US011399603B1

(12) United States Patent
Volin

(10) Patent No.: US 11,399,603 B1
(45) Date of Patent: Aug. 2, 2022

(54) PHYSICALLY-IMPAIRED-ASSISTING MULTI-FUNCTION SAIL

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 17/531,751

(22) Filed: Nov. 21, 2021

(51) Int. Cl.
*A45B 25/14* (2006.01)
*A45B 17/00* (2006.01)
(Continued)

(52) U.S. Cl.
CPC ............ *A45B 25/14* (2013.01); *A01D 46/243* (2013.01); *A01D 46/28* (2013.01); *A45B 17/00* (2013.01); *A45B 19/00* (2013.01); *A45B 23/00* (2013.01); *B62B 15/001* (2013.01); *B62B 15/004* (2013.01); *B63B 17/00* (2013.01); *B63H 8/00* (2020.02); *B63H 9/06* (2013.01); *B63H 9/068* (2020.02); *B63H 9/08* (2013.01); *E03B 3/03* (2013.01); *G03B 21/56* (2013.01); *A01D 46/26* (2013.01); *A01D 2046/262* (2013.01); *A45B 2023/0006* (2013.01); *A45B 2023/0012* (2013.01); *A45B 2023/0031* (2013.01); *A45B 2023/0037* (2013.01); *A45B 2023/0075* (2013.01); *A45B 2023/0081* (2013.01); *B62B 15/005* (2013.01); *B63H 2009/082* (2013.01)

(58) Field of Classification Search
CPC ... B62B 15/001; B62B 15/004; B62B 15/005; B63H 9/06; B63H 9/068; B63H 9/08; B63H 2009/082; A45B 25/14; A45B 17/00; A45B 19/00; A45B 23/00; A45B 2023/0006; A45B 2023/0012; A45B 2023/0031; A45B 2023/0037; A45B 2023/0075; A45B 2023/0081; B63B 17/00
USPC ....... 135/16, 20.1, 20.3, 21, 95, 98; 280/213
See application file for complete search history.

(56) References Cited

U.S. PATENT DOCUMENTS 816,186 A * 3/1906 Roberts .................. A01D 46/26 56/329
3,240,004 A * 3/1966 Muller ................... A01D 46/26 56/329
(Continued)

FOREIGN PATENT DOCUMENTS

CN 201468239 U * 5/2010 ............. A45B 25/22
CN 209930955 U * 1/2020
(Continued)

*Primary Examiner* — Robert Canfield

(57) ABSTRACT

A physically-impaired-assisting multi-function sail comprises: a stanchion, a hoisting navigator for allowing an arthritic to deploy and retract the sail without the need to bend the fingers, a hoisting teeter totter secured to the navigator, a teeter-totter hook-lock secured to the teeter totter for automatically locking and unlocking the teeter totter to deploy and retract the sail, a cable secured to a camber, a cable canal formed into the teeter totter for hiding and protecting the cable within, a pivoting pulley housing secured to the teeter totter, a pivoting pulley hub swingingly attached to the pivoting pulley housing, sail-buttresses hingedly attached to the pivoting pulley hub, a sail canopy secured to the sail-buttresses, multiple cable pulleys rotatably secured at multiple locations within the pivoting pulley housing and pivoting pulley hub, a central tube attached to the pivoting pulley hub, sail-buttress-supporting arms hingedly attached to the sail-buttresses, and a shuttling hub attached to the sail-buttress-supporting arms.

20 Claims, 190 Drawing Sheets

(51) Int. Cl.

| | |
|---|---|
| ***A45B 19/00*** | (2006.01) |
| ***A62B 15/00*** | (2006.01) |
| ***G03B 21/56*** | (2006.01) |
| ***A01D 46/24*** | (2006.01) |
| ***B63B 17/00*** | (2006.01) |
| ***A45B 23/00*** | (2006.01) |
| ***B62B 15/00*** | (2020.01) |
| ***B63H 8/00*** | (2020.01) |
| ***B63H 9/068*** | (2020.01) |
| ***B63H 9/08*** | (2006.01) |
| ***B63H 9/06*** | (2020.01) |
| ***A01D 46/28*** | (2006.01) |
| ***E03B 3/03*** | (2006.01) |
| *A01D 46/26* | (2006.01) |

(56) References Cited

U.S. PATENT DOCUMENTS 3,383,814 A 5/1968 Rowe
3,765,434 A 10/1973 Riggs
4,276,033 A * 6/1981 Krovina .................. F03D 13/25 416/240
4,441,728 A * 4/1984 Schroeder ............. B62B 15/005 296/78.1
4,582,078 A 4/1986 Ma
4,586,525 A 5/1986 Glatz et al.
4,674,523 A 6/1987 Glatz
5,002,081 A 3/1991 Stromeyer
5,785,069 A 7/1998 Glatz
D398,443 S 9/1998 Bolle
5,937,882 A 8/1999 Harbaugh
6,152,156 A * 11/2000 Tung ...................... A45B 17/00 135/21
6,220,261 B1 4/2001 Glatz
6,478,037 B2 11/2002 Tung
D477,458 S 7/2003 Goldwitz
6,588,438 B1 7/2003 Steiner
6,619,306 B2 9/2003 Ma
D497,479 S 10/2004 Jianyong
6,923,193 B2 8/2005 Chen
6,840,253 B2 11/2005 Ma
7,134,442 B2 11/2006 Ma
7,182,355 B1 * 2/2007 MacTaggart .......... B62B 15/004 280/282
7,445,225 B2 * 11/2008 Volk ...................... B62B 15/004 280/282
7,487,787 B2 2/2009 Tung
7,493,909 B2 2/2009 Ma
7,520,289 B1 4/2009 Barber
7,533,680 B2 5/2009 Ma
7,556,051 B2 * 7/2009 Lai ......................... A45B 23/00 135/21
7,600,734 B2 * 10/2009 Clarke .................... F16B 7/105 248/539
7,708,022 B2 5/2010 Ma
7,717,121 B2 5/2010 Glatz
7,886,755 B2 * 2/2011 Tung ...................... A45B 25/14 135/21
7,913,707 B2 3/2011 Lai
7,980,261 B2 7/2011 Glatz
8,104,492 B2 1/2012 Dan
8,360,080 B2 1/2013 Liu et al.
8,413,671 B2 4/2013 Li
9,237,785 B2 1/2016 Ma
9,289,038 B2 3/2016 Ma
9,433,268 B2 9/2016 Ma
9,642,421 B2 5/2017 Ma
9,930,942 B2 4/2018 Ma
10,136,709 B2 11/2018 Ma
11,096,458 B1 * 8/2021 Volin ....................... B60K 8/00
2002/0083969 A1 * 7/2002 Tung ...................... A45B 23/00 135/96
2002/0104557 A1 8/2002 Tung
2003/0146615 A1 * 8/2003 Beckett ................. B62B 15/004 280/771
2003/0192580 A1 * 10/2003 Tung ...................... A45B 17/00 135/20.1
2005/0088836 A1 * 4/2005 Lowe ..................... G03B 15/06 362/18
2005/0229956 A1 * 10/2005 Merritt ................... A45B 17/00 135/20.1
2005/0287922 A1 * 12/2005 Sinisi ..................... A63H 17/26 446/454
2006/0077356 A1 * 4/2006 Merczak ................ G03B 21/56 359/443
2008/0041431 A1 * 2/2008 Tung ...................... A45B 19/00 135/21
2008/0223422 A1 * 9/2008 Lai ......................... A45B 23/00 135/21
2009/0071517 A1 3/2009 Zhoa
2010/0037929 A1 * 2/2010 Liu ........................ A45B 19/04 135/20.3
2010/0192996 A1 * 8/2010 Ma ......................... A45B 25/10 135/20.1
2010/0206346 A1 * 8/2010 Tung ...................... A45B 23/00 135/20.1
2011/0005558 A1 * 1/2011 Lai ......................... A45B 17/00 135/20.1
2011/0030751 A1 * 2/2011 Wu ........................ A45B 25/22 135/98
2011/0259382 A1 * 10/2011 Dalo ....................... E04H 15/18 135/98
2013/0146739 A1 * 6/2013 Zhao ................... E04H 12/2238 248/519
2013/0248677 A1 * 9/2013 Lai ...................... E04H 12/2238 248/514
2018/0030751 A1 * 2/2018 Roberts .................. A45B 23/00
2021/0169187 A1 * 6/2021 Volin ................... A01D 46/243
2021/0301550 A1 * 9/2021 Volin ........................ E03B 3/02

FOREIGN PATENT DOCUMENTS

CN 111802237 A * 10/2020 ........... A01G 25/167
CN 211832150 U * 11/2020
DE 3826197 A * 2/1990 ......... B63B 35/7976
DE 20104771 U1 * 6/2001 ............. A01D 46/26
FR 2651477 A2 * 3/1991 ............... B63H 8/10

* cited by examiner

121

110

PHYSICALLY-IMPAIRED-ASSISTING MULTI-FUNCTION SAIL

1) FIELD OF THE INVENTION

The present invention relates to an umbrella, which is economical to produce, is easy to ship as one unit, requires no tools, and can be quickly and easily folded and unfolded. Particularly, the present invention relates to a physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, comprising:

1) Sail and stanchion plinth system(s),
2) Horizontal-rotation-locking wind-catching-and-redirecting land-yacht-maneuvering system(s),
3) Physically-impaired-assisting arthritic-assisting single-hand-automatic-sail-deploying-and-retracting multi-direction-hoisting system(s), and
4) Wind-catching-and-redirecting rainwater-amassing-and-storing garden-irrigating fruit-harvesting panorama-media-screen-capable land-yacht-powering sail system(s).

2) DESCRIPTION OF THE PRIOR ART

A number of umbrellas have been introduced.

U.S. Pat. No. 3,383,814, issued 1968 May 21, to Blaine F Rowe, demonstrates a sunshade utilizing an umbrella supported by a standard having an outwardly extending arm carrying a vertically adjustable cord to which the umbrella is attached. A brace having two parts relatively rotatable about a longitudinal axis, one part being pivoted to the standard and the other part to the umbrella, together with locking means for locking said parts from movement relative to the standard and the umbrella and clamping means for restraining relative rotation between the parts and operating means for the same.

U.S. Pat. No. 3,765,434, issued 1976 Feb. 3, to Helen Cohen, demonstrates an umbrella assembly comprising a generally cylindrical housing, open at its top and closed at its bottom, a removable cover for closing the top of said housing, and a collapsible umbrella within said housing, said umbrella comprising a handle having extensible sections, the bottom of which is swivelly secured to the inner surface of the bottom wall of the housing, whereby when said umbrella is collapsed and the handle sections retracted the entire umbrella fits within said housing and when said cover is removed and said handle sections extended, the handle extends upwardly from said housing whereby when the umbrella is opened it is located substantially above the top edge of the housing, and means permanently securing the housing to any desired article, such as a chair or the like, whereby said assembly is permanently associated with said article so that the umbrella may be completely housed when not in use.

U.S. Pat. No. 4,582,078, issued 1986 Apr. 15, to Mark J. S. Ma, demonstrates stepless tilting mechanism for an umbrella including a carriage slidable on a hinged upper portion of the mast and which is moved axially against a spring bias after the umbrella has been opened, in order to operate a linkage fast with the upper mast and which reacts against abuttments provided on a fixed lower portion of the mast in order to effect tilting of the upper portion on the mast relatively to the lower portion thereof.

U.S. Pat. No. 4,586,525, issued 1986 May 6, to Adolph Glatz and Peter Glatz, demonstrates a large umbrella arrangement including a stand (2) having a mast (10) to which an extendable and retractable support arm (4) is connected. A connecting member (12) is pivotally connected to the middle area of the support arm (4) and at its other end is pivotally connected to the upper end of the mast (10). One end (26) of the support arm (4) engages the mast (10) by means of a roll (32). This end (26) is further provided with a fork (28) whose arms (30) overlap and receive the mast (10). The support arm (4) is fixable by means of the fork (28) at different height positions on the mast (10), with such fixing in different heights involving the use of an arresting bolt (36) insertable in a bore (34) in the mast (10). At the free end of the support arm (4) is a pin (20) protruding from the support arm from which the umbrella (8) is hung through a hanging means (6).

U.S. Pat. No. 4,674,523, issued 1987 Jun. 23, to Gustav A. Glatz, demonstrates a suspension umbrella having a crown connected to a holder by means of a ball joint. For arresting the ball joint in different positions the ball joint is equipped with an arresting body which is actuatable by means of a screw spindle arranged coaxially to the umbrella axis. A securing device includes a securing screw which is threaded into the crown through a bore in a sleeve in order to prevent relative movement between the crown and the sleeve or ball joint.

U.S. Pat. No. 5,002,081, issued 1991 Mar. 26, to L. Stonemeyer and Co, demonstrates a frame for a collapsible canopy suspended on an externally threaded shaft which extends downwardly from a head in a concave socket at the free end of an overhead supporting arm. A nut which mates with the shaft beneath the frame can be rotated by way of a downwardly extending handle to move the frame into frictional engagement with the underside of the socket while urging the head against the upper side of the socket. If the angular position of the frame is to be changed, or if the frame is to be separated from the arm, the grip of the head and frame upon the socket is relaxed and the shaft is then ready to be withdrawn from an open slot of the socket.

U.S. Pat. No. 5,785,069, issued 1998 Jul. 28, to Gustav Adolf Glatz, demonstrates a standing umbrella having a mast on which the inner end of an outwardly and inwardly movable carrier beam is guided with the outer end of the beam carrying an umbrella stick of a collapsible umbrella and with the carrier beam being held by a connecting strut linkedly arranged between the upper end of the mast the carrier beam. A drive mechanism shifts the inner end of the carrier beam along the length of the mast and the mast has two guide tracks spaced from one another and so profiled that guide elements running there along and carried by the inner end of the mast are held by the shape of the tracks against movement transversely to the direction in which the inner end of the carrier beam is shifted; and the drive mechanism for shifting the inner end of the carrier beam and a drive mechanism for opening and closing the umbrella are so combined with one another that they operate simultaneously in common.

U.S. Pat. No. 5,937,882 issued 1999 Aug. 17, to Kenneth A. Harbaugh, demonstrates an umbrella supported by a mast located alongside the umbrella canopy. The umbrella canopy includes a radial arm connected to an element slidably mounted along the mast. A brace pivotably attaches to the arm and extends to the top of the mast. A flexible line extends from a winder within the mast, over a fixed pulley located at the top of a mast, a second pulley mounted on the sliding element, and then travels through the arm and around a third pulley located at the central region of the umbrella. This line operates the opening mechanism of the umbrella, and also selectively moves the slider element along the mast to adjust the tilt of the canopy assembly.

U.S. Pat. No. 6,220,261, issued 2001 Apr. 24, to Gustav Adolf Glatz, demonstrates an adjustable static umbrella with a static mast (2) to which an arm (10) is secured by means of a hinge (12) allowing for the arm to be either adjusted into a use position or collapsed into a rest position and to be tipped about the hinge (12) tilting axle (14) perpendicular to the mast axis. The hinge (12) has toggle head (80) and a pair of shells (82, 82') symmetrically inverted one to each other, encompassing the toggle head (80) therein and rotatably mounted about the tilting axle (14), while the pair of hinge shells (82, 82') is provided with a length guide perpendicular to the tilting axle (14), in which the arm (10) is inserted. A locking device (90) includes a tilting hinge (92) parallel to the tilting axle (14) and a fastening device (94) allowing for the hinge shells to be pressed one against the other and against the toggle head (80) so that, when said fastening device in the length guide (84) is pulled, the arm cannot be displaced, while the hinge shells (82, 82') encompassing the toggle head cannot be twisted due to pairs of interactive contact surfaces. Releasing the locking device (94) loosens the arm (10) length guide (84), thereby enabling adjustment of the arm, in the area of a tilt angle (a) limited by two end-stops (116, 116', 118, 120), between a rest position and a use position.

U.S. Pat. No. 6,478,037, issued 2002 Nov. 12, to Pai Tung, demonstrates a sunshade including a supporting rod, a canopy support frame, and a canopy. An adjusting sleeve is slidably mounted around the supporting rod. A holding sleeve is pivotally connected to an upper end of the supporting rod. An arcuate tube is slidably extended through the holding sleeve. An elbow is mounted to a first end of the arcuate tube and a reel is mounted to a second end of the arcuate tube. A connecting rod is connected between the second end of the arcuate tube and the adjusting sleeve. An anchor is provided to be releasably engaged in an anchor room in the elbow to reliably retain the canopy support frame in a desired tilting angle relative to the supporting rod. The arcuate tube and the supporting rod can be folded to further reduce the overall volume of the sunshade.

U.S. Pat. No. 6,588,438, issued 2003 Jul. 8, to Walter Steiner, demonstrates a free-arm shade having radial shade ribs (6), support ribs (7) attached to the latter, and a shade rod slide (8) that is freely attached to support ribs (7). It also has a decentral pole (1) standing outside the shade. One of the shade ribs is vertically displaceably attached to pole (1) by its outer end, and functions as a side arm (2). On its top side, it is connected to pole tip (11) via an articulated rib (4), with this shade rib (2) having a pivot joint (13) between the edge of the shade fabric and the pole. Articulated rib (4) is connected to shade rib (2) via a pivot hinge (12). Shade rib (2) can therefore be pivoted around the axis between pivot joint (13) and pivot hinge (12) so that the entire shade can be tilted sideways in relation to pole (1).

U.S. Pat. No. 6,619,306, issued 2003 Sep. 16, to Mark J. S. Ma, demonstrates a parasol opening device incorporating a parasol for opening/closing a canopy of the parasol. The parasol includes a tubular post for movably receiving the parasol opening device therein. The parasol opening device is movable along the post between an open position and a closed position. A canopy support arm has a first end pivotally attached to the parasol opening device and a second end to which a canopy system is pivoted. A link has a first end pivoted to the post and a second end pivotally attached to a slide which is movable along the arm. A rope having a predetermined and fixed length partially extends through the post, the parasol opening device and the arm with a first end of the rope fixed to the post and a second end of the rope attached to a runner of the canopy system whereby driving the rope causes the canopy system to open/close. The parasol opening device includes a movement control device for guiding/controlling the parasol opening device to move along the post between the open position and the closed position and thus driving the rope to open/close the canopy system.

U.S. Pat. No. 6,840,253, issued 2005 Nov. 11, to Joen-Shen Ma, describes a side post umbrella including a side post to which a side arm is mounted by an arm retainer that is a tubular member receiving an end of the side arm therein. A rib skeleton is hung on the side arm and supports a shade. A shade rotating device is provided for rotating the side arm and thus the shade, including a cylinder rotatably received in the arm retainer and fixed to the side arm to be rotatable in unison therewith A drive bar is pivotally connected to the cylinder for manually rotating the cylinder. A latch bar having a latch pin is movable with respect to the cylinder between a latched position where the latch pin engages a securing plate to secure the side arm and thus the shade at a corresponding angular position and a released position where the latch pin disengages the securing plate to allow for free rotation of the side arm and the shade. A helical spring is arranged between the latch bar and the cylinder to bias the latch pin toward the latched position. The drive bar is pivoted to the latch bar. The drive bar and the pivotal connection between the drive bar and the cylinder form a leverage that allows for manually driving the latch U.S. Pat. No. 6,923,193, issued 2005 Aug. 2, to Shiow-Hui Chen, demonstrates a stand frame for an umbrella comprising a shaft, an umbrella frame, a foldable hanger arm hanging the umbrella frame, a height-adjustable device, and an angle-adjusting device. The stand frame for an umbrella utilizes the height-adjustable device and the angle-adjusting device to control the expansion/contraction and angular orientation of the umbrella frame thereof. The height-adjustable device provides a mechanism by which the middle section of the shaft can rotate horizontally, so as to move the umbrella frame about the shaft. A pull string extending from the shaft to the umbrella frame drives a vertical movement of the upper section of the shaft and the expansion of the umbrella frame simultaneously. A set of other pull strings are manipulated by the angle-adjusting device to vary the angular orientation of the umbrella frame in three dimensions.

U.S. Pat. No. 7,134,442 issued 2006 Nov. 14, to Oliver Joen-an Ma, demonstrates an umbrella assembly that comprises a canopy frame, a support pole, an extension mechanism, and a canopy deployment mechanism. The support pole has a first member that has a first end and a second end and a second member. The second member is coupled with the canopy frame and with the first member and is movable relative to the first member between a retracted position and an extended position. The extension mechanism is configured to be driven by a crank handle to move the second member between the retracted position and the extended position. The canopy deployment mechanism is configured to be driven by a crank handle independently of the extension mechanism to open and close the canopy frame.

U.S. Pat. No. 7,487,787, issued 2009 Feb. 10, to Pai Tung, demonstrates a sunshade including a supporting rod, a holding sleeve pivotably mounted to an upper end of the supporting rod, an arcuate tube slidably extended through the holding sleeve and including an end for coupling with a canopy support frame, a reel mounted to the other end of the arcuate tube, a mounting member mounted to the supporting rod, a quick release mounted around the other end of the arcuate tube, and a connecting rod including a first end pivotally connected to the mounting member and a second end pivotally connected to the quick release. When the quick release is in a clamping position, the quick release is fixedly clamped on the arcuate tube, and the other end of the arcuate tube is supported by the connecting rod. When the quick release is in a released position, relative sliding movement between the quick release and the arcuate tube is allowed.

U.S. Pat. No. 7,493,909, issued 2009 Feb. 24, to Oliver Joen-An Ma, demonstrates an umbrella that includes a support pole, at least a portion of which extends upwardly in use, a suspending pole, a canopy, and a mechanism for rotating the suspending pole about its longitudinal axis. The suspending pole is mounted transversely to the support pole and has first and second ends and a longitudinal axis. The canopy is suspended in use from the second end of the support pole. The mechanism includes a plurality of gear teeth coupled with the suspending pole to cause the suspending pole to rotate in either direction about said axis upon movement of the gear teeth and to thereby cause the canopy to tilt in either direction about said axis.

U.S. Pat. No. 7,520,289, issued 2009 Apr. 21, to James N Barber, demonstrates a support apparatus for a cafe umbrella having a support arm pivotally attached to a generally vertical pole. In a preferred uneven-arm arrangement, a canopy-supporting end of the arm is further to one side of the pole than a second, actuator-connected end of the arm is to the other side of the pole. An actuator mechanism connected between the pole and the shorter portion of the arm and can be used to raise or lower the canopy supporting end of the arm by moving the second end of the arm respectively toward or away from the pole. A cable assembly runs along the length of the support arm so that one end hangs beneath the canopy supporting end of the arm where it can retain a removable canopy. The other end of the cable assembly is attached to the pole so that when the actuator draws the arm toward the pole and raises its canopy-supporting end, the free end of the cable moves downward so as to collapse the canopy.

U.S. Pat. No. 7,533,680, issued 2009 May 19, to Oliver Joen-An Ma, demonstrates an umbrella or sunshade that includes a support pole assembly and a tilt assembly. The support pole assembly includes a first support pole and a second support pole. The second support pole has a proximal end and a distal end and is curved therebetween. The second support pole is coupled with and extends generally transverse to the first support pole. The tilt assembly includes a transmission and a drive shaft. The drive shaft is housed in the second support pole. The drive shaft has a first end coupled with the transmission and a second end adjacent to the distal end of the second support pole. The transmission is configured to convert rotation of a crank handle into rotation of the drive shaft to pivot a canopy coupled with the distal end of the second support pole relative to the first support pole.

U.S. Pat. No. 7,708,022, issued 2010 May 4, to Oliver Joen-An Ma, demonstrates an umbrella that comprises a support pole, a suspending pole mounted transversely to the support pole, a hub, a canopy, and means for coupling and decoupling the hub from the suspending pole. The suspending pole has first and second ends and a longitudinal axis that defines an arc. The hub is attached to second end of suspending pole. The canopy is suspended in use from the hub. The coupling and decoupling means permits the canopy to be rotated about the longitudinal axis of the supporting pole.

U.S. Pat. No. 7,717,121, issued 2010 May 18, to Adolf Glatz, demonstrates an invention relating to a free arm parasol which comprises a pole (2) whereon an extension arm (10) is guided such that it can be extended and detracted in the direction of the axis thereof, and can pivoted about the axis thereof. The extension arm (10) supports a parasol (12) on the end thereof and is rotationally mounted on the other end in a bearing (14). A carrier element (16), which is connected in an articulated manner to the pole (2), is connected to bearing. Also, a stopping device (24), which is used to stop the pivotable positioning of the extension arm (10), is provided on the bearing (14). Said stopping device comprises a steering bar (26) which is arranged in the extension of the extension arm (10), can be placed counter to the carrier element (16), can be locked to the carrier element (16) and can be pivoted about the axis of the extension arm (10) when in the unlocked state in order to improve the handling of the free arm parasol. Said arm is coupled in a detachable manner to the extension arm by means of a coupling device, according to a selected rotational angle in relation to the extension arm (10).

U.S. Pat. No. 7,913,707, issued 2011 Mar. 29, to Jin-Sheng Lai, demonstrates an umbrella including an upright post, a swing mechanism mounted on the upright post and a frame mounted on the swing mechanism. The swing mechanism includes a mounting seat mounted on the upright post, a pivot seat pivotally mounted on the mounting seat and having a lower end provided with a worm wheel, a worm rotatably mounted on the mounting seat and meshing with the worm wheel, a driven gear secured on the worm, a propeller shaft rotatably mounted on the upright post, a drive gear secured on the propeller shaft and meshing with the driven gear, and a rocker arm secured on the propeller shaft. Thus, when the swing mechanism is operated, the frame is rolled and tilted relative to the upright post leftward or rightward to adjust the inclined angle the frame to provide a better shading effect.

U.S. Pat. No. 7,980,261, issued 2011 Jul. 19, to Adolph Gustav Glatz, demonstrates an invention originating with a mast on the upper end of which a locking and tiltable jib support is arranged. A jib is guided in the jib support such that said jib can be slid and fastened and carries a roof construction on the outer end thereof, wherein said roof construction can be extended like a canopy, fan, or frame. To make the extension and retraction of the jib easier, it is proposed that the jib support be designed with at least four guide and locking rollers, of which at least two engage in a left-handed track and two in a right-handed track of the jib.

U.S. Pat. No. 8,104,492 issued 2012 Jan. 31, to Wu We Dan, demonstrates an adjustable offset umbrella having a generally vertical main pole and a sliding member slidably mounted to the main pole. The sliding member includes a locking mechanism for securing it at a desired location along the main pole. One end of an arm is associated with the sliding member, and the other end supports an umbrella canopy. A winding mechanism is associated with the sliding member and moves with it. A line extends from the winding mechanism to the umbrella canopy. Operating the winding mechanism opens and closes the umbrella canopy, and moving the sliding member up or down the main pole adjusts the angle of the canopy with respect to the main pole.

U.S. Pat. No. 8,360,080 issued 2013 Jan. 29, to Kai Liu and Zhonglin Wang demonstrates an invention relating to an umbrella, particularly a sun umbrella or rain umbrella, comprising a holding structure and an umbrella roof attached thereto by means of a joint, the joint being able to be locked by means of a cable or Bowden wire running through at least one part of the holding structure, characterized in that the joint is designed as a purely rotating joint, wherein an engagement element located on the umbrella roof is connected to the cable or Bowden wire or is otherwise mechanically operationally connected thereto, in order to releaseably engage in a segment of the joint associated with the holding structure to lock the joint.

U.S. Pat. No. 8,413,671, issued 2013 Apr. 9, to Wanda Ying Li, demonstrates an intelligence outdoor shading arrangement including an outdoor shading system, an environmental sensor device and a functional controller. The outdoor shading system includes at least an outdoor shading device including a supporting frame, a power source, an awning frame suspendedly and movably supported by the supporting frame, and a shelter mounted to the awning frame to define a shading area under the shelter. The environmental sensor device is electrically linked to the power source and is installed to the outdoor shading system for detecting an environmental change of the shading system in responsive to the shading area thereof. The functional controller is electrically linked to the environmental sensor device and is operatively controlled the awning frame of the outdoor shading system, wherein when the functional controller receives a command signal from the environmental sensor device, the awning frame is automatically adjusted to regulate the shading area thereof in responsive to the environmental change of the outdoor shading system.

U.S. Pat. No. 9,237,785 issued 2016 Jan. 19, to Oliver Joen-an Ma, demonstrates an umbrella assembly comprising: an upright pole; a cantilevered beam having a first end disposed away from the upright pole and a second end disposed adjacent to the upright pole; a canopy frame coupled with the first end of the cantilevered beam; a tilt mechanism operable to rotate the canopy frame about an axis extending through the cantilevered beam, the tilt mechanism including a rotatable shaft disposed in the cantilevered beam; and a clutch mechanism including a first component fixed to the cantilevered beam adjacent to the first end and a second component, the clutch mechanism having an engaged configuration and a disengaged configuration such that when the clutch mechanism is in the disengaged configuration the second component is disposed closer to the upright pole.

U.S. Pat. No. 9,289,038 issued 2016 Mar. 22, to Oliver Joen-an Ma, demonstrates an umbrella having a transverse member mounted canopy control module. The umbrella has a support structure and a canopy. The support structure has a first support member having an upper end and a second support member. The second support member has a first end disposed adjacent to the first support member and a second end disposed away from the first end. The second support member extending along a longitudinal axis disposed transverse to the first support member. The canopy has an upper hub. The upper hub is coupled with the second support member. The umbrella also has an enclosure disposed at the first end of the second support member. A canopy control mechanism is at least partially disposed in the enclosure to alter the configuration of the canopy.

U.S. Pat. No. 9,433,268, issued 2016 Sep. 6, to Mark J. S. Ma, demonstrates an umbrella having the crown of the canopy coupled to a support structure via a pivot joint that is structured and configured to allow swiveling and/or tilting of the canopy with ease by a user, in more than one plane or with more than one degree of freedom with respect to the support structure. The canopy frame includes a longitudinal central support hub, and the pivot joint is rotatable about a rotation axis, wherein the axis of the canopy support hub makes a fixed or variable non-zero angle with respect to the pivot joint rotation axis. As a result of the angle between the pivot joint rotation axis and the canopy support hub axis. The rotation of the pivot joint causes tilting of the canopy support hub axis, thus tilting the canopy to change its orientation.

U.S. Pat. No. 9,642,421 issued 2017 May 9, to Oliver Joen-an Ma, demonstrates an umbrella canopy tilt mechanism that can include a crank mechanism and an automatic bending mechanism. The crank mechanism includes a crank and a rope. The crank is configured to be swivel-mounted on one end of the curved cantilever of a sunshade umbrella. The automatic bending mechanism is configured to be installed in a shaft of the sunshade umbrella. One end of the rope is configured to connect to the crank. The other end of the rope is configured to extend along the curved cantilever to reach the other end of the curved cantilever. The rope is configured to extend through the shaft and automatic bending mechanism to connect to a lower runner. The lower runner is held and slides on the shaft. An upper runner is fixedly secured to the shaft. The umbrella canopy tilt mechanism can further be provided with a rotation mechanism.

U.S. Pat. No. 9,930,942, issued 2018 Apr. 3, to Oliver Joen-an Ma, demonstrates umbrella assemblies configured to retract and extend, tilt side to side, and open and close. In some embodiments, the umbrella assembly can include a cantilevered beam. The umbrella assembly can further include a tilt mechanism operable to rotate the canopy frame. The umbrella assembly can include a clutch mechanism fixed to the cantilevered beam. The umbrella assembly can also include an integrated mechanism to both open and close the canopy frame and raise and lower the cantilevered beam.

U.S. Pat. No. 10,136,709 issued 2018 Nov. 27, to Oliver Joen-an Ma, demonstrates a cantilever umbrella assembly that includes an upright pole, a runner, a transverse pole, and a canopy. The upright pole includes an upright guide surface. The runner is coupled with the upright pole and has a bearing coupled with the guide surface for guiding the runner along the upright pole. The cantilever umbrella assembly includes a deployable tension member with a first end disposed in the transverse pole and a second end coupled with the canopy.

U.S. Pat. No. D398,443 issued Sep. 22, 1998 1998-09-22, to Bernfried Bolle, depicts the ornamental design for an umbrella cap, as shown described.

U.S. Pat. No. D477,458, issued 2003 Jul. 22, to Brian L. Goldwitz, depicts the ornamental design for an umbrella assembly, as shown and described.

U.S. Pat. No. D497,479, issued 2004 Oct. 26, to Xie Jianyong, depicts the ornamental design for a retractable suspensory umbrella, as shown and described U.S. Publication No 20020104557A1, issued 2001 Feb. 2, to Pai Ting, describes an adjusting sleeve assembly including an adjusting sleeve slidably mounted around an upright support member of a sunshade and a mounting member extending outward from the adjusting sleeve and including a U-shape path therein. A pivotal block is pivotally mounted in the mounting member. A connecting rod includes a first end connected to the pivotal block to pivot therewith and a second end pivotally connected to an arcuate tube for supporting a canopy of the sunshade. A push member is slidably received in the pivotal block and includes an end for manual operation. A positioning peg includes a first end securely attached to the push member to move therewith and a second end that is urged into one of two positioning ends of the U-shape path for retaining the connecting rod in place with respect to the mounting member.

U.S. Publication No 20050229956A1, issued 2005 Jan. 24, to Ronald Merritt and Jian Yong Xie, describes an instant gazebo which is movable between an open and closed position quickly and which is side supported to allow maximum flexibility for placement of furniture in the gazebo. The gazebo includes an openable and closable canopy to which is connected a screen enclosure which extends completely around the periphery of the canopy. The screen enclosure may remain attached to the canopy in both the open and closed positions of the gazebo. The preferred actuation mechanism for the gazebo includes an elongated curved support arm which slides through a hollow sleeve carried at the top of a supporting mast. The support arm slides through the hollow sleeve as the gazebo is opened or closed. After the support arm is raised by the user, a hand crank is actuated to open the canopy. A rotatable mast support allows the gazebo to be easily rotated about the axis of the mast.

U.S. Publication No 20090071517A1, issued 2009 Mar. 19, to Stephen Zhoa, describes umbrella devices and methods for dual-function umbrellas that may combine a vertical-supported and inclined-suspended umbrella in one structure. A dual-function umbrella that may have vertical supporting and incline suspending structure may have a frame column, umbrella holder and a crank mechanism to position the umbrella holder; the umbrella holder may include a fixed umbrella bracket, moveable umbrella bracket, multiple umbrella ribs with one end pin-jointed to the fixed umbrella bracket, and multiple supporting ribs with opposite ends pin-jointed to the central part of a corresponding umbrella rib and the moveable umbrella bracket. The dual-function umbrella may also have a tilting bar and a cross bar wherein the frame column may be equipped with a moveable locking gear for locking the bottom end of the cross bar. The crank mechanism may be positioned at the cross bar bottom end. Each end of the tilting bar may be pin-jointed to the middle part of the frame column and the lower part of the cross bar respectively. The top end of the cross bar may be pin-jointed to the middle part of the central umbrella rod, and the cross bar may have a slot on the lateral side corresponding to the frame column. Inside the slot there may be an embedded slide block, and the top end of the frame column may be pin-jointed to the slide block, such that the top end of the frame column slide block may move along the slot of and relative to the cross bar.

DISADVANTAGES OF THE PRIOR ART

The prior art have failed to solve many problems associated with such under-reach bridge cranes as follows:

1) No prior art mention or disclose any umbrellas, having horizontal-rotation-locking spring-loaded nipple-lock 106.
   Therefore, the prior art of umbrellas:
   a) Not capable of engaging and disengaging horizontal-rotation-locking pin 107 from horizontal-rotation-locking openings 108 to horizontally rotate physically-impaired-assisting arthritic-assisting single-hand–automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
      in the directions of arrows 135, and 136 (see FIG. 19, and FIG. 49; and
   b) Not capable of engaging and disengaging horizontal-rotation-locking pin 107 from horizontal-rotation-locking openings 108 to horizontally rotate physically-impaired-assisting arthritic-assisting single-hand–automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
      in the directions of arrows 137, 138*a*, 138*b*, 139*a*, 139*b*, 140, 141*a*, 141*b*, 142*a*, and 142*b* (see FIG. 6, FIG. 7A, FIG. 7B, FIG. 30, FIG. 41, FIG. 42, FIG. 43, and FIG. 67).
2) No prior art mention or disclose any umbrellas, having horizontal-rotation-locking openings 108.
   Therefore, the prior art of umbrellas:
   a) Not capable of lockingly allowing horizontal-rotation-locking pin 107 to engage and disengage to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
      in the directions of arrows 135, and 136
      (see FIG. 19, and FIG. 49; and
   b) Not capable of lockingly allowing horizontal-rotation-locking pin 107 to engage and disengage horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
      in the directions of arrows 137, 138*a*, 138*b*, 139*a*, 139*b*, 140, 141*a*, 141*b*, 142*a*, and 142*b*
      (see FIG. 6, FIG. 7A, FIG. 7B, FIG. 30, FIG. 41, FIG. 42, FIG. 43, and FIG. 67).
3) No prior art mention or disclose any umbrellas, having physically-impaired-assisting arthritic-assisting single-hand-sail-deploying-and-retracting land-yacht-maneuvering multi-direction-hoisting ergonomic navigator 112.
   Therefore, the prior art of umbrellas:
   a) Not capable of allowing a physically-impaired or arthritic to easily deploy and retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail without the need to bend the fingers in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40);

b) Not capable of automatically deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40); and c) Not capable of automatically engaging physically-impaired-assisting arthritic-assisting single-hand-automatic-sail-deploying-and-retracting land-yacht-maneuvering multi-direction-hoisting slidable-rockable cantilever teeter totter 113, teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e* (see FIG. 2, FIG. 3, FIG. 4, FIG. 5, FIG. 37, FIG. 38, FIG. 39, and FIG. 40).

4) No prior art mention or disclose any umbrellas, having physically-impaired-assisting arthritic-assisting single-hand-automatic-sail-deploying-and-retracting land-yacht-maneuvering multi-direction-hoisting slidable-rockable cantilever teeter totter 113.
Therefore, the prior art of umbrellas:

a) Not capable of automatically engaging teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40); and b) Not capable of providing cantilevered weight-balance for the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from falling over
in the directions of arrows 150*a*, 150*b*, 151*a*, 151*b*, 152*a*, 152*b*, 152*c*, 152*d*, and 152*e*
(see FIG. 39 and FIG. 40).

5) No prior art mention or disclose any umbrellas, having teeter-totter-locking spring-loaded automatic hook-lock 114.
Therefore, the prior art of umbrellas:

a) Not capable of automatically locking physically-impaired-assisting arthritic-assisting single-hand-automatic-sail-deploying-and-retracting land-yacht-maneuvering multi-direction-hoisting slidable-rockable cantilever teeter totter 113 to fully deploy the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from collapsing and causing injury
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40);

b) Not capable of unlocking physically-impaired-assisting arthritic-assisting single-hand-automatic-sail-deploying-and-retracting land-yacht-maneuvering multi-direction-hoisting slidable-rockable cantilever teeter totter 113 to safely retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-saildeploying-and-retracting single-movement-ergonomic-navigator-to-produce-multi-function sail to allow for compact storage and moving in the directions of arrows 153_a_, 153_b_, 153_c_, 154_a_, 154_b_, and 154_c_ (see FIG. 28, and FIG. 64); and c) Not capable of automatically locking physically-impaired-assisting arthritic-assisting single-hand-automatic-sail-deploying-and-retracting land-yacht-maneuvering multi-direction-hoisting slidable-rockable cantilever teeter totter 113 to assist the physically-impaired or arthritic in the directions of arrows 153_a_, 153_b_, 153_c_, 154_a_, 154_b_, and 154_c_

(see FIG. 28, and FIG. 64).

6) No prior art mention or disclose any umbrellas, having teeter-totter rocking tubular clamp 116.

Therefore, the prior art of umbrellas:

a) Not capable of slidably navigating physically-impaired-assisting arthritic-assisting single-hand-automatic-sail-deploying-and-retracting land-yacht-maneuvering multi-direction-hoisting slidable-rockable cantilever teeter totter 113 for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155_a_, 155_b_, 156_a_, and 156_b_

(see FIG. 29A, FIG. 29B, FIG. 65A, and FIG. 65B);

b) Not capable of preventing physically-impaired-assisting arthritic-assisting single-hand-automatic-sail-deploying-and-retracting land-yacht-maneuvering multi-direction-hoisting slidable-rockable cantilever teeter totter 113 from disengaging from upper stanchion 109 in the directions of arrows 155_a_, 155_b_, 156_a_, and 156_b_

(see FIG. 29A, FIG. 29B, FIG. 65A, and FIG. 65B); and c) Not capable of pivotably rocking to allow physically-impaired-assisting arthritic-assisting single-hand-automatic-sail-deploying-and-retracting land-yacht-maneuvering multi-direction-hoisting slidable-rockable cantilever teeter totter 113 a defined range of motion for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155_a_, 155_b_, 156_a_, and 156_b_

(see FIG. 29A, FIG. 29B, FIG. 65A, and FIG. 65B).

7) No prior art mention or disclose any umbrellas, having cable-securing tubular clamp-securing camber 117.

Therefore, the prior art of umbrellas:

a) Not capable of securely and discretely locking canal-hidden automatic-sail-deploying-and-retracting cable 118 in the directions of arrow 157_a_ and 157_b_

(see FIG. 58, FIG. 59A, FIG. 59B, FIG. 60, and FIG. 61); and b) Not capable of guiding physically-impaired-assisting arthritic-assisting single-hand-automatic-sail-deploying-and-retracting land-yacht-maneuvering multi-direction-hoisting slidable-rockable cantilever teeter totter 113 to assist and control deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155_a_, 155_b_, 156_a_, and 156_b_

(see FIG. 29A, FIG. 29B, FIG. 65A, and FIG. 65B).

8) No prior art mention or disclose any umbrellas, having canal-hidden automatic-sail-deploying-and-retracting cable 118.

Therefore, the prior art of umbrellas:

Not capable of automatically engaging teeter-totter rocking tubular clamp 116, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 164_a_, 164_b_, 164_c_, 164_d_, 164_e_, 165_a_, 165_b_, 165_a_, 165_a_, 165_a_, 165_a_, 165_a_, 165_a_, 165_a_, 165_a_, 165_a_, 165_a_, 165_a_, 165_a_, and 169_d_

(see FIG. 60, FIG. 61, FIG. 63, and FIG. 64).

9) No prior art mention or disclose any umbrellas, having cable-hiding cable-guiding canal 119.

Therefore, the prior art of umbrellas:

a) Not capable of discretely hiding canal-hidden automatic-sail-deploying-and-retracting cable 118 within to be more aesthetically pleasing in the directions of arrows 164_a_ and 165_a_

(see FIG. 58, FIG. 59A, FIG. 59B, FIG. 60, and FIG. 61);

b) Not capable of discretely hiding canal-hidden automatic-sail-deploying-and-retracting cable 118 within to prevent injury in the directions of arrows 164_a_ and 165_a_

(see FIG. 58, FIG. 59A, FIG. 59B, FIG. 60, and FIG. 61); and c) Not capable of guiding canal-hidden automatic-sail-deploying-and-retracting cable 118 to assist in deploying and retracting the physically-impairedassisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 164_a_, 164_b_, 164_c_, 164_d_, 164_e_, 165_a_, 165_b_, 165_a_, 165_a_, 165_a_, 165_a_, 165_a_, 165_a_, 165_a_, 165_a_, 165_a_, 165_a_, 165_a_, 165_a_, and 169_d_

(see FIG. 60, FIG. 61, FIG. 63, and FIG. 64).

10) No prior art mention or disclose any umbrellas, having wind-catching-and-redirecting rainwater-amassing-and-storing garden-irrigating fruit-harvesting panorama-media-screen-capable land-yacht-powering sail 123.

Therefore, the prior art of umbrellas:

a) Not capable of harvesting fruit and nuts from trees;

b) Not capable of collecting rainwater on a marine craft;

c) Not capable of collecting rainwater for irrigation;

d) Not capable of multi-adjustably catching and redirecting wind to maneuver a land-yacht; and e) Not capable of providing shade in the directions of arrows 131_a_, 131_b_, 131_c_, 132_a_, 132_b_, 132_c_, 133_a_, 133_b_, 133_c_, 134_a_, 134_b_, 134_c_, 155_a_, 155_b_, 155_c_, 171_a_, 171_b_, 171_c_, 171_d_, 172_a_, 172_b_, 172_c_, 172_d_, 173_a_, 173_b_, 173_c_, 173_d_, 174_a_, 174_b_, 175_a_, 175_b_, 176_a_, 176_b_, 176_c_, 176_d_, 177_a_, 177_b_, 177_c_, 177_d_, 178_a_, 178_b_, 178_c_, and 178_d_

(see FIG. 9, FIG. 10, FIG. 11, FIG. 12, FIG. 16, FIG. 17, FIG. 18, FIG. 19, FIG. 20, FIG. 21, FIG. 45, FIG. 46, FIG. 47, FIG. 48, FIG. 52, FIG. 53, FIG. 54, FIG. 56, and FIG. 57).

OBJECTS AND ADVANTAGES OF THE INVENTION

The present invention substantially departs from the conventional concepts and designs of the prior art. In doing so, the present invention provides a physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail (having: a) Sail and stanchion plinth system, b) Horizontal-rotation-locking wind-catching-and-redirecting land-yacht-maneuvering system, c) Physically-impaired-assisting arthritic-assisting single-hand-automatic-sail-deploying-and-retracting multi-direction-hoisting system, and d) Wind-catching-and-redirecting rainwater-amassing-and-storing garden-irrigating fruit-harvesting panorama-media-screen-capable land-yacht-powering sail system, having many new and significant features, functions, and advantages, which overcome all the disadvantages of the prior art, as follows:

1) It is an object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having horizontal-rotation-locking spring-loaded nipple-lock 106.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht in the directions of arrows 135, and 136

(see FIG. 19, and FIG. 49; and b) Capable of engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration in the directions of arrows 137, 138_a_, 138_b_, 139_a_, 139_b_, 140, 141_a_, 141_b_, 142_a_, and 142_b_

(see FIG. 6, FIG. 7A, FIG. 7B, FIG. 30, FIG. 41, FIG. 42, FIG. 43, and FIG. 67).

2) It is an object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having horizontal-rotation-locking openings 108.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of lockingly allowing horizontal-rotation-locking pin 107 to engage and disengage to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht in the directions of arrows 135, and 136

(see FIG. 19, and FIG. 49; and b) Capable of lockingly allowing horizontal-rotation-locking pin 107 to engage and disengage horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration in the directions of arrows 137, 138*a*, 138*b*, 139*a*, 139*b*, 140, 141*a*, 141*b*, 142*a*, and 142*b*

(see FIG. 6, FIG. 7A, FIG. 7B, FIG. 30, FIG. 41, FIG. 42, FIG. 43, and FIG. 67).

3) It is another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having physically-impaired-assisting arthritic-assisting single-hand-sail-deploying-and-retracting land-yacht-maneuvering multi-direction-hoisting ergonomic navigator 112.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of allowing a physically-impaired or arthritic to easily deploy and retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail without the need to bend the fingers in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40);

b) Capable of automatically deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40); and c) Capable of automatically engaging physically-impaired-assisting arthritic-assisting single-hand-automatic-sail-deploying-and-retracting land-yacht-maneuvering multi-direction-hoisting slidable-rockable cantilever teeter totter 113, teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40).

4) It is another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having physically-impaired-assisting arthritic-assisting single-hand-automatic-sail-deploying-and-retracting land-yacht-maneuvering multi-direction-hoisting slidable-rockable cantilever teeter totter 113.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of automatically engaging teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40); and b) Capable of providing cantilevered weight-balance for the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from falling over
in the directions of arrows 150*a*, 150*b*, 151*a*, 151*b*, 152*a*, 152*b*, 152*c*, 152*d*, and 152*e*
(see FIG. 39 and FIG. 40).

5) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having teeter-totter-locking spring-loaded automatic hook-lock 114.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of automatically locking physically-impaired-assisting arthritic-assisting single-hand-automatic-sail-deploying-and-retracting land-yacht-maneuvering multi-direction-hoisting slidable-rockable cantilever teeter totter 113 to fully deploy the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from collapsing and causing injury
in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
(see FIG. 2, FIG. 3, FIG. 4, FIG. 5, FIG. 37, FIG. 38, FIG. 39, and FIG. 40);

b) Capable of unlocking physically-impaired-assisting arthritic-assisting single-hand-automatic-sail-deploying-and-retracting land-yacht-maneuvering multi-direction-hoisting slidable-rockable cantilever teeter totter 113 to safely retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to allow for compact storage and moving
in the directions of arrows 153*a*, 153*b*, 153*c*, 154*a*, 154*b*, and 154*c*
(see FIG. 28, and FIG. 64); and c) Capable of automatically locking physically-impaired-assisting arthritic-assisting single-hand-automatic-sail-deploying-and-retracting land-yacht-maneuvering multi-direction-hoisting slidable-rockable cantilever teeter totter 113 to assist the physically-impaired or arthritic
in the directions of arrows 153*a*, 153*b*, 153*c*, 154*a*, 154*b*, and 154*c*
(see FIG. 28, and FIG. 64).

6) It is yet still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having teeter-totter rocking tubular clamp 116.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of slidably navigating physically-impaired-assisting arthritic-assisting single-hand-automatic-sail-deploying-and-retracting land-yacht-maneuvering multi-direction-hoisting slidable-rockable cantilever teeter totter 113 for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 155*a*, 155*b*, 156*a*, and 156*b*
(see FIG. 29A, FIG. 29B, FIG. 65A, and FIG. 65B);

b) Capable of preventing physically-impaired-assisting arthritic-assisting single-hand-automatic-sail-deploying-and-retracting land-yacht-maneuvering multi-direction-hoisting slidable-rockable cantilever teeter totter 113 from disengaging from upper stanchion 109
in the directions of arrows 155*a*, 155*b*, 156*a*, and 156*b*
(see FIG. 29A, FIG. 29B, FIG. 65A, and FIG. 65B); and c) Capable of pivotably rocking to allow physically-impaired-assisting arthritic-assisting single-hand-automatic-sail-deploying-and-retracting land-yacht-maneuvering multi-direction-hoisting slidable-rockable cantilever teeter totter 113 a defined range of motion for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155*a*, 155*b*, 156*a*, and 156*b*

(see FIG. 29A, FIG. 29B, FIG. 65A, and FIG. 65B).

7) It is yet still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having cable-securing tubular clamp-securing camber 117.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of securely and discretely locking canal-hidden automatic-sail-deploying-and-retracting cable 118 in the directions of arrow 157*a* and 157*b*

(see FIG. 58, FIG. 59A, FIG. 59B, FIG. 60, and FIG. 61); and b) Capable of guiding physically-impaired-assisting arthritic-assisting single-hand-automatic-sail-deploying-and-retracting land-yacht-maneuvering multi-direction-hoisting slidable-rockable cantilever teeter totter 113 to assist and control deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155*a*, 155*b*, 156*a*, and 156*b*

(see FIG. 29A, FIG. 29B, FIG. 65A, and FIG. 65B).

8) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having canal-hidden automatic-sail-deploying-and-retracting cable 118.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

Capable of automatically engaging teeter-totter rocking tubular clamp 116, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*

(see FIG. 60, FIG. 61, FIG. 63, and FIG. 64).

9) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having cable-hiding cable-guiding canal 119.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of discretely hiding canal-hidden automatic-sail-deploying-and-retracting cable 118 within to be more aesthetically pleasing in the directions of arrows 164*a* and 165*a*

(see FIG. 58, FIG. 59A, FIG. 59B, FIG. 60, and FIG. 61);

b) Capable of discretely hiding canal-hidden automatic-sail-deploying-and-retracting cable 118 within to prevent injury in the directions of arrows 164*a* and 165*a*

(see FIG. 58, FIG. 59A, FIG. 59B, FIG. 60, and FIG. 61); and c) Capable of guiding canal-hidden automatic-sail-deploying-and-retracting cable 118 to assist in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*

(see FIG. 60, FIG. 61, FIG. 63, and FIG. 64).

10) It is a further object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having wind-catching-and-redirecting rainwater-amassing-and-storing garden-irrigating fruit-harvesting panorama-media-screen-capable land-yacht-powering sail 123.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of harvesting fruit and nuts from trees;

b) Capable of collecting rainwater on a marine craft;

c) Capable of collecting rainwater for irrigation;

d) Capable of multi-adjustably catching and redirecting wind to maneuver a land-yacht; and e) Capable of providing shade in the directions of arrows 131*a*, 131*b*, 131*c*, 132*a*, 132*b*, 132*c*, 133*a*, 133*b*, 133*c*, 134*a*, 134*b*, 134*c*, 155*a*, 155*b*, 155*c*, 171*a*, 171*b*, 171*c*, 171*d*, 172*a*, 172*b*, 172*c*, 172*d*, 173*a*, 173*b*, 173*c*, 173*d*, 174*a*, 174*b*, 175*a*, 175*b*, 176*a*, 176*b*, 176*c*, 176*d*, 177*a*, 177*b*, 177*c*, 177*d*, 178*a*, 178*b*, 178*c*, and 178*d* (see FIG. 9, FIG. 10, FIG. 11, FIG. 12, FIG. 16, FIG. 17, FIG. 18, FIG. 19, FIG. 20, FIG. 21, FIG. 45, FIG. 46, FIG. 47, FIG. 48, FIG. 52, FIG. 53, FIG. 54, FIG. 56, and FIG. 57).

Other objects and advantages of the present invention will become apparent from a consideration of the accompanying drawings and ensuing description.

BRIEF SUMMARY OF THE INVENTION

A physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail comprises: adjustable louver blades attached to side gutter beams for preventing rainwater from getting into the bungalow and adjustably controlling amount of sunlight that shines into the bungalow, chutes formed to the side gutter beams and end gutter beams, solar-rechargeable batteries installed within adjustable louver blades for powering led lights and saving costs of replacing non-rechargeable alkaline batteries and helping reduce carbon footprint, a solar panel mounted to adjustable louver blades for collecting solar energy to charge and recharge rechargeable batteries and saving energy costs associated with lighting the bungalow and saving costs of replacing with non-rechargeable alkaline batteries and providing freedom to place the bungalow away from a power outlet and helping reduce carbon footprint, panel frames, panel inserts inserted within the panel frames for enabling the bungalow to become a sauna and a skybox and a dehydrator and providing security and insulation and protection from wind within the bungalow, louver braces inserted within the panel frames for allowing the louvers to be rotated, flipped, and positioned to redirect wind direction and structuringly securing louvers, axis pins inserted within the louver braces for providing eight locking points to reposition and locking and unlocking and pivotingly functionalizing the louver braces, louvers attached to the louver braces for redirecting and blocking and reducing and sealing the bungalow to create a sauna and a skybox and a dehydrator, an inner-track insert slidably inserted within hook-sliding track for providing a smooth sound-dampening track for slide hooks to be inserted for securing a curtain or insect screen, a curtain removably hooked onto slide hooks for providing privacy and protection from harmful sun rays and wind and insects, an extending-and-retracting door for providing protection from wind and harmful sun rays and insulation from cold temperatures and security within bungalow, door-spool housing attached to door-spool-housing bracket for providing discrete storage and protection of the extending-and-retracting door, drain openings formed into the corner-posts, corner-post-base-plate covers slidably attached onto the corner-posts, corner-post base-plates secured to the corner-posts, sliding-door track attached to the corner-post base-plates, the panel frames interchangably and slidably placed into the sliding-door track, anchoring-screw holes drilled into the corner-post base-plates, and tube-screws screwed into the anchoring-screw holes for leveling bungalow when installed on an uneven ground surface and securing the corner-post base-plate to a ground surface and providing adjustment points for each corner-post base-plate, and anchoring bolts screwed through the tube-screws and the anchoring-screw holes.

SYSTEM AND COMPONENT

Figure 1:
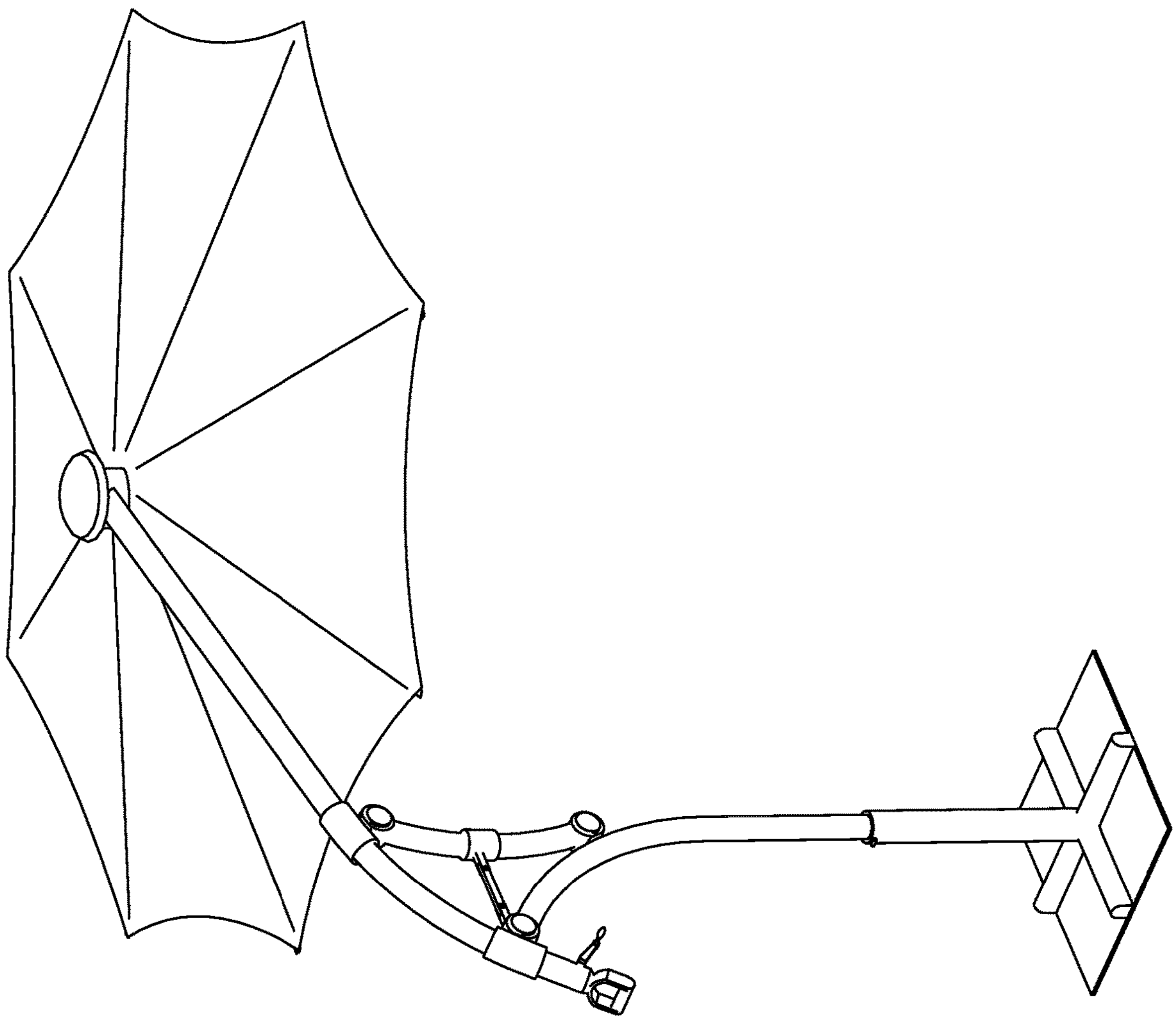
FIG. 1 (Prior Art) and FIG. 2 (Prior Art) illustrate perspective views of cantilever umbrellas which are not designed for ease-of-use for physically-impaired or arthritic people, have limited adjustment in positioning, have unnecessarily heavy construction, require a great effort to deploy, and requires a crank handle to extend and retract the canopy, making operation awkward and painful.
Figure 2:
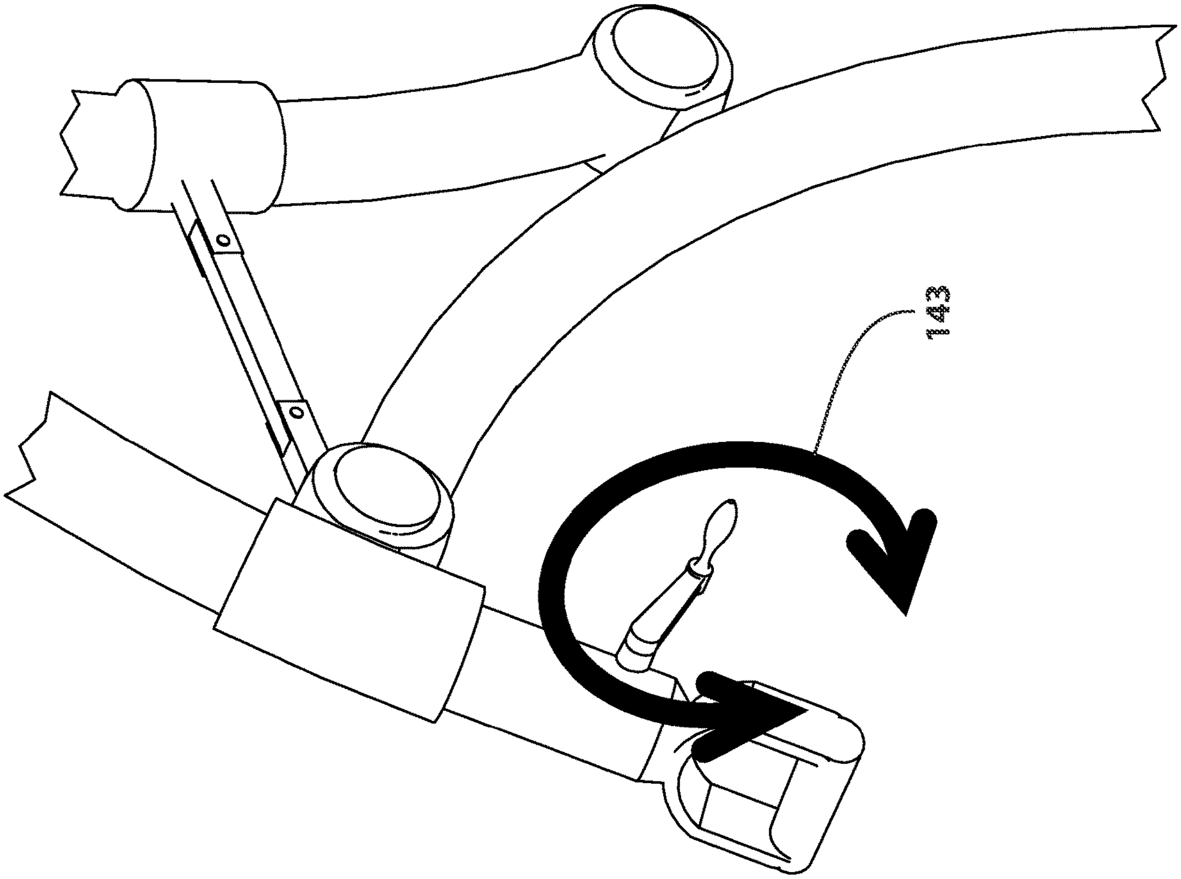
Figure 3:
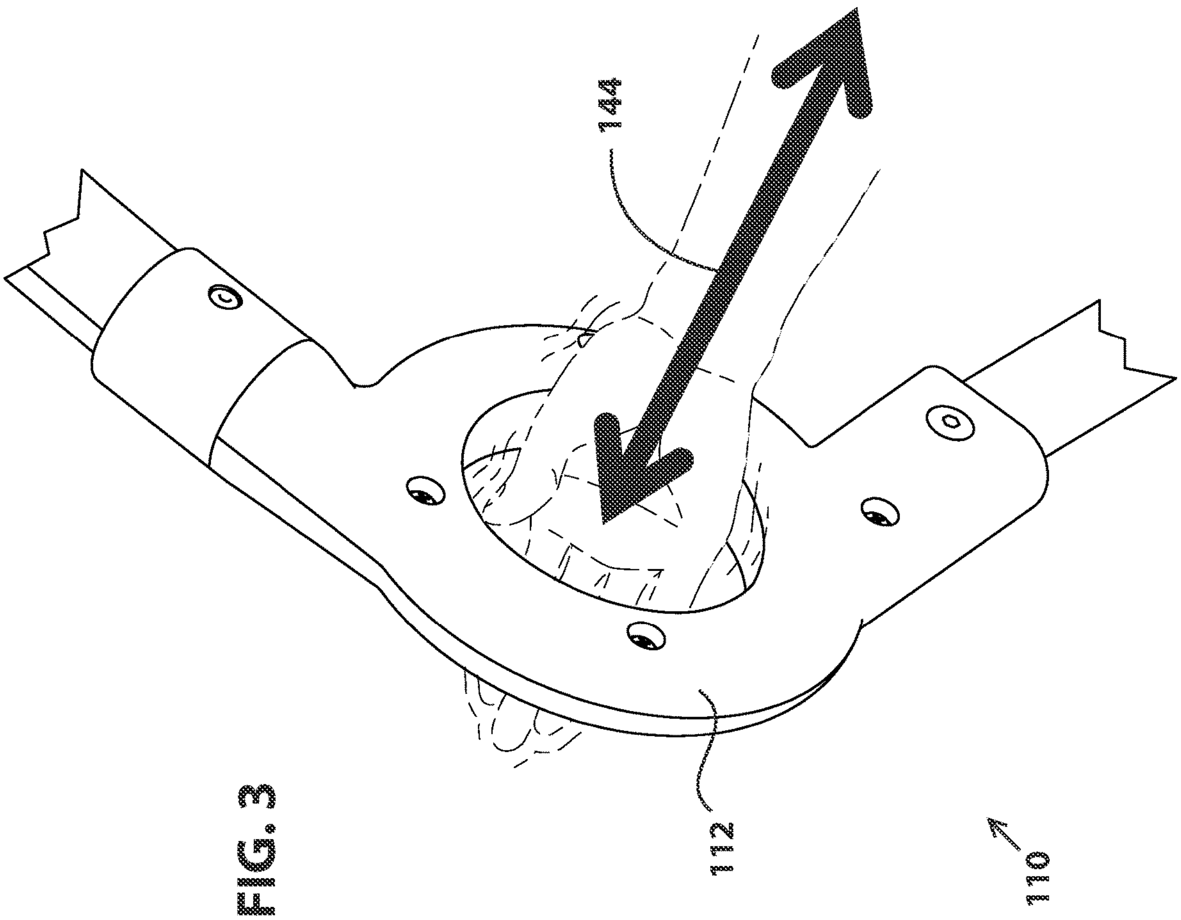
FIG. 3, FIG. 4, and FIG. 5 illustrate perspective views of the operation of the physically-impaired-assisting arthritic-assisting single-hand-sail-deploying-and-retracting land-yacht-maneuvering multi-direction-hoisting ergonomic navigator 112, physically-impaired-assisting arthritic-assisting single-hand-automatic-sail-deploying-and-retracting multi-direction-hoisting system 110, and wind-catching-and-redirecting rainwater-amassing-and-storing garden-irrigating fruit-harvesting panorama-media-screen-capable land-yacht-powering sail system 121.

Referring to FIG. 1 (Prior Art), FIG. 2 (Prior Art), FIG. 3, FIG. 4, FIG. 5, FIG. 6, FIG. 7A, FIG. 7B, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22A, FIG. 22B, FIG. 23, FIG. 24, FIG. 25A, FIG. 25B, FIG. 26, FIG. 27, FIG. 28, FIG. 29A, FIG. 29B, FIG. 30, FIG. 31, FIG. 32, FIG. 33, FIG. 34, and FIG. 35:

1) Sail and stanchion plinth system 101, comprising:
2) Lower-stanchion-supporting plinth 102,
3) Plinth-securing screws 103, and
4) Lower stanchion 104;
5) Horizontal-rotation-locking wind-catching-and-redirecting land-yacht-maneuvering system 105, comprising:
6) Horizontal-rotation-locking spring-loaded nipple-lock 106,
7) Horizontal-rotation-locking pin 107,
8) Horizontal-rotation-locking openings 108, and
9) Upper stanchion 109;
10) Physically-impaired-assisting arthritic-assisting single-hand-automatic-sail-deploying-and-retracting multi-direction-hoisting system 110, comprising:
11) Multi-direction-hoisting shank 111,
12) Physically-impaired-assisting arthritic-assisting single-hand-sail-deploying-and-retracting land-yacht-maneuvering multi-direction-hoisting ergonomic navigator 112,
13) Physically-impaired-assisting arthritic-assisting single-hand-automatic-sail-deploying-and-retracting land-yacht-maneuvering multi-direction-hoisting slidable-rockable cantilever teeter totter 113,
14) Teeter-totter-locking spring-loaded automatic hook-lock 114,
15) Teeter-totter-locking pin 115,
16) Teeter-totter rocking tubular clamp 116,
17) Cable-securing tubular clamp-securing camber 117,
18) Canal-hidden automatic-sail-deploying-and-retracting cable 118,
19) Cable-hiding cable-guiding canal 119, and
20) Pivoting pulley housing 120;
21) Wind-catching-and-redirecting rainwater-amassing-and-storing garden-irrigating fruit-harvesting panorama-media-screen-capable land-yacht-powering sail system 121, comprising:
22) Pivoting pulley hub 122, 23) Wind-catching-and-redirecting rainwater-amassing-and-storing garden-irrigating fruit-harvesting panorama-media-screen-capable land-yacht-powering sail 123,
24) Sail-location-securing adjustable removable clip 124,
25) Automatic-sail-deploying-and-retracting-cable pulleys 125,
26) Cable-guiding central tube 126,
27) Sail-buttresses 127,
28) Sail-buttress-supporting arms 128,
29) Arm-hinging shuttling hub 129, and
30) Automatic-sail-deploying-and-retracting-cable anti-tangling weight 130.

Material

Referring to FIG. 1 (Prior Art), FIG. 2 (Prior Art), FIG. 3, FIG. 4, FIG. 5, FIG. 6, FIG. 7A, FIG. 7B, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22A, FIG. 22B, FIG. 23, FIG. 24, FIG. 25A, FIG. 25B, FIG. 26, FIG. 27, FIG. 28, FIG. 29A, FIG. 29B, FIG. 30, FIG. 31, FIG. 32, FIG. 33, FIG. 34, and FIG. 35:

1) Sail and stanchion plinth system 101 is (or are each) made of the combined materials of its components.
2) Lower-stanchion-supporting plinth 102 is (or are each) made of the material of metal.
3) Plinth-securing screws 103 is (or are each) made of the material of metal.
4) Lower stanchion 104 is (or are each) made of the material of metal.
5) Horizontal-rotation-locking wind-catching-and-redirecting land-yacht-maneuvering system 105 is (or are each) made of the combined materials of its components.
6) Horizontal-rotation-locking spring-loaded nipple-lock 106 is (or are each) made of the material of plastic.
7) Horizontal-rotation-locking pin 107 is (or are each) made of the material of metal.
8) Horizontal-rotation-locking openings 108 is (or are each) made of empty space.
9) Upper stanchion 109 is (or are each) made of the material of metal.
10) Physically-impaired-assisting arthritic-assisting single-hand-automatic-sail-deploying-and-retracting multi-direction-hoisting system 110 is (or are each) made of the combined materials of its components.
11) Multi-direction-hoisting shank 111 is (or are each) made of the material of metal.
12) Physically-impaired-assisting arthritic-assisting single-hand-sail-deploying-and-retracting land-yacht-maneuvering multi-direction-hoisting ergonomic navigator 112 is (or are each) made of the material of plastic, metal, or rubber.
13) Physically-impaired-assisting arthritic-assisting single-hand-automatic-sail-deploying-and-retracting land-yacht-maneuvering multi-direction-hoisting slidable-rockable cantilever teeter totter 113 is (or are each) made of the material of metal.
14) Teeter-totter-locking spring-loaded automatic hook-lock 114 is (or are each) made of the material of metal and/or plastic.
15) Teeter-totter-locking pin 115 is (or are each) made of the material of metal or plastic.
16) Teeter-totter rocking tubular clamp 116 is (or are each) made of the material of metal or plastic.
17) Cable-securing tubular clamp-securing camber 117 is (or are each) made of the combined material of metal or plastic.
18) Canal-hidden automatic-sail-deploying-and-retracting cable 118 is (or are each) made of the material of metal.
19) Cable-hiding cable-guiding canal 119 is (or are each) made of empty space.
20) Pivoting pulley housing 120 is (or are each) made of the material of metal or plastic.
21) Wind-catching-and-redirecting rainwater-amassing-and-storing garden-irrigating fruit-harvesting panorama-media-screen-capable land-yacht-powering sail system 121 is (or are each) made of the combined materials of its components.
22) Pivoting pulley hub 122 is (or are each) made of the material of metal.
23) Wind-catching-and-redirecting rainwater-amassing-and-storing garden-irrigating fruit-harvesting panorama-media-screen-capable land-yacht-powering sail 123 is (or are each) made of the material of vinyl, nylon or other fabric.
24) Sail-location-securing adjustable removable clip 124 is (or are each) made of the material of plastic.
25) Automatic-sail-deploying-and-retracting-cable pulleys 125 is (or are each) made of the material of metal or plastic.
26) Cable-guiding central tube 126 is (or are each) made of the material of metal or plastic.
27) Sail-buttresses 127 is (or are each) made of the material of metal.
28) Sail-buttress-supporting arms 128 is (or are each) made of the material of metal.
29) Arm-hinging shuttling hub 129 is (or are each) made of the material of metal or plastic.
30) Automatic-sail-deploying-and-retracting-cable anti-tangling weight 130 is (or are each) made of the material of metal.

Shape

Referring to FIG. 1 (Prior Art), FIG. 2 (Prior Art), FIG. 3, FIG. 4, FIG. 5, FIG. 6, FIG. 7A, FIG. 7B, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22A, FIG. 22B, FIG. 23, FIG. 24, FIG. 25A, FIG. 25B, FIG. 26, FIG. 27, FIG. 28, FIG. 29A, FIG. 29B, FIG. 30, FIG. 31, FIG. 32, FIG. 33, FIG. 34, and FIG. 35:

1) Sail and stanchion plinth system 101 is (or are each) formed into the combined shapes of its components.
2) Lower-stanchion-supporting plinth 102 is (or are each) formed into the shape of (a or an) rectangle.
3) Plinth-securing screws 103 is (or are each) formed into the shape of (a or an) screw.
4) Lower stanchion 104 is (or are each) formed into the shape of (a or an) tube.
5) Horizontal-rotation-locking wind-catching-and-redirecting land-yacht-maneuvering system 105 is (or are each) formed into the combined shapes of its components.
6) Horizontal-rotation-locking spring-loaded nipple-lock 106 is (or are each) formed into the shape of (a or an) rounded rectangle.
7) Horizontal-rotation-locking pin 107 is (or are each) formed into the shape of (a or an) a cylinder with a half-sphere-shape at the top.

8) Horizontal-rotation-locking openings 108
is (or are each) formed into the shape of (a or an) circle.
9) Upper stanchion 109
is (or are each) formed into the shape of (a or an) tube.
10) Physically-impaired-assisting arthritic-assisting single-hand-automatic-sail-deploying-and-retracting multi-direction-hoisting system 110 is (or are each) formed into the combined shapes of its components.
11) Multi-direction-hoisting shank 111
is (or are each) formed into the shape of (a or an) tube.
12) Physically-impaired-assisting arthritic-assisting single-hand-sail-deploying-and-retracting land-yacht-maneuvering multi-direction-hoisting ergonomic navigator 112
is (or are each) formed into the shape of (a or an) circle.
13) Physically-impaired-assisting arthritic-assisting single-hand-automatic-sail-deploying-and-retracting land-yacht-maneuvering multi-direction-hoisting slidable-rockable cantilever teeter totter 113
is (or are each) formed into the shape of (a or an) curved tube.
14) Teeter-totter-locking spring-loaded automatic hook-lock 114
is (or are each) formed into the shape of (a or an) rounded rectangle.
15) Teeter-totter-locking pin 115
is (or are each) formed into the shape of (a or an) triangle.
16) Teeter-totter rocking tubular clamp 116
is (or are each) formed into the shape of (a or an) tube.
17) Cable-securing tubular clamp-securing camber 117
is (or are each) formed into the shape of (a or an) eyelet atop a tube.
18) Canal-hidden automatic-sail-deploying-and-retracting cable 118
is (or are each) formed into the shape of (a or an) cable.
19) Cable-hiding cable-guiding canal 119
is (or are each) formed into the shape of (a or an) tube with the semi-circular cross-section.
20) Pivoting pulley housing 120
is (or are each) formed into the shape of (a or an) tube with the ninety-degree bend.
21) Wind-catching-and-redirecting rainwater-amassing-and-storing garden-irrigating fruit-harvesting panorama-media-screen-capable land-yacht-powering sail system 121 is (or are each) formed into the combined shapes of its components.
22) Pivoting pulley hub 122
is (or are each) formed into the shape of (a or an) tube with the funnel-shaped end.
23) Wind-catching-and-redirecting rainwater-amassing-and-storing garden-irrigating fruit-harvesting panorama-media-screen-capable land-yacht-powering sail 123
is (or are each) formed into the shape of (a or an) hexagon.
24) Sail-location-securing adjustable removable clip 124
is (or are each) formed into the shape of (a or an) a ring with an opening.
25) Automatic-sail-deploying-and-retracting-cable pulleys 125
is (or are each) formed into the shape of (a or an) circle.
26) Cable-guiding central tube 126
is (or are each) formed into the shape of (a or an) tube.
27) Sail-buttresses 127
is (or are each) formed into the shape of (a or an) tube.
28) Sail-buttress-supporting arms 128
is (or are each) formed into the shape of (a or an) tube.
29) Arm-hinging shuttling hub 129
is (or are each) formed into the shape of (a or an) compressed sphere.
30) Automatic-sail-deploying-and-retracting-cable anti-tangling weight 130
is (or are each) formed into the shape of (a or an) cylinder.

Connection

Referring to FIG. 1 (Prior Art), FIG. 2 (Prior Art), FIG. 3, FIG. 4, FIG. 5, FIG. 6, FIG. 7A, FIG. 7B, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22A, FIG. 22B, FIG. 23, FIG. 24, FIG. 25A, FIG. 25B, FIG. 26, FIG. 27, FIG. 28, FIG. 29A, FIG. 29B, FIG. 30, FIG. 31, FIG. 32, FIG. 33, FIG. 34, and FIG. 35:

1) Sail and stanchion plinth system 101 has the combined connections of its components.
2) Lower-stanchion-supporting plinth 102
is (or are respectively)
welded to lower stanchion 104.
3) Plinth-securing screws 103
is (or are respectively)
inserted into lower-stanchion-supporting plinth 102.
4) Lower stanchion 104
is (or are respectively)
inserted into horizontal-rotation-locking spring-loaded nipple-lock 106.
5) Horizontal-rotation-locking wind-catching-and-redirecting land-yacht-maneuvering system 105 has the combined connections of its components.
6) Horizontal-rotation-locking spring-loaded nipple-lock 106
is (or are respectively)
secured onto lower stanchion 104.
7) Horizontal-rotation-locking pin 107
is (or are respectively)
formed to horizontal-rotation-locking spring-loaded nipple-lock 106.
8) Horizontal-rotation-locking openings 108
is (or are respectively)
drilled into upper stanchion 109.
9) Upper stanchion 109
is (or are respectively)
rotatably inserted into horizontal-rotation-locking spring-loaded nipple-lock 106.
10) Physically-impaired-assisting arthritic-assisting single-hand-automatic-sail-deploying-and-retracting multi-direction-hoisting system 110 has the combined connections of its components.
11) Multi-direction-hoisting shank 111
is (or are respectively)
pivotably secured to upper stanchion 109.
12) Physically-impaired-assisting arthritic-assisting single-hand-sail-deploying-and-retracting land-yacht-maneuvering multi-direction-hoisting ergonomic navigator 112
is (or are respectively)
hingedly attached to multi-direction-hoisting shank 111.
13) Physically-impaired-assisting arthritic-assisting single-hand-automatic-sail-deploying-and-retracting land-yacht-maneuvering multi-direction-hoisting slidable-rockable cantilever teeter totter 113
is (or are respectively)
secured to physically-impaired-assisting arthritic-assisting single-hand-sail-deploying-and-retracting land-yacht-maneuvering multi-direction-hoisting ergonomic navigator 112
14) Teeter-totter-locking spring-loaded automatic hook-lock 114
is (or are respectively)
springingly secured to clamp 116.

15) Teeter-totter-locking pin 115
is (or are respectively)
springingly pushed into teeter-totter 113.

16) Teeter-totter rocking tubular clamp 116
is (or are respectively)
slidably fit around physically-impaired-assisting arthritic-assisting single-hand-automatic-sail-deploying-and-retracting land-yacht-maneuvering multi-direction-hoisting slidable-rockable cantilever teeter totter 113.

17) Cable-securing tubular clamp-securing camber 117
is (or are respectively) secured to upper stanchion 109 and around teeter-totter rocking tubular clamp 116.

18) Canal-hidden automatic-sail-deploying-and-retracting cable 118
is (or are respectively) secured to cable-securing tubular clamp-securing camber 117 and situated within cable-hiding cable-guiding canal 119 and threaded around automatic-sail-deploying-and-retracting-cable pulleys 125 and inserted through cable-guiding central tube 126.

19) Cable-hiding cable-guiding canal 119
is (or are respectively)
formed into physically-impaired-assisting arthritic-assisting single-hand-automatic-sail-deploying-and-retracting land-yacht-maneuvering multi-direction-hoisting slidable-rockable cantilever teeter totter 113.

20) Pivoting pulley housing 120
is (or are respectively)
secured to physically-impaired-assisting arthritic-assisting single-hand-automatic-sail-deploying-and-retracting land-yacht-maneuvering multi-direction-hoisting slidable-rockable cantilever teeter totter 113.

21) Wind-catching-and-redirecting rainwater-amassing-and-storing garden-irrigating fruit-harvesting panorama-media-screen-capable land-yacht-powering sail system 121 has the combined connections of its components.

22) Pivoting pulley hub 122
is (or are respectively)
swingingly attached to pivoting pulley housing 120.

23) Wind-catching-and-redirecting rainwater-amassing-and-storing garden-irrigating fruit-harvesting panorama-media-screen-capable land-yacht-powering sail 123
is (or are respectively)
secured to sail-buttresses 127.

24) Sail-location-securing adjustable removable clip 124
is (or are respectively)
attached to wind-catching-and-redirecting rainwater-amassing-and-storing garden-irrigating fruit-harvesting panorama-media-screen-capable land-yacht-powering sail 123 and removably and slidably clipped to upper stanchion 109.

25) Automatic-sail-deploying-and-retracting-cable pulleys 125
is (or are respectively)
rotatably secured within cable-hiding cable-guiding canal 119 and pivoting pulley hub 122.

26) Cable-guiding central tube 126
is (or are respectively)
attached to pivoting pulley hub 122.

27) Sail-buttresses 127
is (or are respectively)
hingedly attached to pivoting pulley hub 122.

28) Sail-buttress-supporting arms 128
is (or are respectively)
hingedly attached to arm-hinging shuttling hub 129 and to sail-buttresses 127.

29) Arm-hinging shuttling hub 129
is (or are respectively)
attached to sail-buttress-supporting arms 128.

30) Automatic-sail-deploying-and-retracting-cable anti-tangling weight 130
is (or are respectively)
secured to canal-hidden automatic-sail-deploying-and-retracting cable 118.

Function

Figure 36:
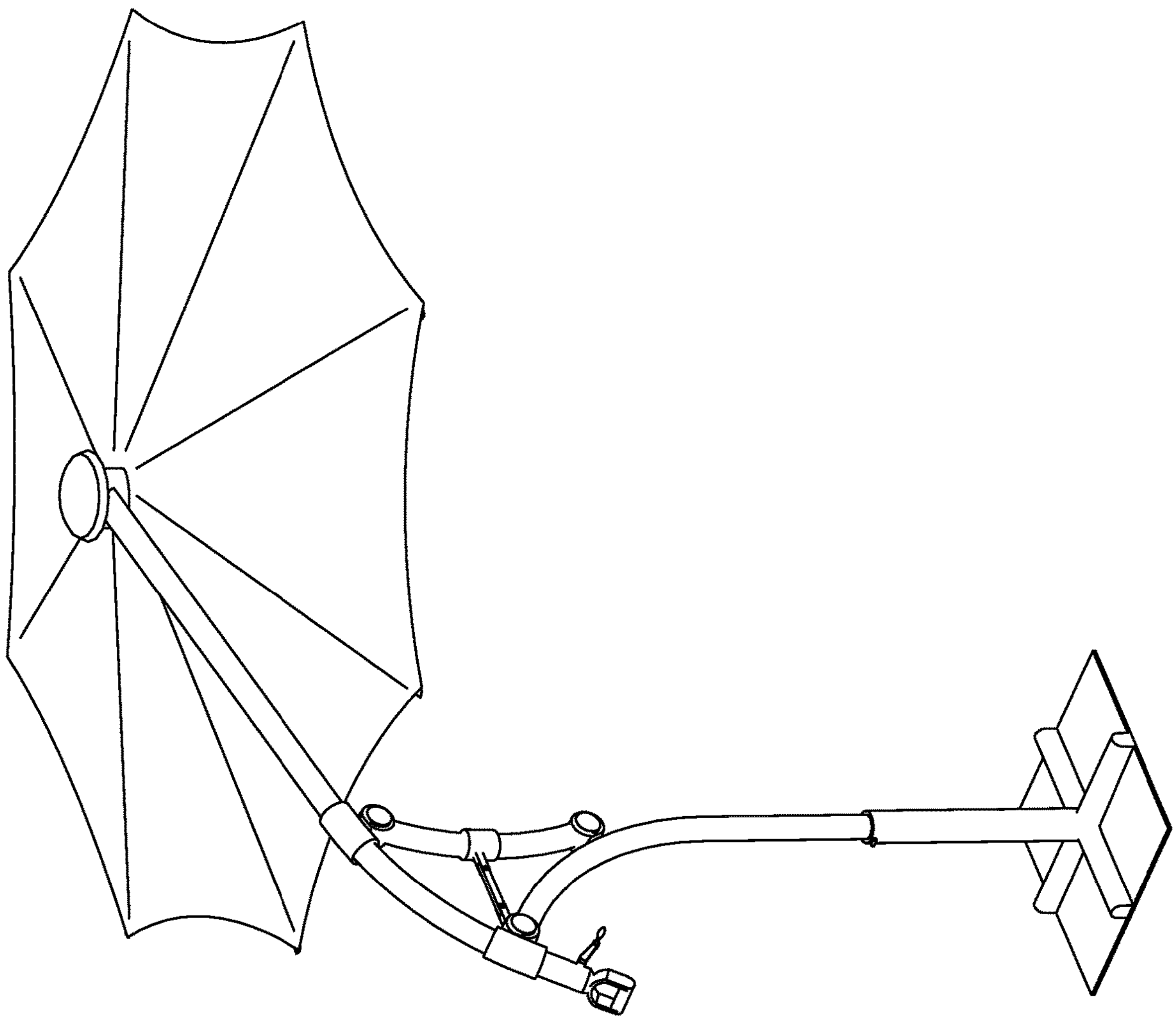
FIG. 36 (Prior Art) and FIG. 37 (Prior Art) illustrate perspective views of cantilever umbrellas which are not designed for ease-of-use for physically-impaired or arthritic people, have limited adjustment in positioning, have unnecessarily heavy construction, requires a great effort to deploy, and requires a crank handle to extend and retract the canopy, making operation awkward and painful.
Figure 37:
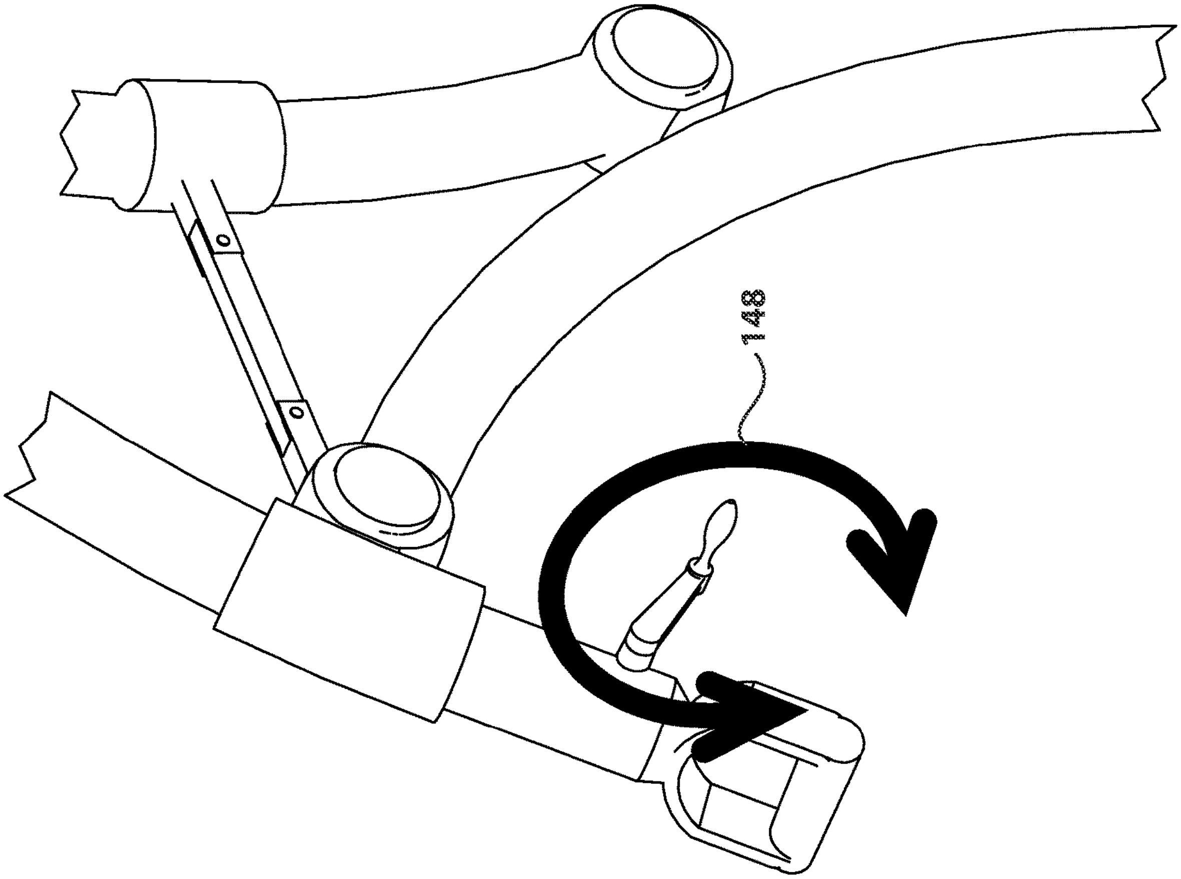
Figure 38:
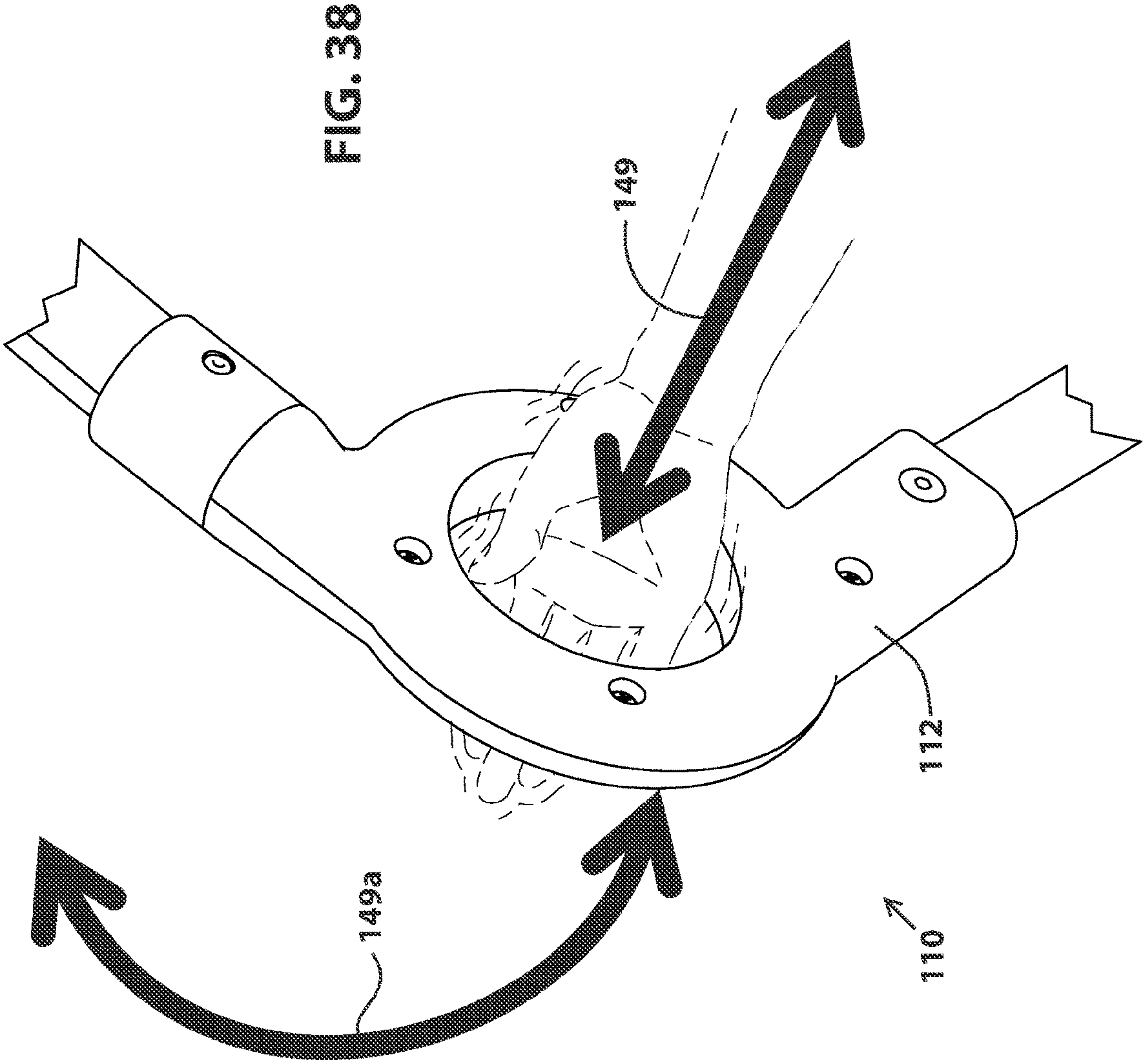
FIG. 38, FIG. 39, and FIG. 40 illustrate perspective views of the operation of the physically-impaired-assisting arthritic-assisting single-hand-sail-deploying-and-retracting land-yacht-maneuvering multi-direction-hoisting ergonomic navigator 112, physically-impaired-assisting arthritic-assisting single-hand-automatic-sail-deploying-and-retracting multi-direction-hoisting system 110, and wind-catching-and-redirecting rainwater-amassing-and-storing garden-irrigating fruit-harvesting panorama-media-screen-capable land-yacht-powering sail system 121.

Referring to FIG. 36 (Prior Art), FIG. 37 (Prior Art), FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59A, FIG. 59B, FIG. 60, FIG. 61, FIG. 62, FIG. 63, FIG. 64, FIG. 65A, FIG. 65B, FIG. 66, and FIG. 67:

1) Sail and stanchion plinth system 101 is for performing the combined functions of its components.

Figure 8:
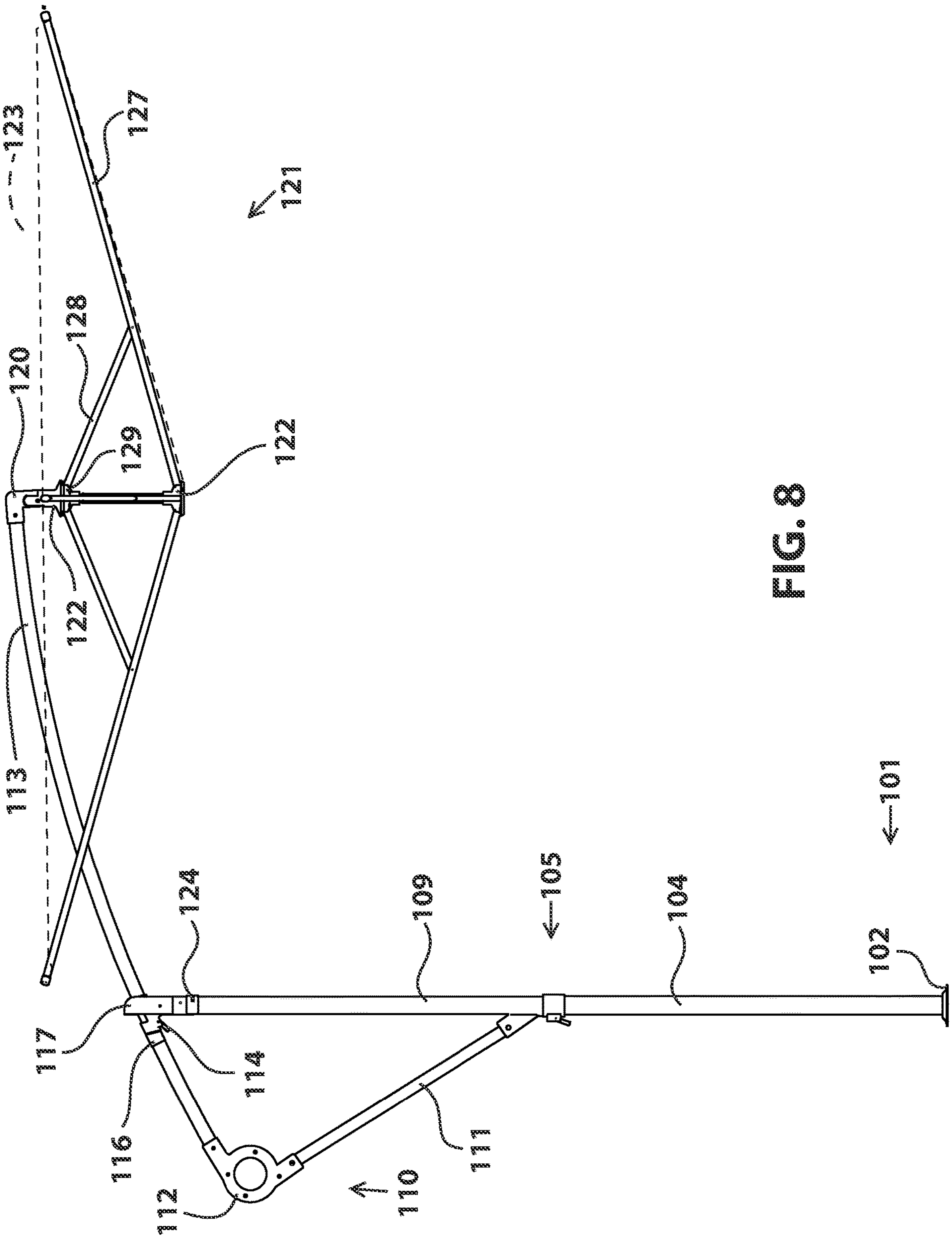
FIG. 8 illustrates a side view of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail demonstrating the wind-catching-and-redirecting rainwater-amassing-and-storing garden-irrigating fruit-harvesting panorama-media-screen-capable land-yacht-powering sail system 121 in an inverted orientation.
Figure 9:
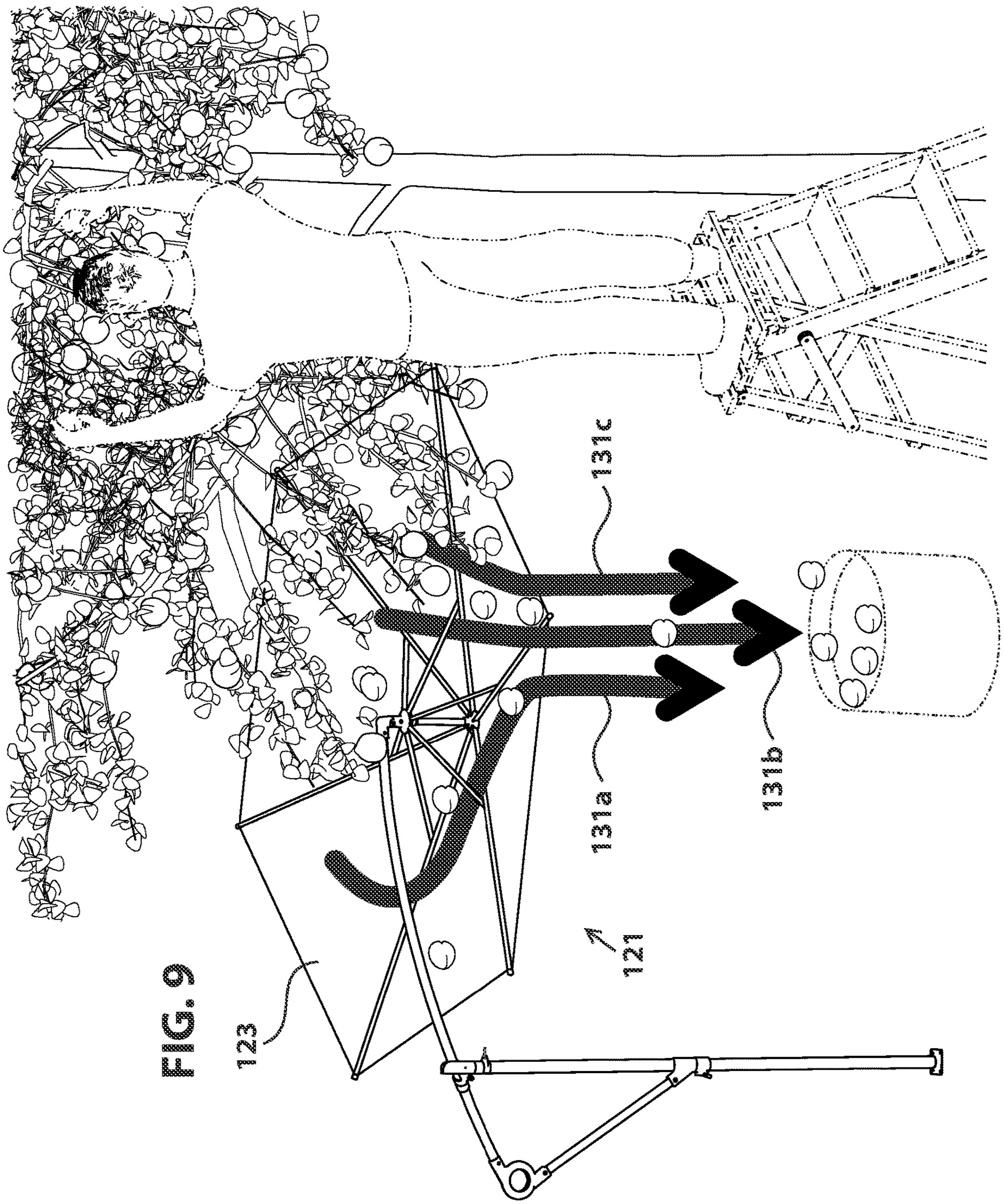
FIG. 9, FIG. 10, FIG. 11, FIG. 12, and FIG. 13 illustrate views demonstrating the wind-catching-and-redirecting rainwater-amassing-and-storing garden-irrigating fruit-harvesting panorama-media-screen-capable land-yacht-powering sail system 121 aiding in the harvesting of fruit, amassing and storing of rainwater, and functioning as a panorama-media-screen.
Figure 10:
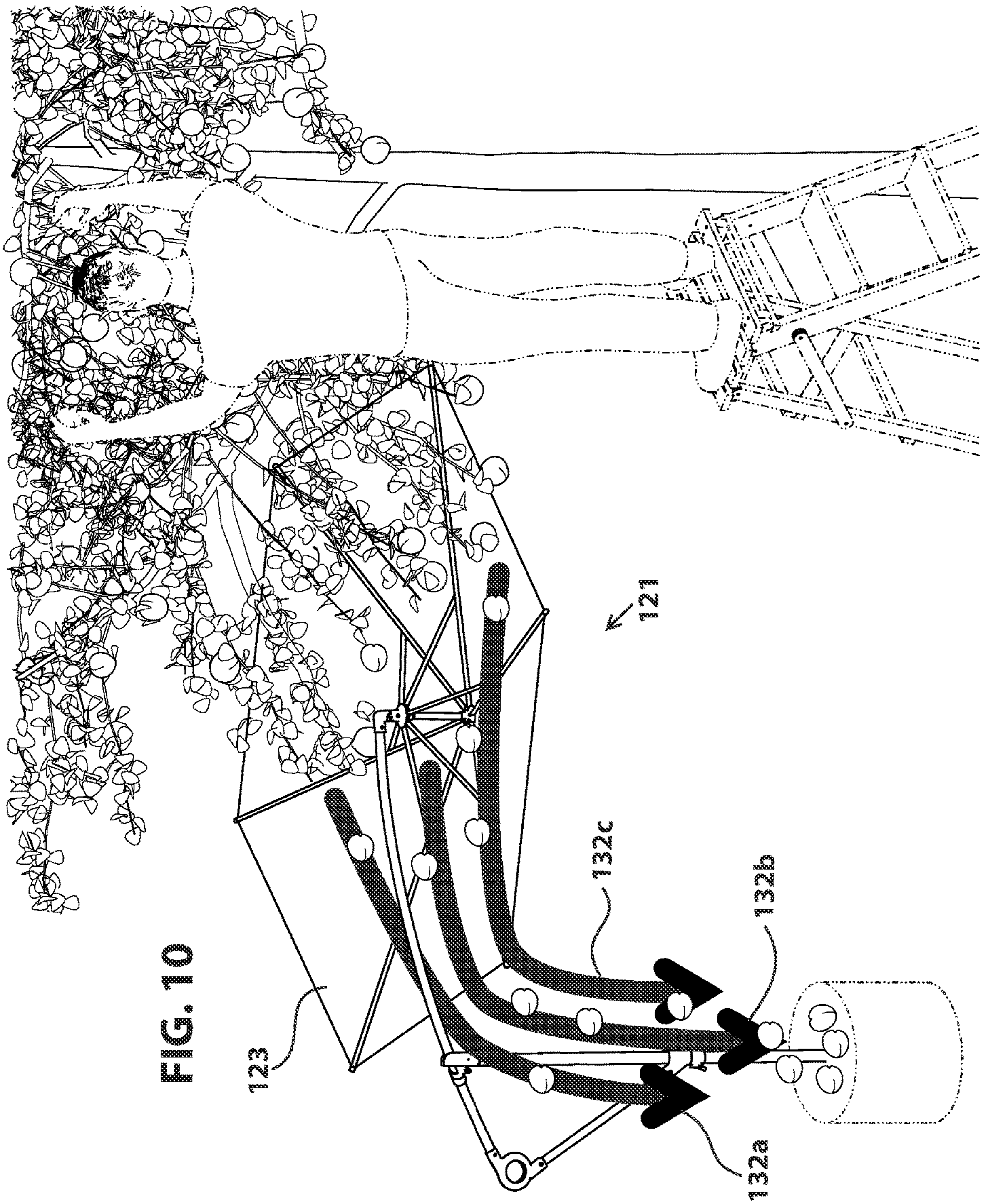
Figure 11:
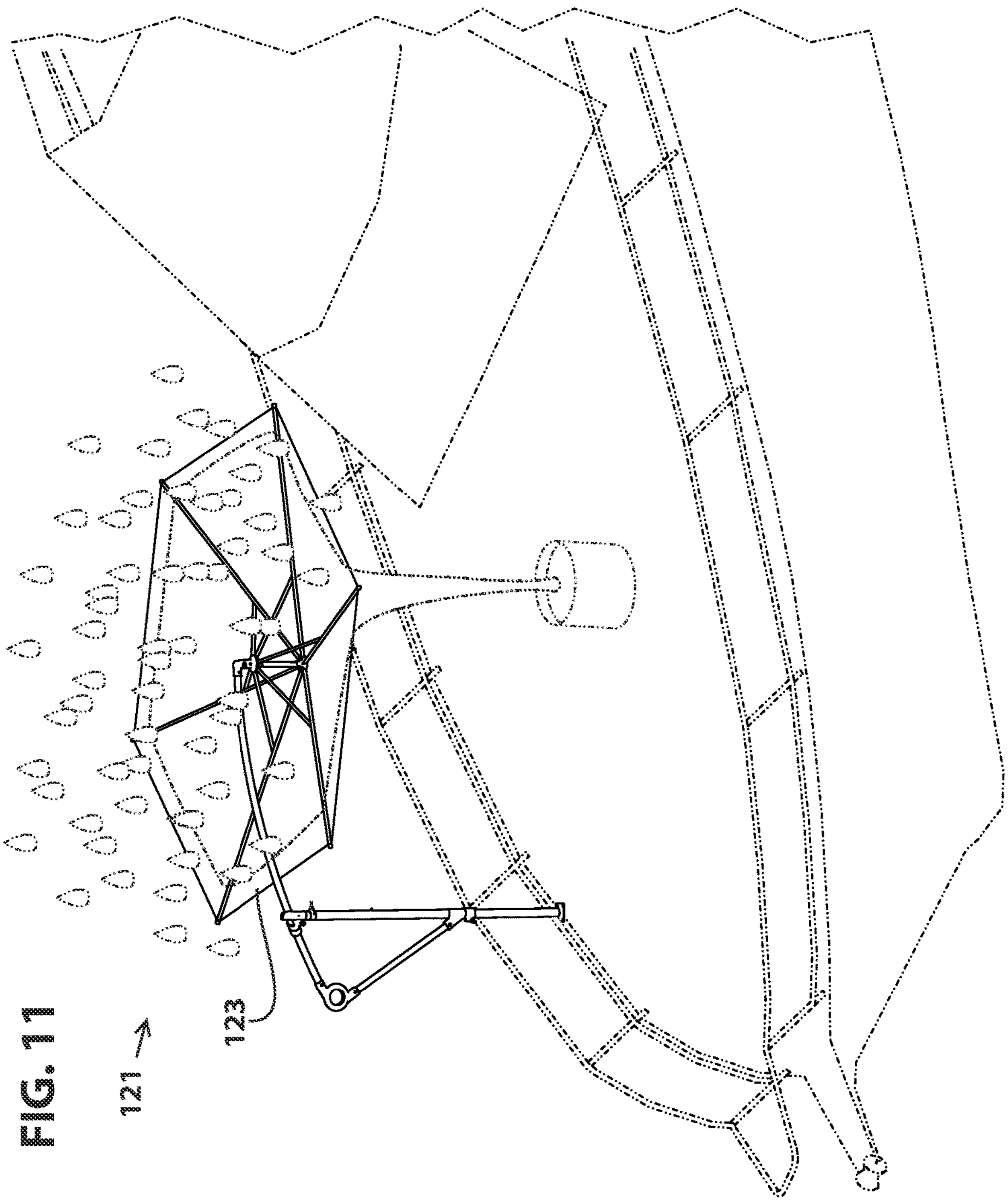
Figure 12:
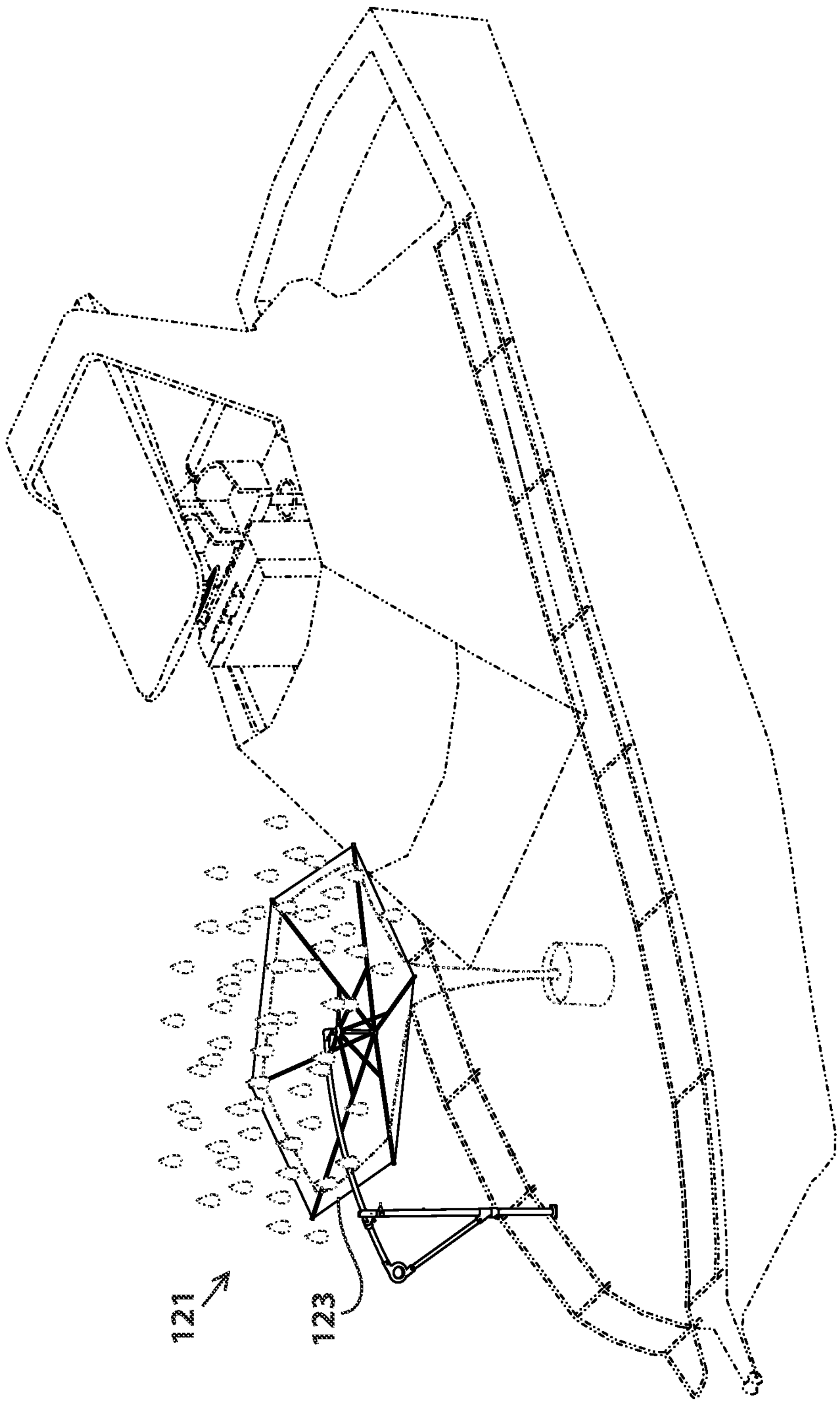
Figure 13:
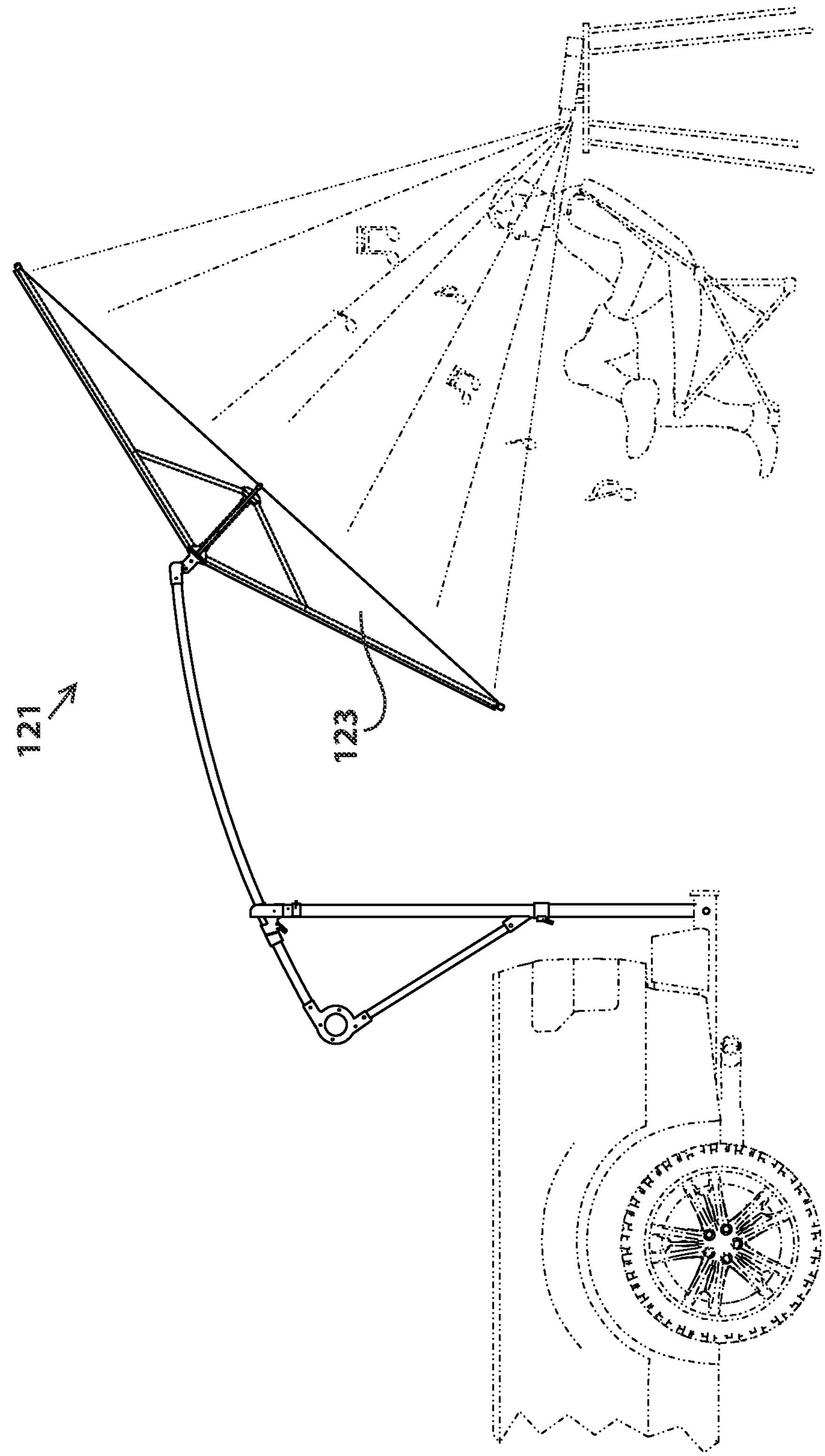
Figure 14:
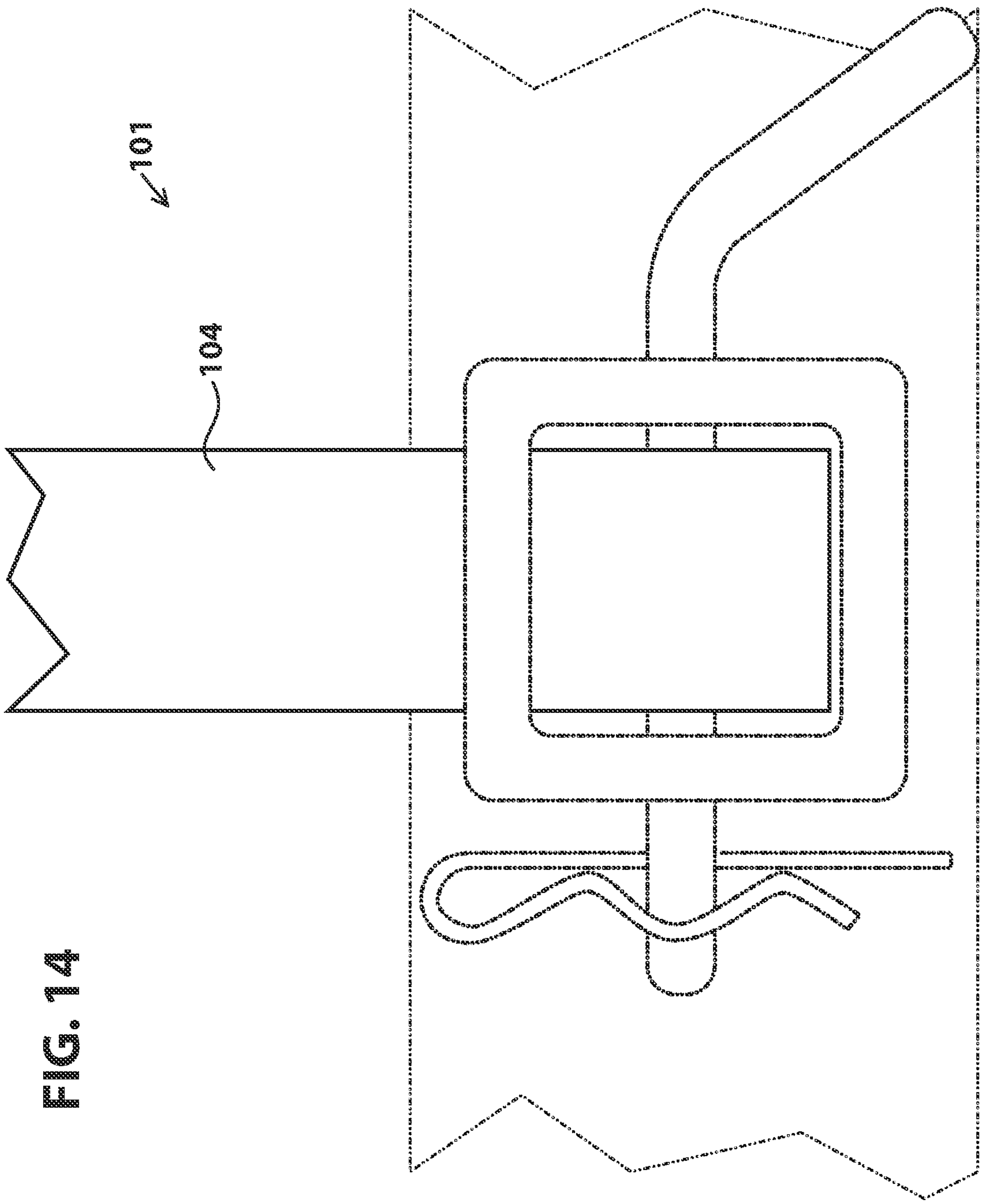
FIG. 14 illustrates a front view demonstrating the lower stanchion 104 being inserted into a trailer hitch.
Figure 15:
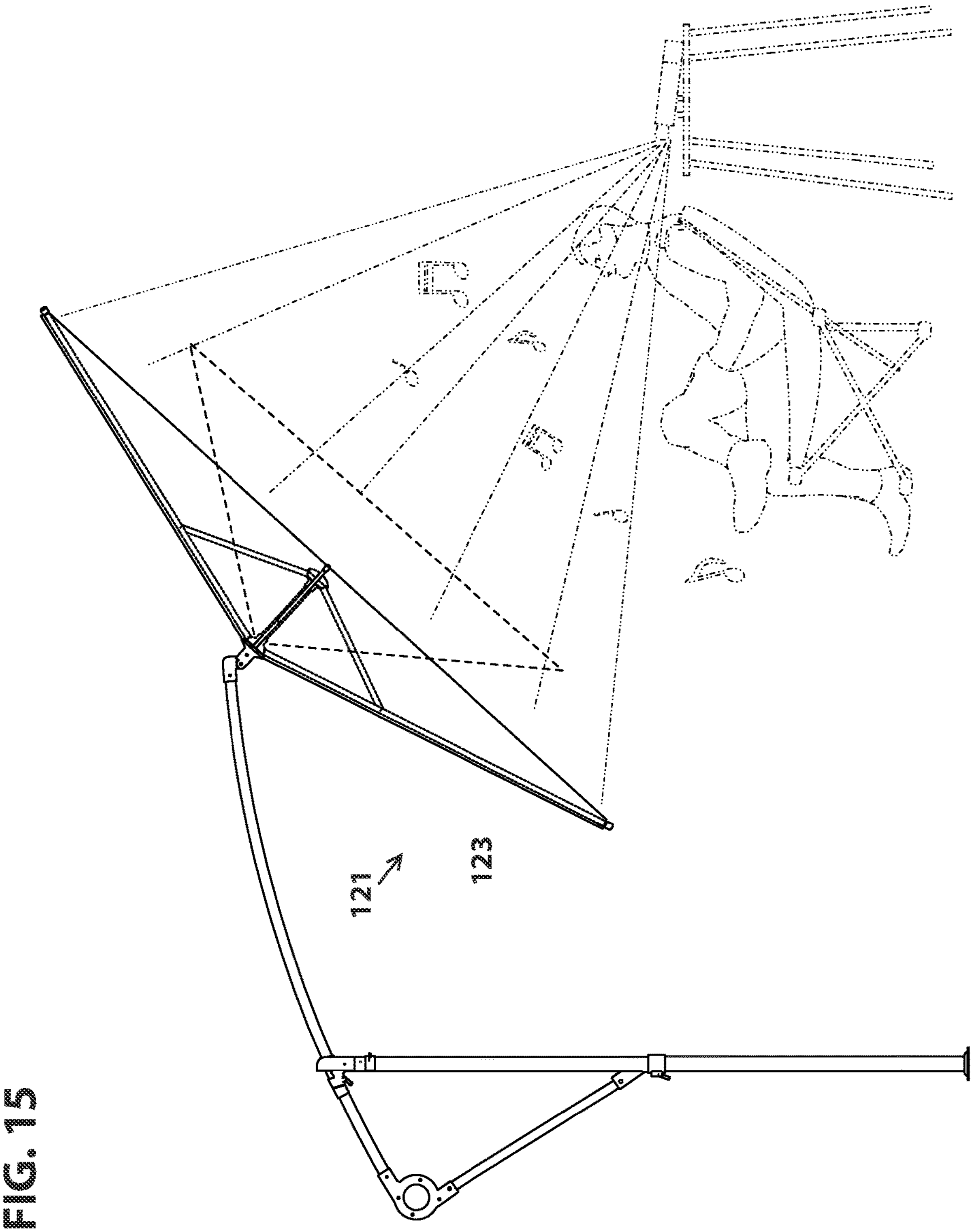
FIG. 15 illustrates a side view demonstrating the wind-catching-and-redirecting rainwater-amassing-and-storing garden-irrigating fruit-harvesting panorama-media-screen-capable land-yacht-powering sail system 121 functioning as a size-adjustable panorama-media-screen.
Figure 16:
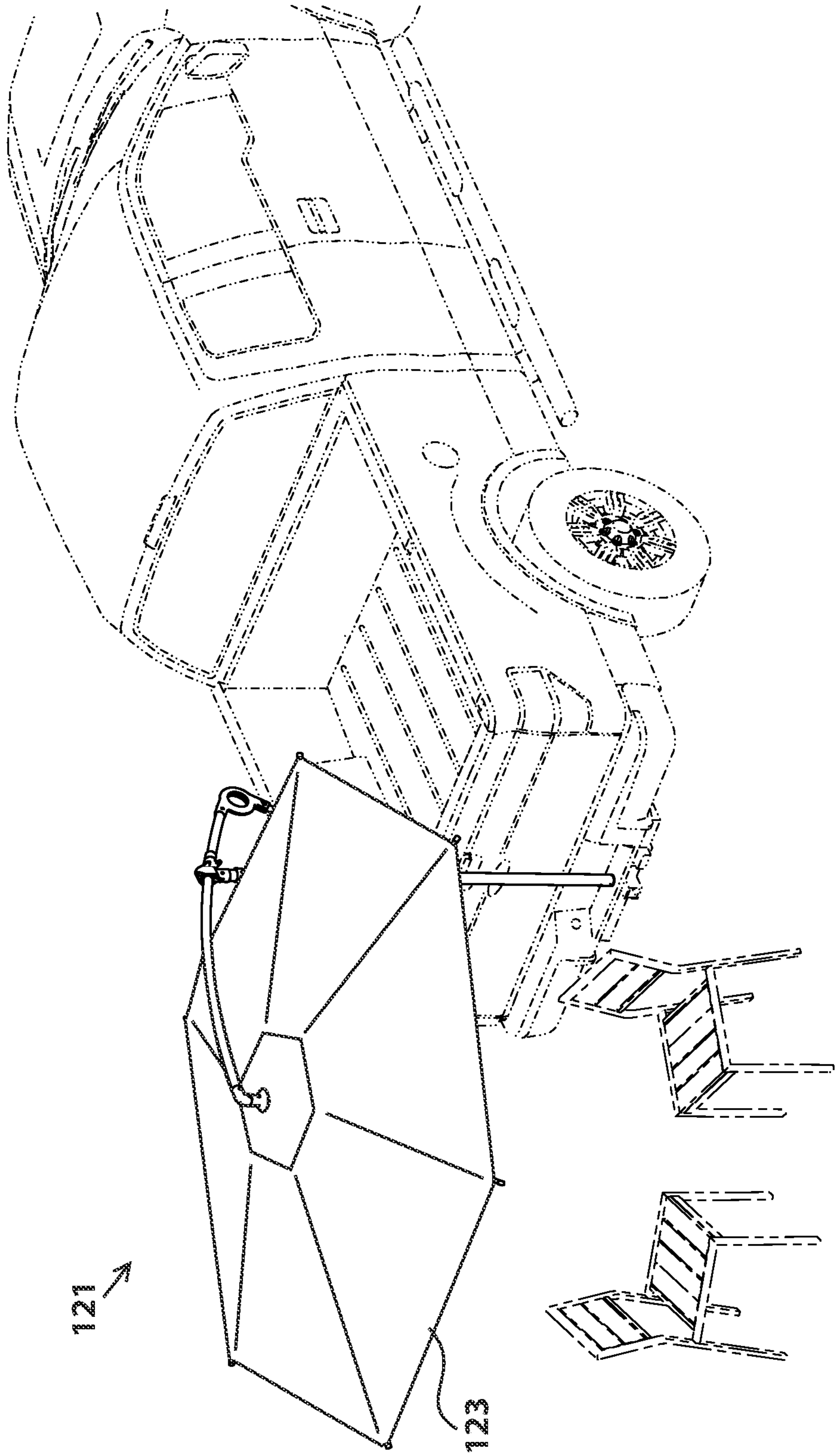
FIG. 16, FIG. 17, and FIG. 18 illustrate perspective views demonstrating the lower stanchion 104 being attached to a pickup truck and the wind-catching-and-redirecting rainwater-amassing-and-storing garden-irrigating fruit-harvesting panorama-media-screen-capable land-yacht-powering sail system 121 aiding in providing shade, amassing and storing rainwater, and irrigating a garden.
Figure 17:
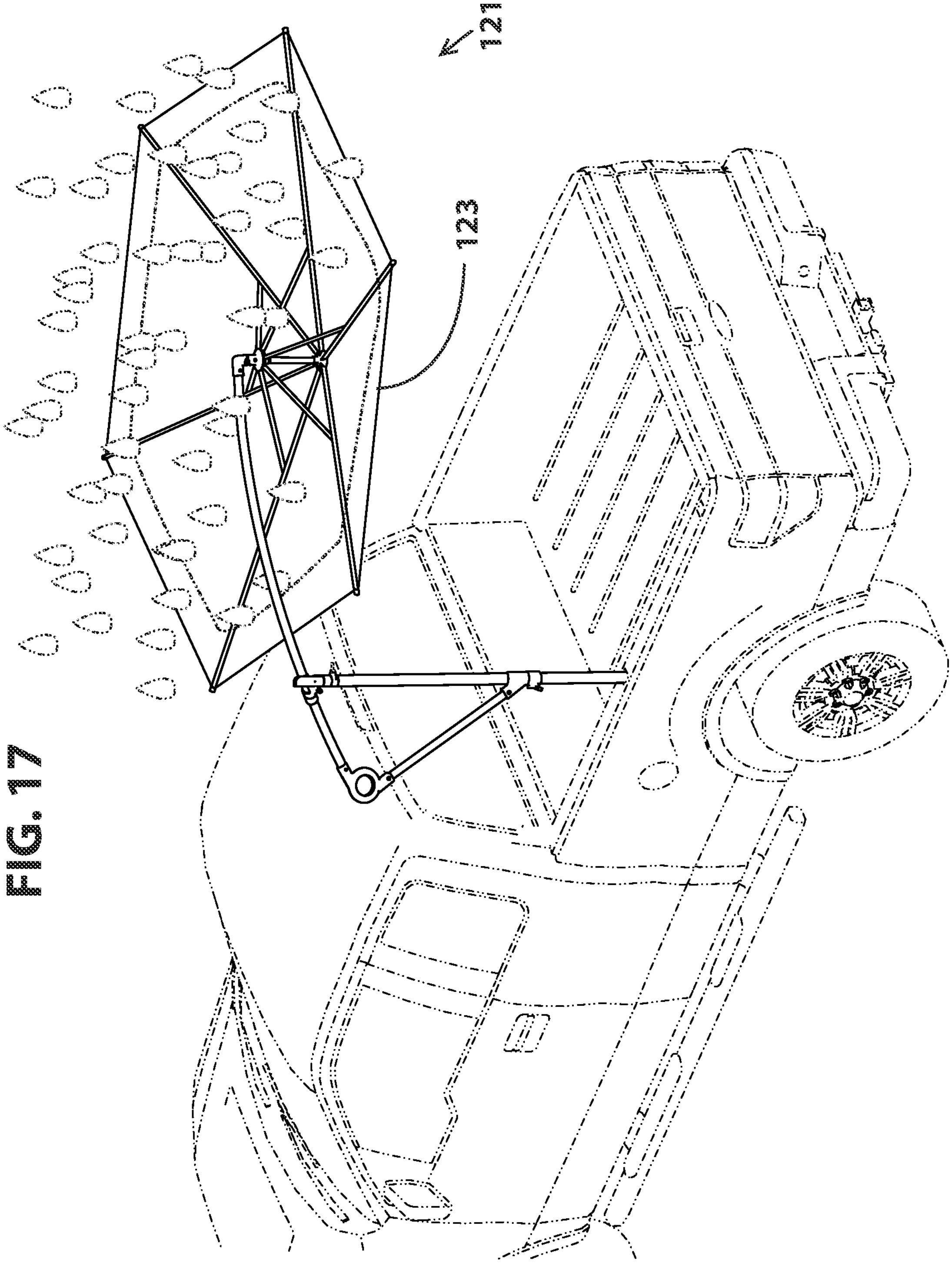
Figure 18:
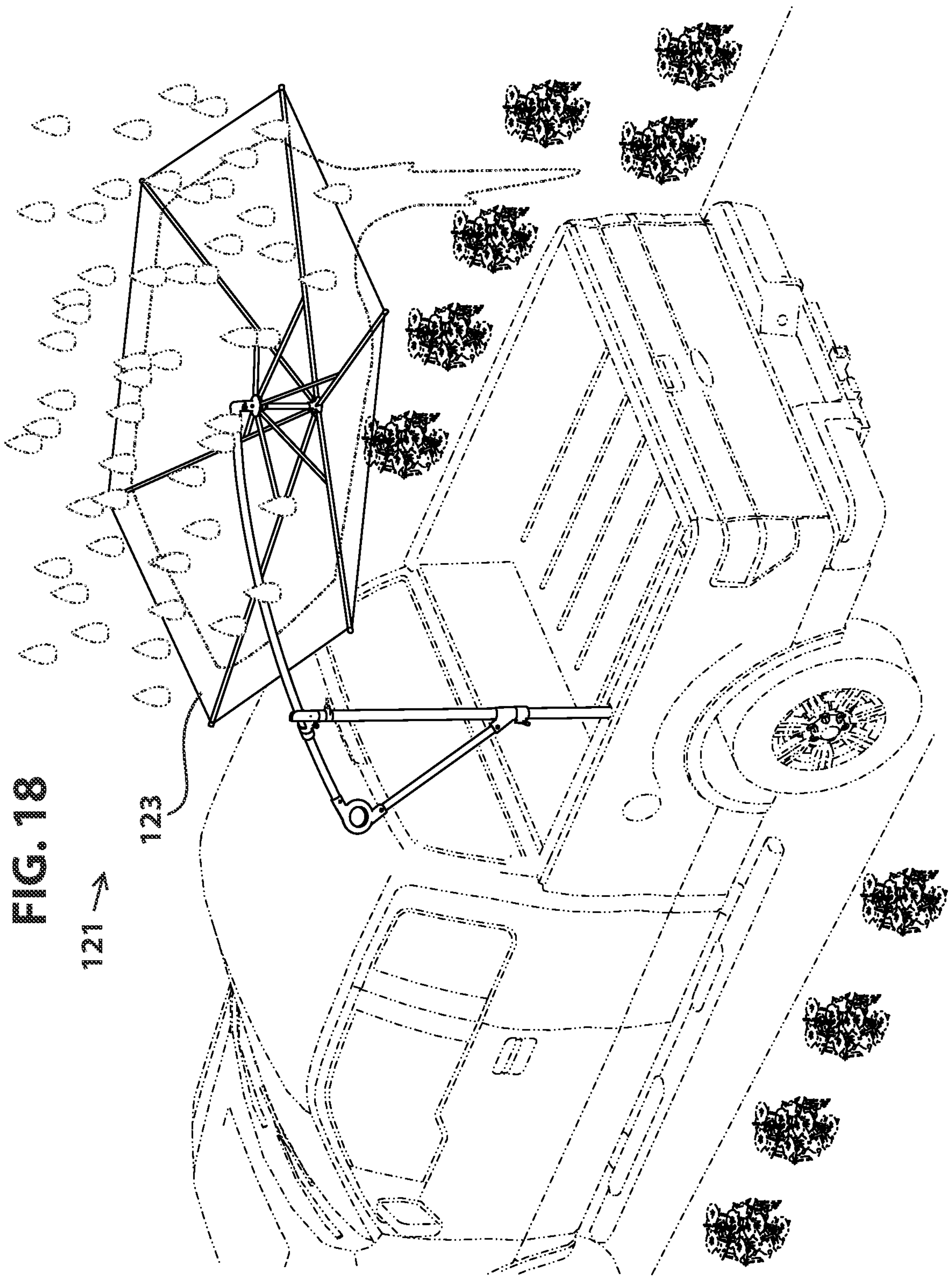
Figure 19:
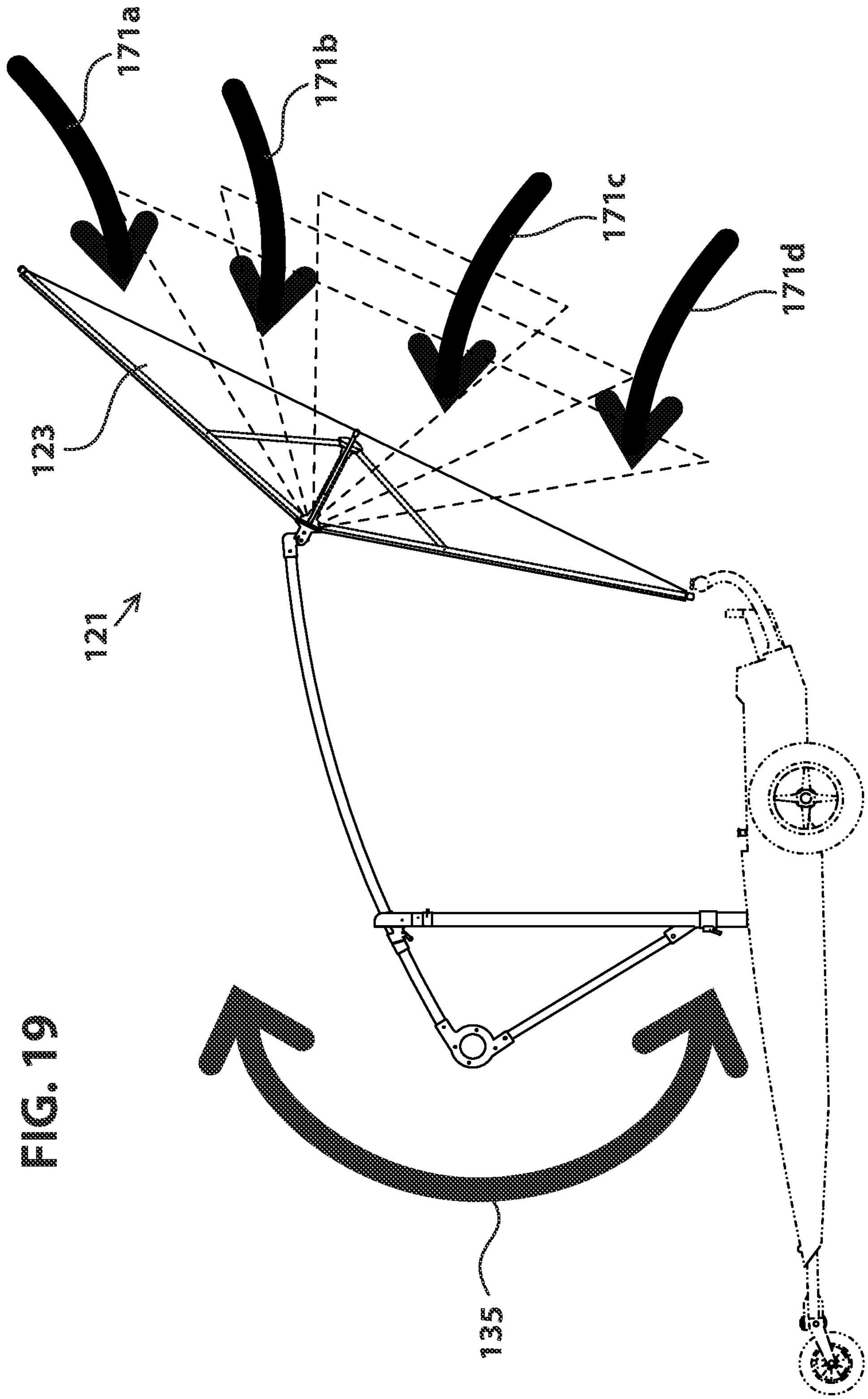
FIG. 19, FIG. 20, and FIG. 21 illustrate perspective views demonstrating the wind-catching-and-redirecting rainwater-amassing-and-storing garden-irrigating fruit-harvesting panorama-media-screen-capable land-yacht-powering sail system 121 functioning as a sail for a land-yacht.
Figure 20:
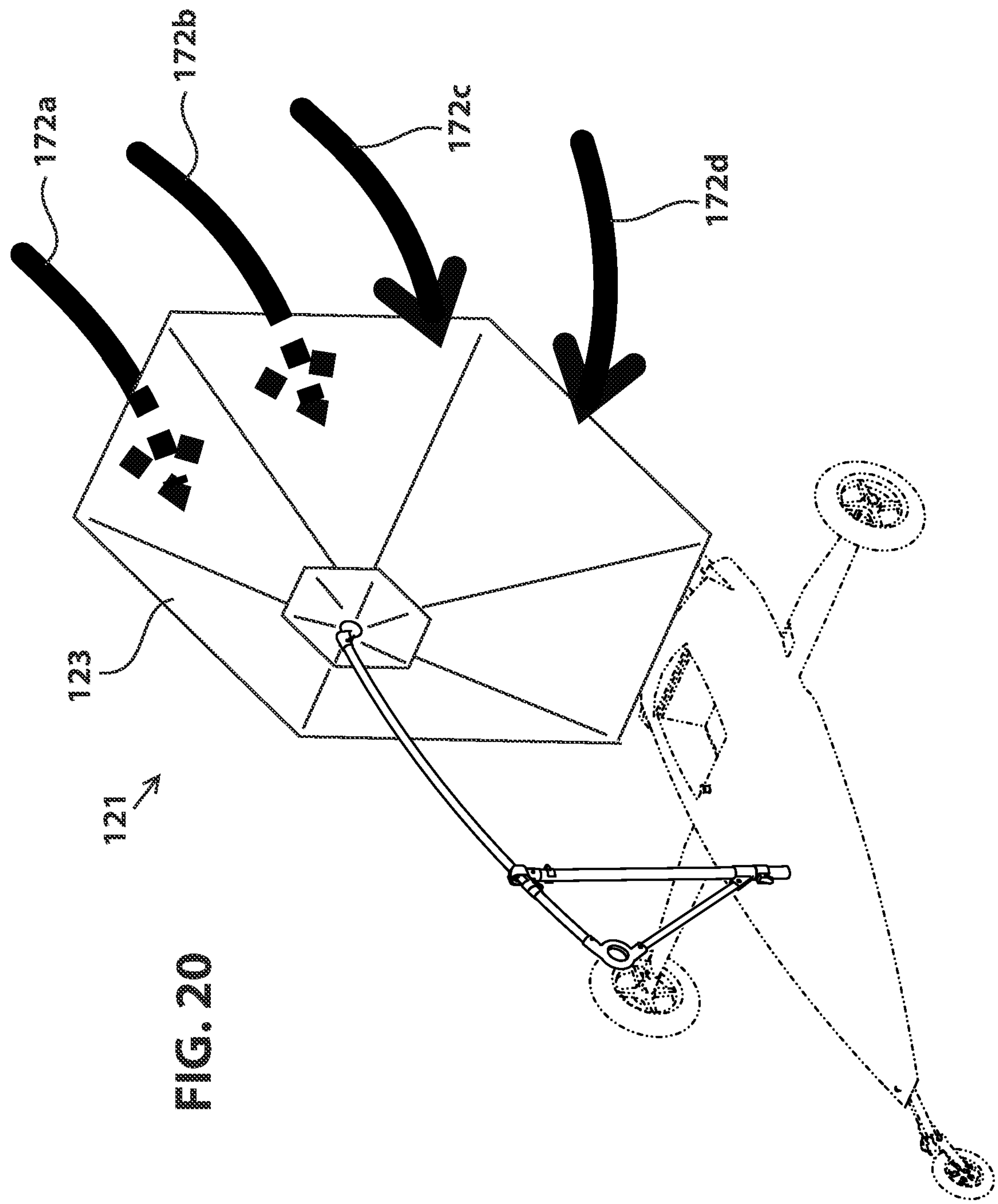
Figure 21:
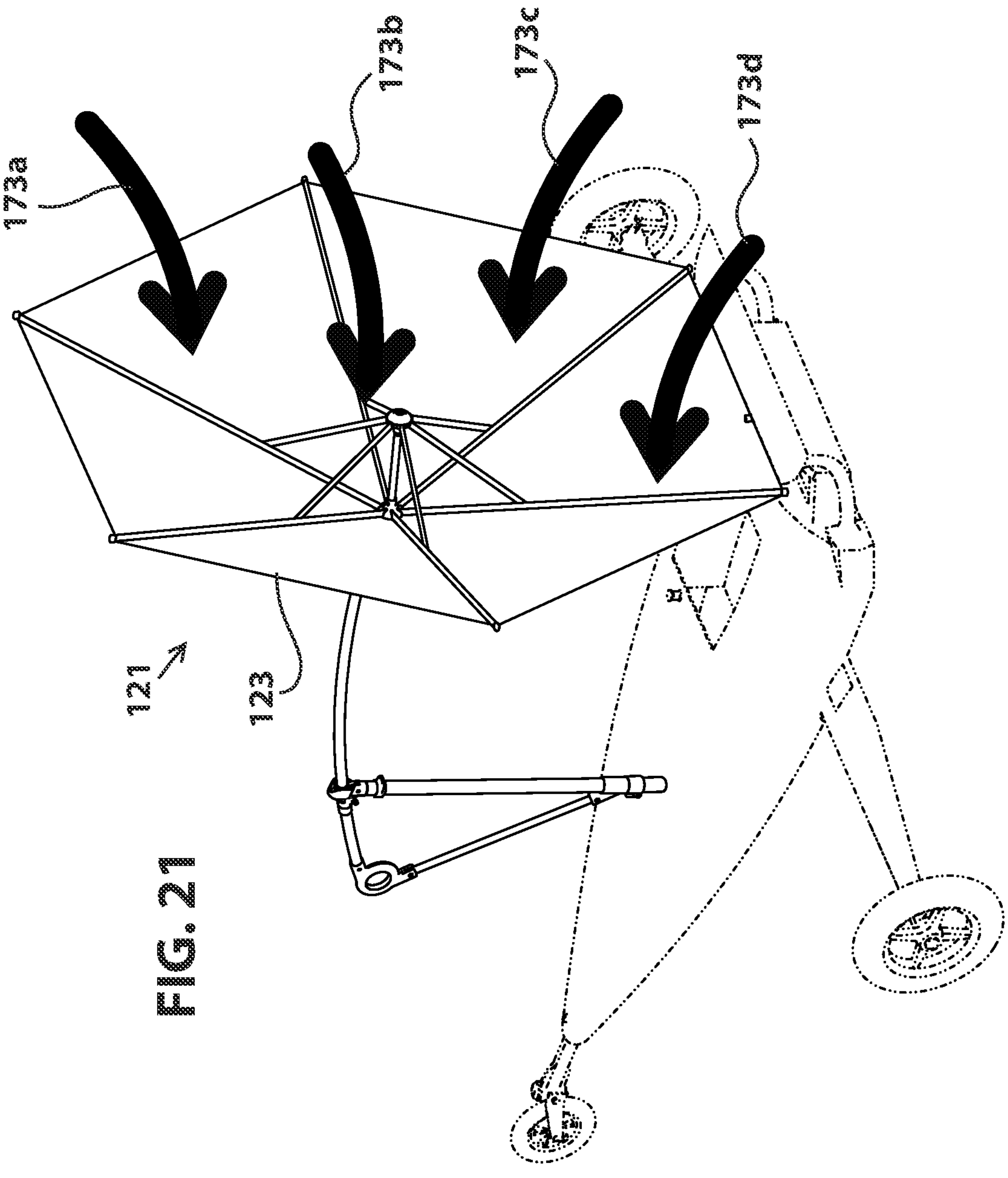
Figure 26:
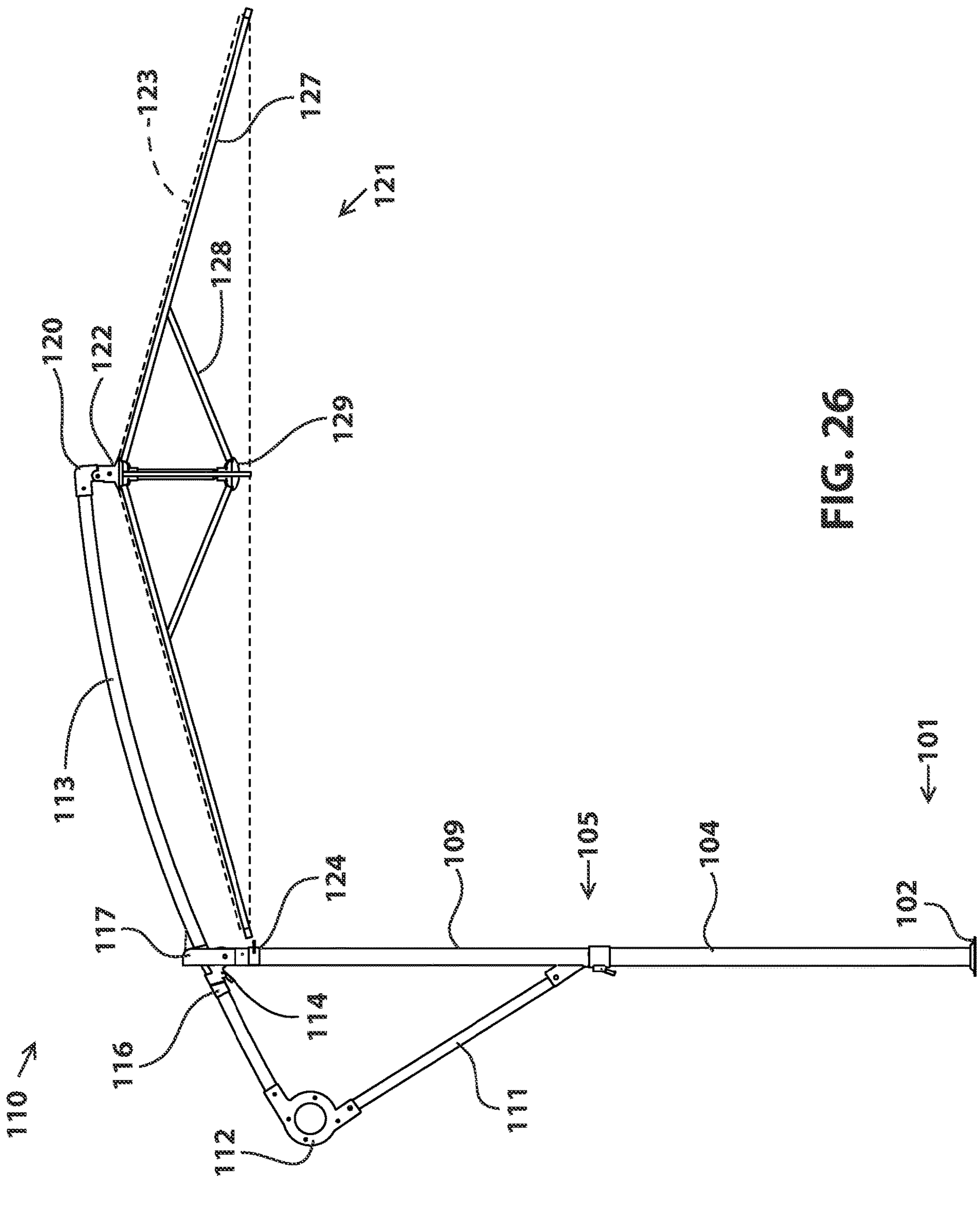
FIG. 26 illustrates a side view of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail.
Figure 27:
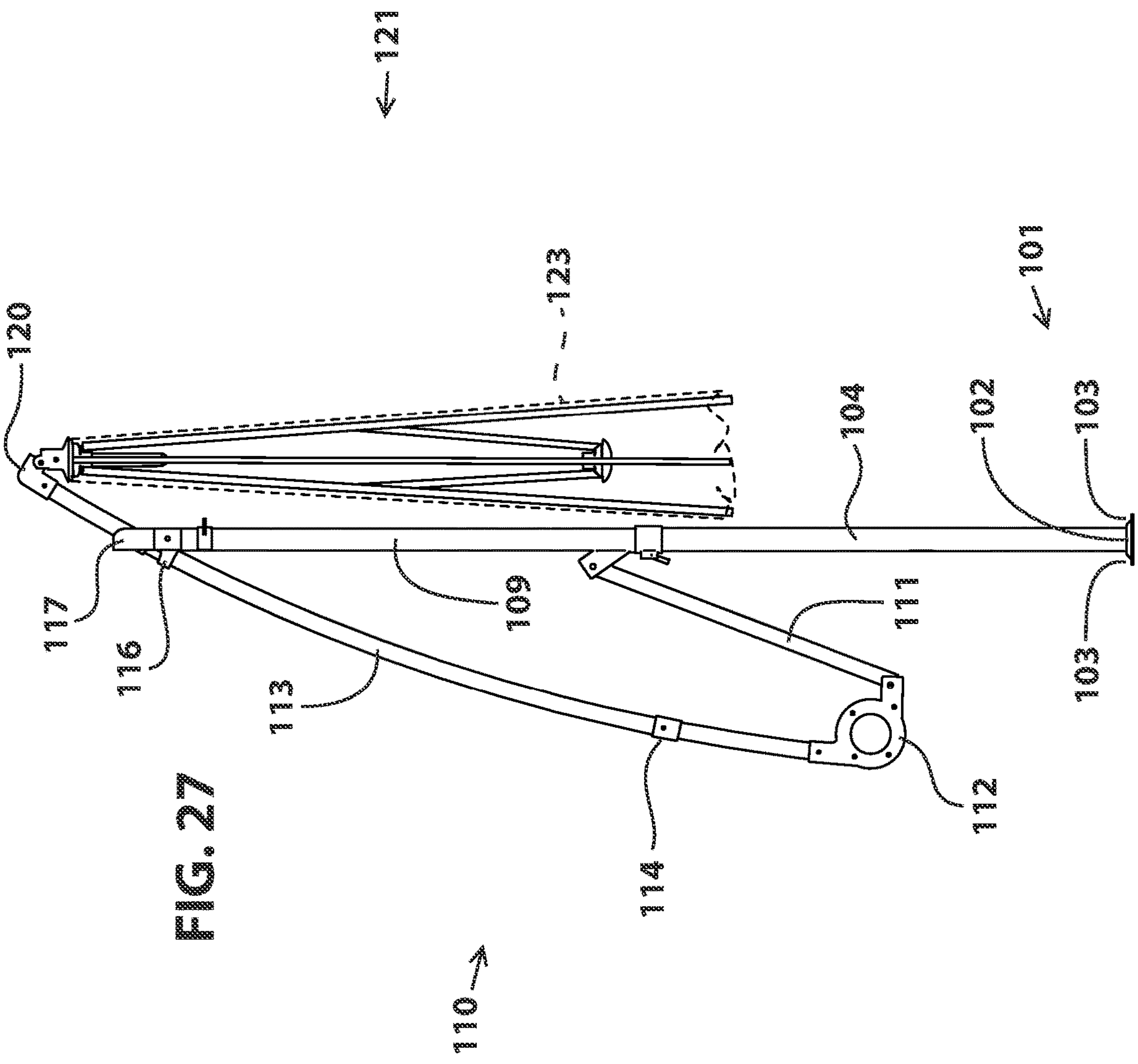
FIG. 27, FIG. 28, FIG. 29A, FIG. 29B, and FIG. 30 illustrate enlarged-partial views and a side view demonstrating the physically-impaired-assisting arthritic-assisting single-hand-automatic-sail-deploying-and-retracting multi-direction-hoisting system 110 activating the deployment of the wind-catching-and-redirecting rainwater-amassing-and-storing garden-irrigating fruit-harvesting panorama-media-screen-capable land-yacht-powering sail system 121 into a fully opened position.

2) Lower-stanchion-supporting plinth 102
is (or are respectively) for:

a) Securing physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to the ground
(see FIG. 8, FIG. 26, and FIG. 27);

b) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to a railing of a marine craft
(see FIG. 11, FIG. 12, FIG. 47, and FIG. 48); and c) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to a land yacht
(see FIG. 19, FIG. 20, FIG. 21, FIG. 55, FIG. 56, and FIG. 57).

3) Plinth-securing screws 103
is (or are respectively) for:

a) Securing physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to the ground
(see FIG. 27);

b) Securing the physically-impaired-assisting arthritic-assisting five-device-in-one wind-catching-and-redirecting land-yacht-maneuvering-and powering rainwater-amassing-and-storing garden-irrigating fruit-harvesting panorama-mediascreen-capable single-hand-automatic-sail-deploying-and-retracting single-movement-ergonomic-navigator-to-produce-multi-function sail to a railing of a marine craft
(see FIG. 11, FIG. 12, FIG. 47, and FIG. 48); and c) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to a land yacht
(see FIG. 19, FIG. 20, FIG. 21, FIG. 55, FIG. 56, and FIG. 57).

4) Lower stanchion 104
is (or are respectively) for:

a) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to a tow hitch
(see FIG. 13, FIG. 14, FIG. 16, FIG. 49, FIG. 50, and FIG. 52);

b) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to a utility hole of a pickup truck
(see FIG. 17, FIG. 18, FIG. 53, and FIG. 54); and c) Securing the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic navigator-to-produce-multi-function sail to a bucket
to harvest fruit or collect rainwater
in the directions of arrows 131*a*, 131*b*, 131*c*, 132*a*, 132, 132*c*, 133*a*, 133*b*, 133*c*, 134*a*, 134*b*, and 134*c*
(see FIG. 9, FIG. 10, FIG. 45, and FIG. 46).

5) Horizontal-rotation-locking wind-catching-and-redirecting land-yacht-maneuvering system 105 is for performing the combined functions of its components.

6) Horizontal-rotation-locking spring-loaded nipple-lock 106
is (or are respectively) for:

a) Engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
in the directions of arrows 135, and 136
(see FIG. 19, and FIG. 49; and b) Engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
in the directions of arrows 137, 138*a*, 138*b*, 139*a*, 139*b*, 140, 141*a*, 141*b*, 142*a*, and 142*b*
(see FIG. 6, FIG. 7A, FIG. 7B, FIG. 30, FIG. 41, FIG. 42, FIG. 43, and FIG. 67).

7) Horizontal-rotation-locking pin 107
is (or are respectively) for:

a) Engaging and disengaging from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
in the directions of arrows 135, and 136
(see FIG. 19, and FIG. 49; and b) Engaging and disengaging from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
in the directions of arrows 137, 138*a*, 138*b*, 139*a*, 139*b*, 140, 141*a*, 141*b*, 142*a*, and 142*b*
(see FIG. 6, FIG. 7A, FIG. 7B, FIG. 30, FIG. 41, FIG. 42, FIG. 43, and FIG. 67).

8) Horizontal-rotation-locking openings 108
is (or are respectively) for:

a) Lockingly allowing horizontal-rotation-locking pin 107 to engage and disengage to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
in the directions of arrows 135, and 136
(see FIG. 19, and FIG. 49; and b) Lockingly allowing horizontal-rotation-locking pin 107 to engage and disengage horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration in the directions of arrows 137, 138*a*, 138*b*, 139*a*, 139*b*, 140, 141*a*, 141*b*, 142*a*, and 142*b* (see FIG. 6, FIG. 7A, FIG. 7B, FIG. 30, FIG. 41, FIG. 42, FIG. 43, and FIG. 67).

Figure 22:
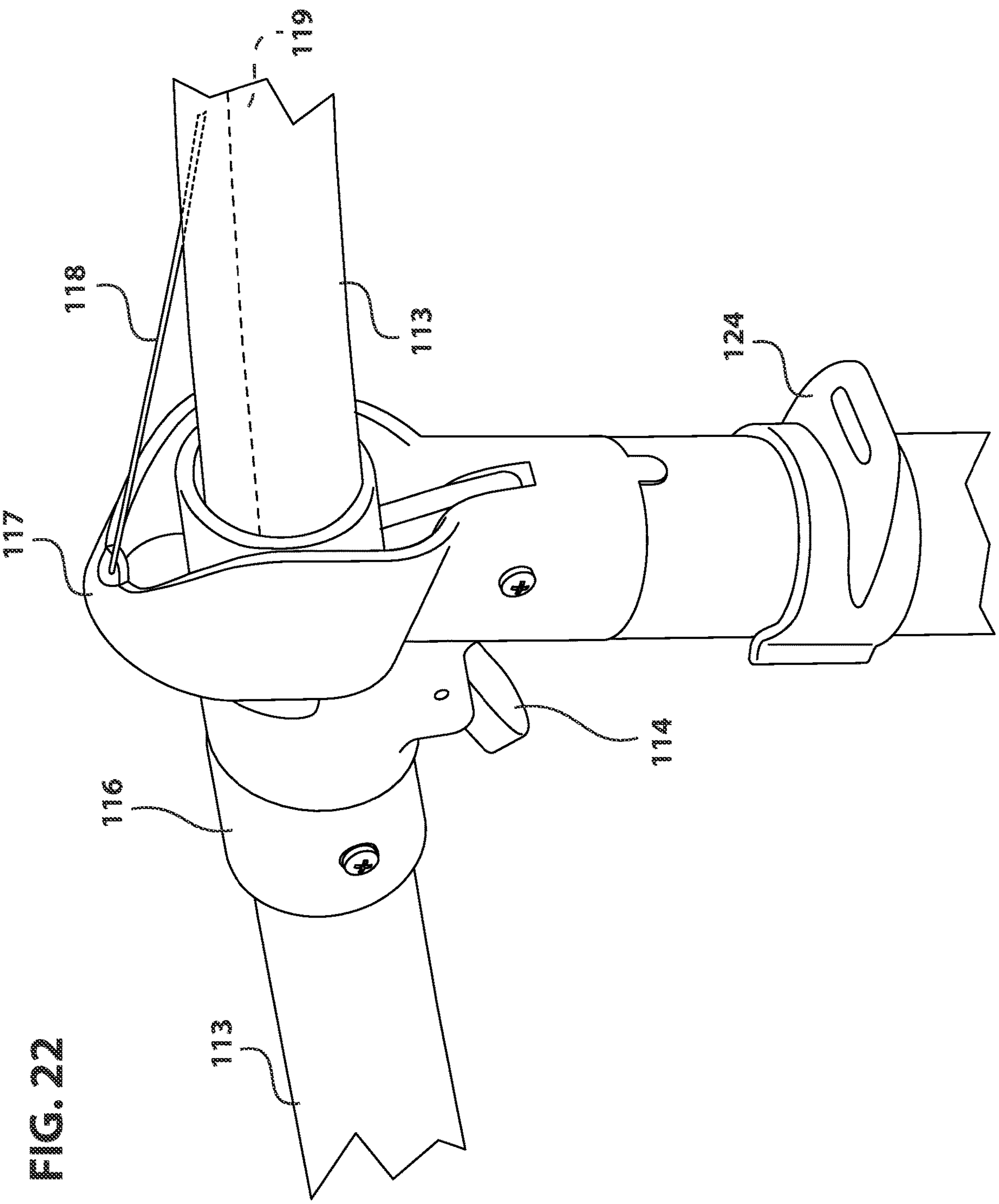
FIG. 22A, FIG. 22B, FIG. 23, FIG. 24, FIG. 25A, and FIG. 25B illustrate enlarged and/or partial views of the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121.
Figure 23A:
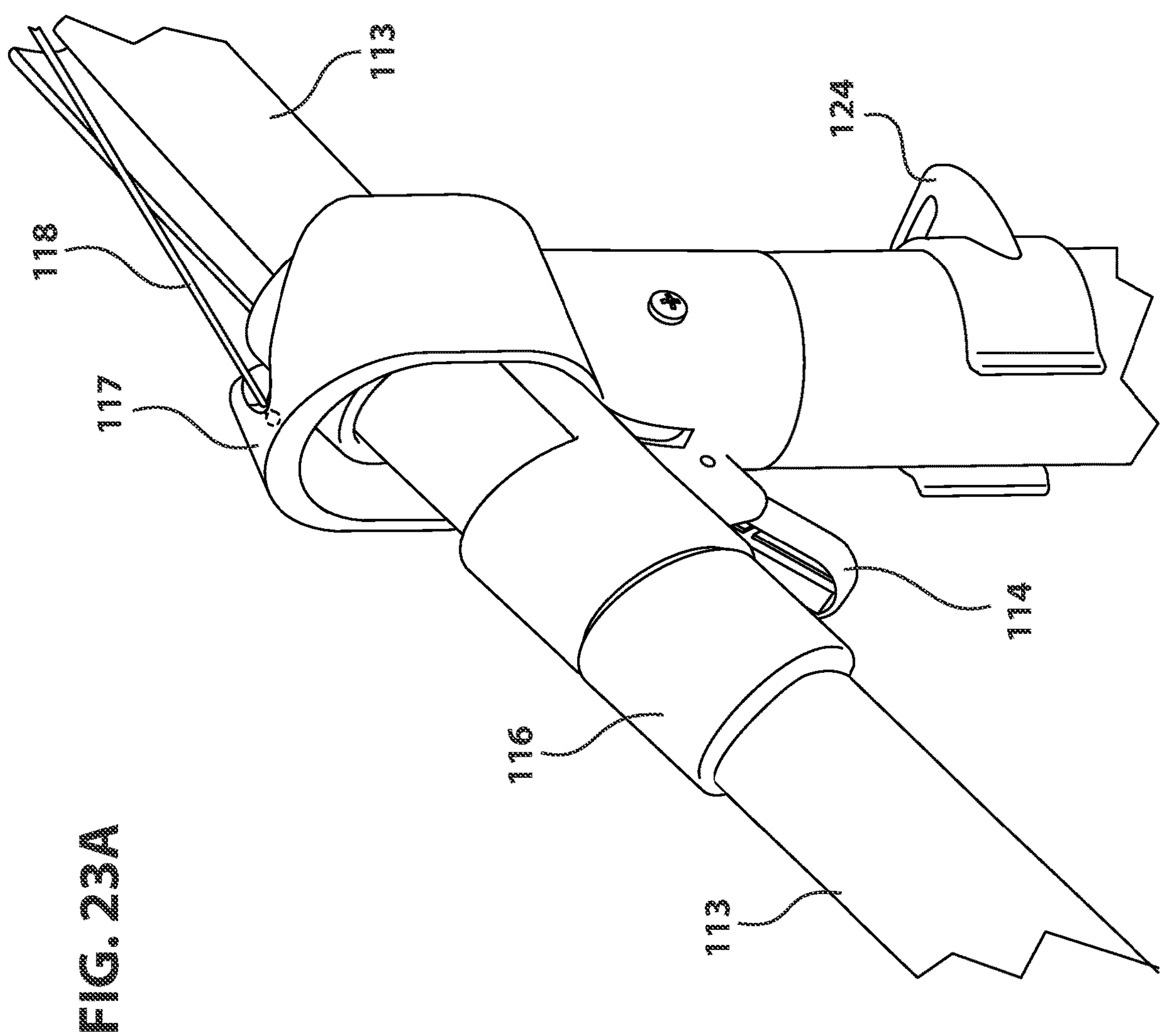
Figure 23B:
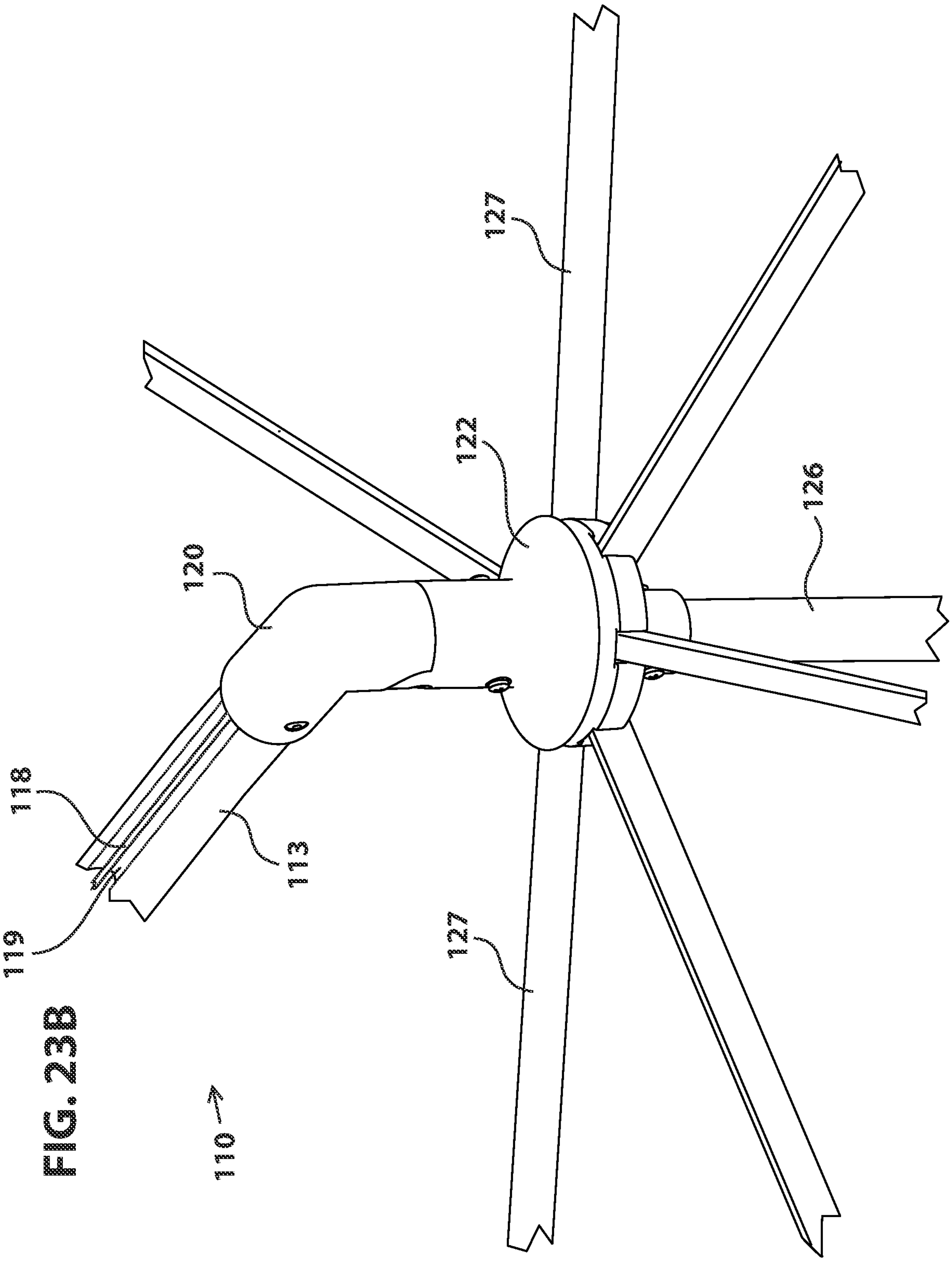
Figure 24:
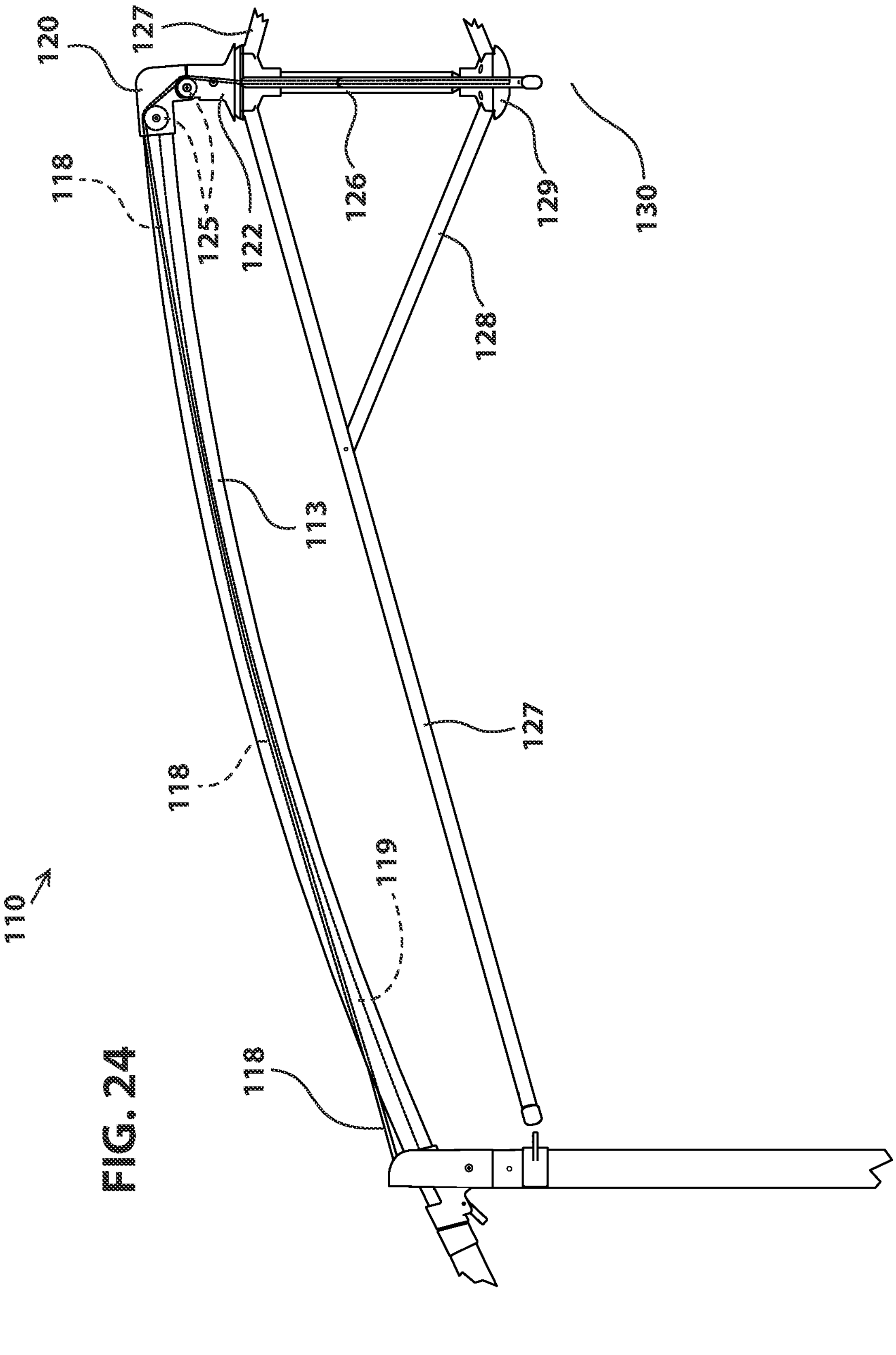
Figure 25A:
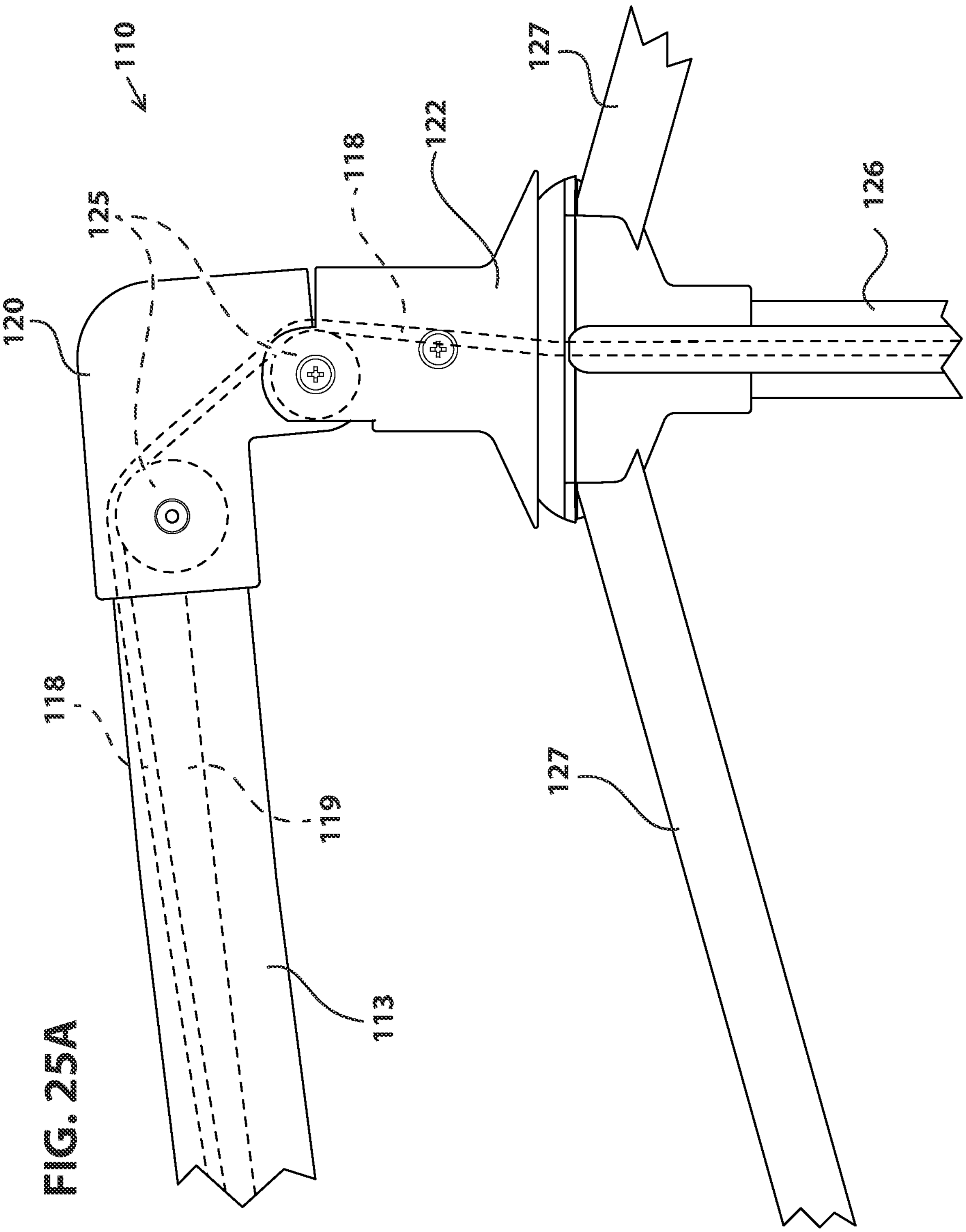
Figure 25B:
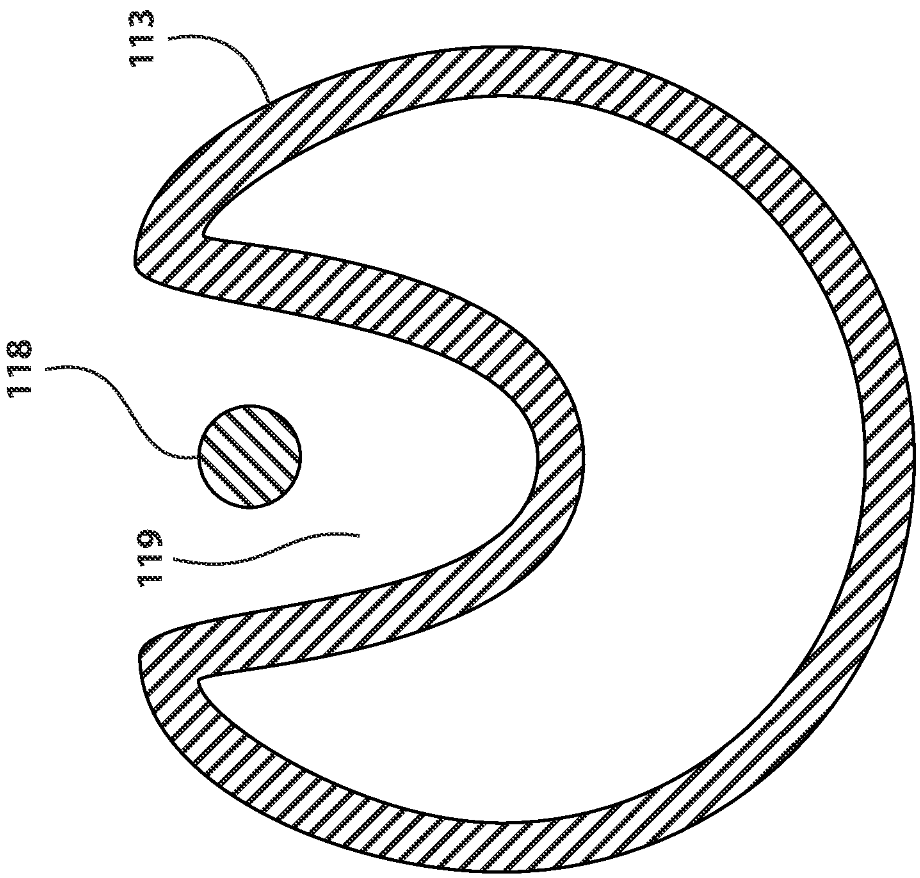
Figure 58:
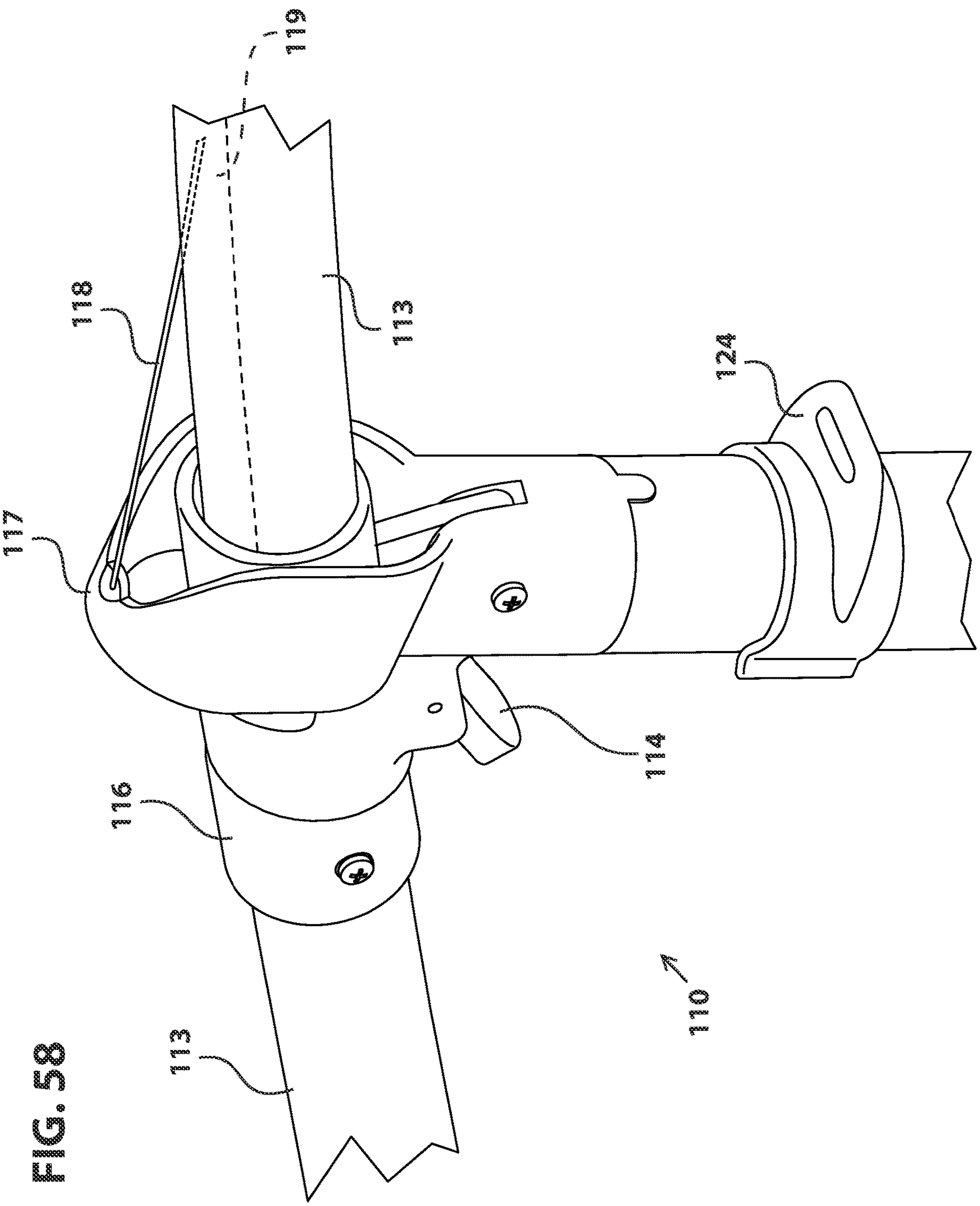
FIG. 58 and FIG. 59 illustrate enlarged and/or partial views of the physically-impaired-assisting arthritic-assisting single-hand-automatic-sail-deploying-and-retracting multi-direction-hoisting system 110.
Figure 59A:
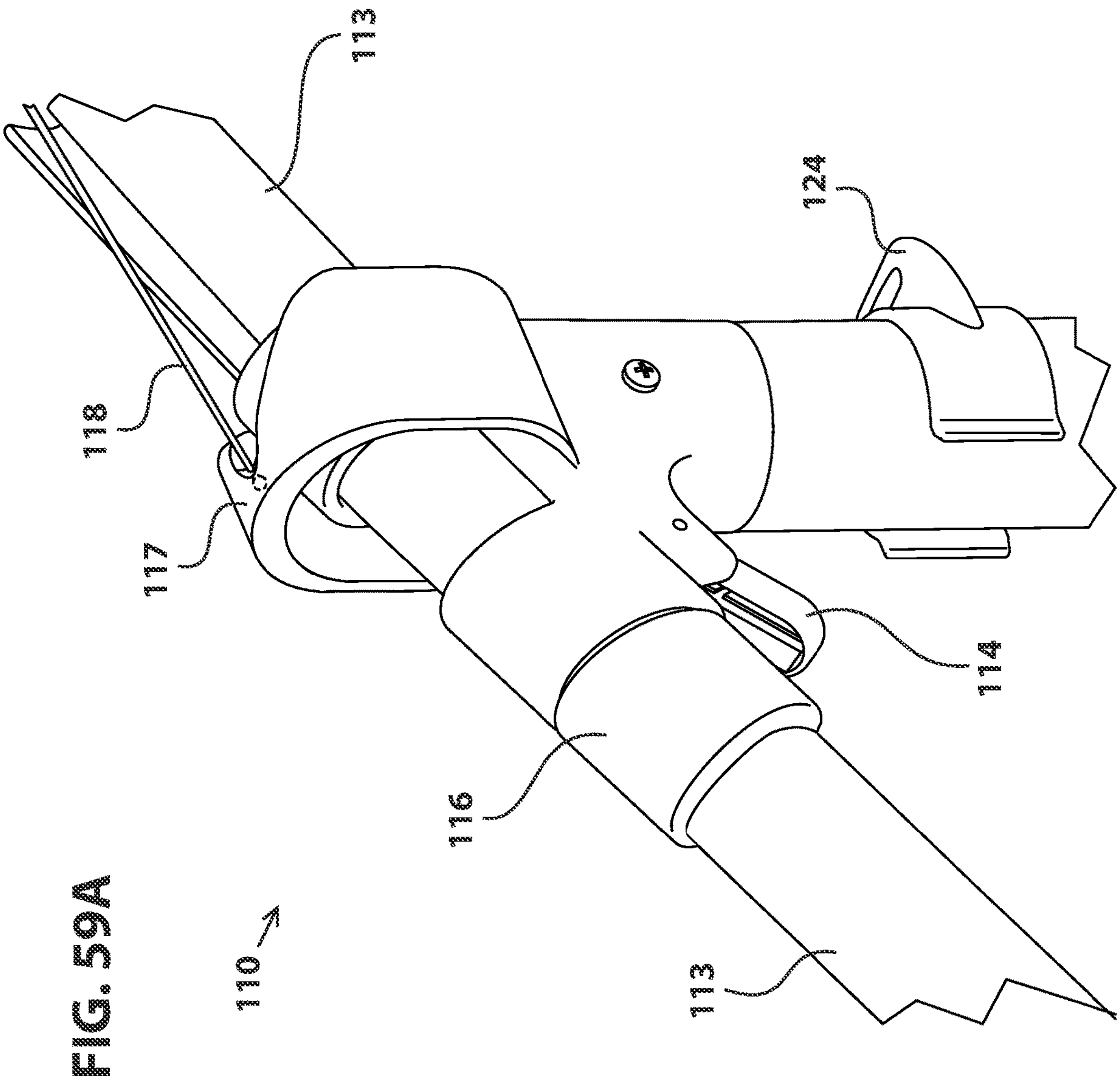
Figure 59B:
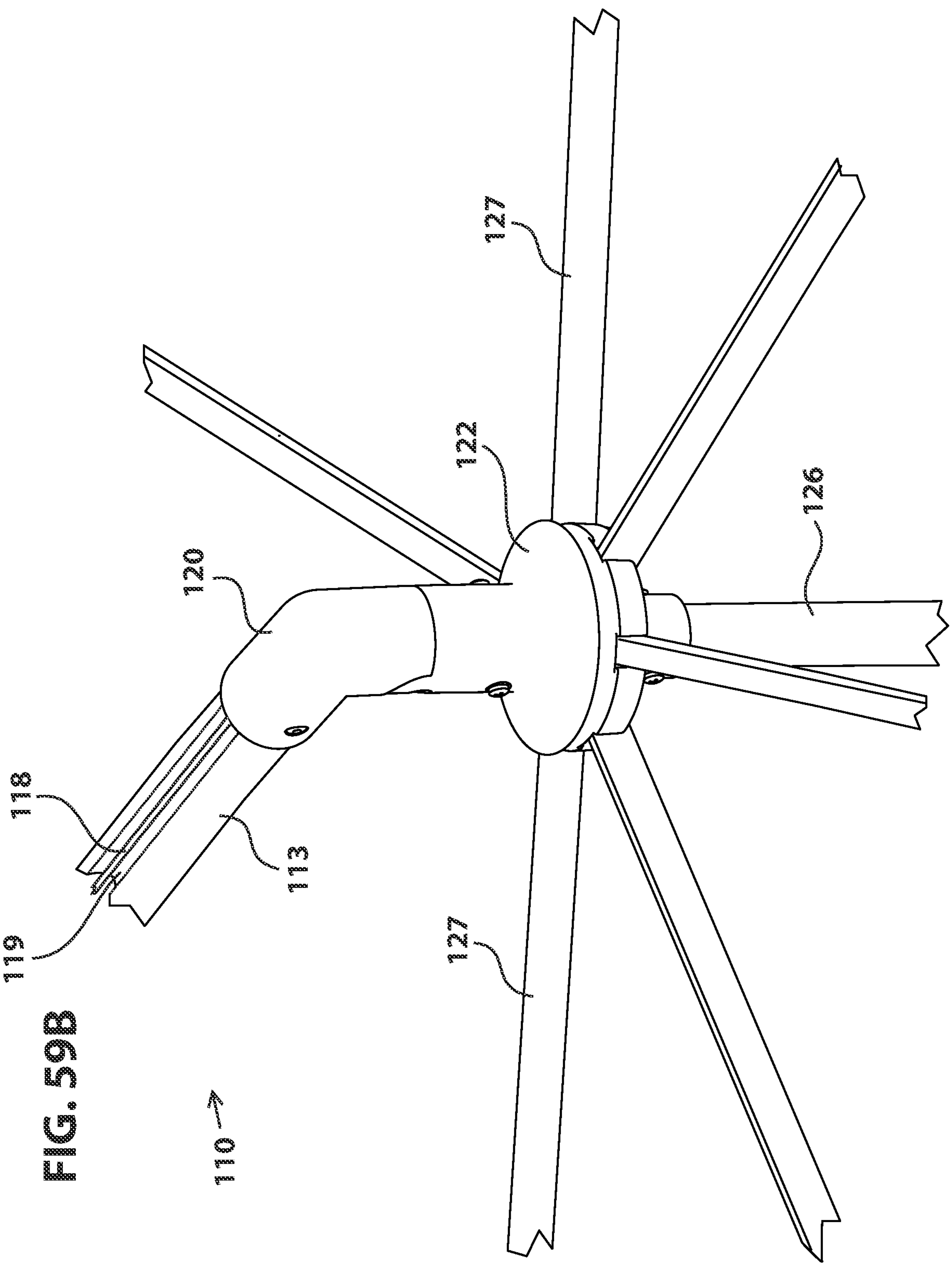

9) Upper stanchion 109 is (or are respectively) for:

a) Providing upper structure for the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail (see FIG. 8 and FIG. 44); and b) Providing a location to slidably attach sail-location-securing adjustable removable clip 124 (see FIG. 22 and FIG. 58).

10) Physically-impaired-assisting arthritic-assisting single-hand-automatic-sail-deploying-and-retracting multi-direction-hoisting system 110 is for performing the combined functions of its components.

Figure 4:
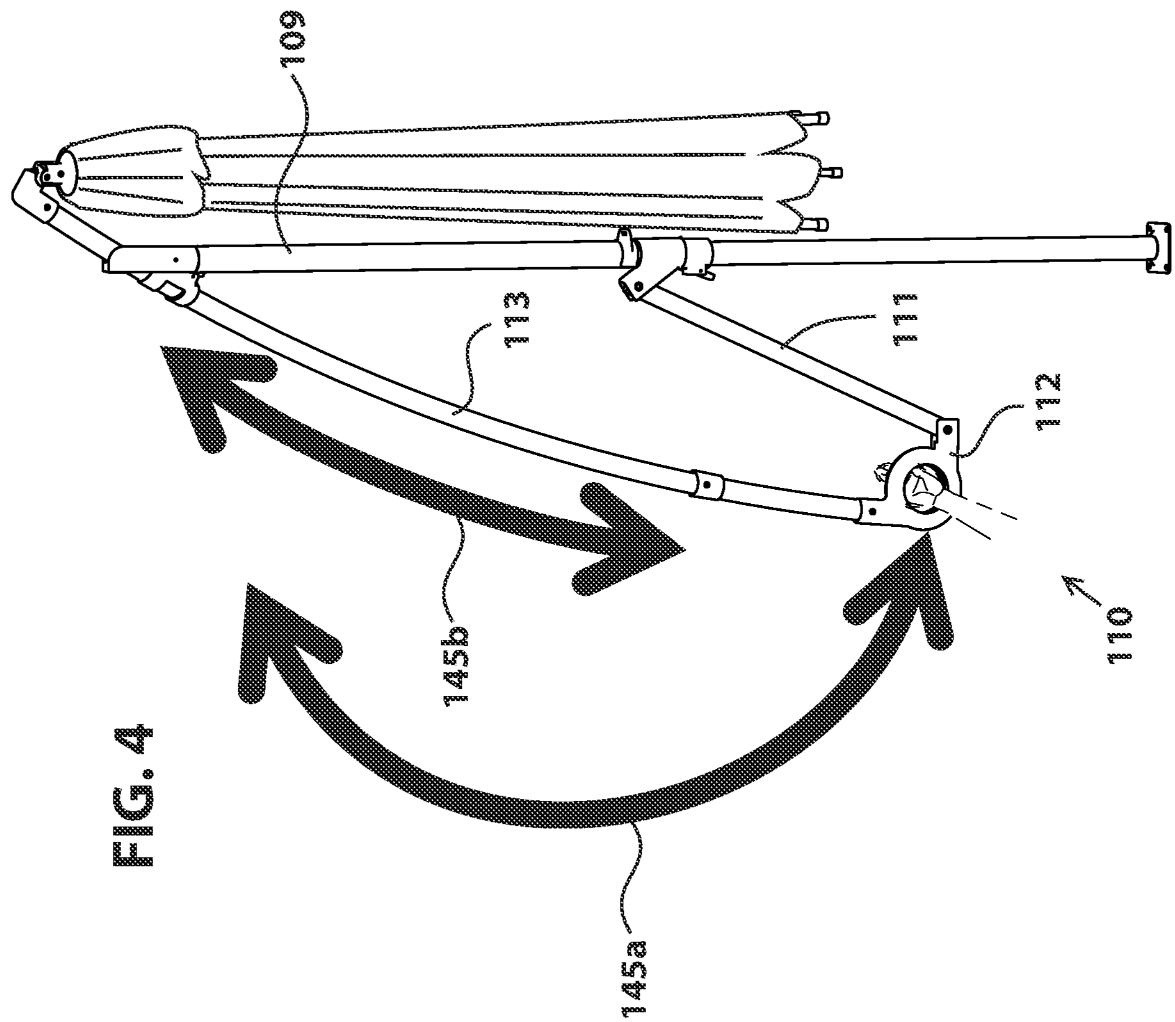
Figure 5:
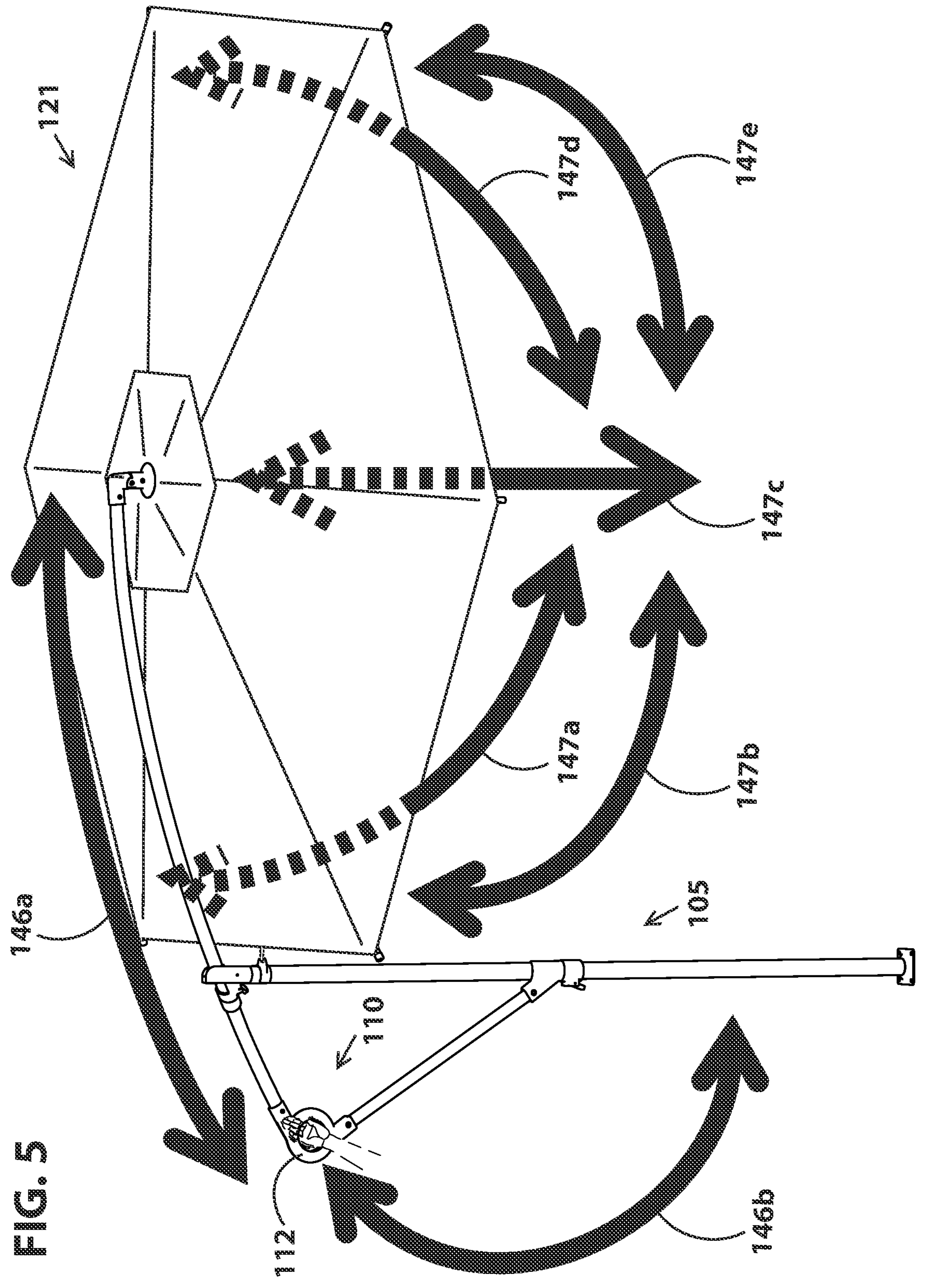
Figure 6:
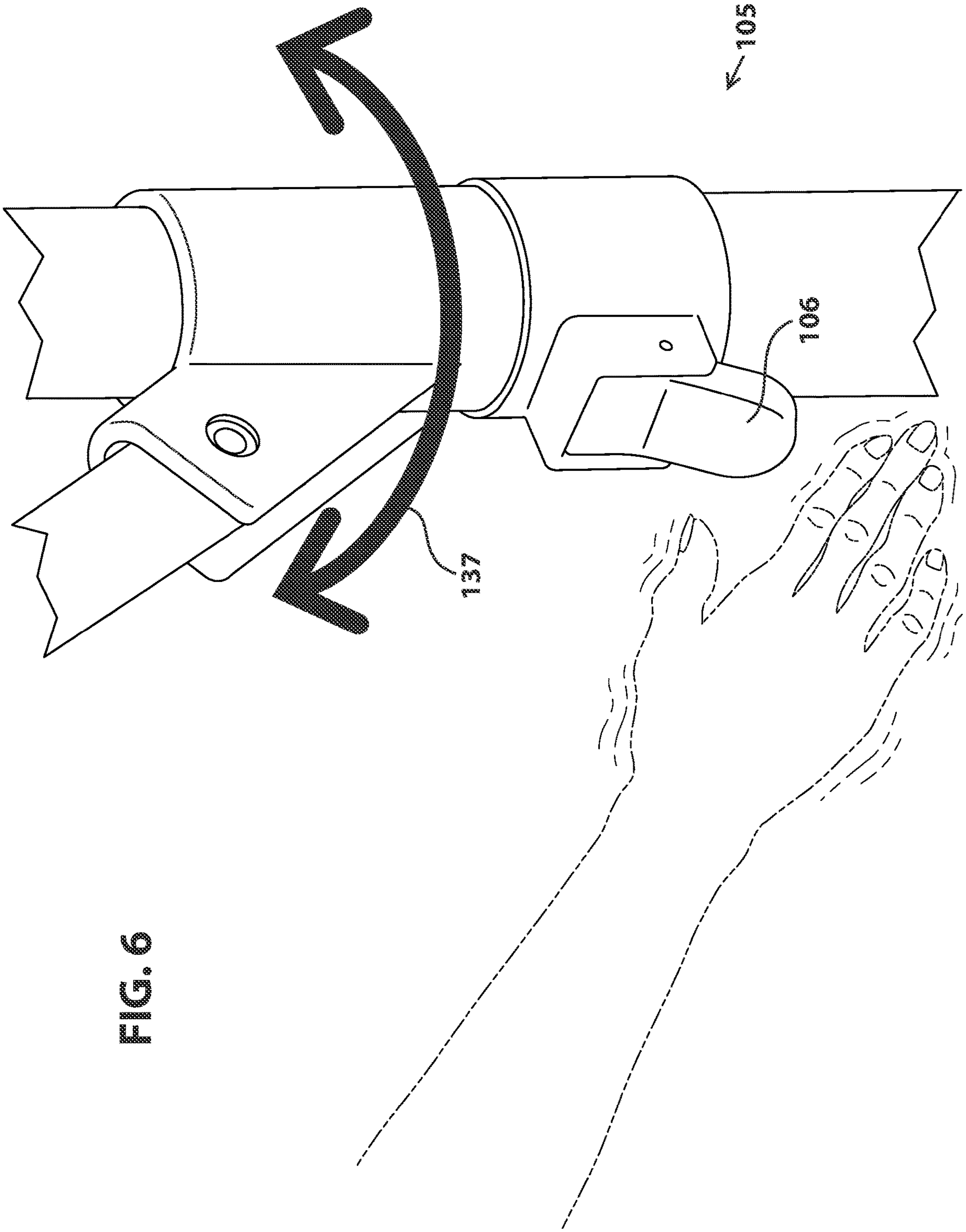
FIG. 6 and FIG. 7A illustrate enlarged views of a physically-impaired person easily pressing the horizontal-rotation-locking spring-loaded nipple-lock 106 to rotate the physically-impaired-assisting arthritic-assisting single-hand-automatic-sail-deploying-and-retracting multi-direction-hoisting system 110, and the wind-catching-and-redirecting rainwater-amassing-and-storing garden-irrigating fruit-harvesting panorama-media-screen-capable land-yacht-powering sail system 121.
Figure 7A:
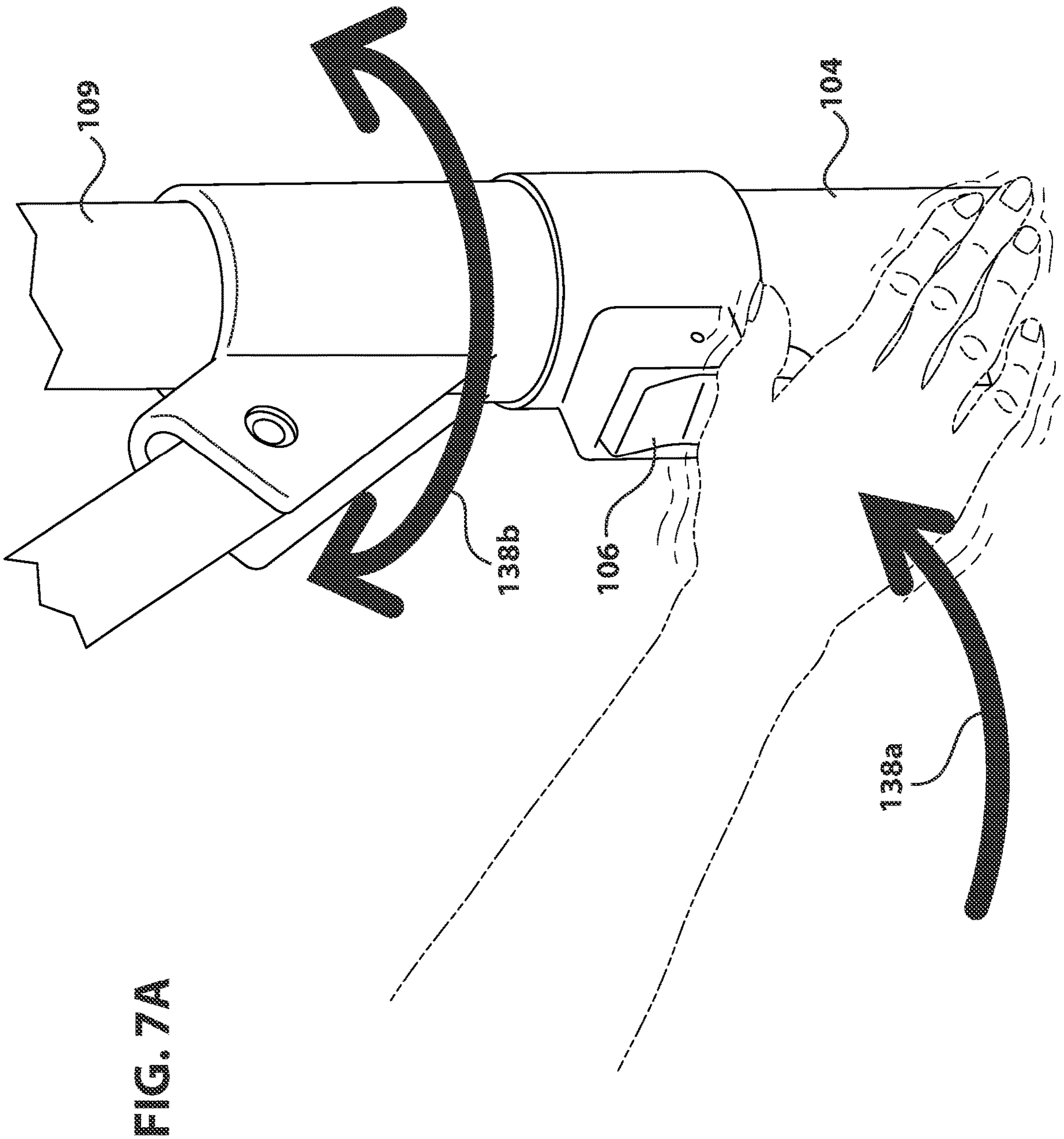
Figure 7B:
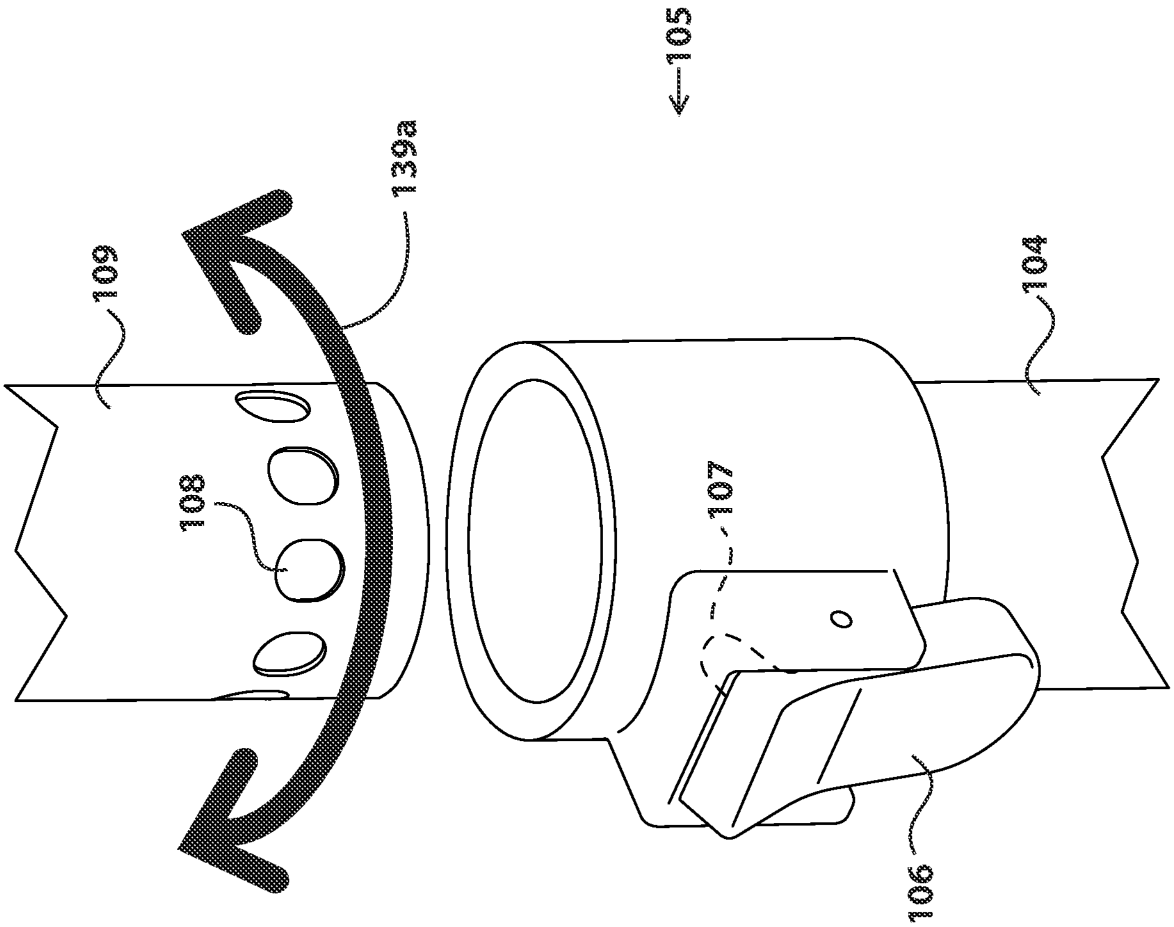
FIG. 7B illustrates an enlarged view demonstrating the rotation of the physically-impaired-assisting arthritic-assisting single-hand-automatic-sail-deploying-and-retracting multi-direction-hoisting system 110, and the wind-catching-and-redirecting rainwater-amassing-and-storing garden-irrigating fruit-harvesting panorama-media-screen-capable land-yacht-powering sail system 121.

11) Multi-direction-hoisting shank 111 is (or are respectively) for:

a) Hingedly supporting physically-impaired-assisting arthritic-assisting single-hand-automatic-sail-deploying-and-retracting land-yacht-maneuvering multi-direction-hoisting slidable-rockable cantilever teeter totter 113 (see FIG. 4 and FIG. 8); and b) Pivotably providing a defined range of motion for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail (see FIG. 4 and FIG. 8).

12) Physically-impaired-assisting arthritic-assisting single-hand-sail-deploying-and-retracting land-yacht-maneuvering multi-direction-hoisting ergonomic navigator 112 is (or are respectively) for:

a) Allowing a physically-impaired or arthritic to easily deploy and retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail without the need to bend the fingers in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e* (see FIG. 2, FIG. 3, FIG. 4, FIG. 5, FIG. 37, FIG. 38, FIG. 39, and FIG. 40);

b) Automatically deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e* (see FIG. 2, FIG. 3, FIG. 4, FIG. 5, FIG. 37, FIG. 38, FIG. 39, and FIG. 40); and c) Automatically engaging physically-impaired-assisting arthritic-assisting single-hand-automatic-sail-deploying-and-retracting land-yacht-maneuvering multi-direction-hoisting slidable-rockable cantilever teeter totter 113, teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e* (see FIG. 2, FIG. 3, FIG. 4, FIG. 5, FIG. 37, FIG. 38, FIG. 39, and FIG. 40).

13) Physically-impaired-assisting arthritic-assisting single-hand-automatic-sail-deploying-and-retracting land-yacht-maneuvering multi-direction-hoisting slidable-rockable cantilever teeter totter 113 is (or are respectively) for:

a) Automatically engaging teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-mediascreen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40); and b) Providing cantilevered weight-balance for the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from falling over in the directions of arrows 150*a*, 150*b*, 151*a*, 151*b*, 152*a*, 152*b*, 152*c*, 152*d*, and 152*e*

Figure 39:
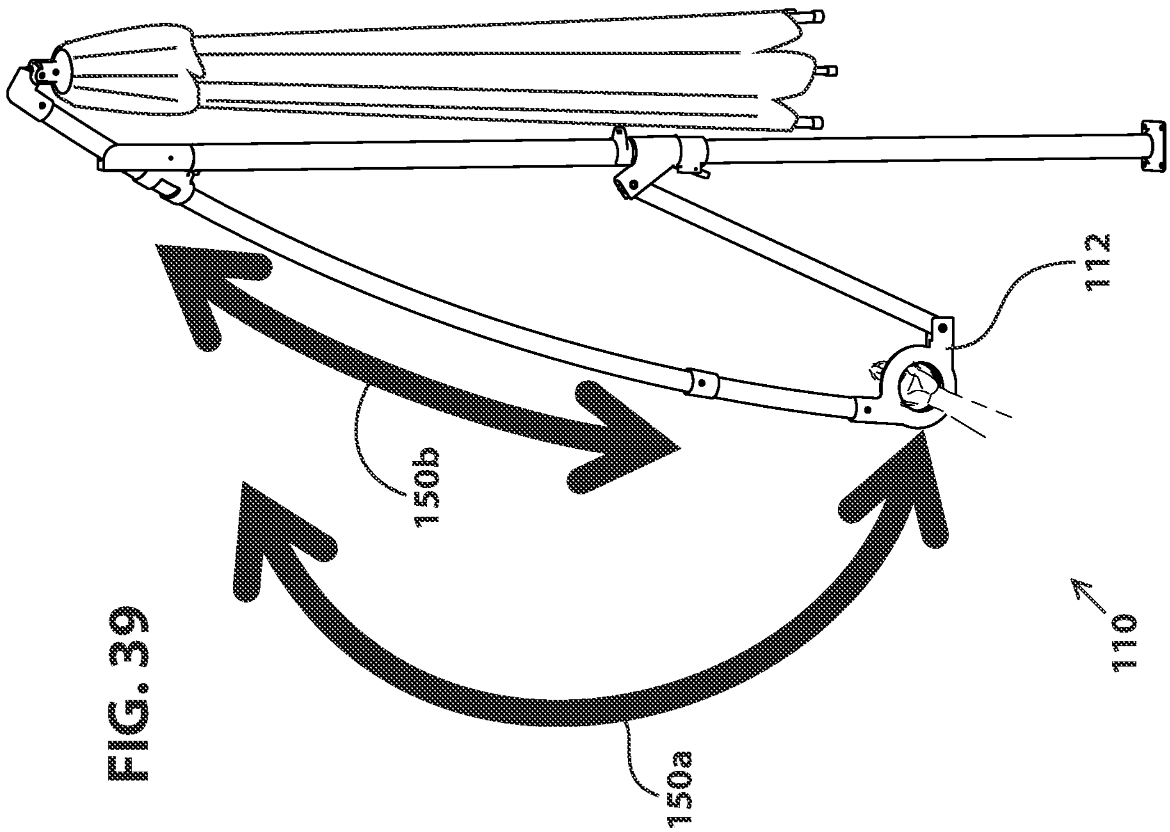
Figure 40:
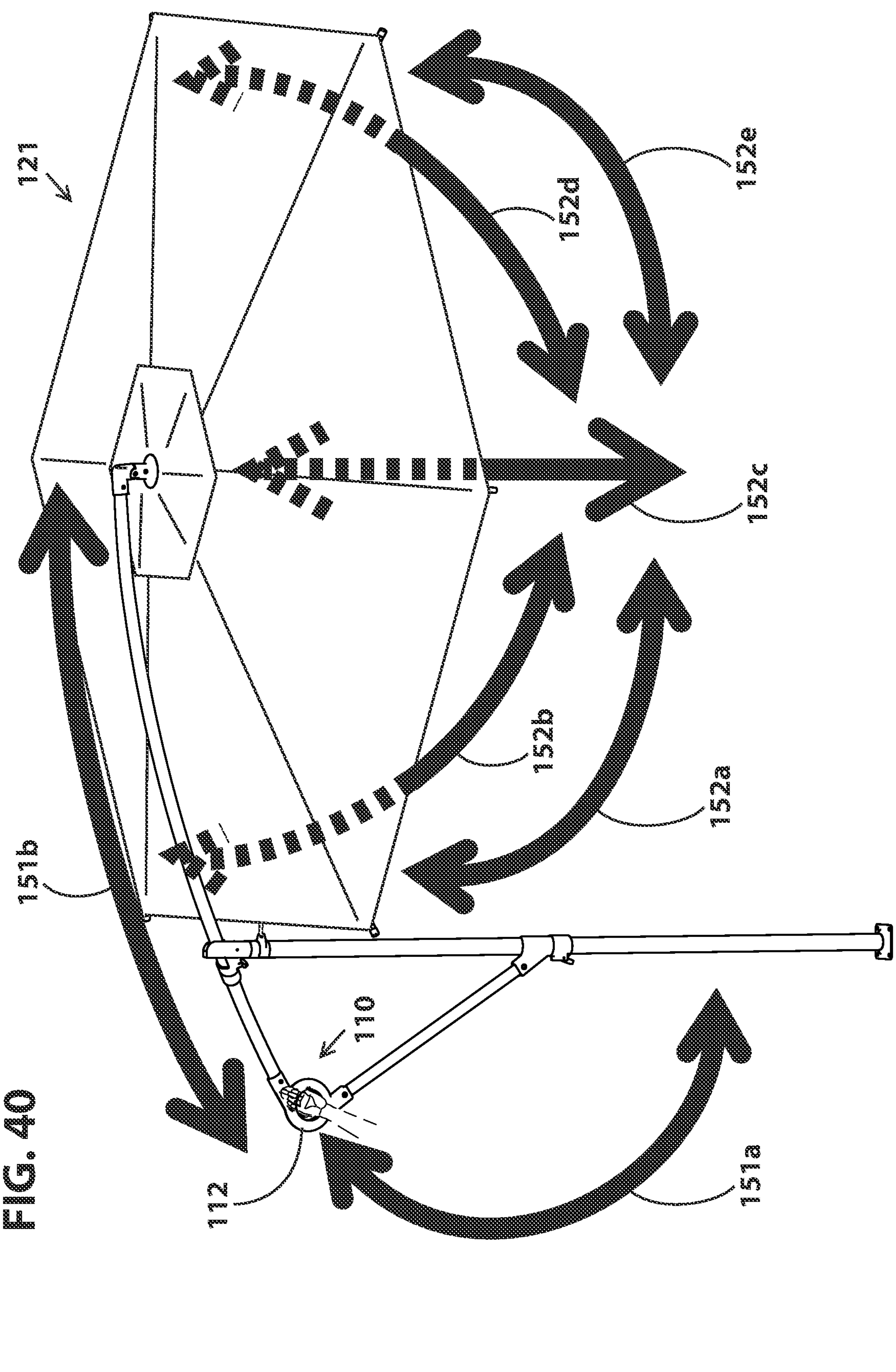
Figure 41:
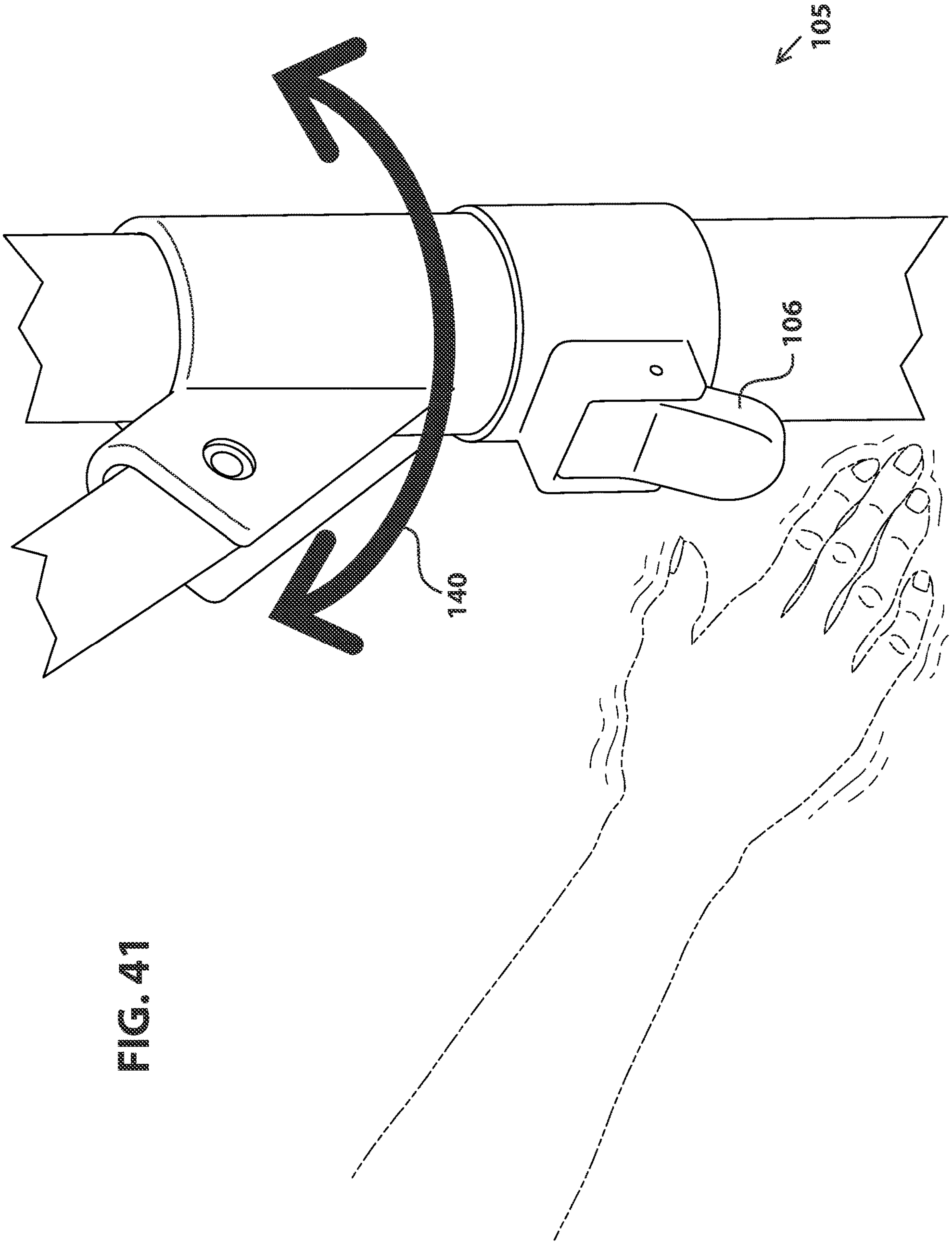
FIG. 41 and FIG. 42 illustrate enlarged views of a physically-impaired person easily pressing the horizontal-rotation-locking spring-loaded nipple-lock 106 to rotate the physically-impaired-assisting arthritic-assisting single-hand-automatic-sail-deploying-and-retracting multi-direction-hoisting system 110, and the wind-catching-and-redirecting rainwater-amassing-and-storing garden-irrigating fruit-harvesting panorama-media-screen-capable land-yacht-powering sail system 121.
Figure 42:
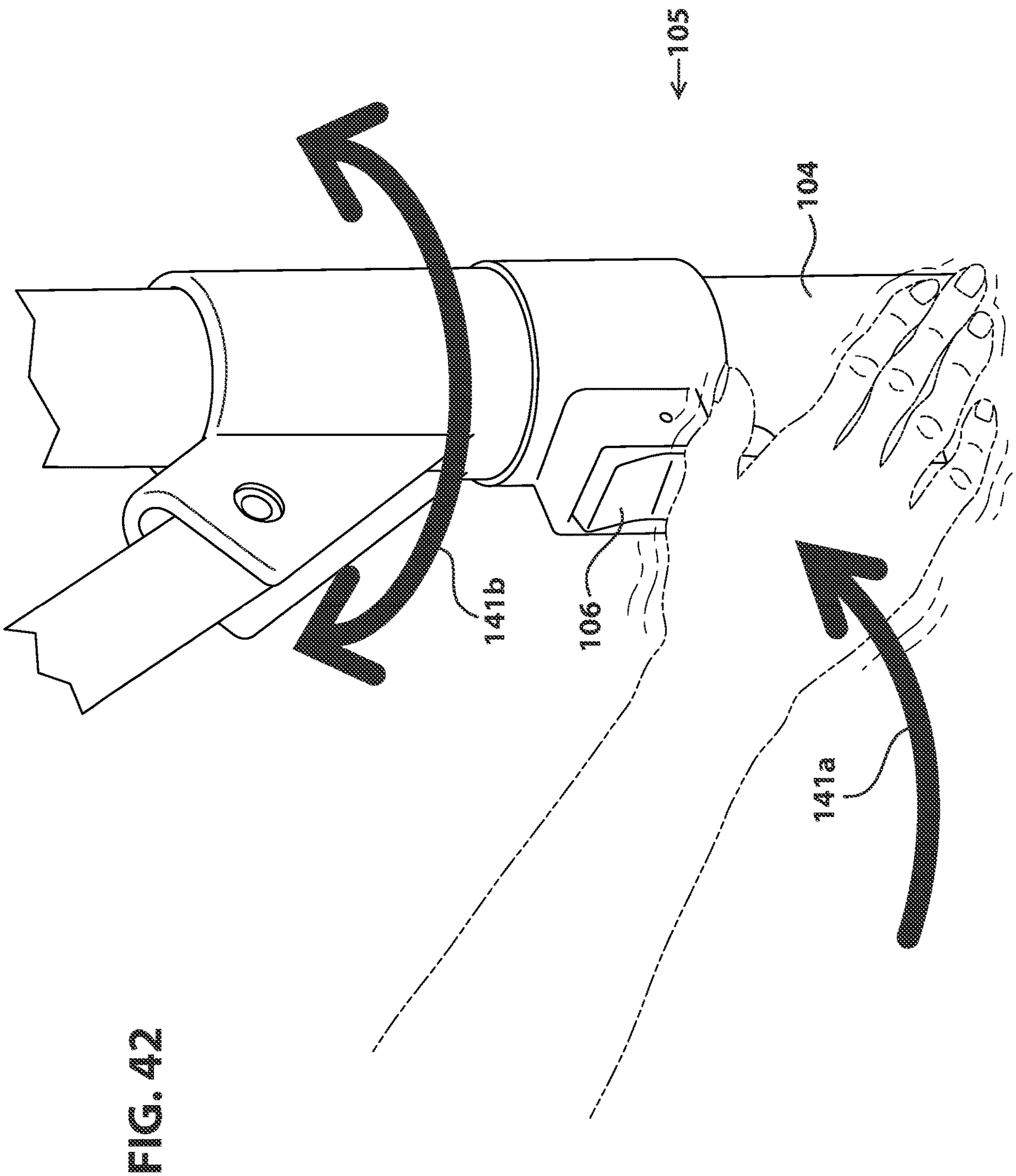
Figure 43:
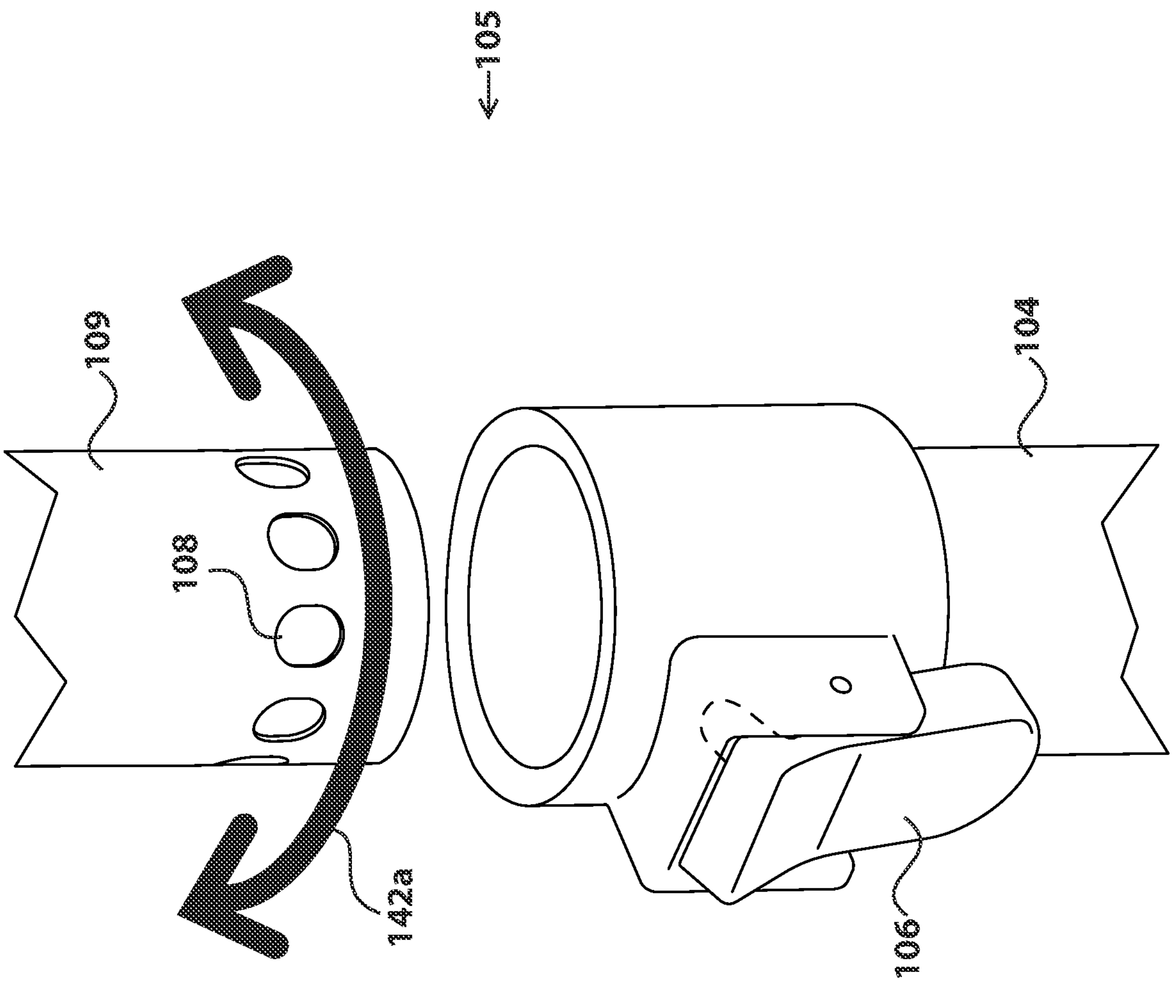
FIG. 43 illustrates an enlarged view demonstrating the rotation of the physically-impaired-assisting arthritic-assisting single-hand-automatic-sail-deploying-and-retracting multi-direction-hoisting system 110, and the wind-catching-and-redirecting rainwater-amassing-and-storing garden-irrigating fruit-harvesting panorama-media-screen-capable land-yacht-powering sail system 121.
Figure 44:
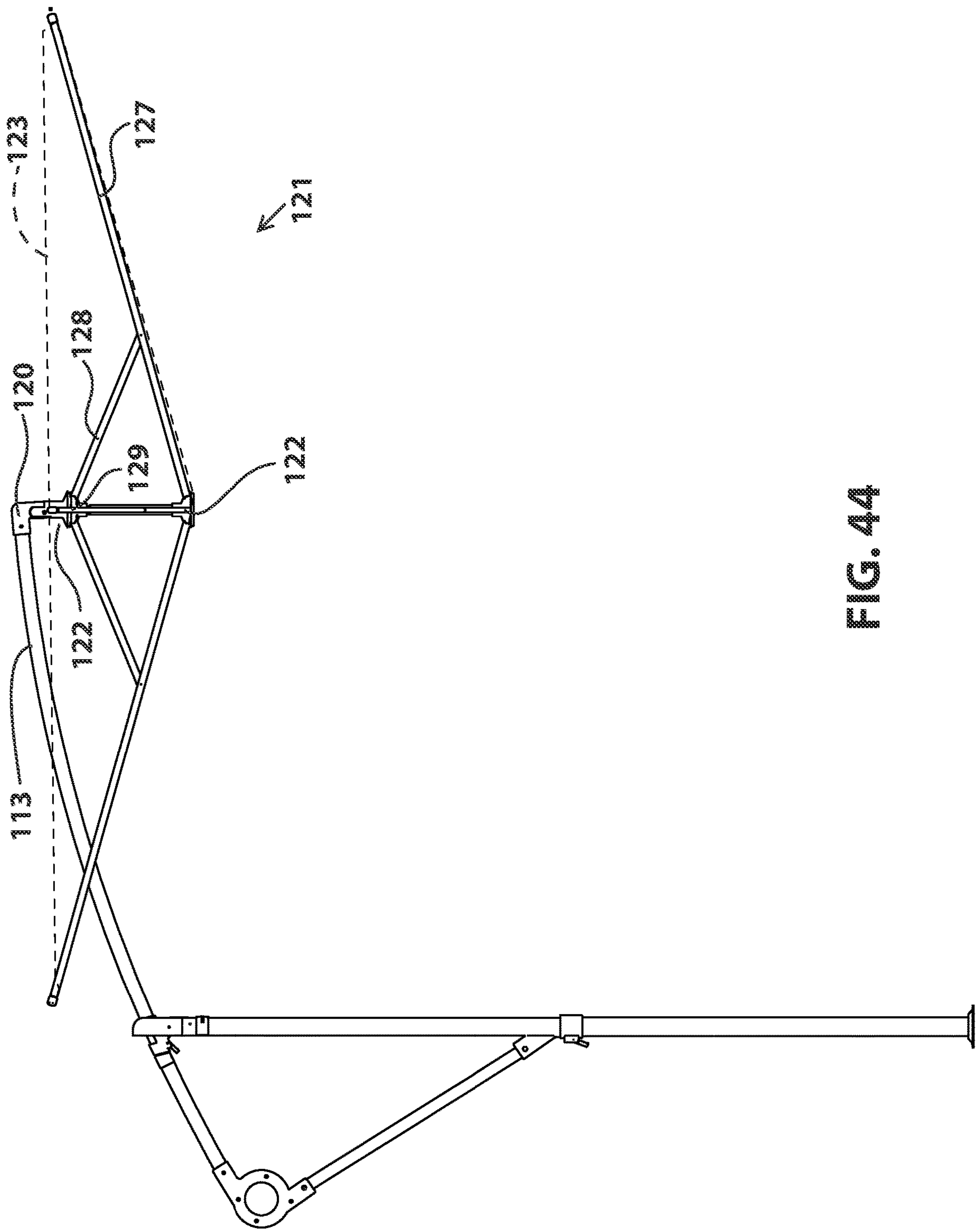
FIG. 44 illustrates a side view demonstrating the wind-catching-and-redirecting rainwater-amassing-and-storing garden-irrigating fruit-harvesting panorama-media-screen-capable land-yacht-powering sail system 121 in an inverted orientation.
Figure 45:
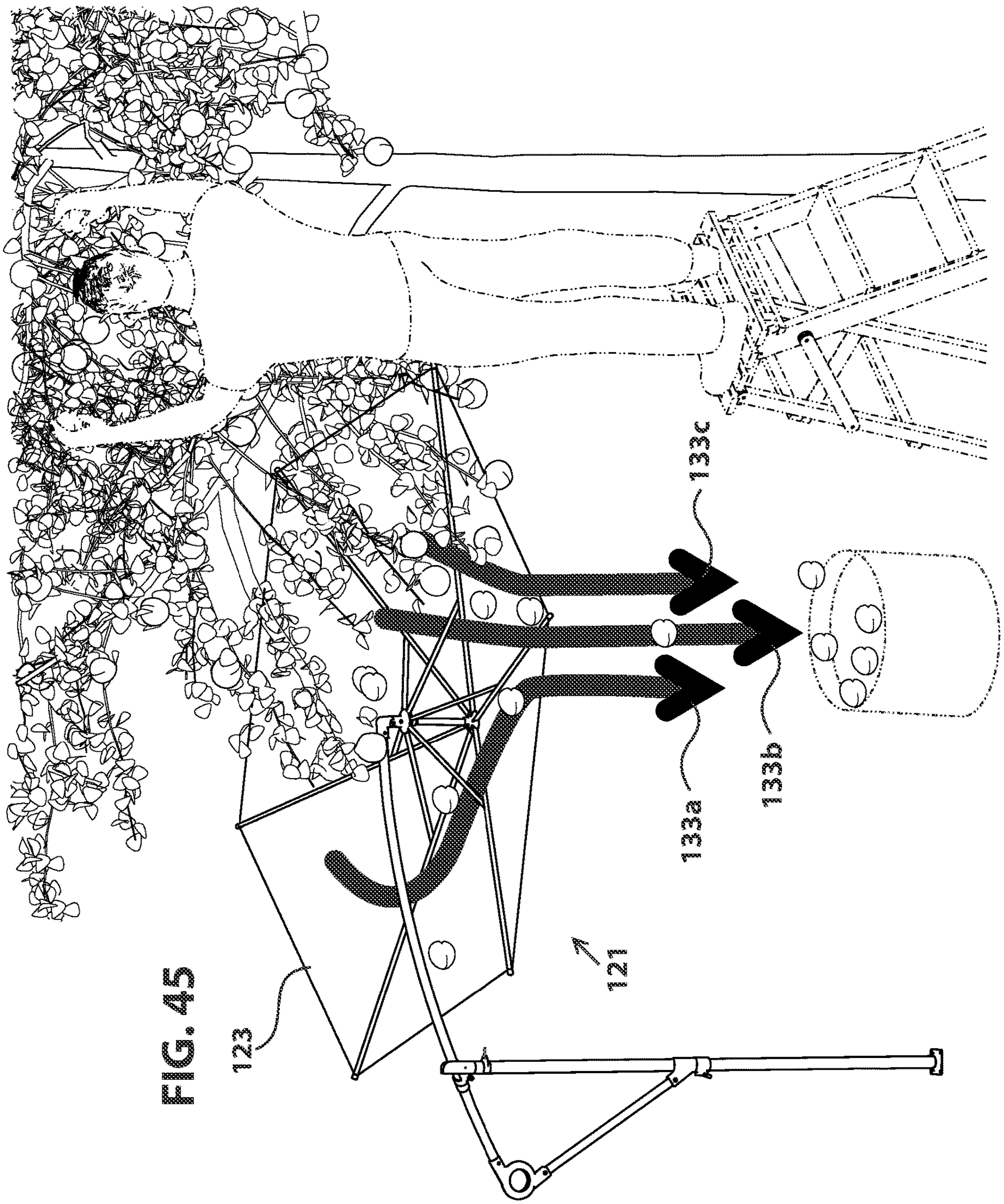
FIG. 45, FIG. 46, FIG. 47, FIG. 48, and FIG. 49 illustrate views demonstrating the wind-catching-and-redirecting rainwater-amassing-and-storing garden-irrigating fruit-harvesting panorama-media-screen-capable land-yacht-powering sail system 121 aiding in the harvesting of fruit, amassing and storing of rainwater, and functioning as a panorama-media-screen.
Figure 46:
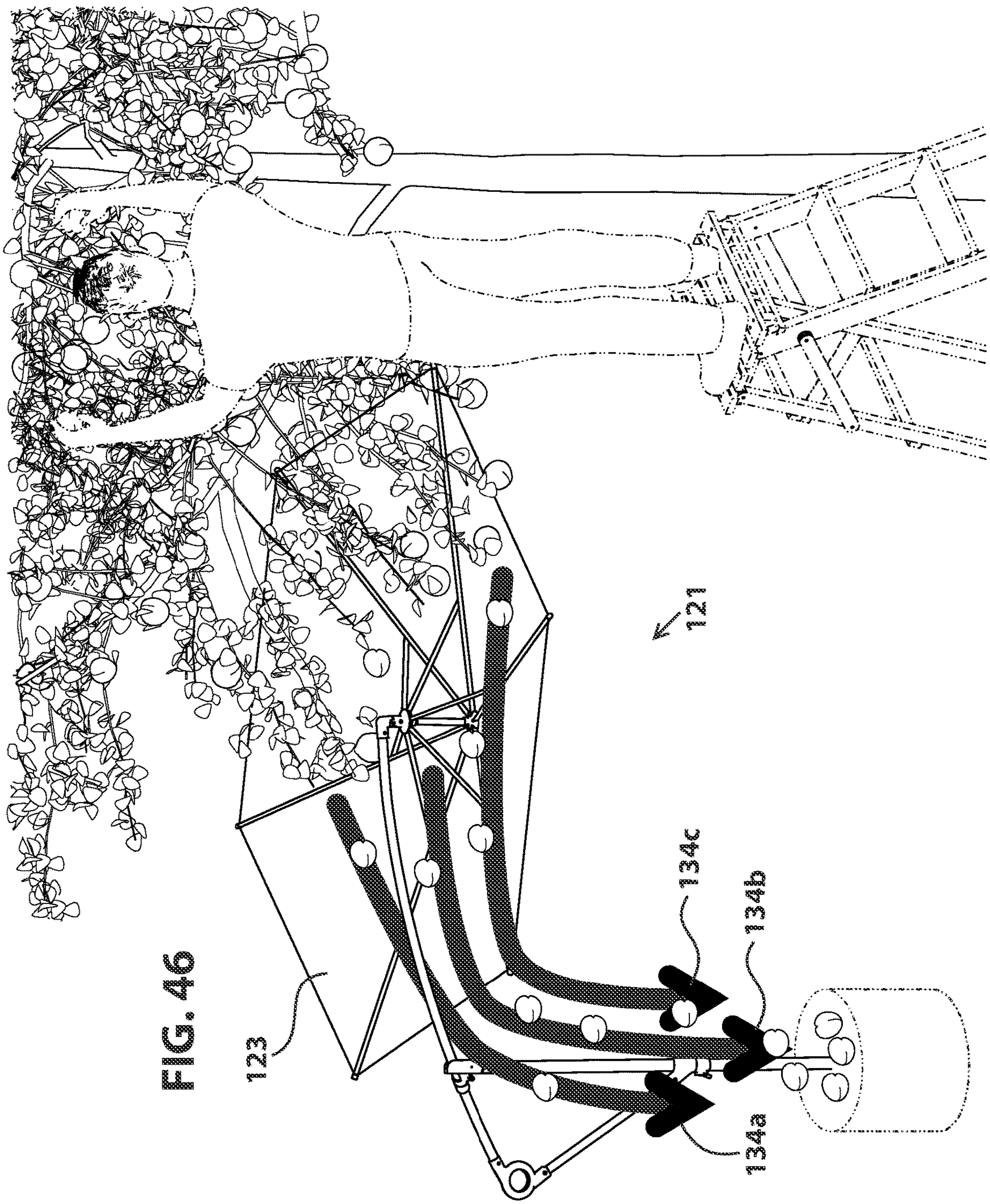
Figure 47:
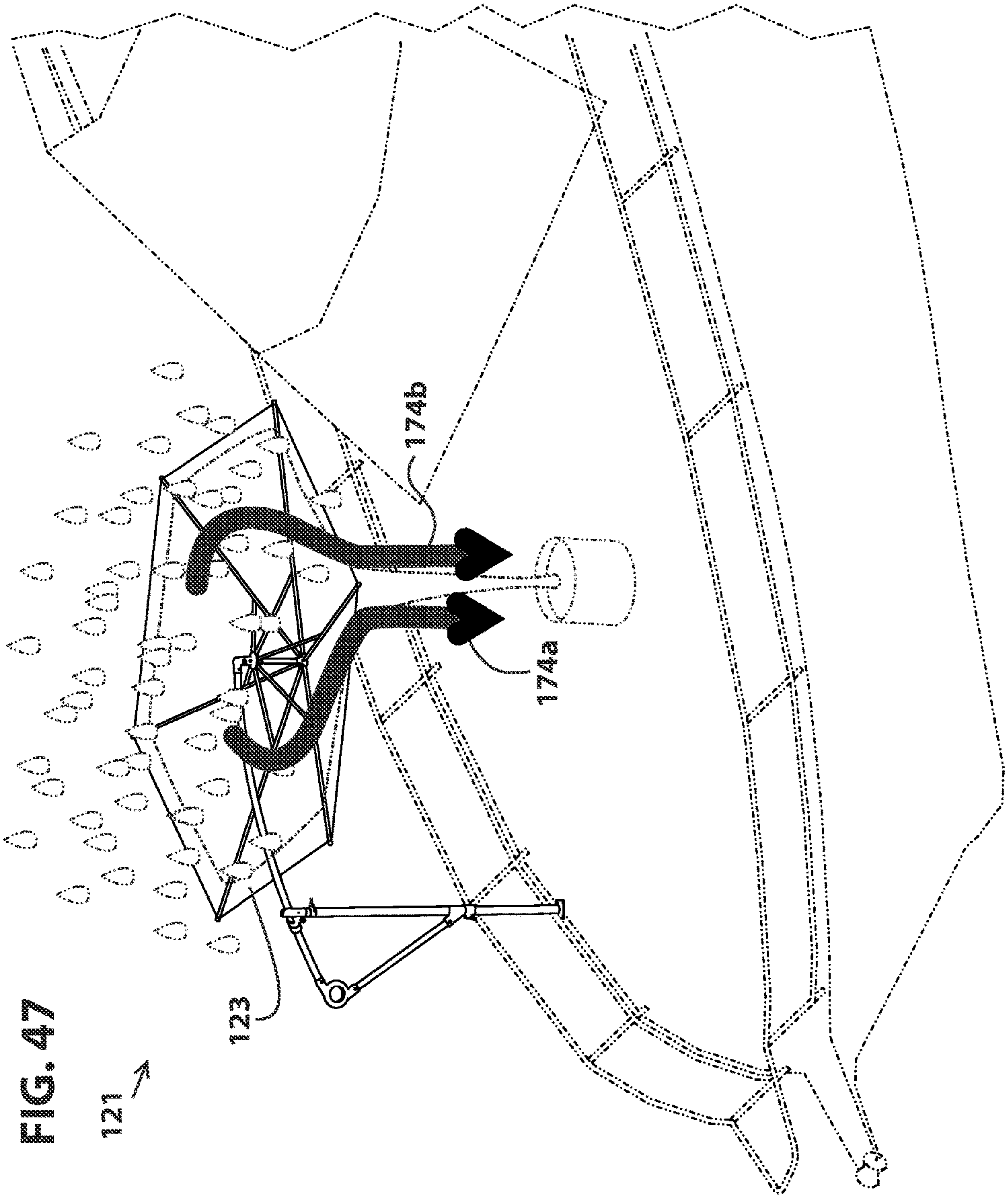
Figure 48:
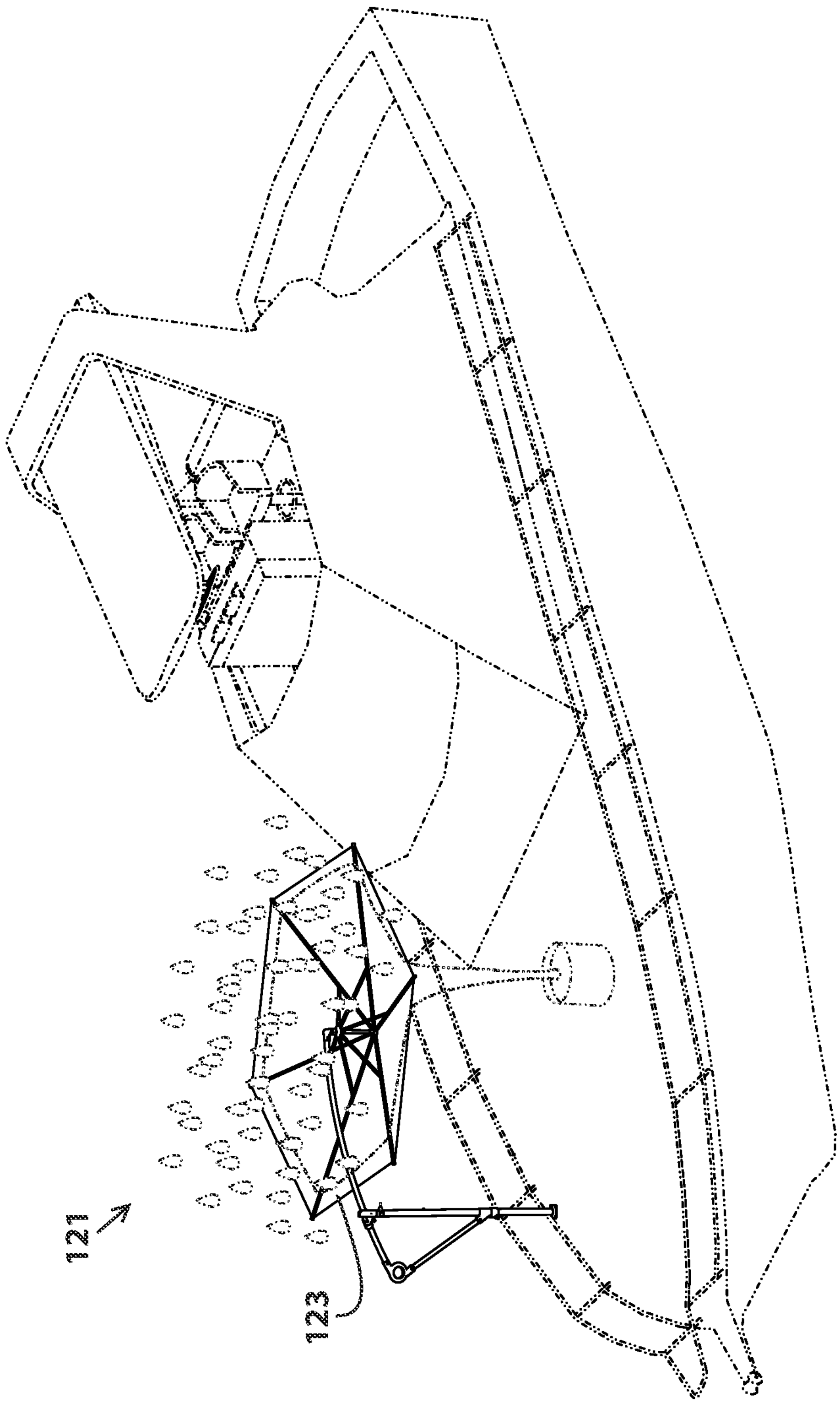
Figure 49:
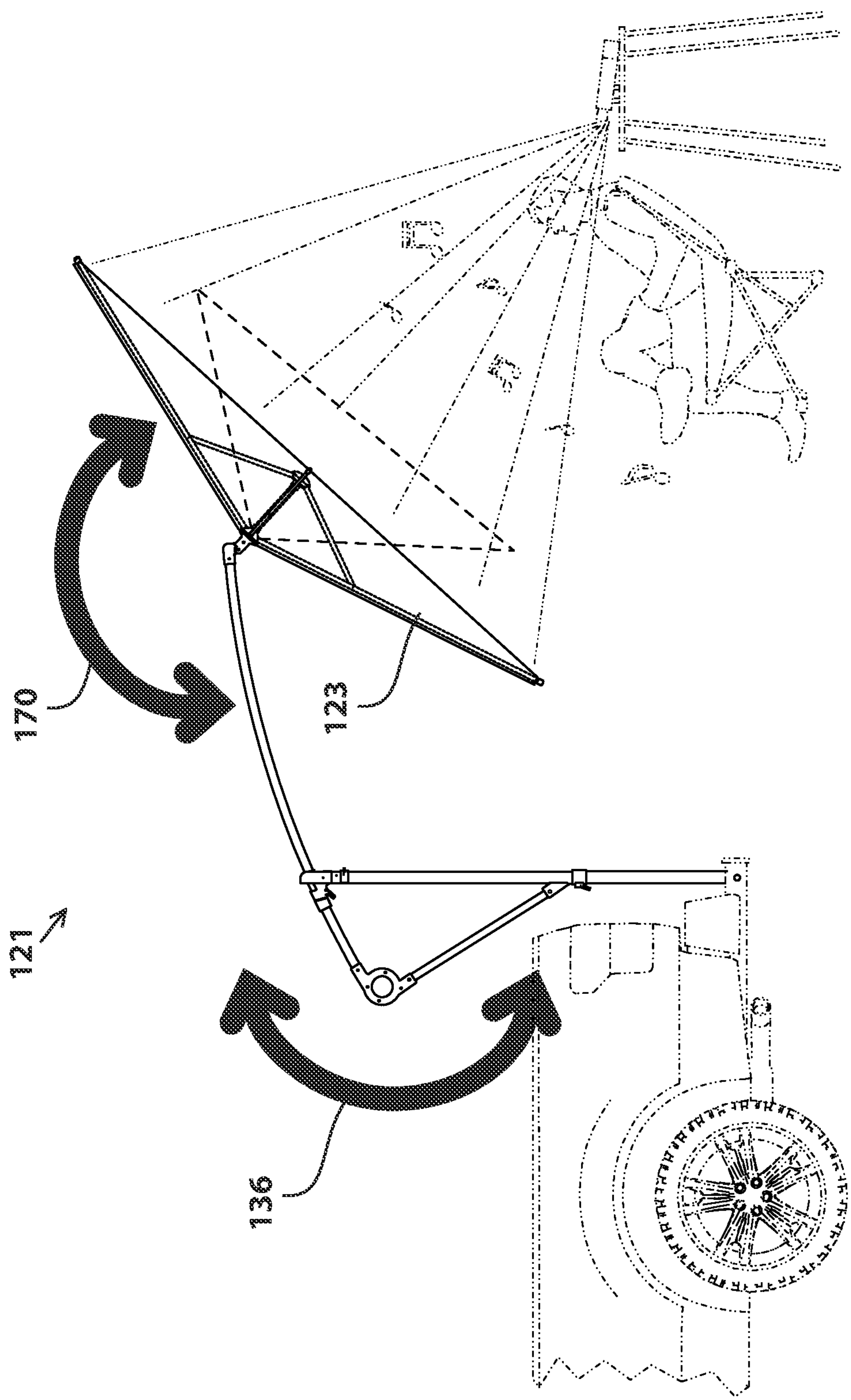
Figure 50:
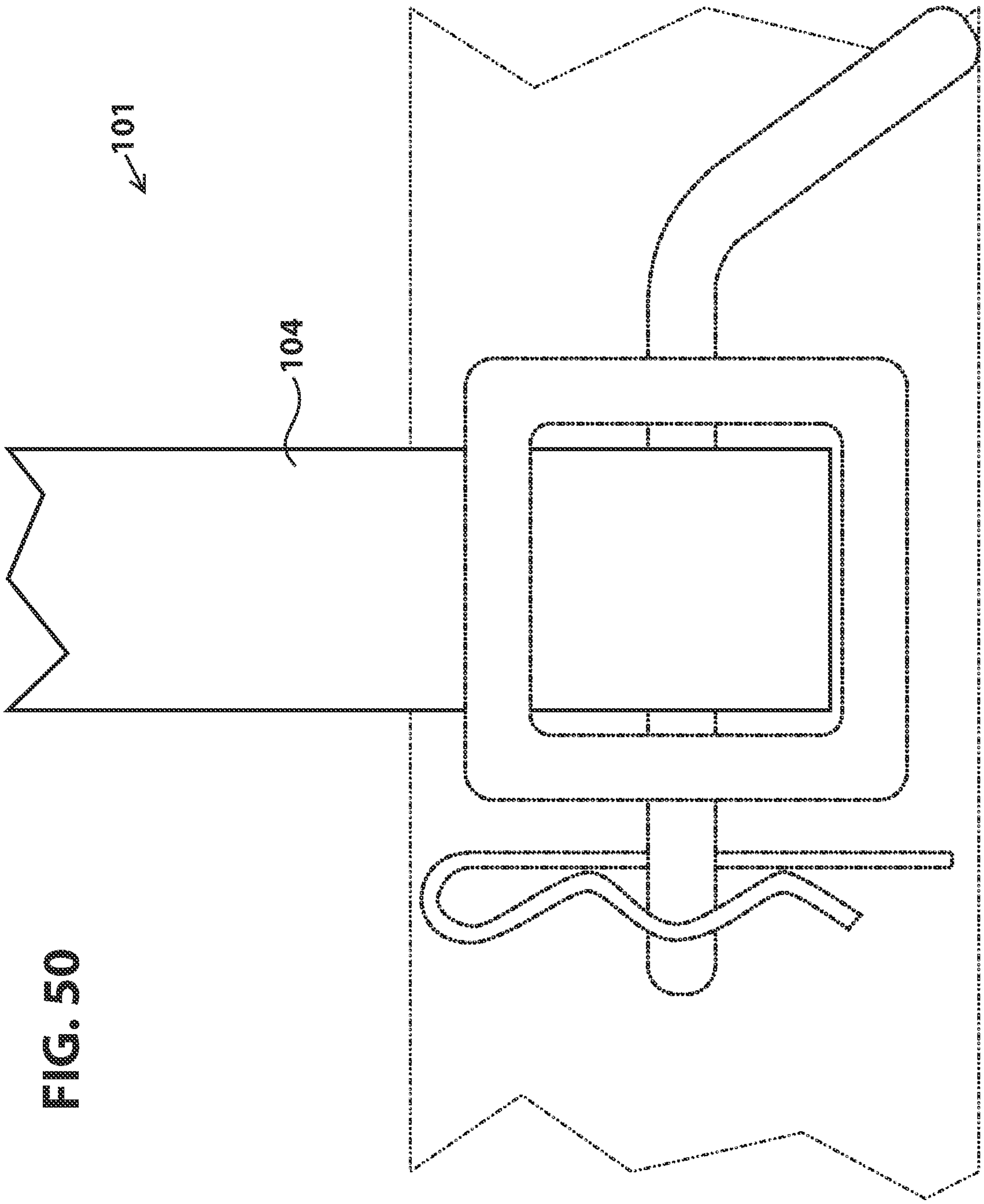
FIG. 50 illustrates a front view demonstrating the lower stanchion 104 being inserted into a trailer hitch.
Figure 51:
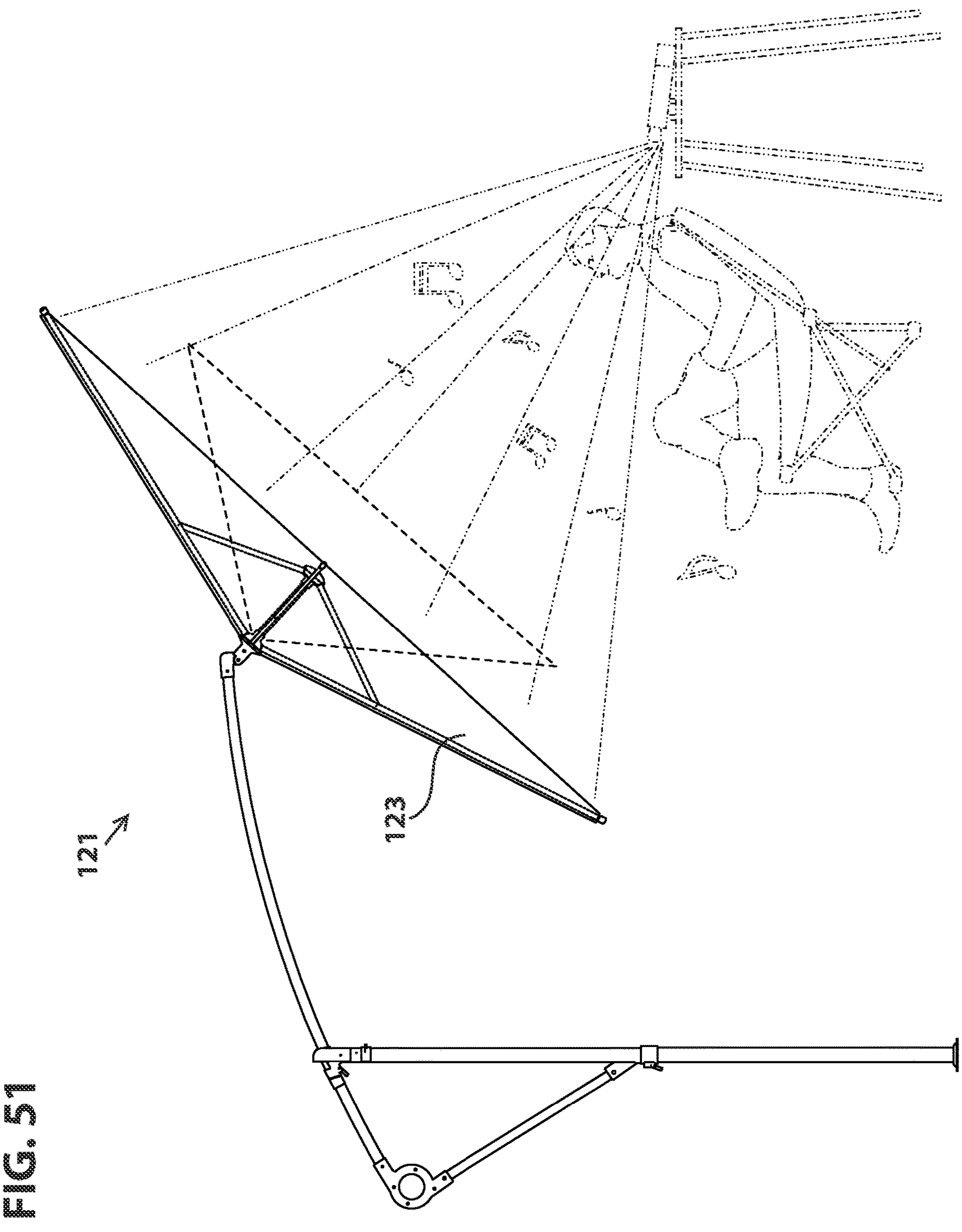
FIG. 51 illustrates a side view demonstrating the wind-catching-and-redirecting rainwater-amassing-and-storing garden-irrigating fruit-harvesting panorama-media-screen-capable land-yacht-powering sail system 121 functioning as a size-adjustable panorama-media-screen.
Figure 52:
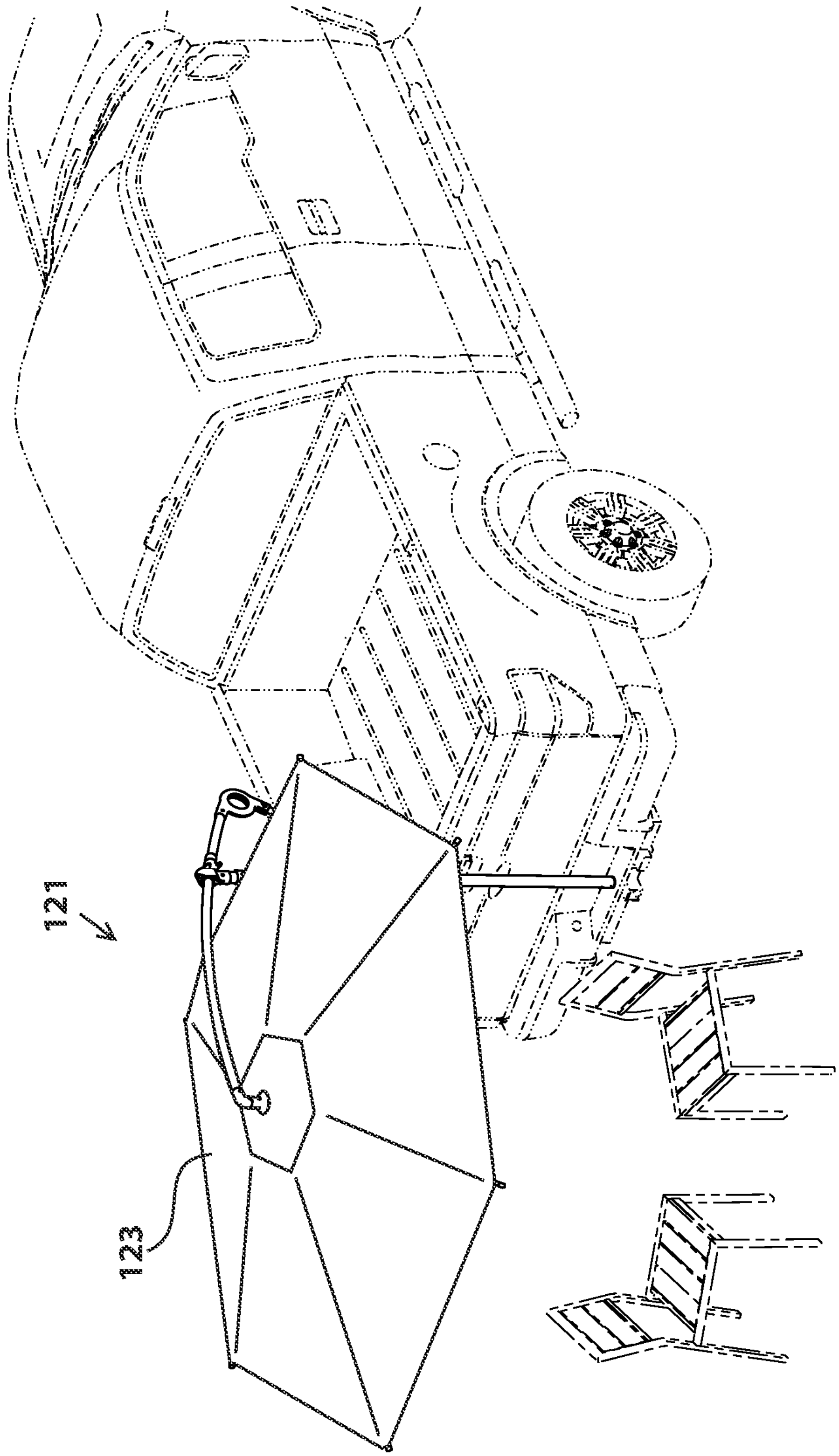
FIG. 52, FIG. 53, and FIG. 54 illustrate perspective views demonstrating the lower stanchion 104 being attached to a pickup truck and the wind-catching-and-redirecting rainwater-amassing-and-storing garden-irrigating fruit-harvesting panorama-media-screen-capable land-yacht-powering sail system 121 aiding in providing shade, amassing and storing rainwater, and irrigating a garden.
Figure 53:
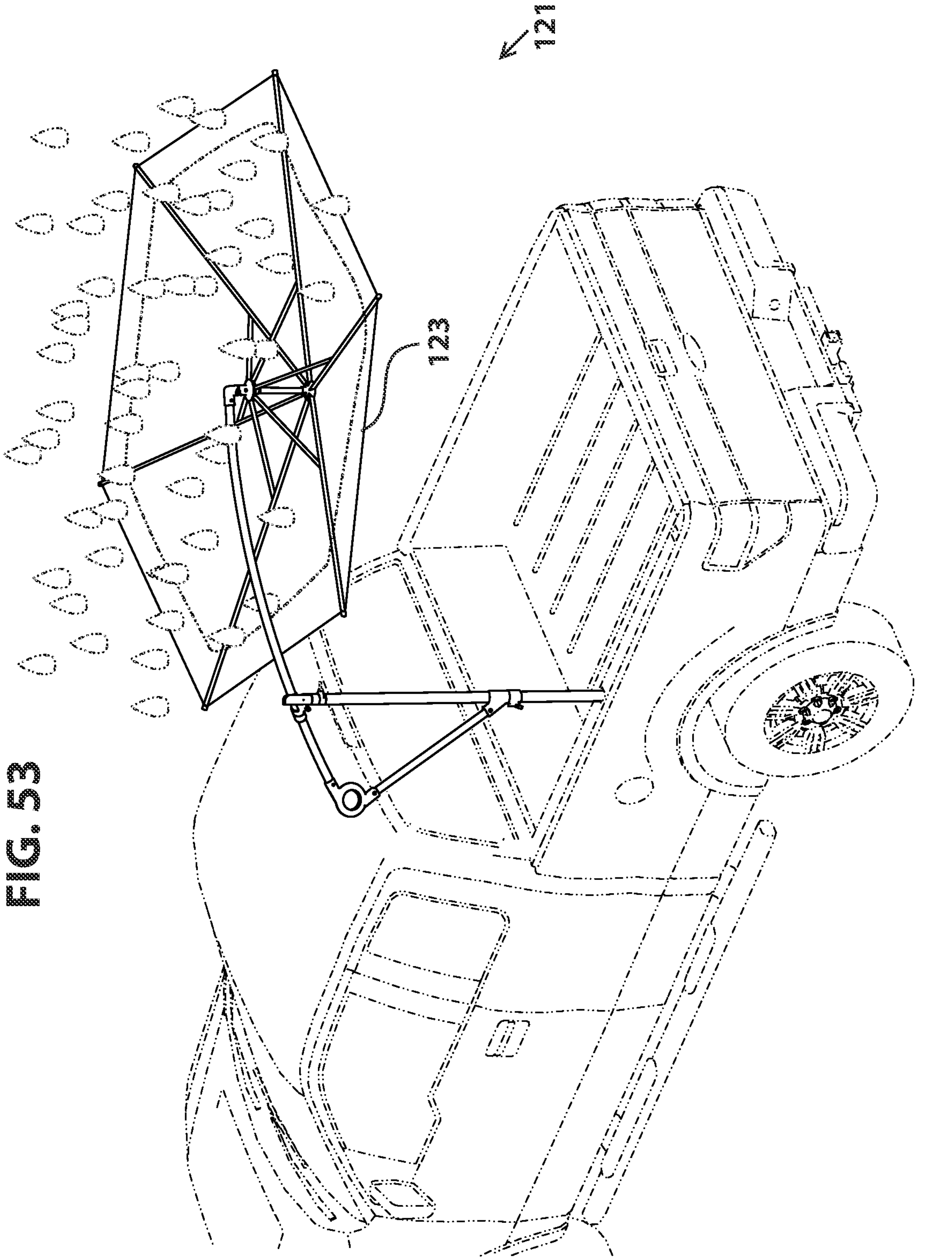
Figure 54:
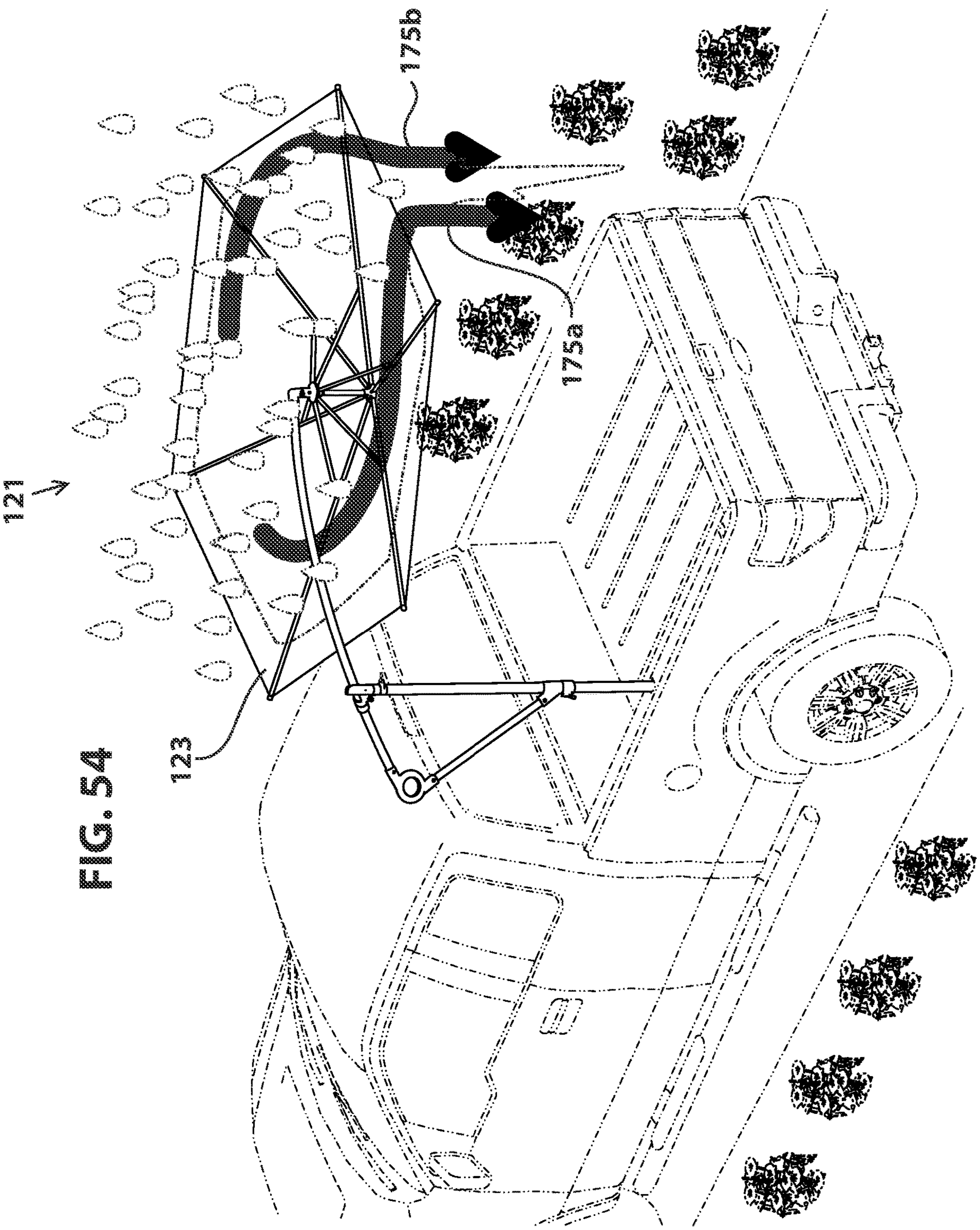
Figure 55:
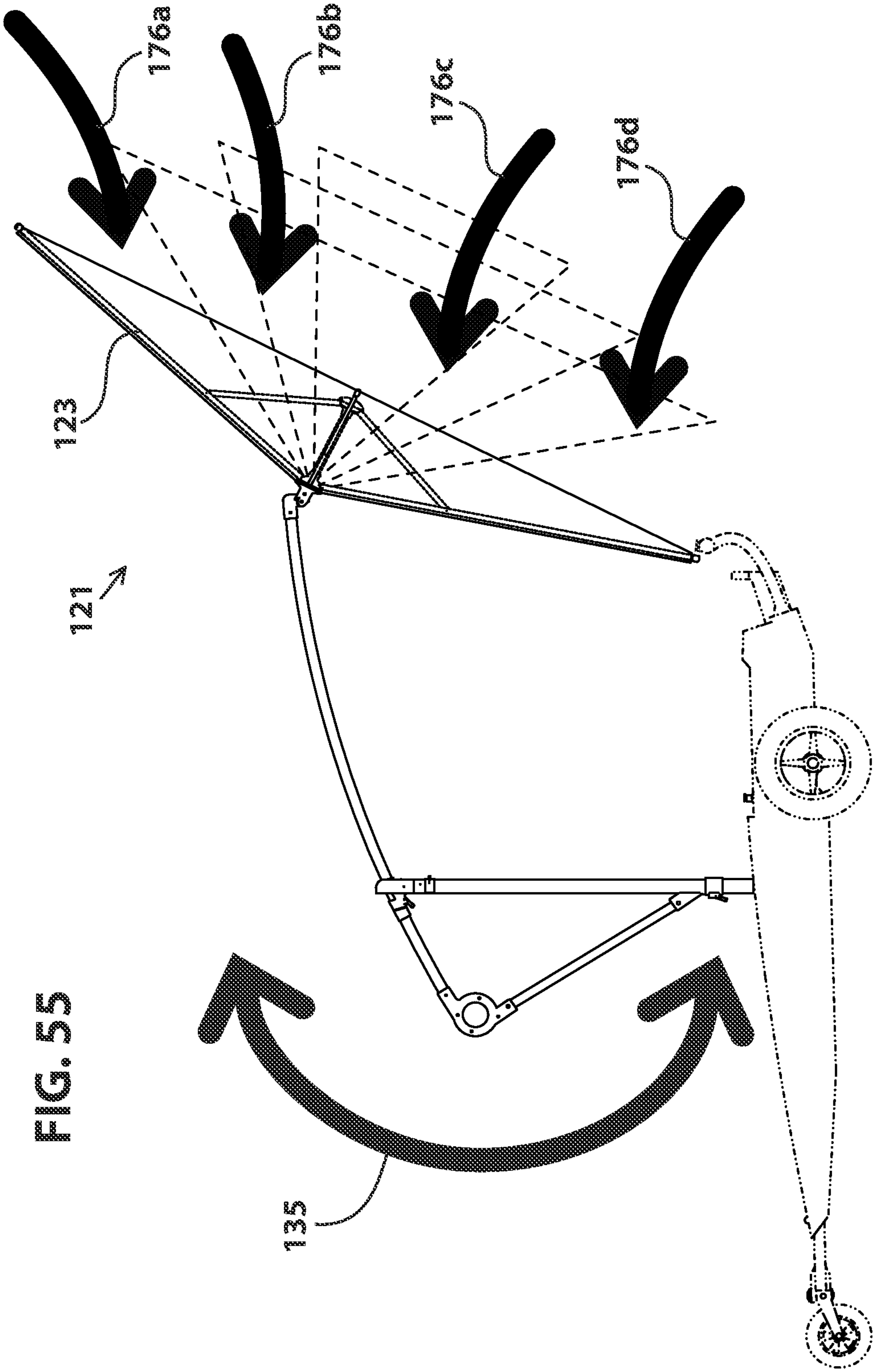
FIG. 55, FIG. 56, and FIG. 57 illustrate perspective views demonstrating the wind-catching-and-redirecting rainwater-amassing-and-storing garden-irrigating fruit-harvesting panorama-media-screen-capable land-yacht-powering sail system 121 functioning as a sail for a land-yacht.
Figure 56:
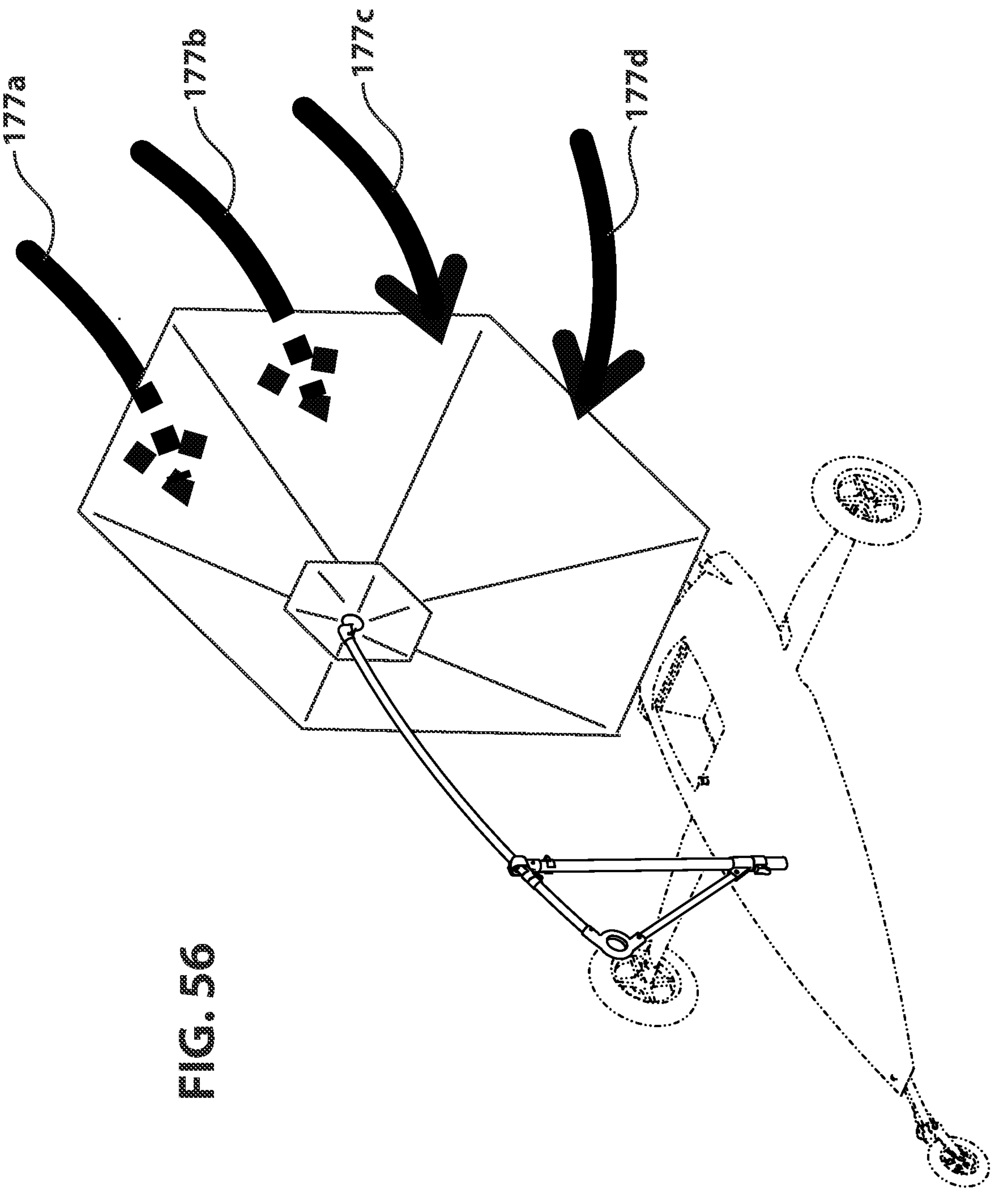
Figure 57:
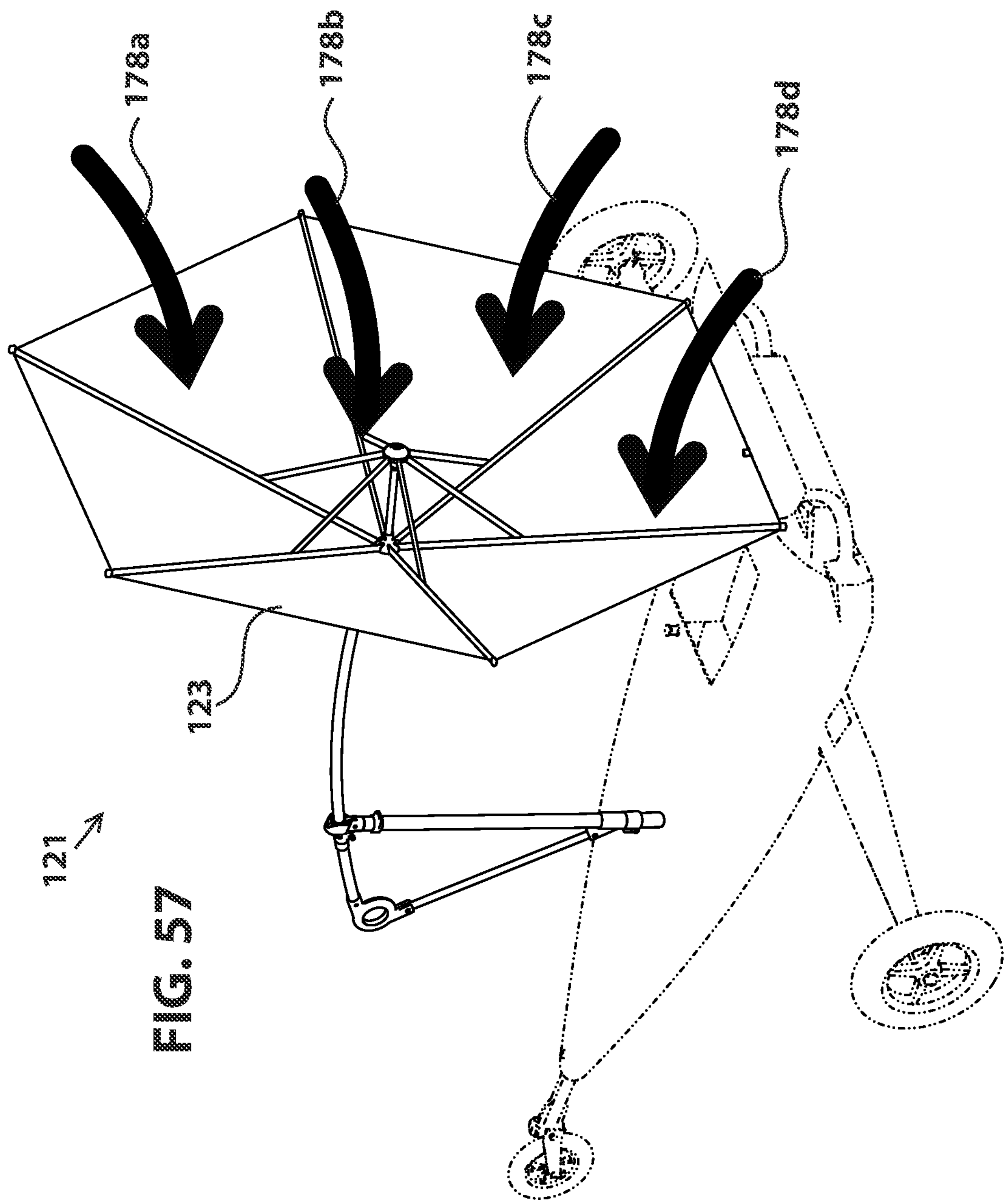

(see FIG. 39 and FIG. 40).

14) Teeter-totter-locking spring-loaded automatic hook-lock 114 is (or are respectively) for:

a) Automatically locking physically-impaired-assisting arthritic-assisting single-hand-automatic-sail-deploying-and-retracting land-yacht-maneuvering multi-direction-hoisting slidable-rockable cantilever teeter totter 113 to fully deploy the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from collapsing and causing injury in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40);

b) Unlocking physically-impaired-assisting arthritic-assisting single-hand-automatic-sail-deploying-and-retracting land-yacht-maneuvering multi-direction-hoisting slidable-rockable cantilever teeter totter 113 to safely retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to allow for compact storage and moving in the directions of arrows 153*a*, 153*b*, 153*c*, 154*a*, 154*b*, and 154*c*

(see FIG. 28, and FIG. 64); and c) Automatically locking physically-impaired-assisting arthritic-assisting single-hand-automatic-sail-deploying-and-retracting land-yacht-maneuvering multi-direction-hoisting slidable-rockable cantilever teeter totter 113 to assist the physically-impaired or arthritic in the directions of arrows 153*a*, 153*b*, 153*c*, 154*a*, 154*b*, and 154*c*

Figure 28:
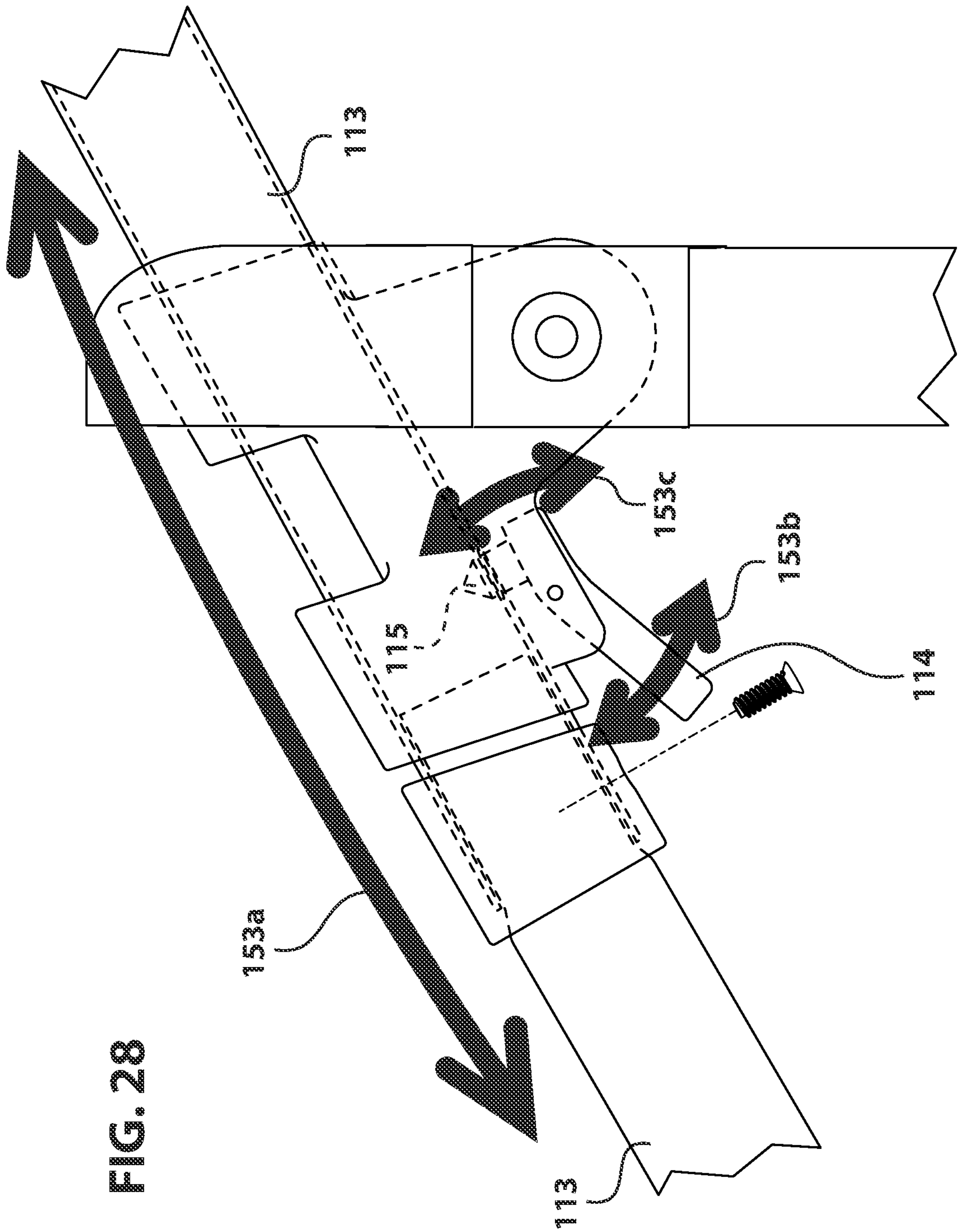
Figure 29A:
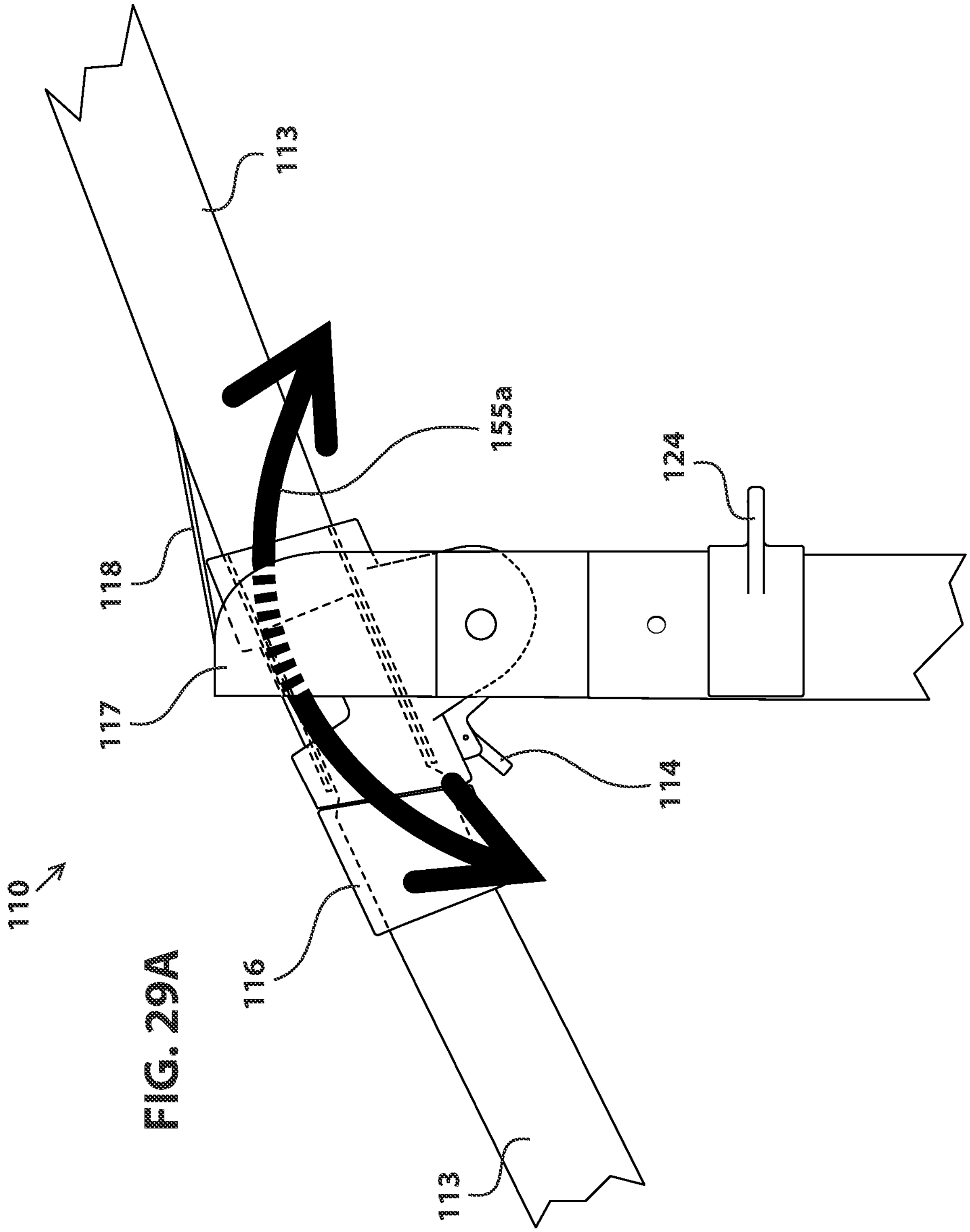
Figure 29B:
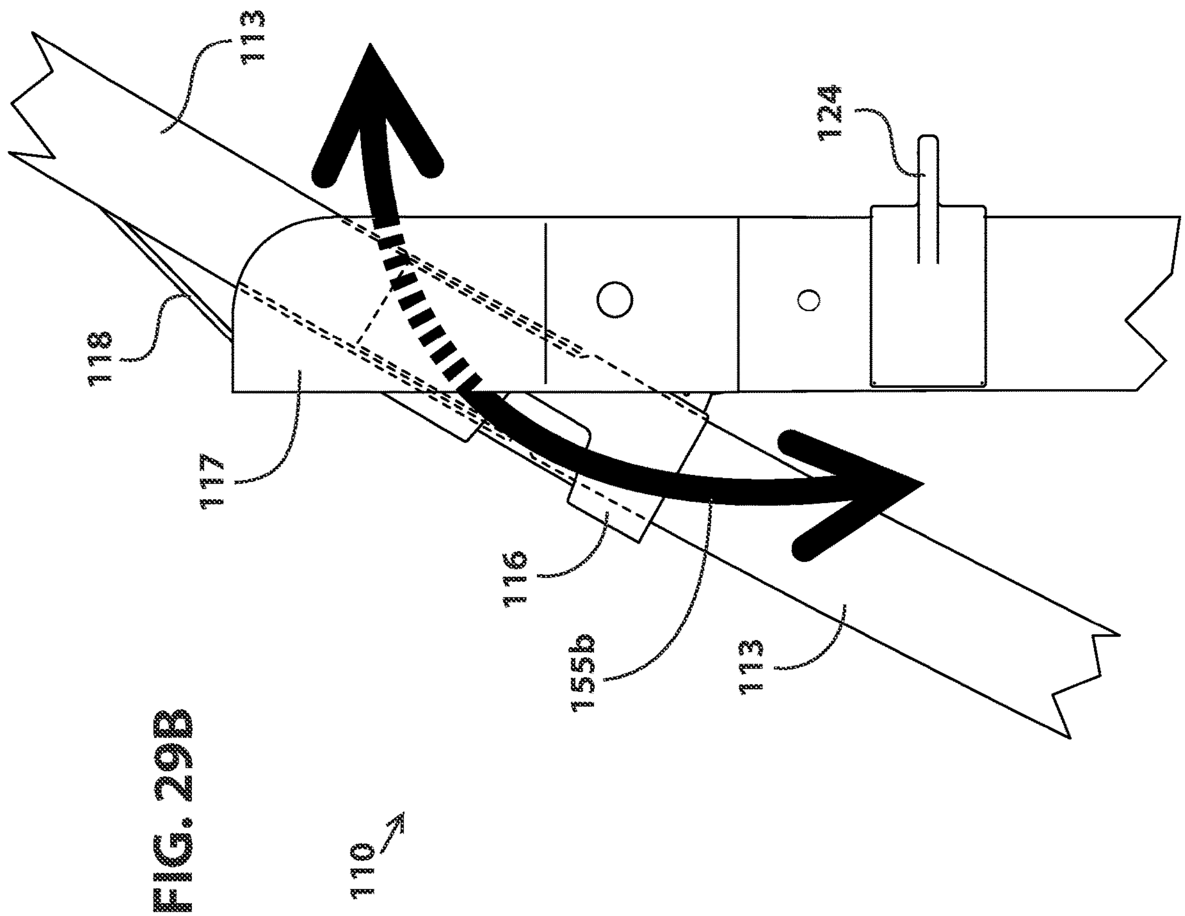
Figure 30:
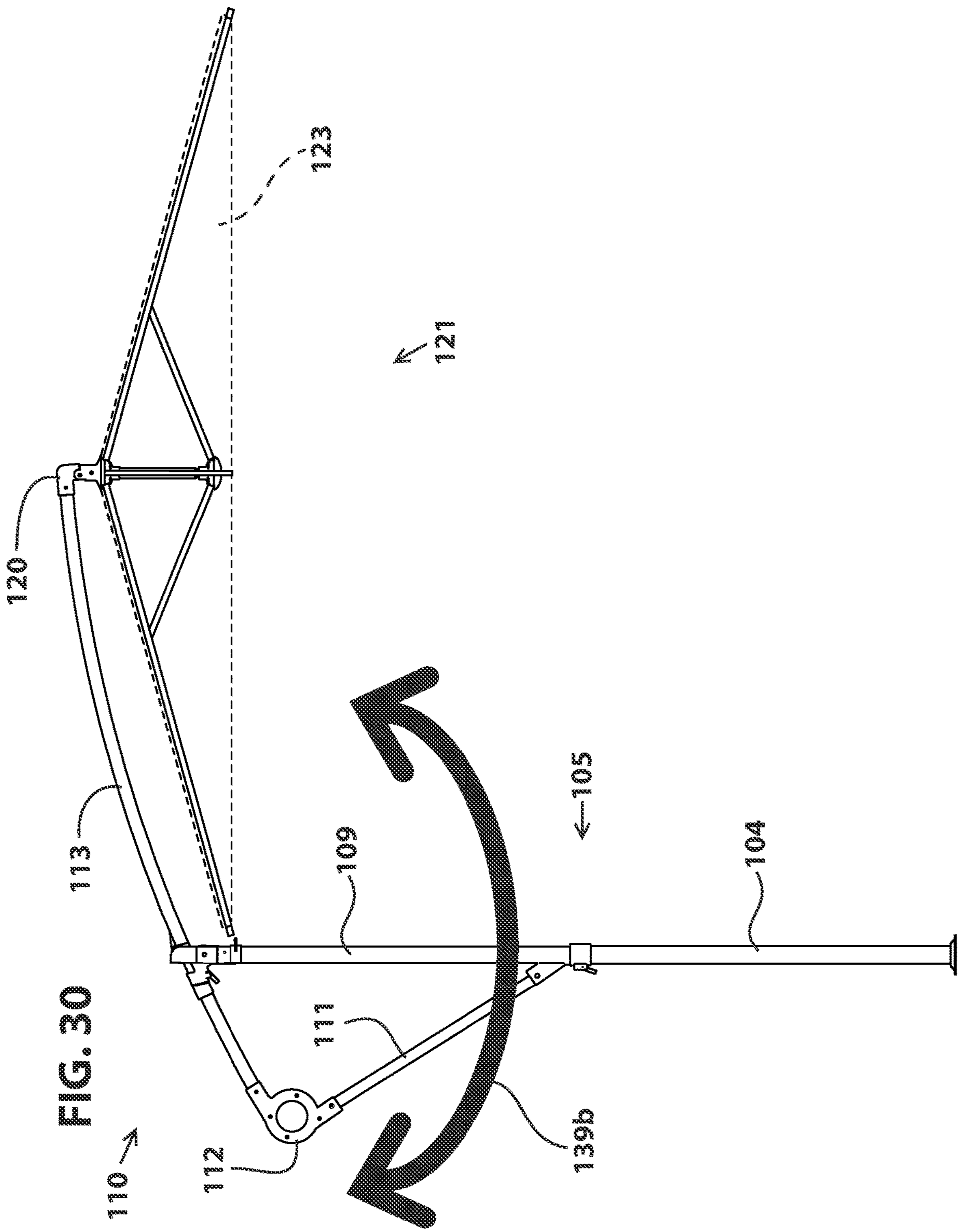
Figure 31:
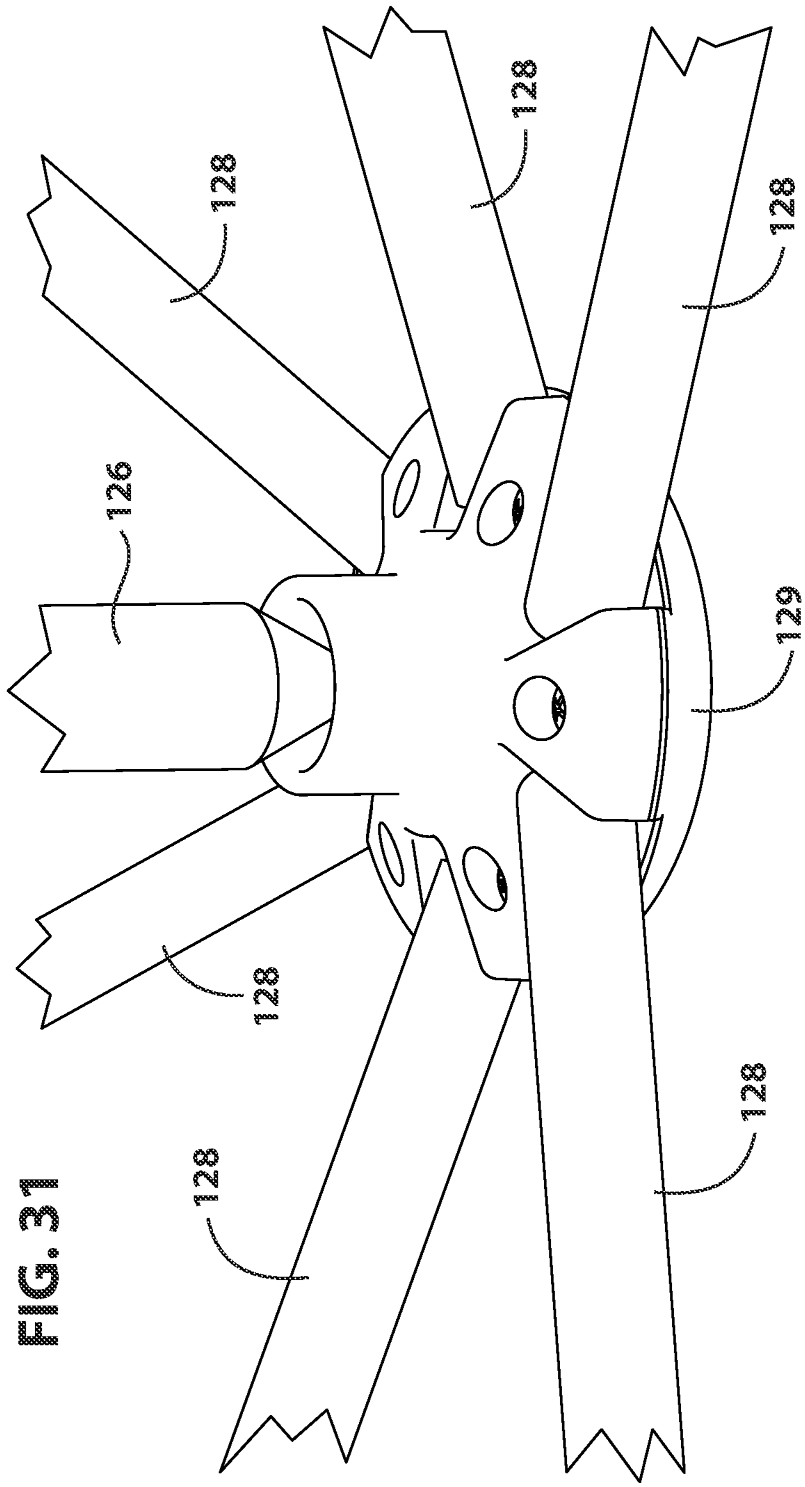
FIG. 31 illustrates an enlarged-partial view of components of wind-catching-and-redirecting rainwater-amassing-and-storing garden-irrigating fruit-harvesting panorama-media-screen-capable land-yacht-powering sail system 121.
Figure 32:
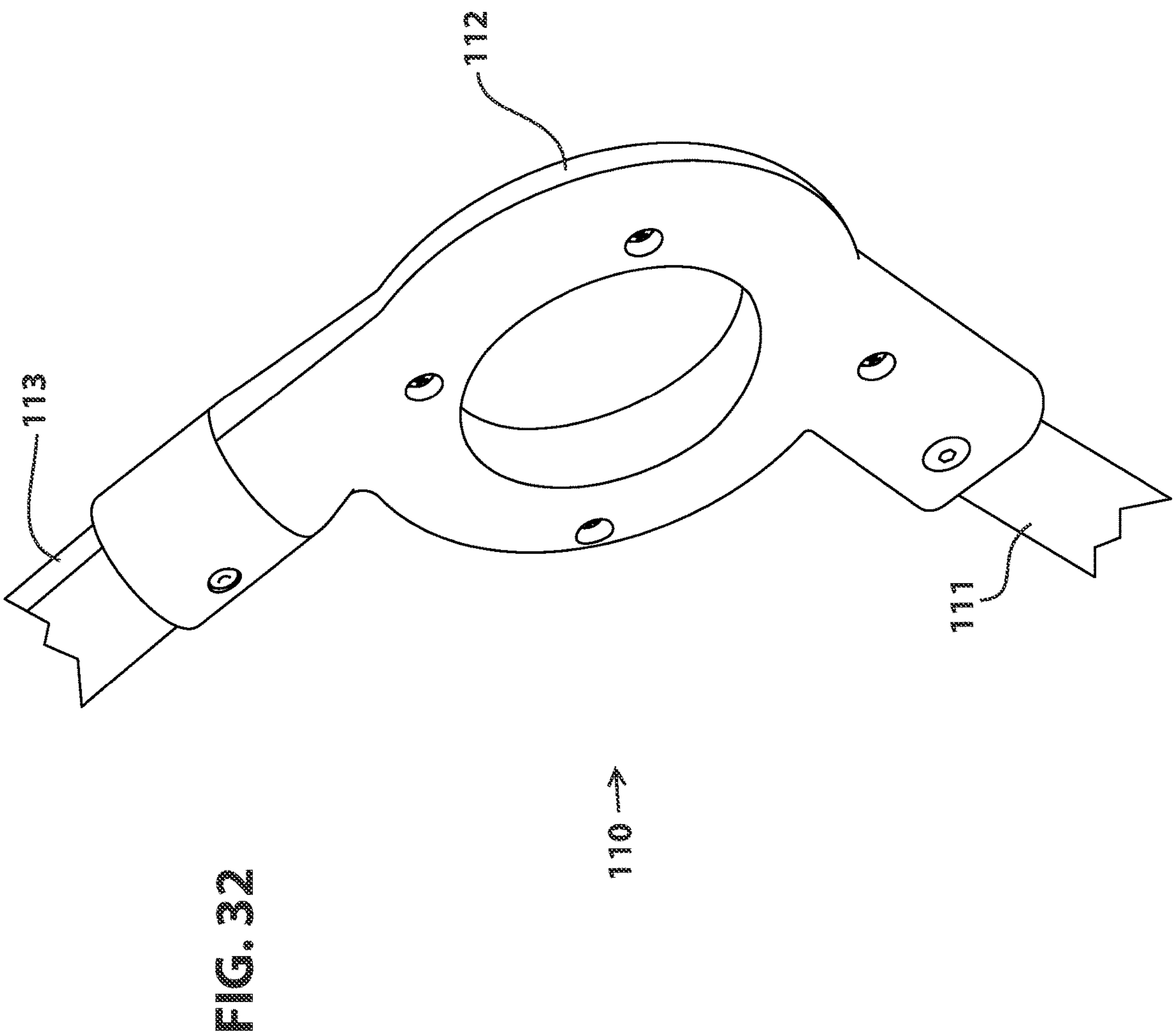
FIG. 32 illustrates an enlarged-partial view of the physically-impaired-assisting arthritic-assisting single-hand-sail-deploying-and-retracting land-yacht-maneuvering multi-direction-hoisting ergonomic navigator 112.
Figure 33:
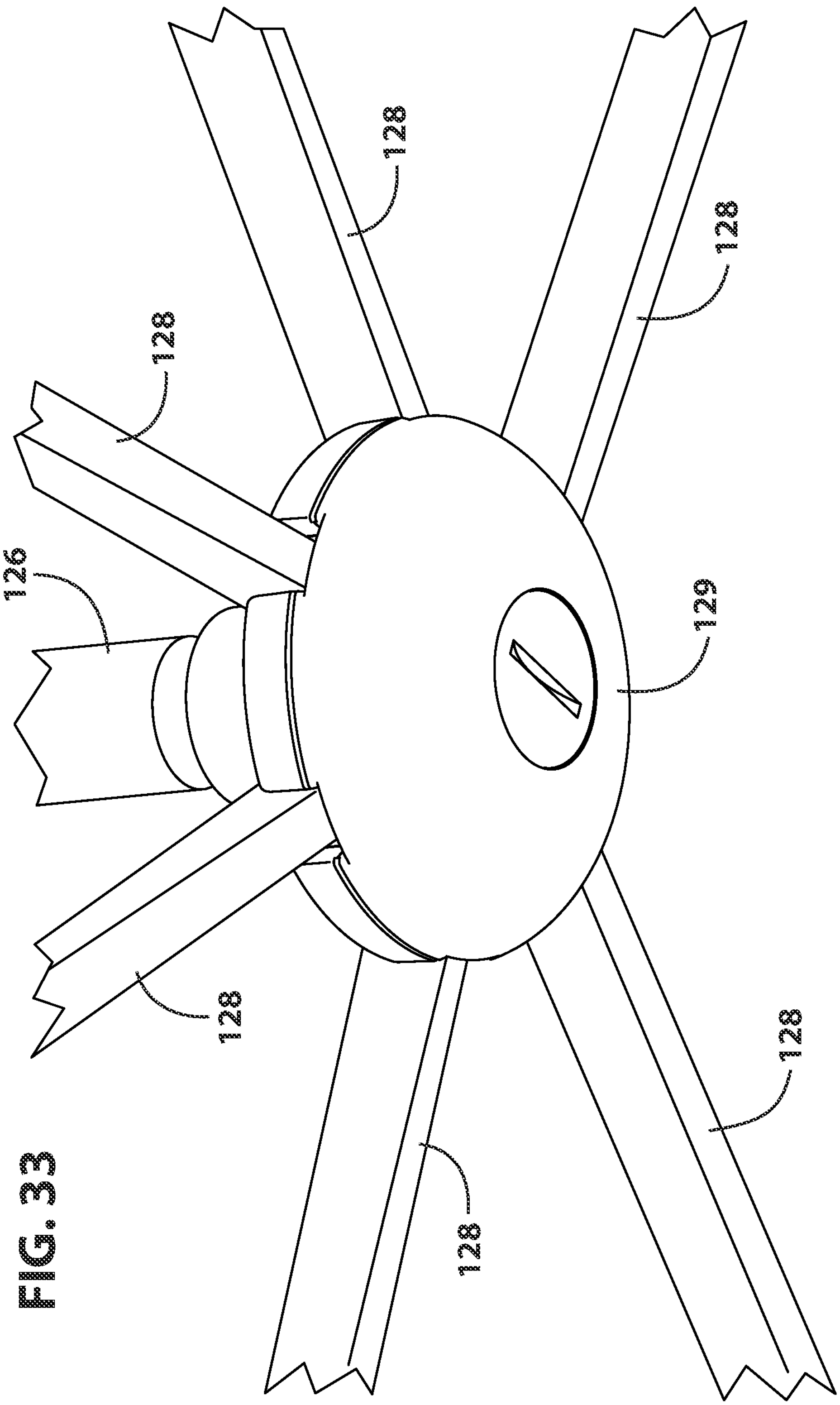
FIG. 33, FIG. 34, and FIG. 35 illustrate perspective views of components of wind-catching-and-redirecting rainwater-amassing-and-storing garden-irrigating fruit-harvesting panorama-media-screen-capable land-yacht-powering sail system 121.
Figure 34:
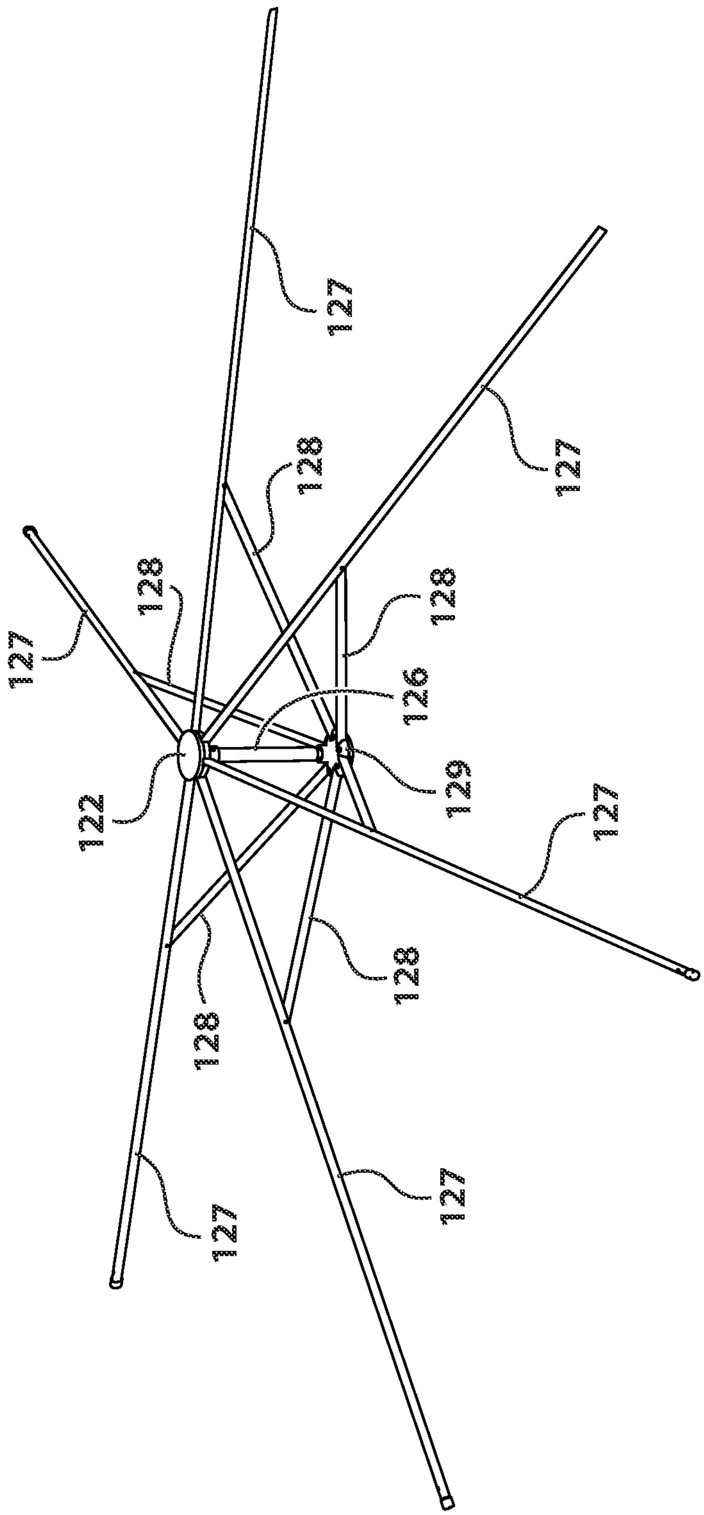
Figure 35:
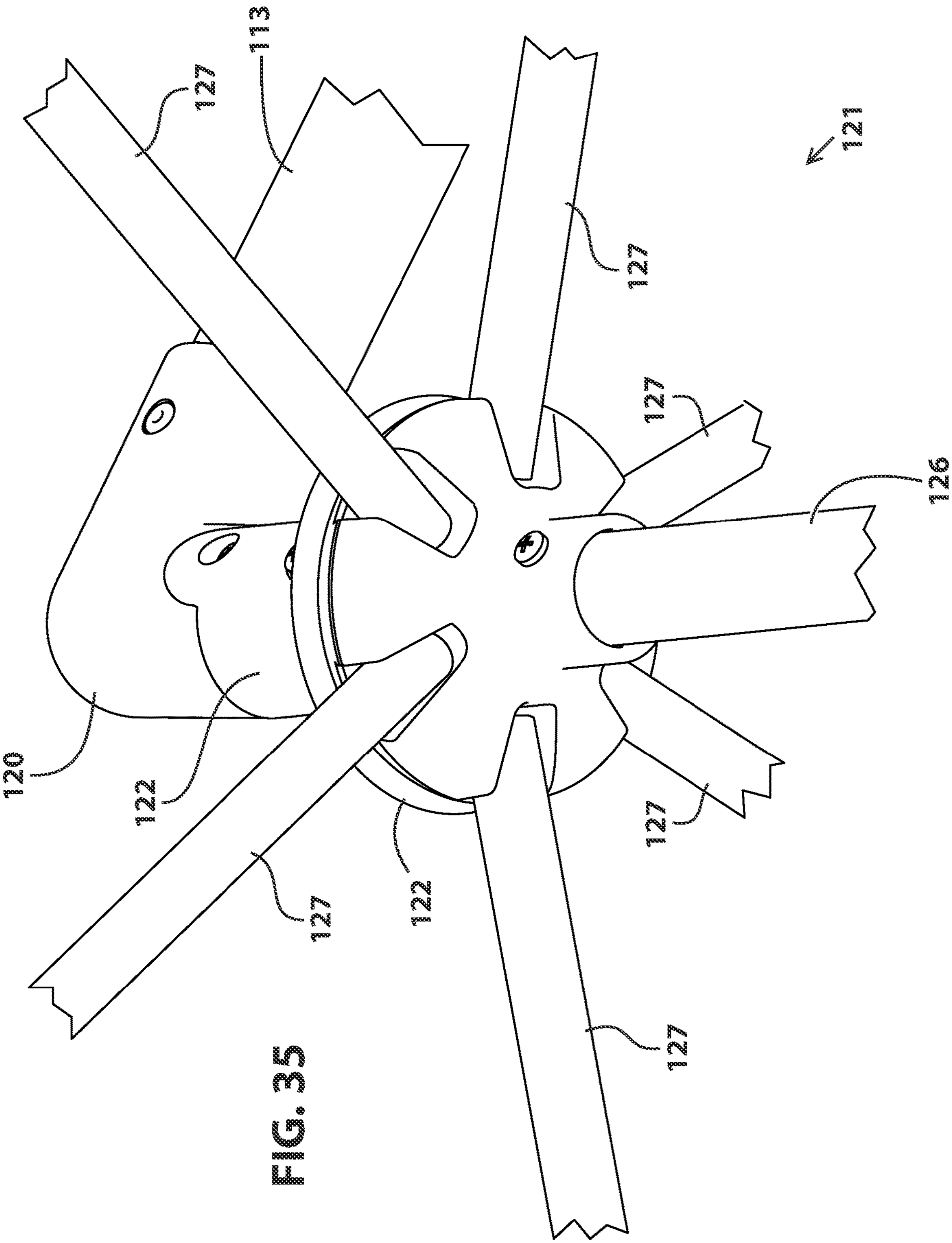
Figure 64:
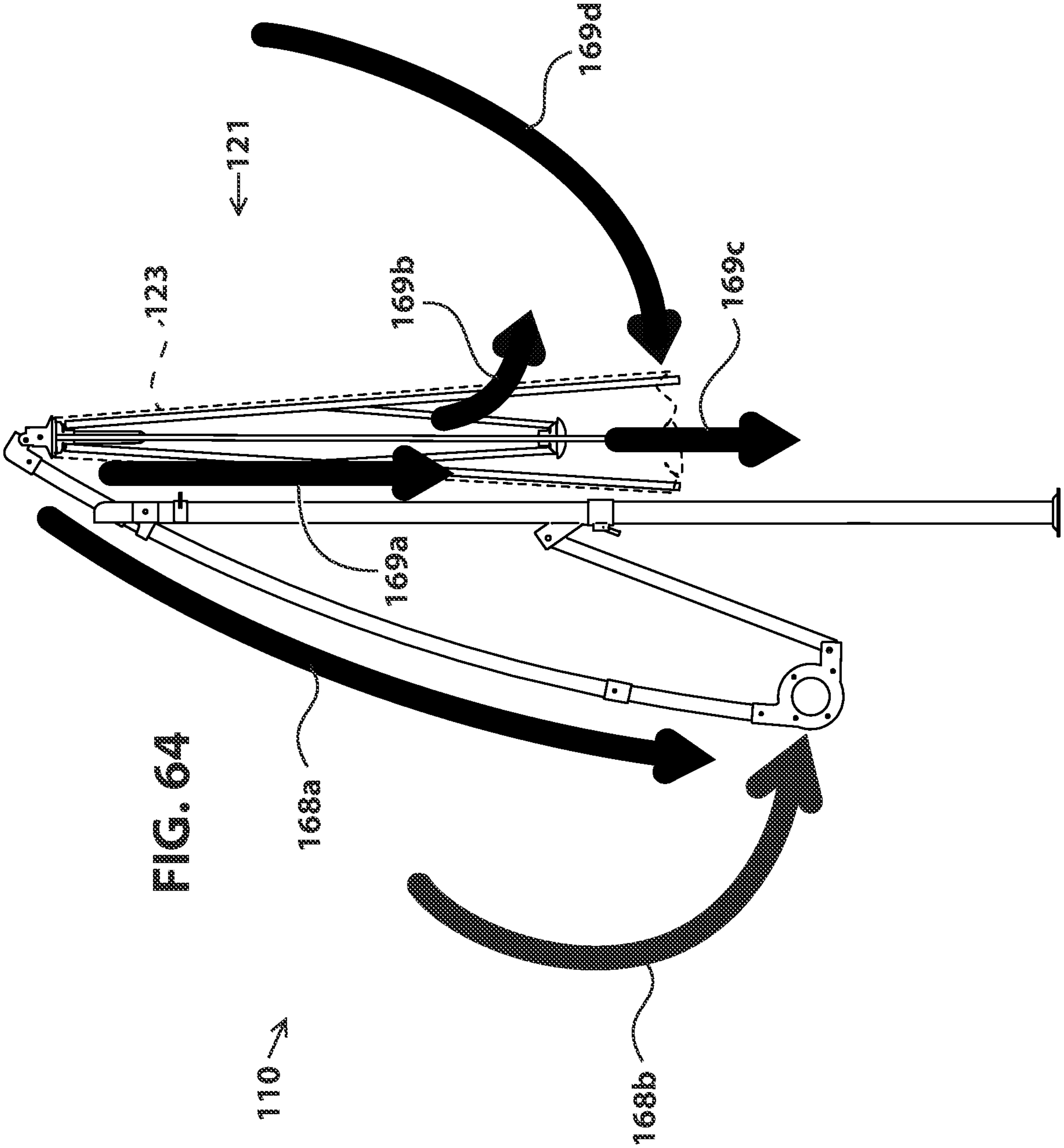
Figure 65A:
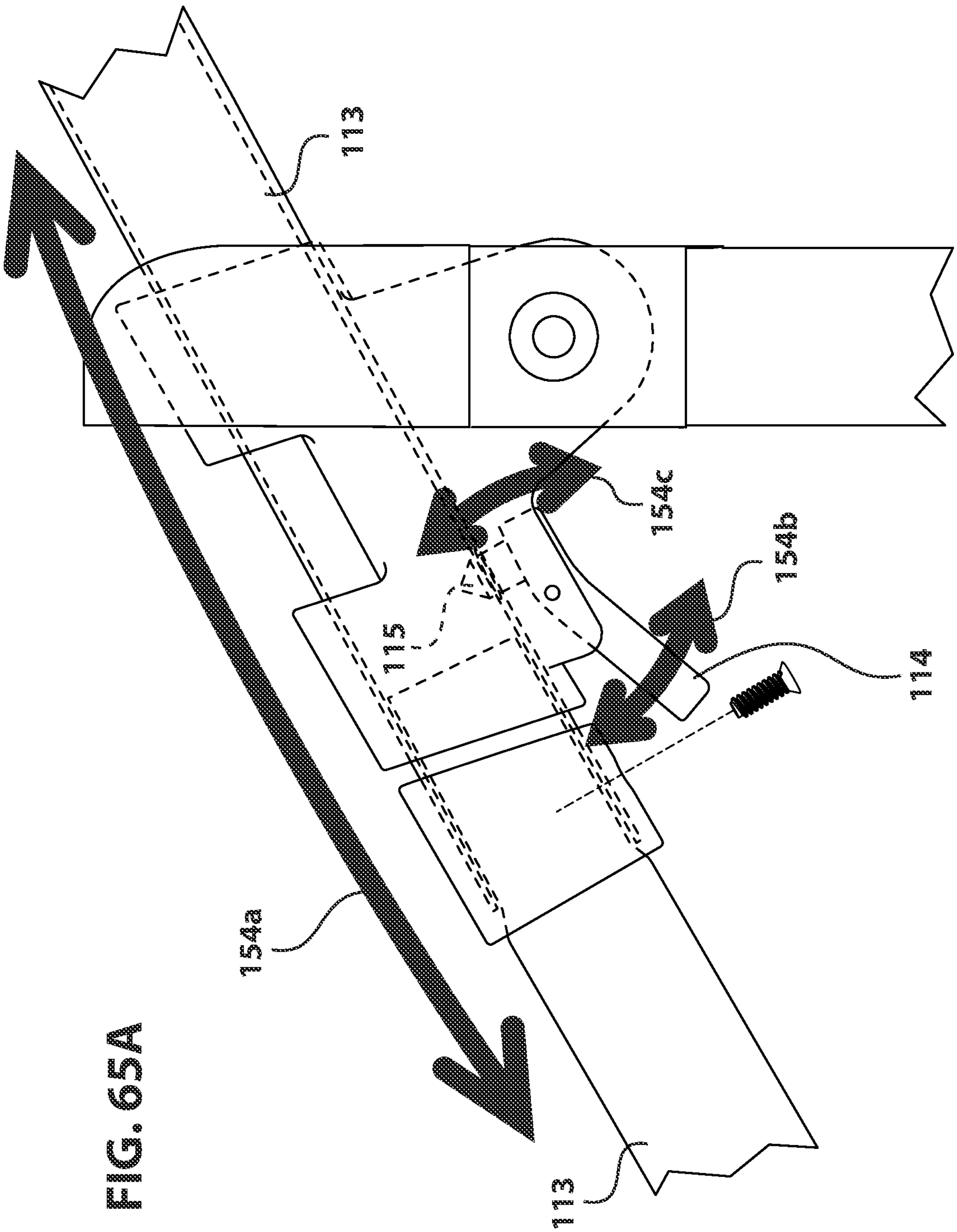
Figure 65B:
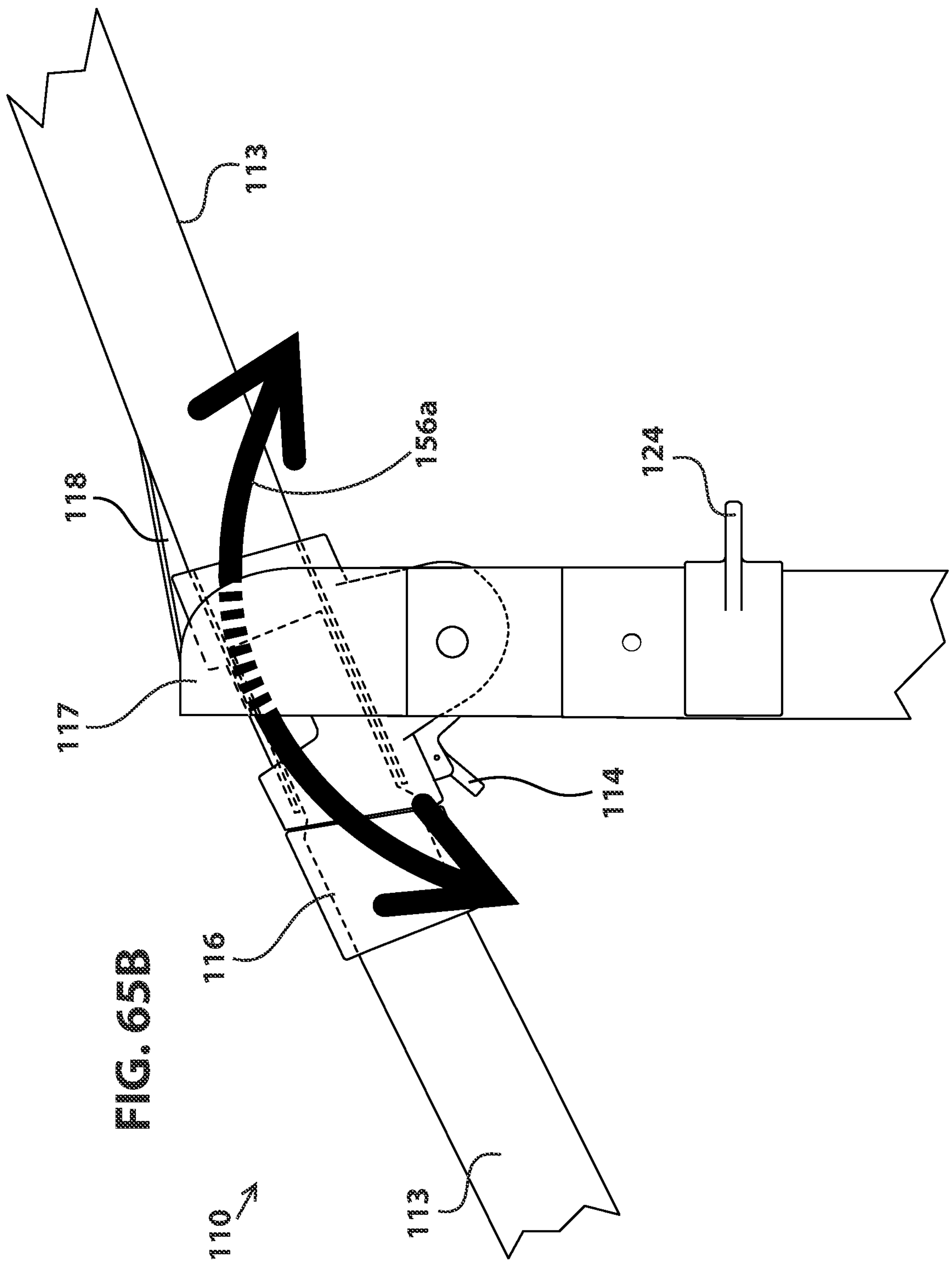
Figure 66:
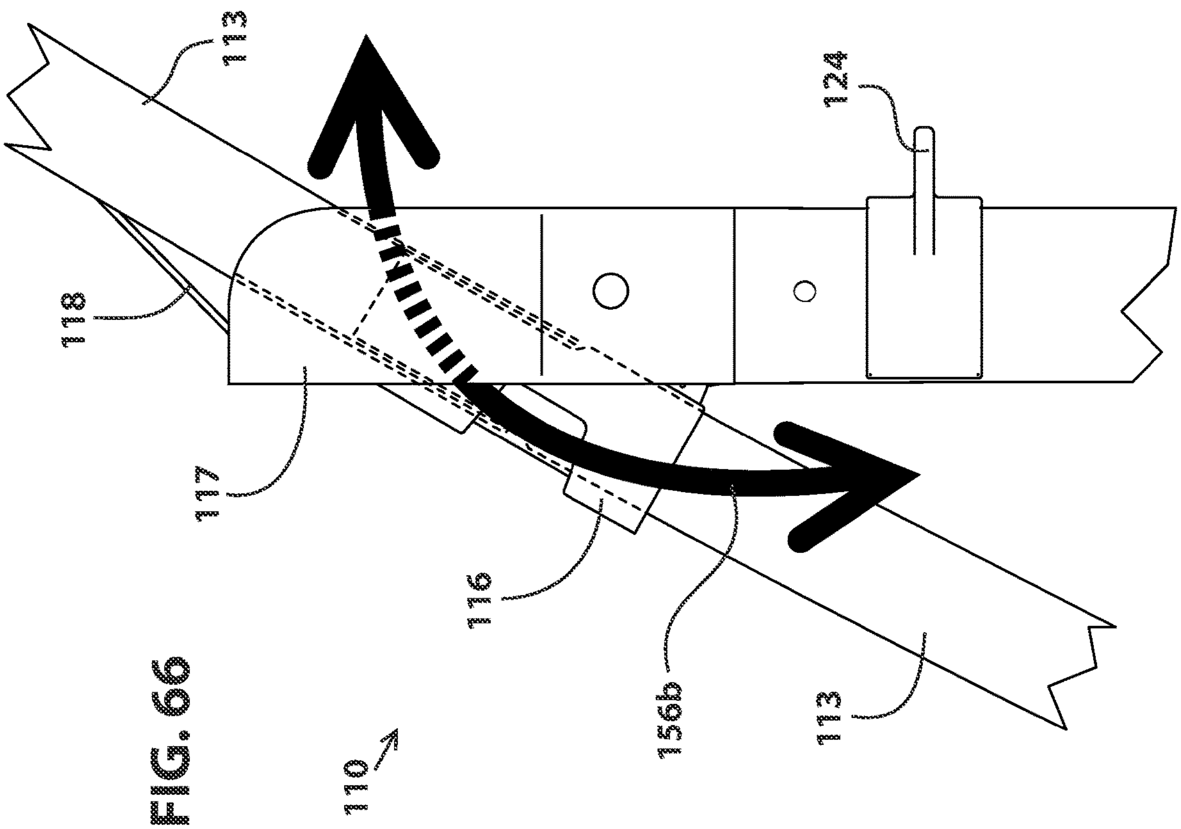
Figure 67:
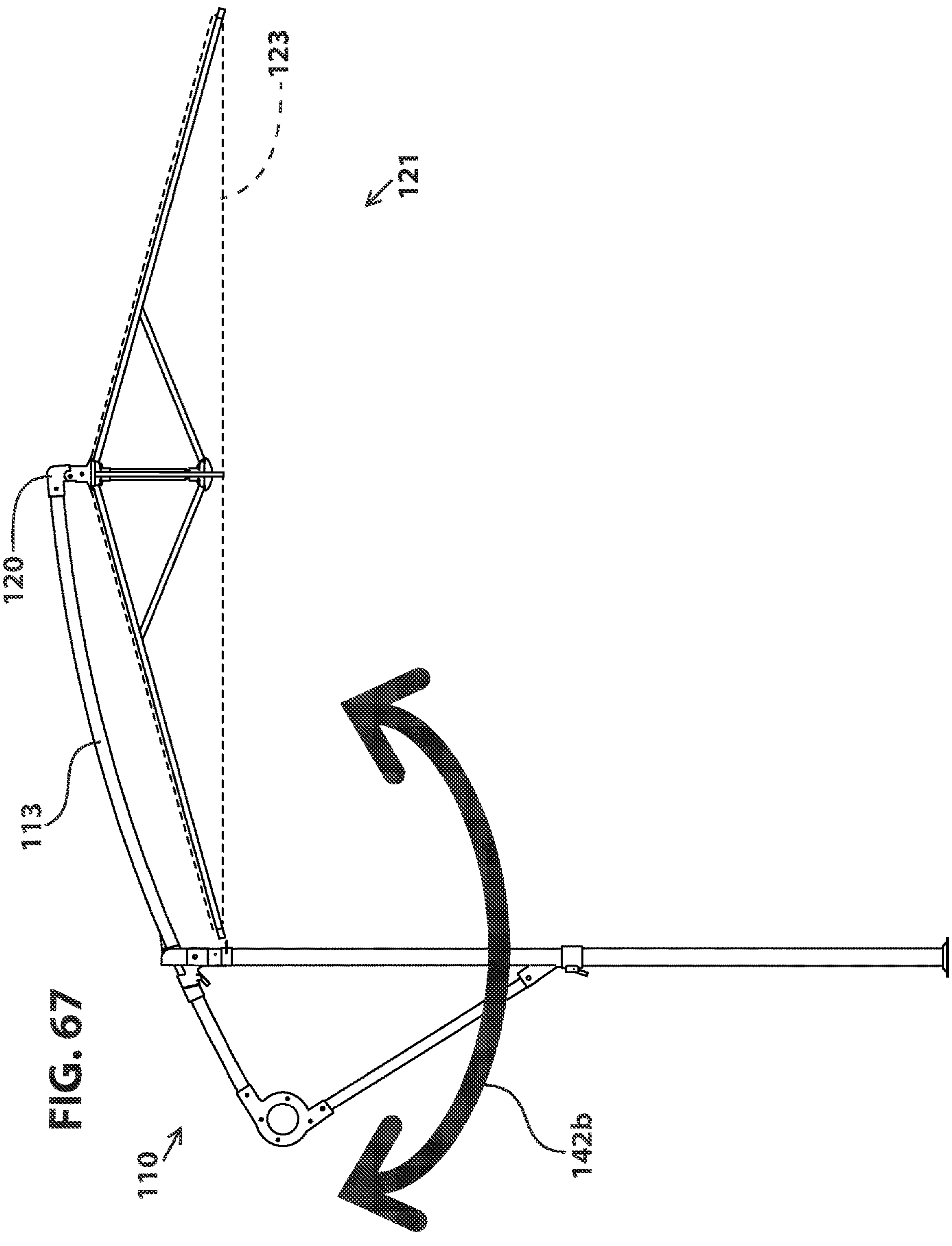

(see FIG. 28, and FIG. 64).

15) Teeter-totter-locking pin 115 is (or are respectively) for:

a) Automatically locking physically-impaired-assisting arthritic-assisting single-hand-automatic-sail-deploying-and-retracting land-yacht-maneuvering multi-direction-hoisting slidable-rockable cantilever teeter totter 113 to fully deploy the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from collapsing and causing injury (see FIG. 28 and FIG. 64);

b) Unlocking physically-impaired-assisting arthritic-assisting single-hand-automatic-sail-deploying-and-retracting land-yacht-maneuvering multi-direction-hoisting slidable-rockable cantilever teeter totter 113 to safely retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to allow for compact storage and moving in the directions of arrows 153*a*, 153*b*, 153*c*, 154*a*, 154*b*, and 154*c*

(see FIG. 28, and FIG. 64); and c) Automatically locking physically-impaired-assisting arthritic-assisting single-hand-automatic-sail-deploying-and-retracting land-yacht-maneuvering multi-direction-hoisting slidable-rockable cantilever teeter totter 113 to assist the physically-impaired or arthritic in the directions of arrows 153*a*, 153*b*, 153*c*, 154*a*, 154*b*, and 154*c*

(see FIG. 28, and FIG. 64).

16) Teeter-totter rocking tubular clamp 116 is (or are respectively) for:

a) Slidably navigating physically-impaired-assisting arthritic-assisting single-hand-automatic-sail-deploying-and-retracting land-yacht-maneuvering multi-direction-hoisting slidable-rockable cantilever teeter totter 113 for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 155*a*, 155*b*, 156*a*, and 156*b*
(see FIG. 29A, FIG. 29B, FIG. 65A, and FIG. 65B);

b) Preventing physically-impaired-assisting arthritic-assisting single-hand-automatic-sail-deploying-and-retracting land-yacht-maneuvering multi-direction-hoisting slidable-rockable cantilever teeter totter 113 from disengaging from upper stanchion 109
in the directions of arrows 155*a*, 155*b*, 156*a*, and 156*b*
(see FIG. 29A, FIG. 29B, FIG. 65A, and FIG. 65B); and c) Pivotably rocking to allow physically-impaired-assisting arthritic-assisting single-hand-automatic-sail-deploying-and-retracting land-yacht-maneuvering multi-direction-hoisting slidable-rockable cantilever teeter totter 113 a defined range of motion for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 155*a*, 155*b*, 156*a*, and 156*b*
(see FIG. 29A, FIG. 29B, FIG. 65A, and FIG. 65B).

17) Cable-securing tubular clamp-securing camber 117
is (or are respectively) for:

a) Securely and discretely locking canal-hidden automatic-sail-deploying-and-retracting cable 118
in the directions of arrow 157*a* and 157*b*
(see FIG. 58, FIG. 59A, FIG. 59B, FIG. 60, and FIG. 61); and b) Guiding physically-impaired-assisting arthritic-assisting single-hand-automatic-sail-deploying-and-retracting land-yacht-maneuvering multi-direction-hoisting slidable-rockable cantilever teeter totter 113 to assist and control deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 155*a*, 155*b*, 156*a*, and 156*b*
(see FIG. 29A, FIG. 29B, FIG. 65A, and FIG. 65B).

18) Canal-hidden automatic-sail-deploying-and-retracting cable 118
is (or are respectively) for:

Automatically engaging teeter-totter rocking tubular clamp 116, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*
(see FIG. 60, FIG. 61, FIG. 63, and FIG. 64).

19) Cable-hiding cable-guiding canal 119
is (or are respectively) for:

a) Discretely hiding canal-hidden automatic-sail-deploying-and-retracting cable 118 within to be more aesthetically pleasing
in the directions of arrows 164*a* and 165*a*
(see FIG. 58, FIG. 59A, FIG. 59B, FIG. 60, and FIG. 61);

b) Discretely hiding canal-hidden automatic-sail-deploying-and-retracting cable 118 within to prevent injury
in the directions of arrows 164*a* and 165*a*
(see FIG. 58, FIG. 59A, FIG. 59B, FIG. 60, and FIG. 61); and c) Guiding canal-hidden automatic-sail-deploying-and-retracting cable 118 to assist in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*
(see FIG. 60, FIG. 61, FIG. 63, and FIG. 64).

Figure 60:
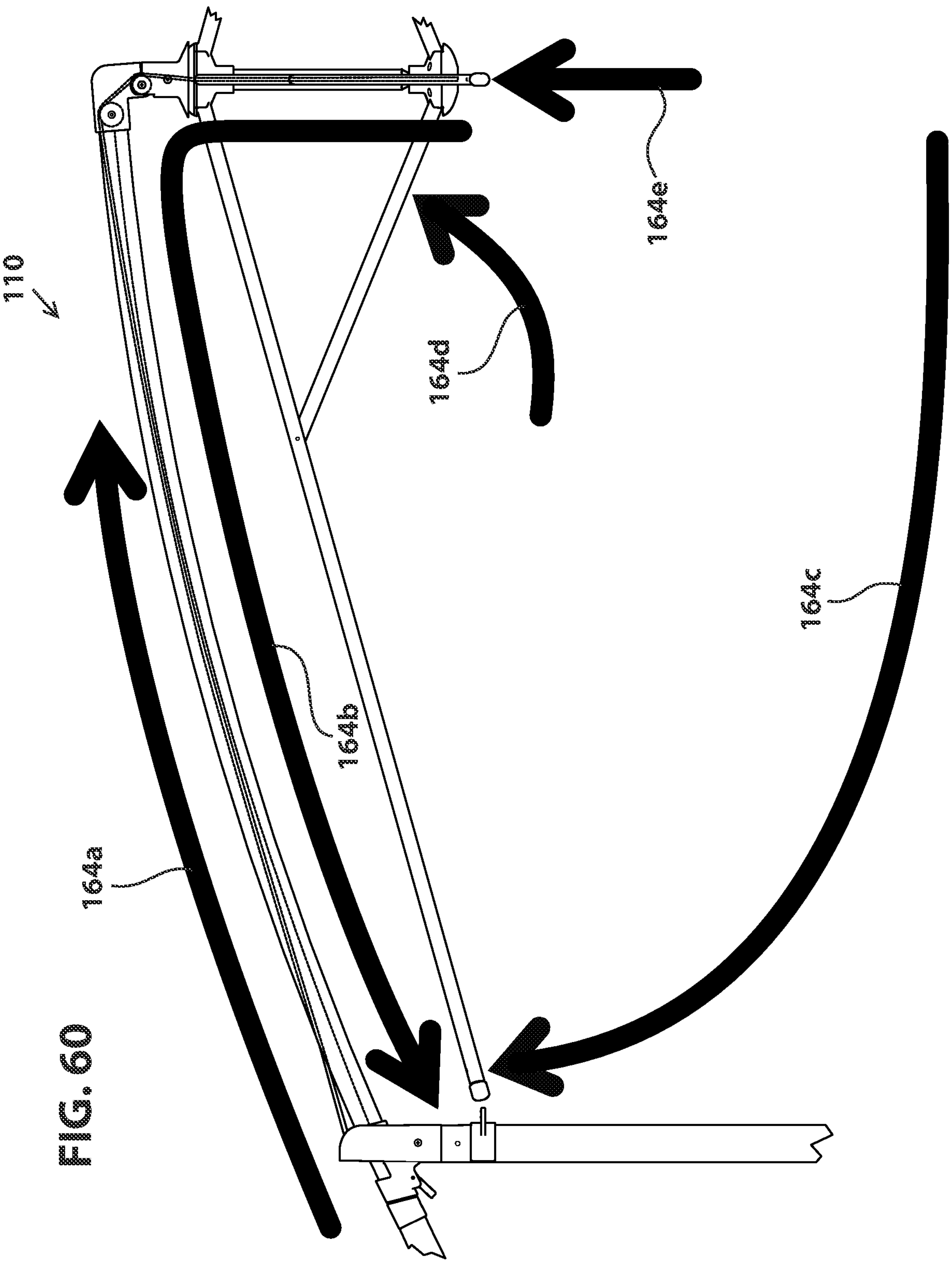
FIG. 60 and FIG. 61 illustrate views demonstrating canal-hidden automatic-sail-deploying-and-retracting cable 118 and automatic-sail-deploying-and-retracting-cable pulleys 125 deploying the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121.
Figure 61:
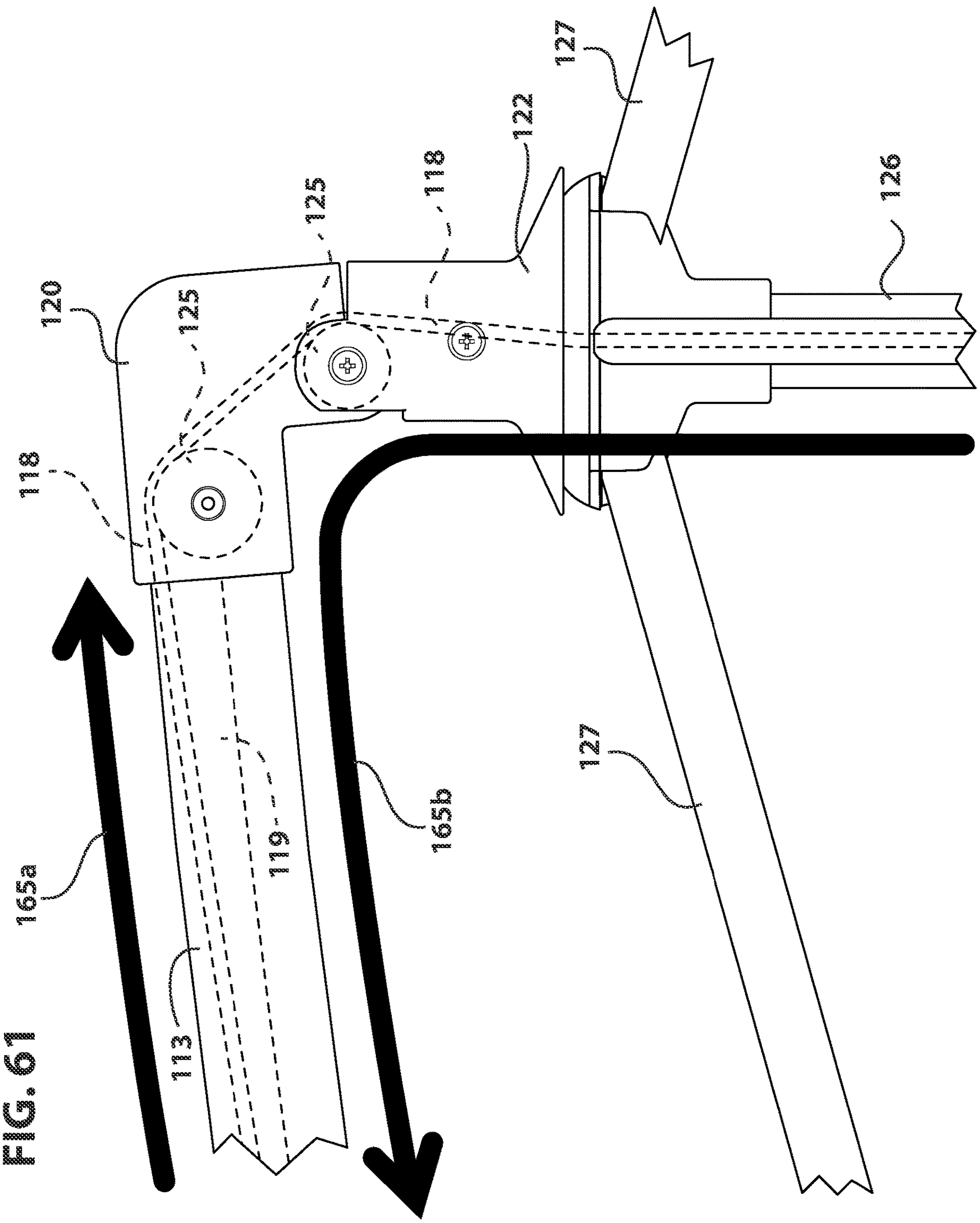
Figure 62:
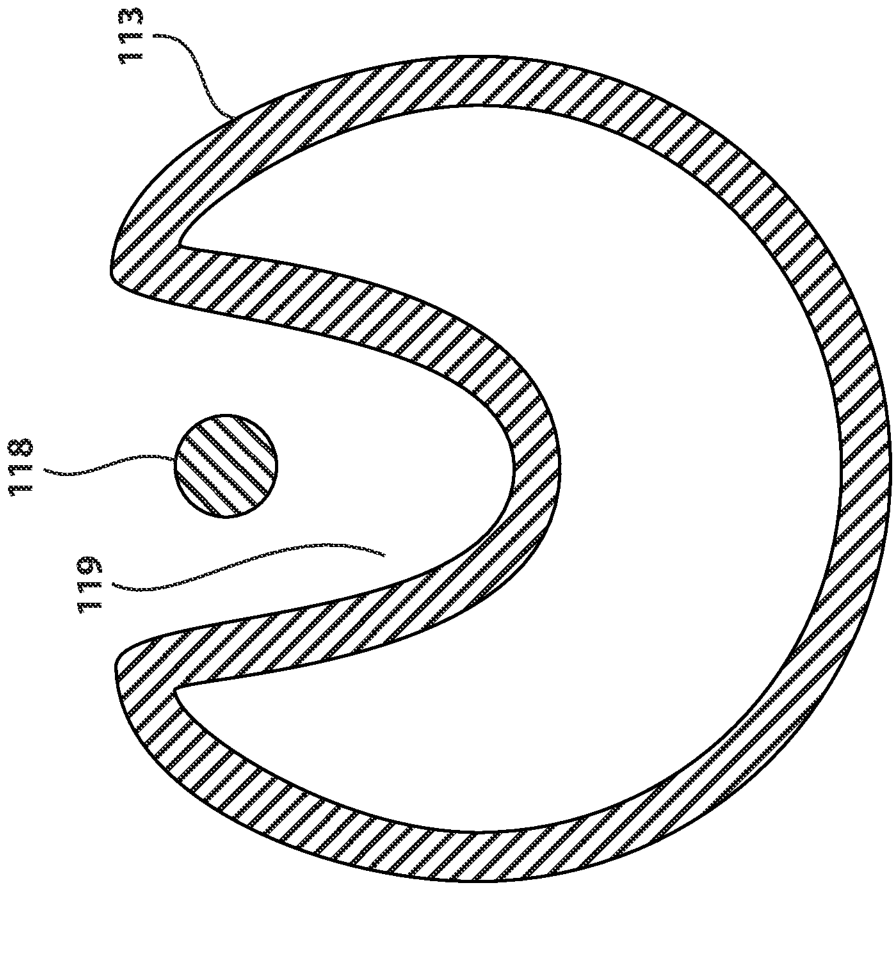
FIG. 62 illustrates a sectional view of the canal-hidden automatic-sail-deploying-and-retracting cable 118 in the cable-hiding cable-guiding canal 119.

20) Pivoting pulley housing 120
is (or are respectively) for:

Protecting canal-hidden automatic-sail-deploying-and-retracting cable 118 and Automatic-sail-deploying-and-retracting-cable pulleys 125 from rain or damage; and Swingingly providing a location for pivoting pulley hub 122 to attach
in the directions of arrows 164*a*, 164*b*, 165*a*, and 165*b*
(see FIG. 60, and FIG. 61).

21) Wind-catching-and-redirecting rainwater-amassing-and-storing garden-irrigating fruit-harvesting panorama-media-screen-capable land-yacht-powering sail system 121 is for performing the combined functions of its components.

22) Pivoting pulley hub 122
is (or are respectively) for:
a) Protecting canal-hidden automatic-sail-deploying-and-retracting cable 118 and Automatic-sail-deploying-and-retracting-cable pulleys 125 from rain or damage
in the directions of arrows 164*a*, 164*b*, 165*a*, and 165*b*
(see FIG. 60, and FIG. 61);
b) Swingingly providing a location for wind-catching-and-redirecting rainwater-amassing-and-storing garden-irrigating fruit-harvesting panorama-media-screen-capable land-yacht-powering sail system 121 to attach
in the directions of arrows 164*a*, 164*b*, 165*a*, and 165*b*
(see FIG. 60, and FIG. 61);
c) Swingingly and weightingly and automatically aligning wind-catching-and-redirecting rainwater-amassing-and-storing garden-irrigating fruit-harvesting panorama-media-screen-capable land-yacht-powering sail system 121 vertically
in the directions of arrows 164*a*, 164*b*, 165*a*, and 165*b*
(see FIG. 60, and FIG. 61); and
d) Providing a pivot point to allow wind-catching-and-redirecting rainwater-amassing-and-storing garden-irrigating fruit-harvesting panorama-media-screen-capable land-yacht-powering sail 123 to function as a panorama-media screen
in the directions of arrows 136 and 170
(see FIG. 13, FIG. 15, FIG. 49, and FIG. 51).

23) Wind-catching-and-redirecting rainwater-amassing-and-storing garden-irrigating fruit-harvesting panorama-media-screen-capable land-yacht-powering sail 123
is (or are respectively) for:
a) Harvesting fruit and nuts from trees;
b) Collecting rainwater on a marine craft;
c) Collecting rainwater for irrigation;
d) Multi-adjustably catching and redirecting wind to maneuver a land-yacht; and
e) Providing shade
in the directions of arrows 131*a*, 131*b*, 131*c*, 132*a*, 132*b*, 132*c*, 133*a*, 133*b*, 133*c*, 134*a*, 134*b*, 134*c*, 155*a*, 155*b*, 155*c*, 171*a*, 171*b*, 171*c*, 171*d*, 172*a*, 172*b*, 172*c*, 172*d*, 173*a*, 173*b*, 173*c*, 173*d*, 174*a*, 174*b*, 175*a*, 175*b*, 176*a*, 176*b*, 176*c*, 176*d*, 177*a*, 177*b*, 177*c*, 177*d*, 178*a*, 178*b*, 178*c*, and 178*d*
(see FIG. 9, FIG. 10, FIG. 11, FIG. 12, FIG. 16, FIG. 17, FIG. 18, FIG. 19, FIG. 20, FIG. 21, FIG. 45, FIG. 46, FIG. 47, FIG. 48, FIG. 52, FIG. 53, FIG. 54, FIG. 56, and FIG. 57).

24) Sail-location-securing adjustable removable clip 124
is (or are respectively) for:
a) Securing wind-catching-and-redirecting rainwater-amassing-and-storing garden-irrigating fruit-harvesting panorama-media-screen-capable land-yacht-powering sail 123 to prevent from spinning (see FIG. 22, FIG. 23A, FIG. 58, and FIG. 59A); and
b) Slidably vertically guiding wind-catching-and-redirecting rainwater-amassing-and-storing garden-irrigating fruit-harvesting panorama-media-screen-capable land-yacht-powering sail 123 when deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
(see FIG. 22, FIG. 23A, FIG. 58, and FIG. 59A).

25) Automatic-sail-deploying-and-retracting-cable pulleys 125
is (or are respectively) for:
a) Guiding canal-hidden automatic-sail-deploying-and-retracting cable 118 when deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 165*a*, and 165*b*
(see FIG. 60, and FIG. 61); and
b) Providing easy rotation when deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 165*a*, and 165*b*
(see FIG. 60, and FIG. 61).

26) Cable-guiding central tube 126
is (or are respectively) for:
Guiding canal-hidden automatic-sail-deploying-and-retracting cable 118 when deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*e* and 167*c*
(see FIG. 60, and FIG. 63).

27) Sail-buttresses 127 is (or are respectively) for:

a) Providing support structure for wind-catching-and-redirecting rainwater-amassing-and-storing garden-irrigating fruit-harvesting panorama-media-screen-capable land-yacht-powering sail 123 in the directions of arrows 166*a*, 166*b*, 167*a*, 167*b*, 167*c*, 167*d*, and 167*e* (see FIG. 40, FIG. 63, and FIG. 64); and b) Automatically and hingingly deploying and retracting wind-catching-and-redirecting rainwater-amassing-and-storing garden-irrigating fruit-harvesting panorama-media-screen-capable land-yacht-powering sail 123 in the directions of arrows 146*a*, 146*b*, 147*a*, 147*b*, 147*c*, 147*d*, 147*e*, 151*a*, 151*b*, 152*a*, 152*b*, 152*c*, 152*d*, 152*e*, 166*a*, 166*b*, 167*a*, 167*b*, 167*c*, 167*d*, 167*e*, 168*a*, 168*b*, 169*a*, 169*b*, 169*c*, and 169*d* (see FIG. 5, FIG. 40, FIG. 63, and FIG. 64).

28) Sail-buttress-supporting arms 128 is (or are respectively) for:

a) Providing support structure for wind-catching-and-redirecting rainwater-amassing-and-storing garden-irrigating fruit-harvesting panorama-media-screen-capable land-yacht-powering sail 123 in the directions of arrows 166*a*, 166*b*, 167*a*, 167*b*, 167*c*, 167*d*, 167*e*, 168*a*, 168*b*, 169*a*, 169*b*, 169*c*, and 169*d* (see FIG. 40, FIG. 63, and FIG. 64); and b) Automatically and hingingly deploying and retracting wind-catching-and-redirecting rainwater-amassing-and-storing garden-irrigating fruit-harvesting panorama-media-screen-capable land-yacht-powering sail 123 in the directions of arrows 146*a*, 146*b*, 147*a*, 147*b*, 147*c*, 147*d*, 147*e*, 151*a*, 151*b*, 152*a*, 152*b*, 152*c*, 152*d*, 15*de*, 166*a*, 166*b*, 167*a*, 167*b*, 167*c*, 167*d*, 167*e*, 168*a*, 168*b*, 169*a*, 169*b*, 169*c*, and 169*d* (see FIG. 5, FIG. 40, FIG. 63, and FIG. 64).

Figure 63:
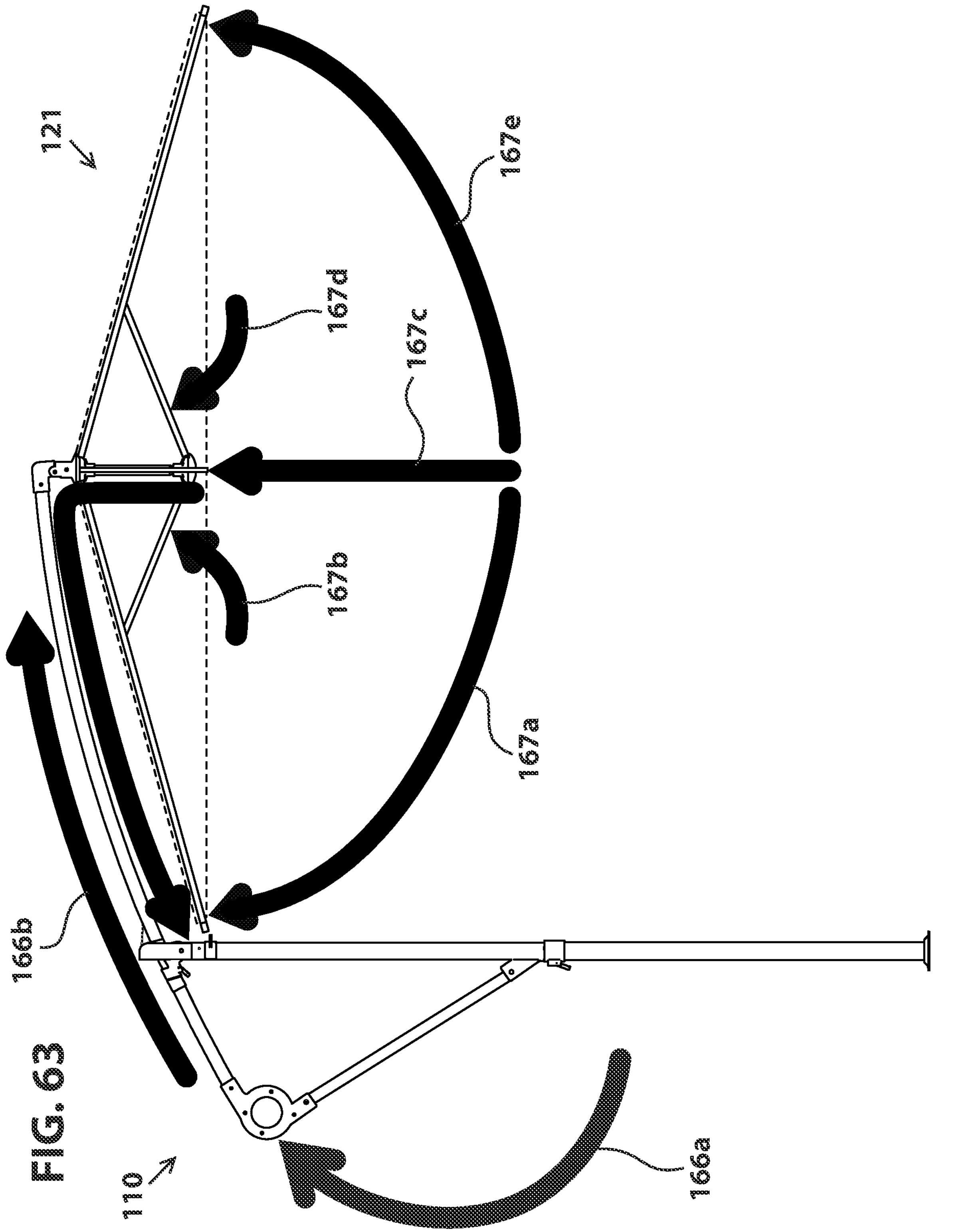
FIG. 63, FIG. 64, FIG. 65A, FIG. 65B, FIG. 66, and FIG. 67 illustrate enlarged-partial views and side views demonstrating the physically-impaired-assisting arthritic-assisting single-hand-automatic-sail-deploying-and-retracting multi-direction-hoisting system 110 activating the deployment of the wind-catching-and-redirecting rainwater-amassing-and-storing garden-irrigating fruit-harvesting panorama-media-screen-capable land-yacht-powering sail system 121 into a fully opened position.

29) Arm-hinging shuttling hub 129 is (or are respectively) for:

Automatically deploying and retracting wind-catching-and-redirecting rainwater-amassing-and-storing garden-irrigating fruit-harvesting panorama-media-screen-capable land-yacht-powering sail 123 in the directions of arrows 151*a*, 151*b*, 152*a*, 152*b*, 152*c*, 152*d*, 152*e*, 166*a*, 166*b*, 167*a*, 167*b*, 167*c*, 167*d*, 167*e*, 168*a*, 168*b*, 169*a*, 169*b*, 169*c*, and 169*d* (see FIG. 40, FIG. 63, and FIG. 64).

30) Automatic-sail-deploying-and-retracting-cable anti-tangling weight 130 is (or are respectively) for:

a) Weightingly preventing canal-hidden automatic-sail-deploying-and-retracting cable 118 from tangling; and b) Assisting in deploying and retracting wind-catching-and-redirecting rainwater-amassing-and-storing garden-irrigating fruit-harvesting panorama-media-screen-capable land-yacht-powering sail 123 in the directions of arrows 146*a*, 146*b*, 147*a*, 147*b*, 147*c*, 147*d*, 147*e*, 151*a*, 151*b*, 152*a*, 152*b*, 152*c*, 152*d*, 152*e*, 166*a*, 166*b*, 167*a*, 167*b*, 167*c*, 167*d*, 167*e*, 168*a*, 168*b*, 169*a*, 169*b*, 169*c*, and 169*d* (see FIG. 5, FIG. 40, FIG. 63, and FIG. 64).

Variation

Any component of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail can have any shape and size. Any component of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail can be made of any material(s).

Figure 68:
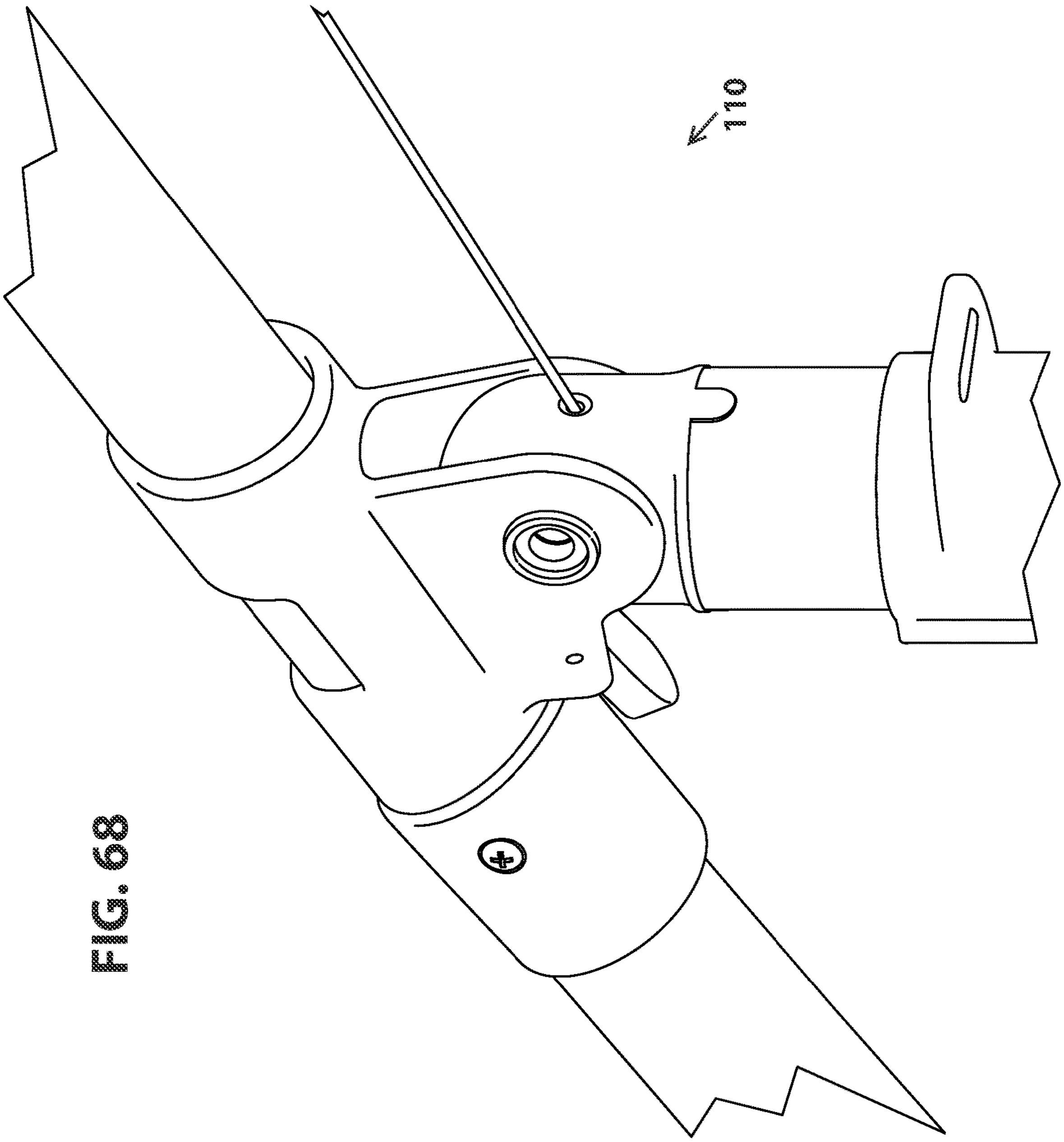
FIG. 68 illustrates an enlarged-partial view of a variation of the physically-impaired-assisting arthritic-assisting single-hand-automatic-sail-deploying-and-retracting multi-direction-hoisting system 110.
Figure 69:
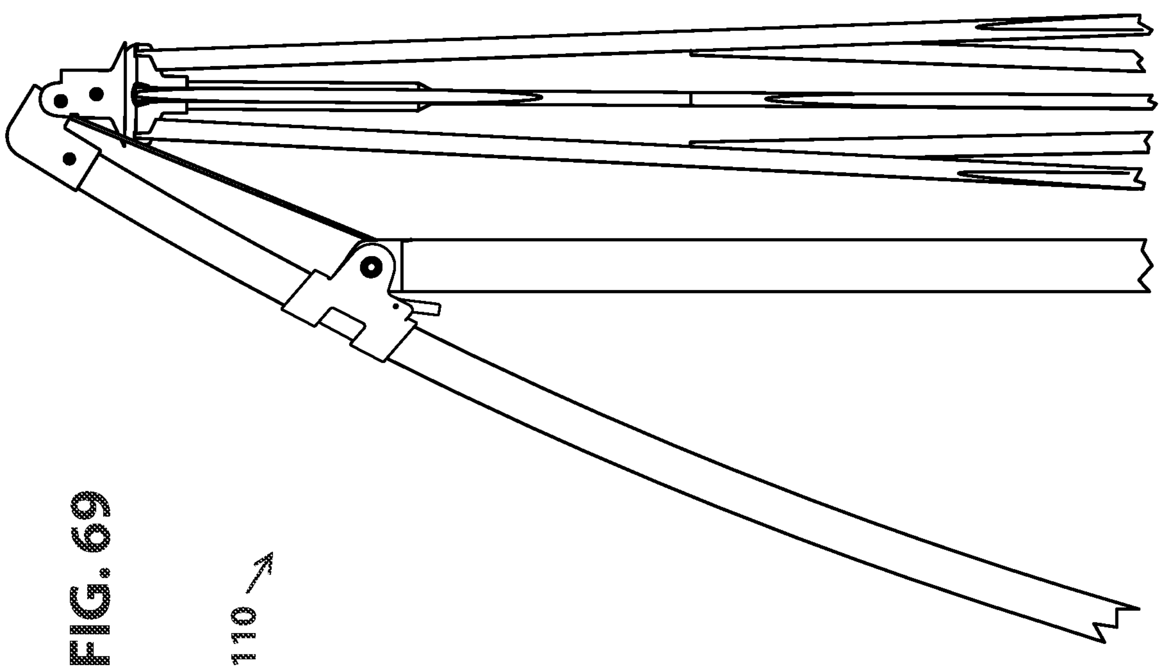
FIG. 69, FIG. 70, FIG. 71, FIG. 72, FIG. 73, and FIG. 74 illustrate partial side views of variations of a sequence demonstrating the opening of the wind-catching-and-redirecting rainwater-amassing-and-storing garden-irrigating fruit-harvesting panorama-media-screen-capable land-yacht-powering sail system 121.
Figure 70:
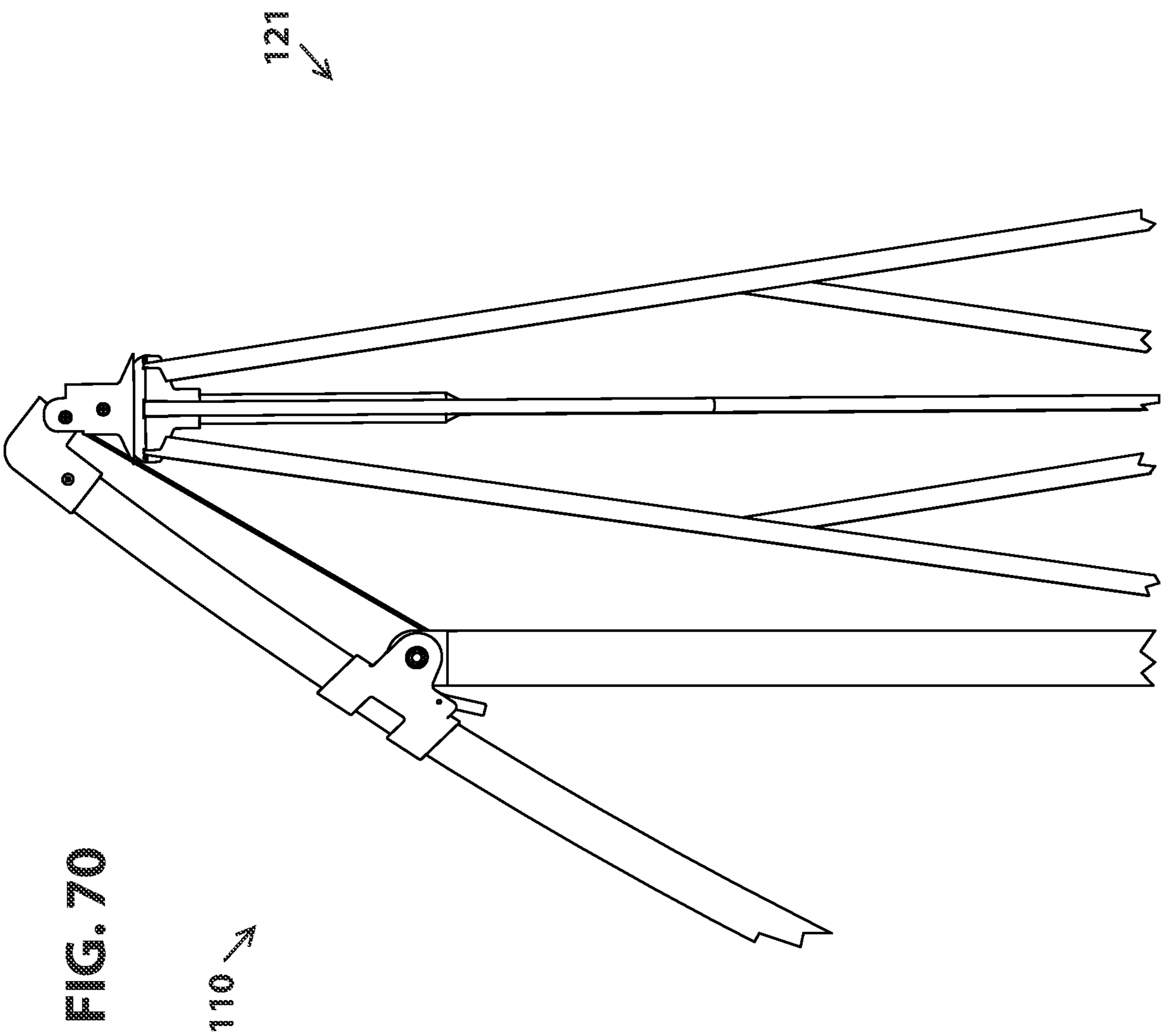
Figure 71:
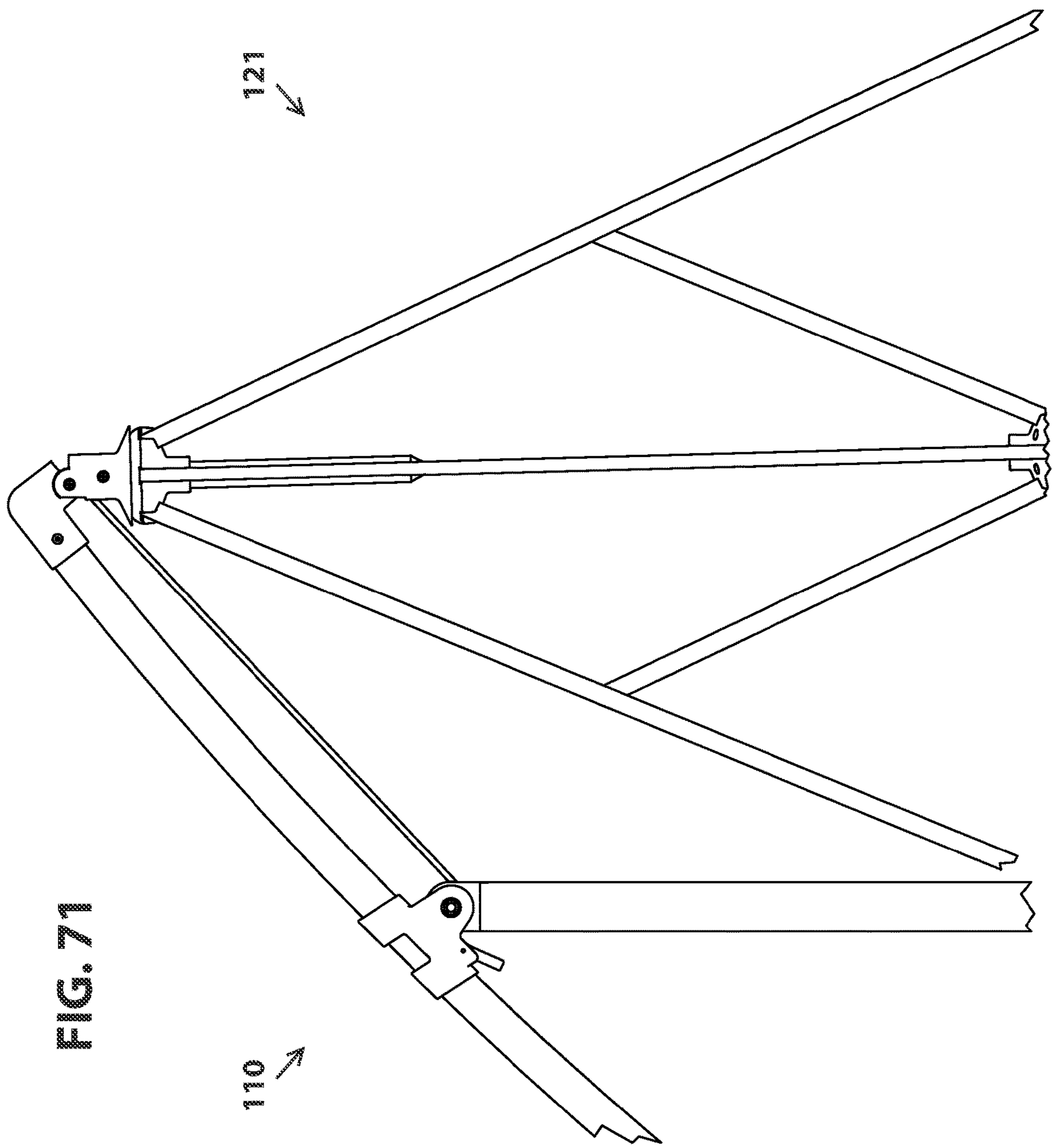
Figure 72:
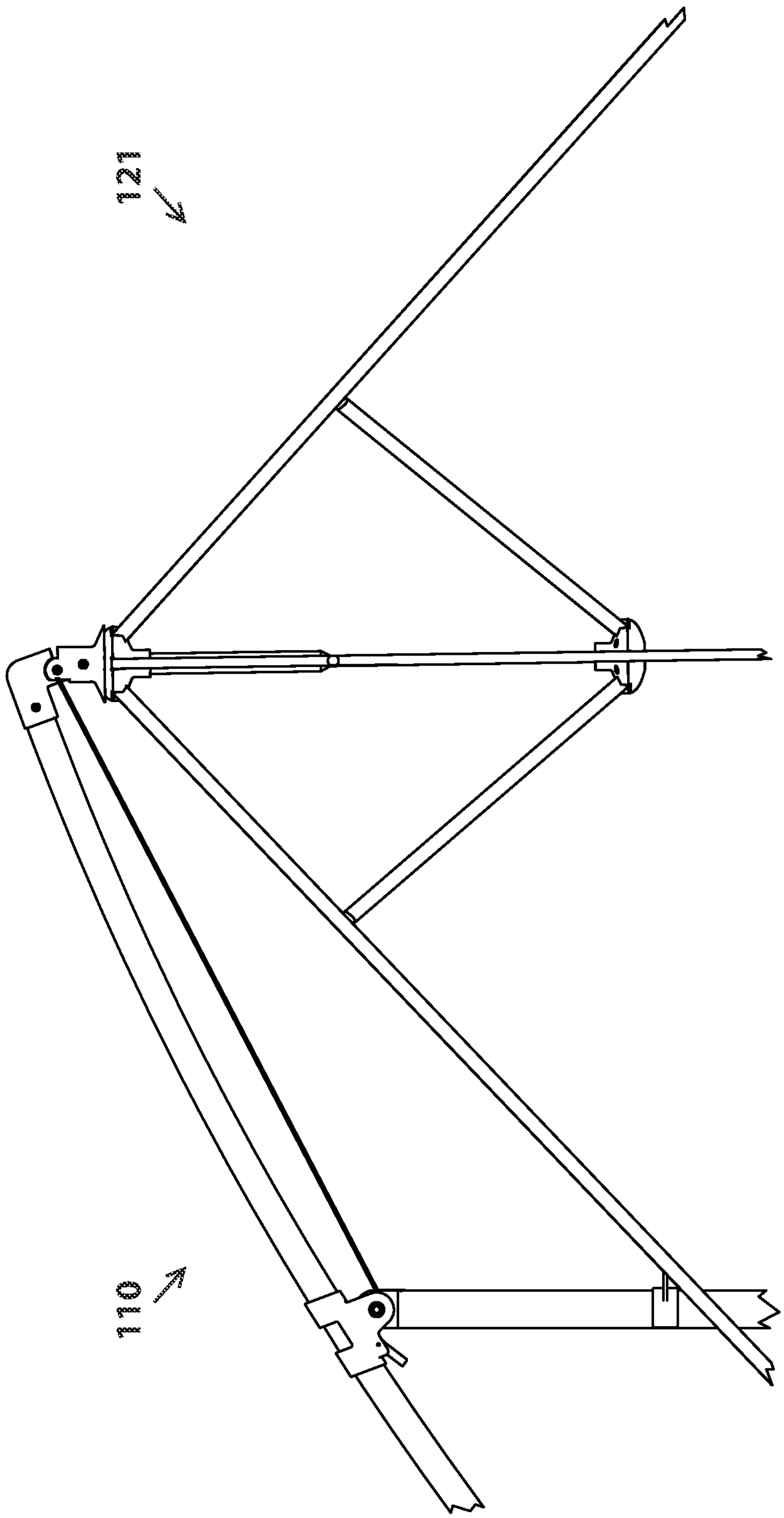
Figure 73:
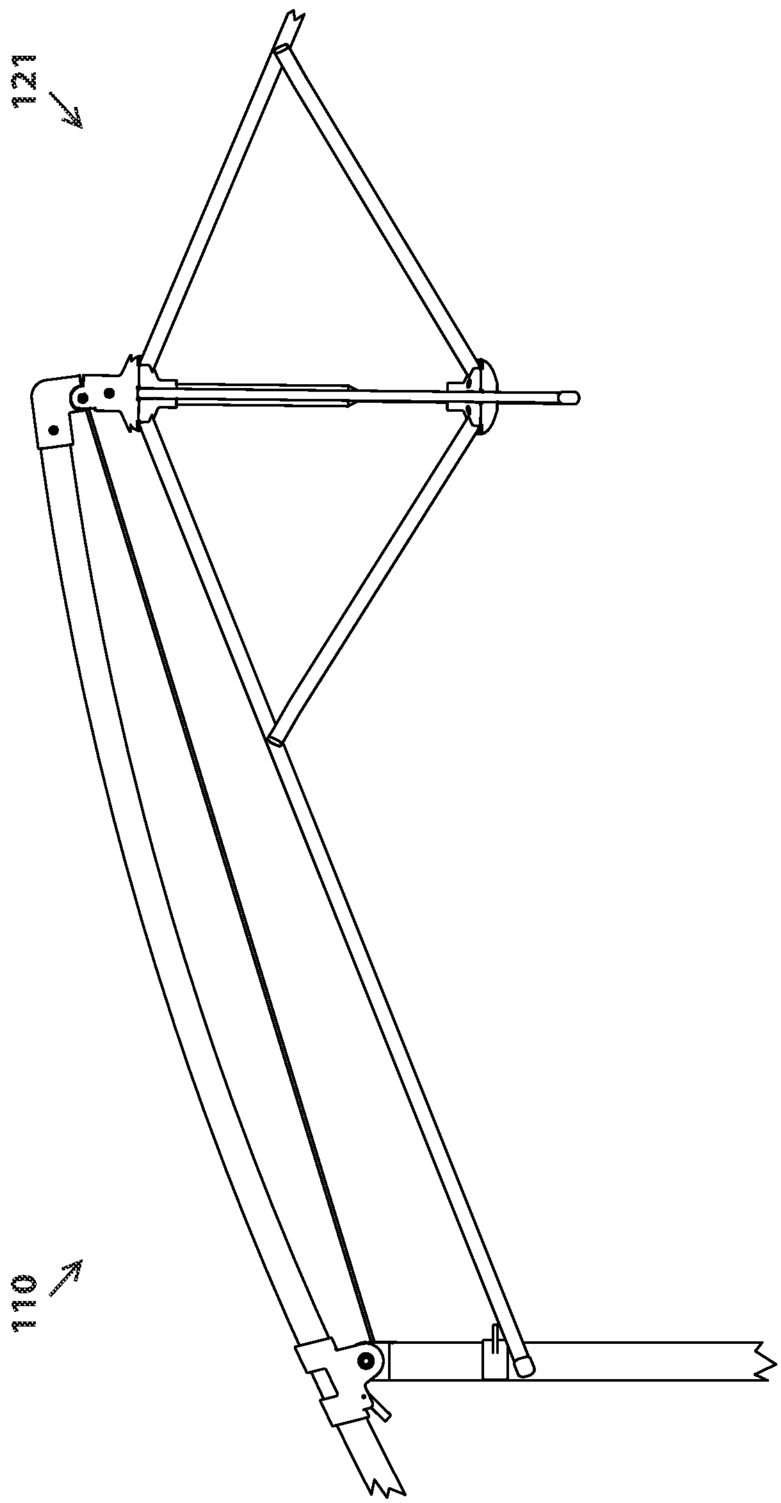
Figure 74:
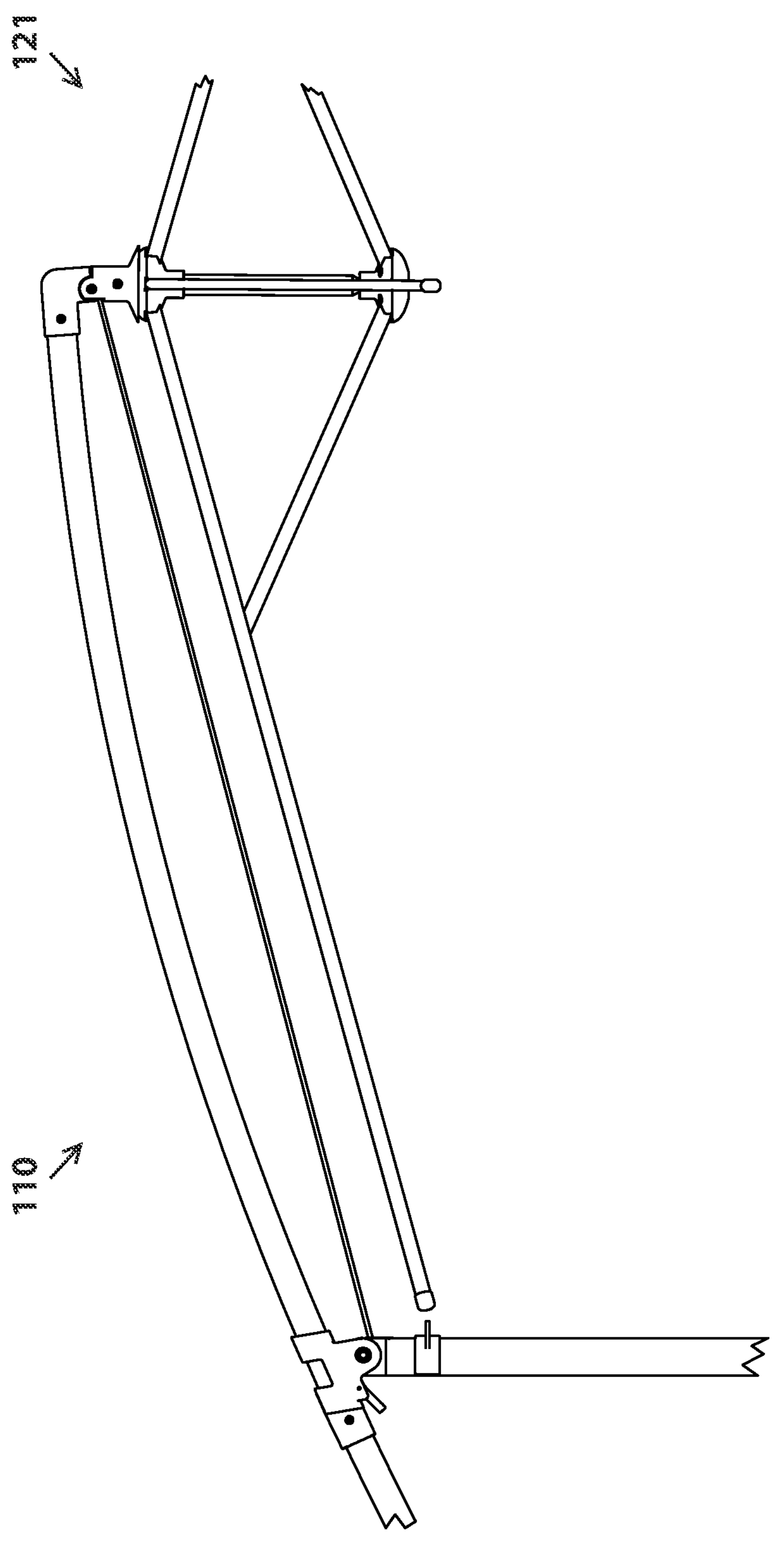
Figure 75:
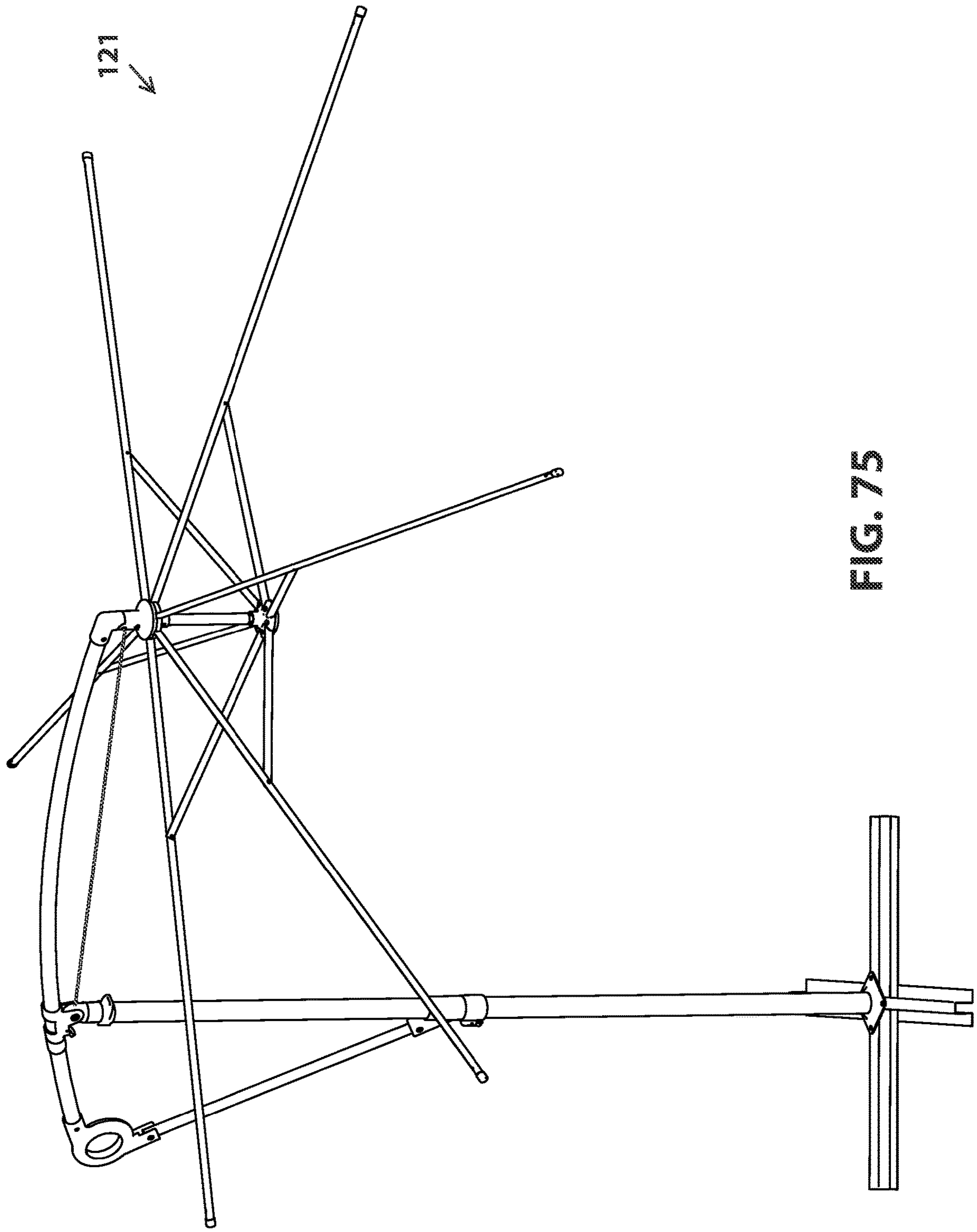
FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, and FIG. 92 illustrate side and partial perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.
Figure 76:
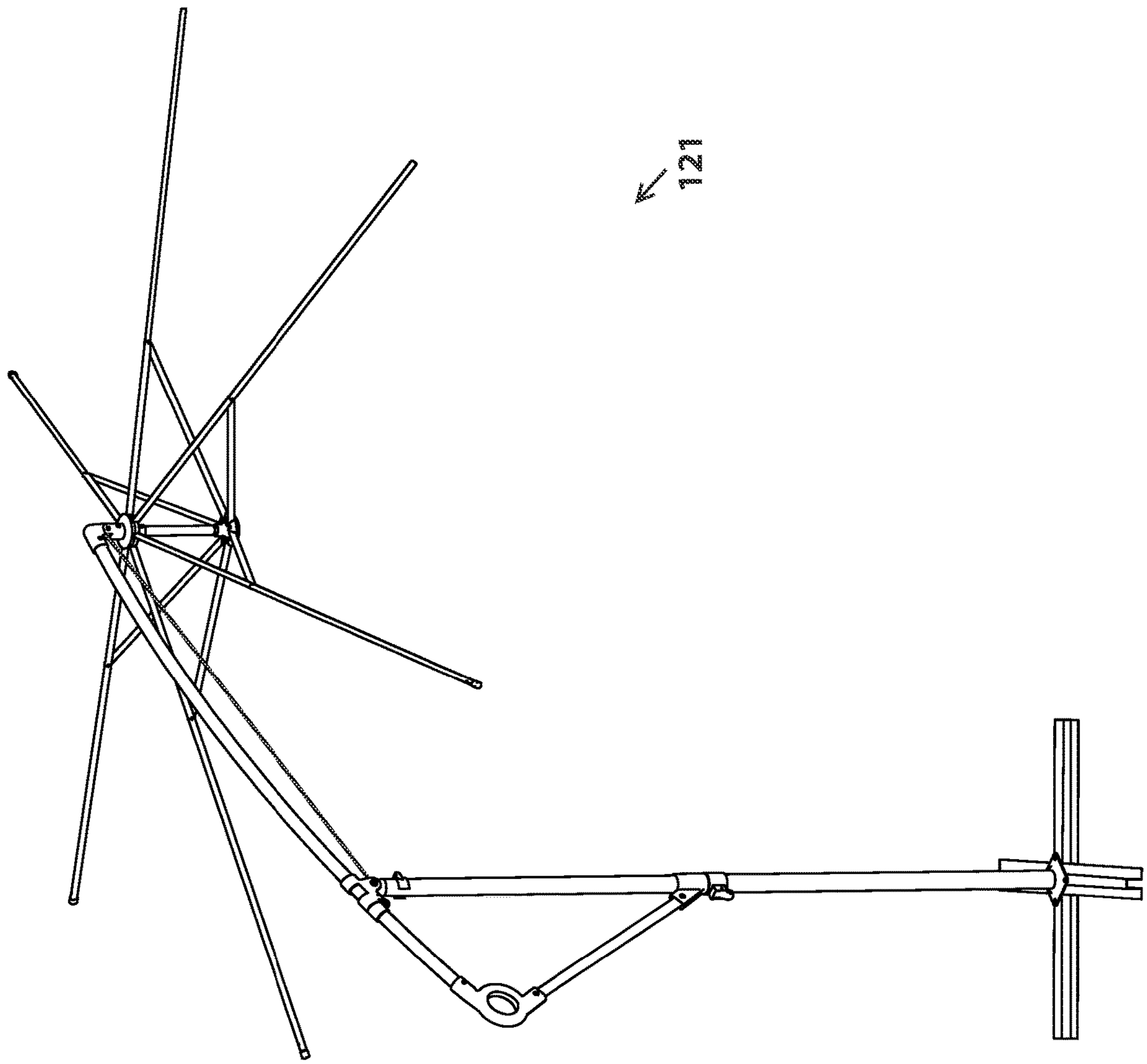
Figure 77:
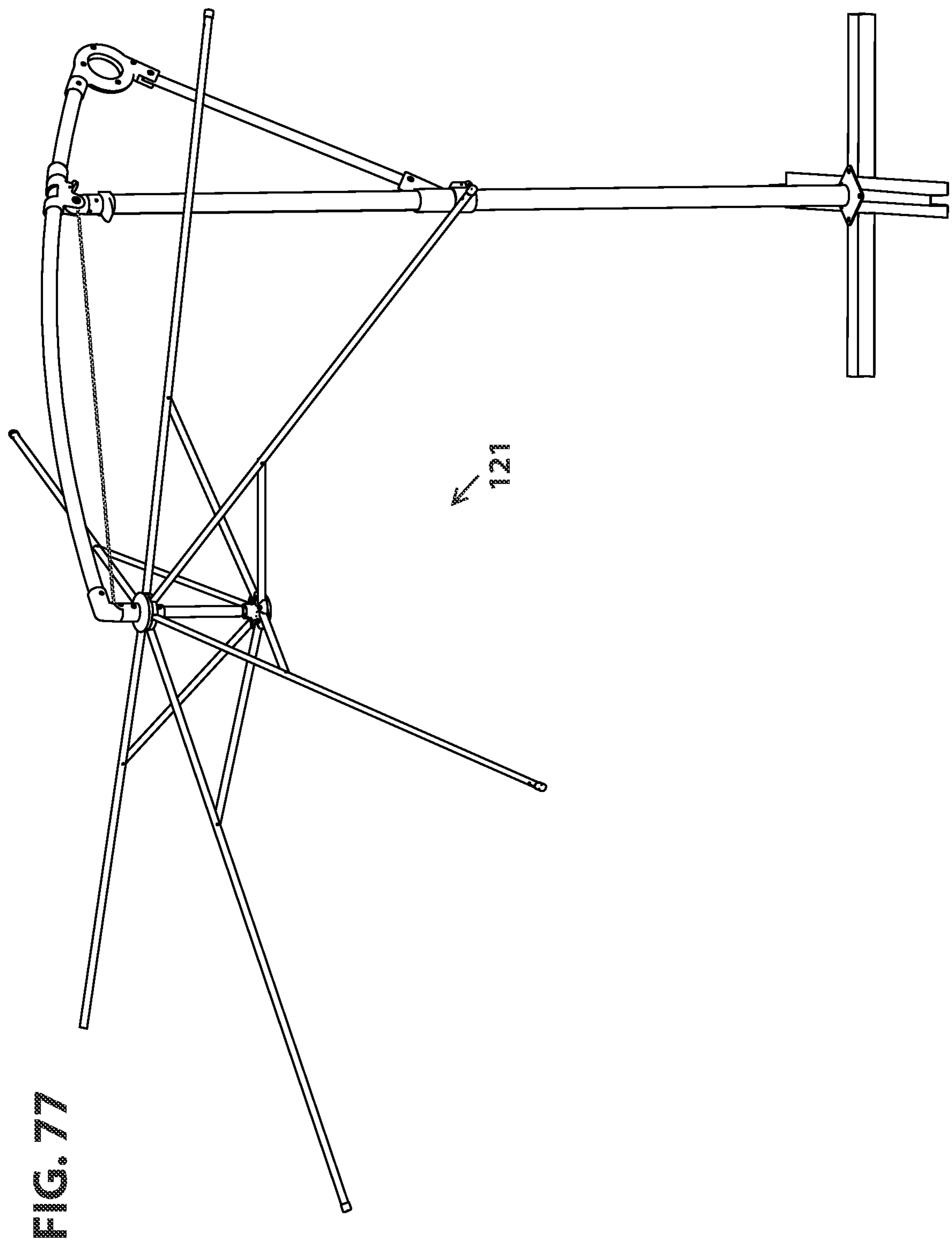
Figure 78:
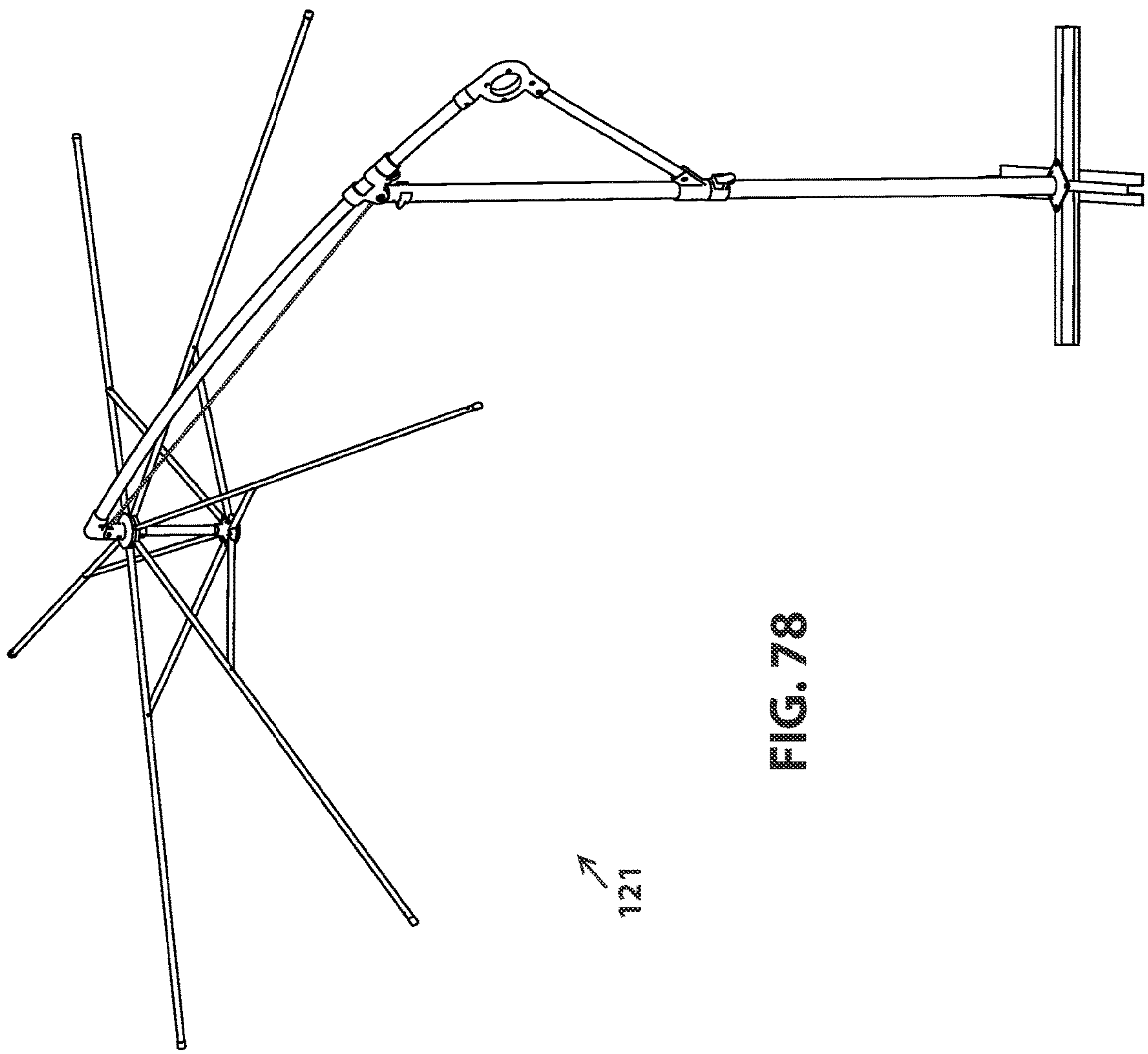
Figure 79:
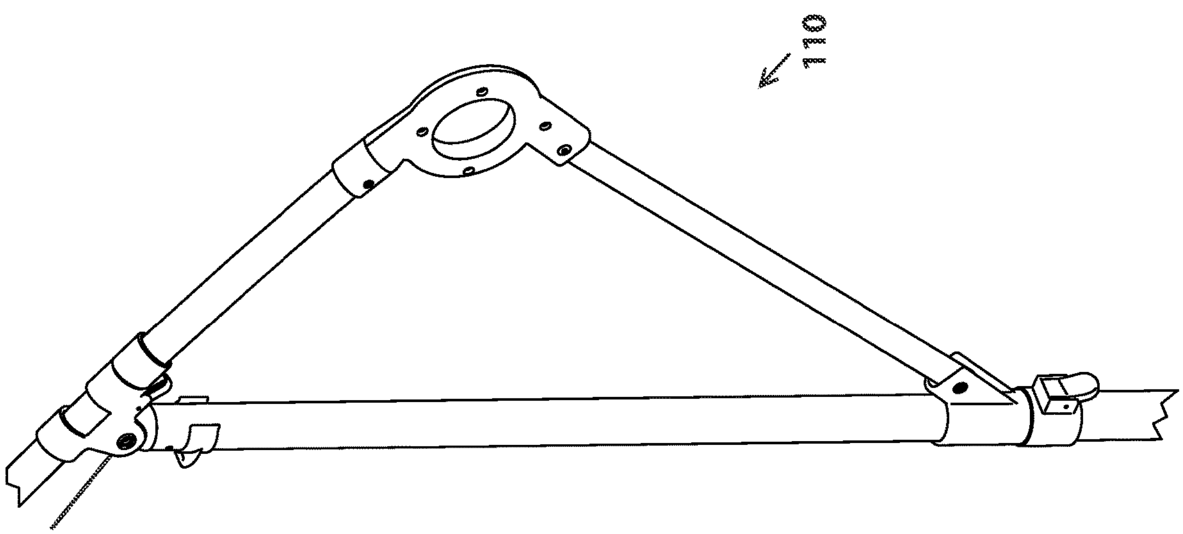
Figure 80:
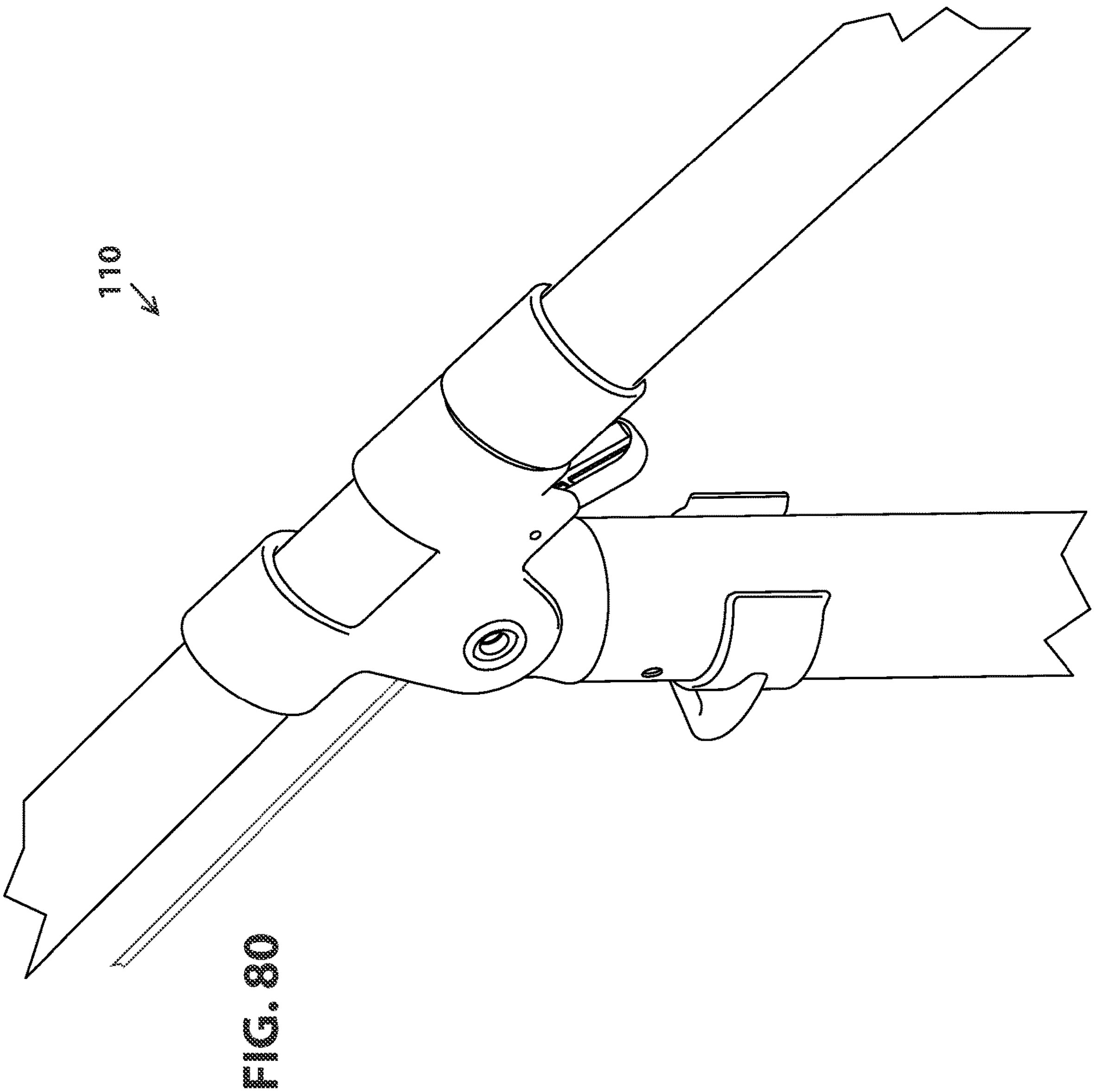
Figure 81:
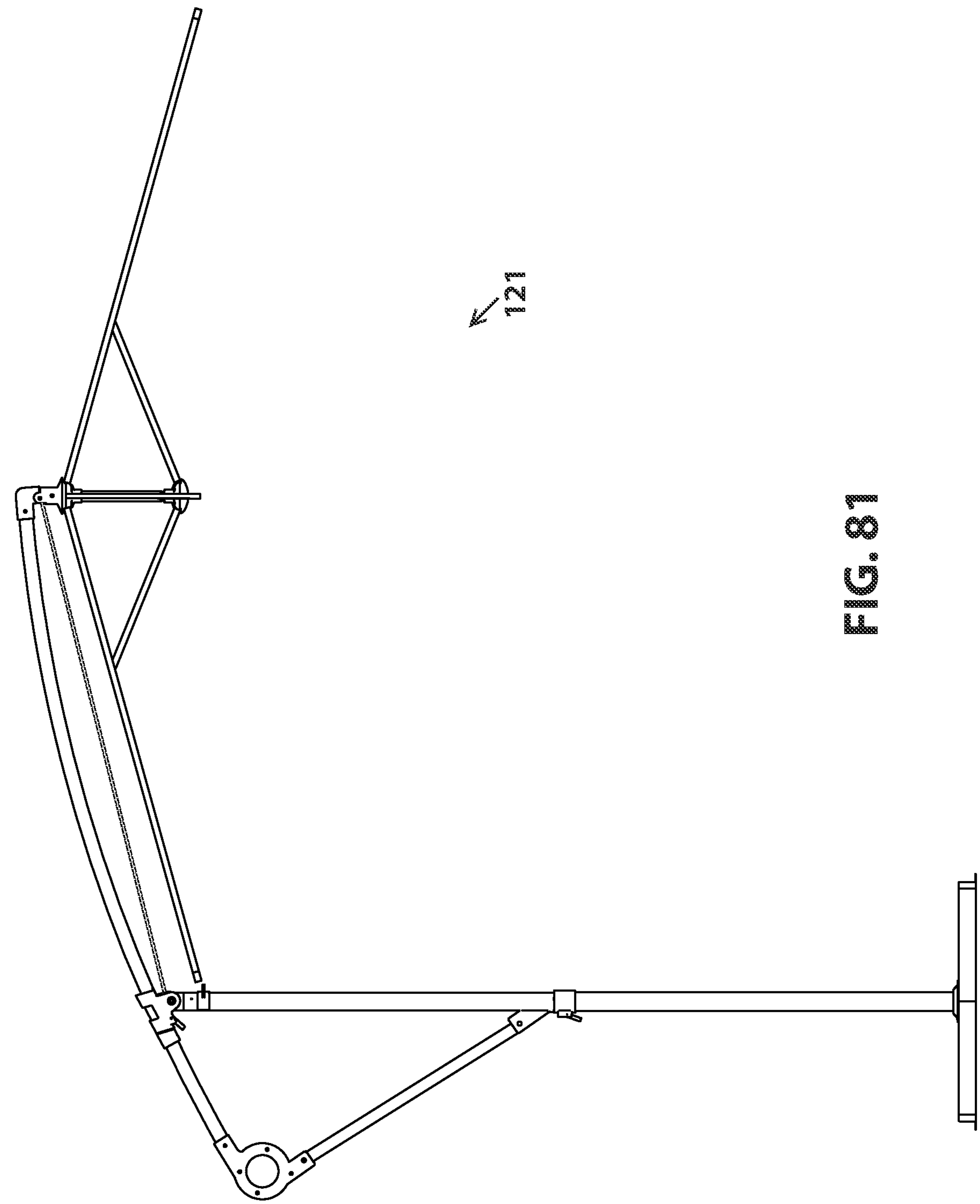
Figure 82:
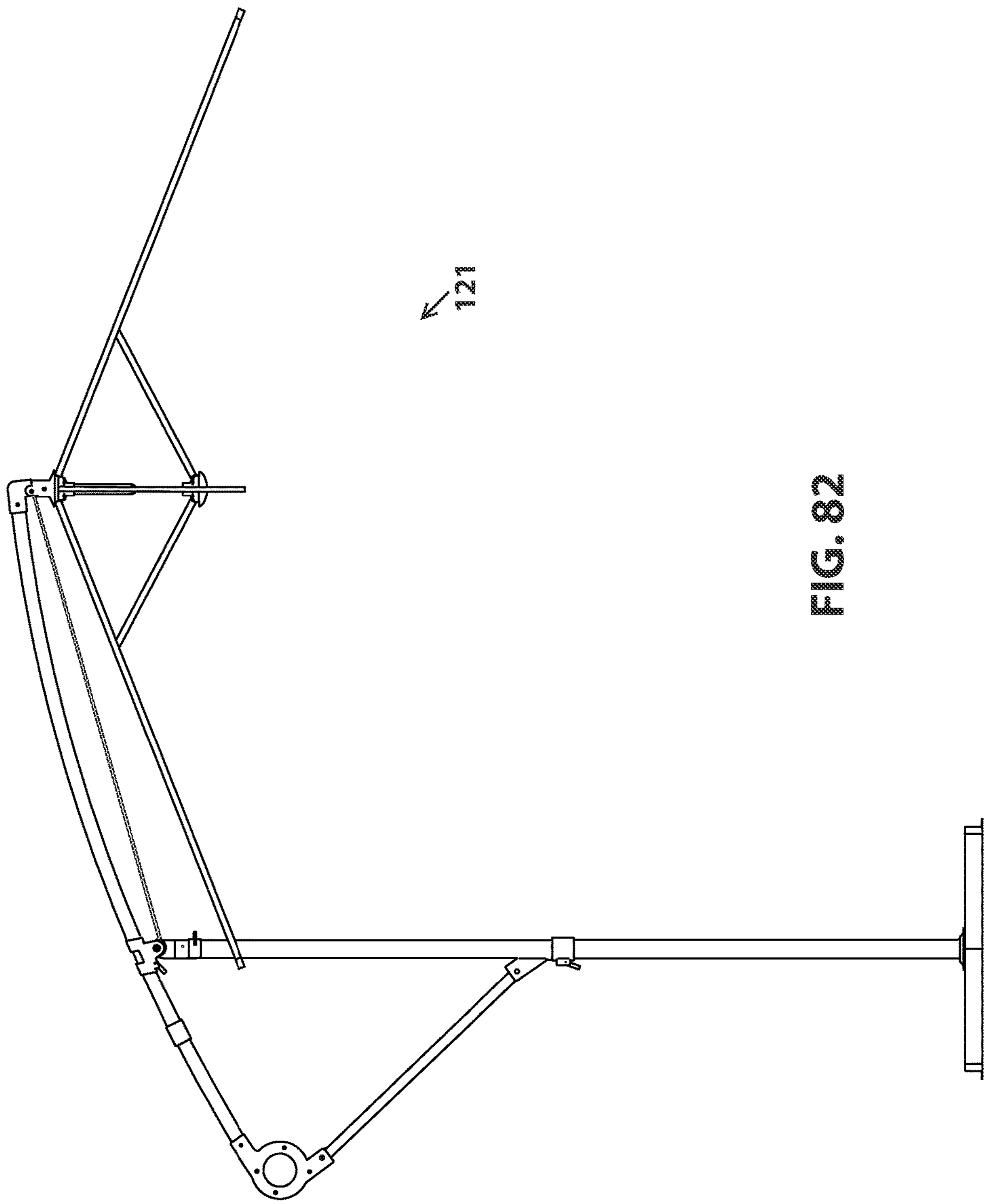
Figure 83:
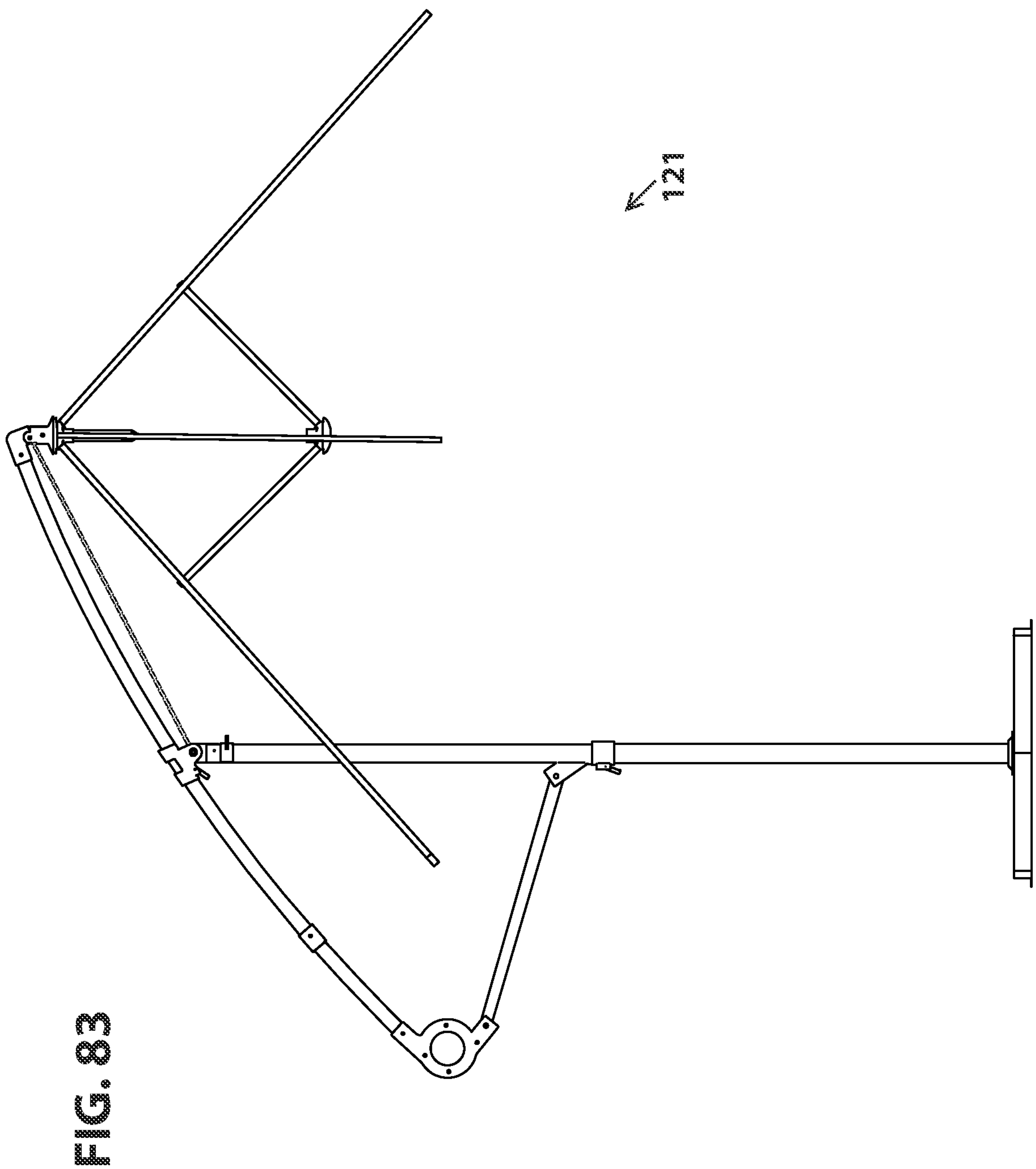
Figure 84:
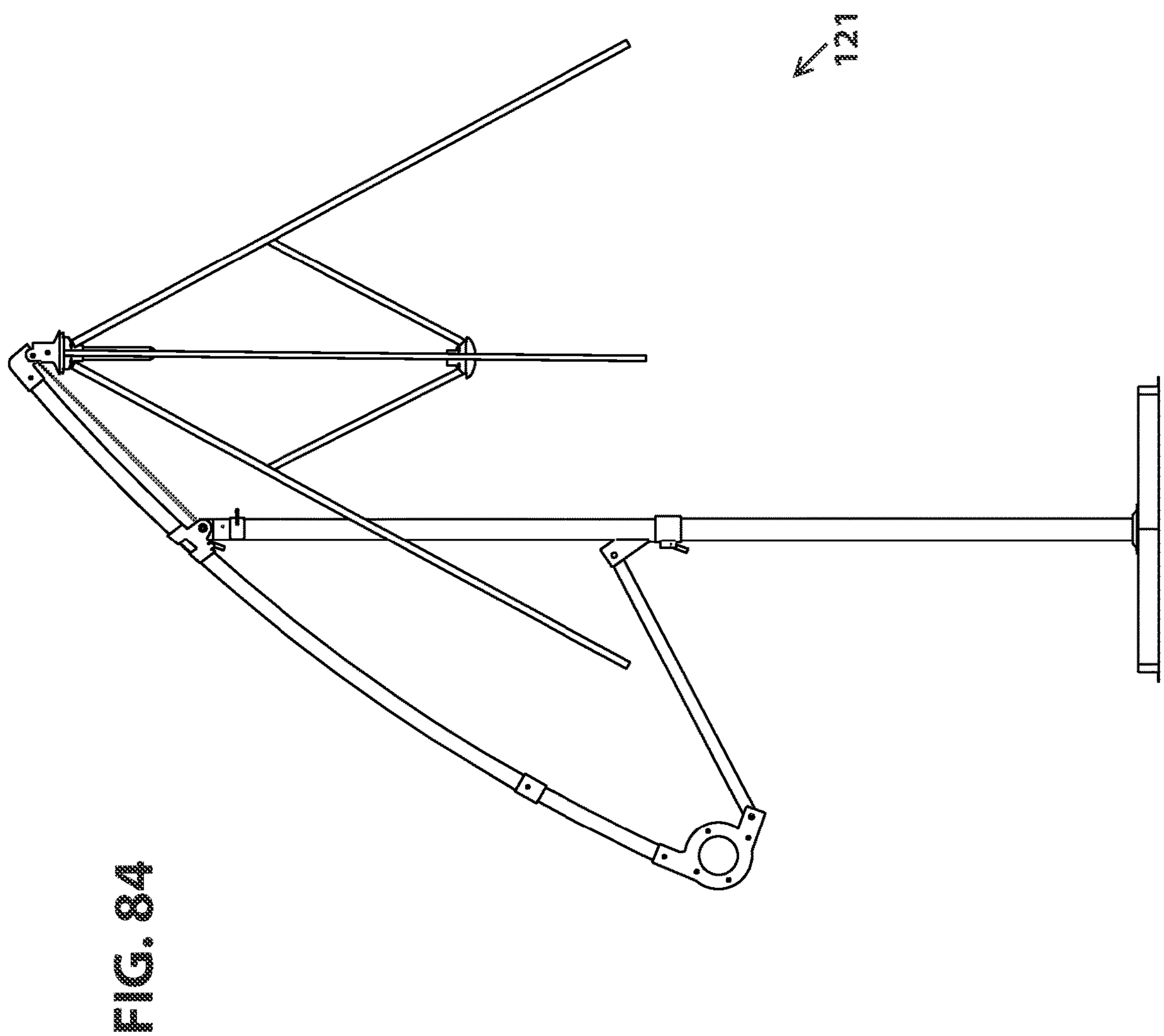
Figure 85:
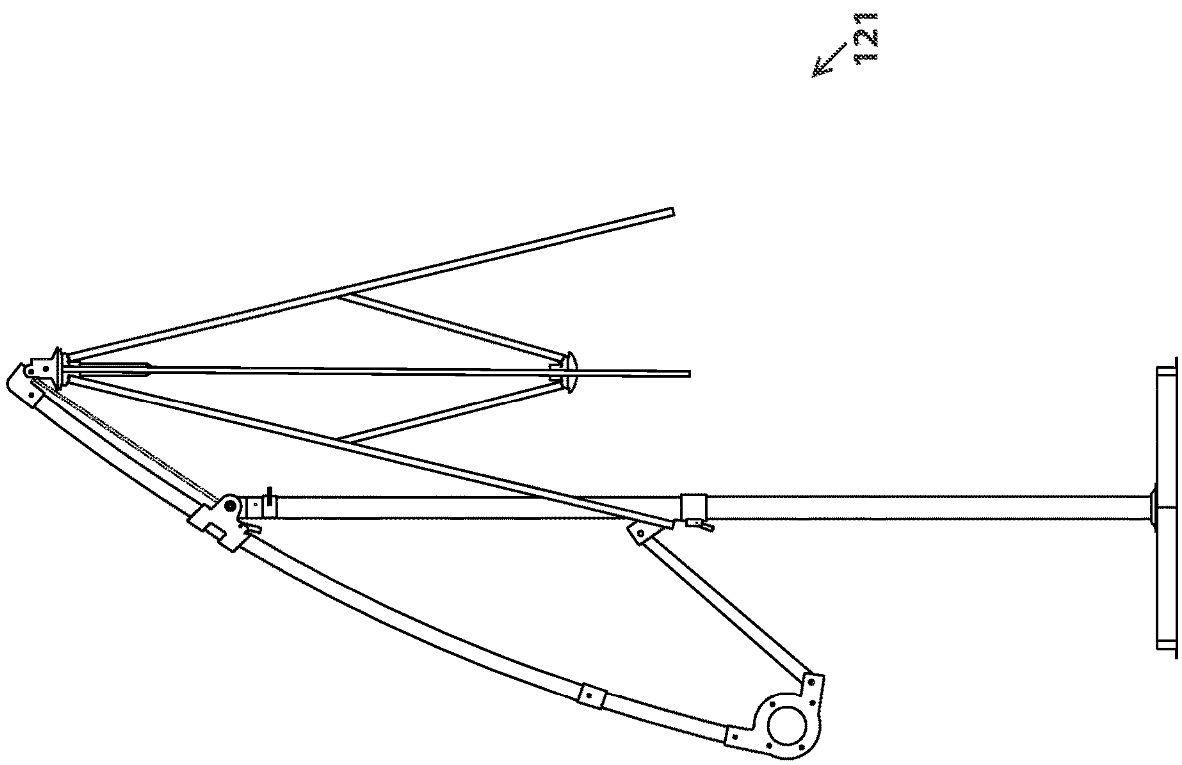
Figure 86:
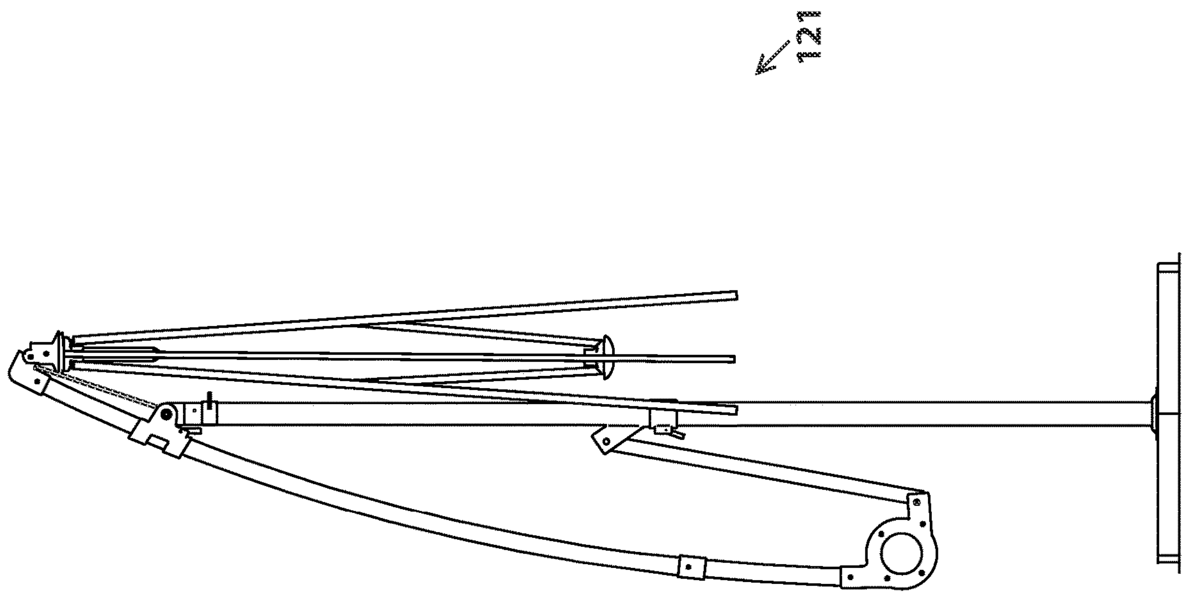
Figure 87:
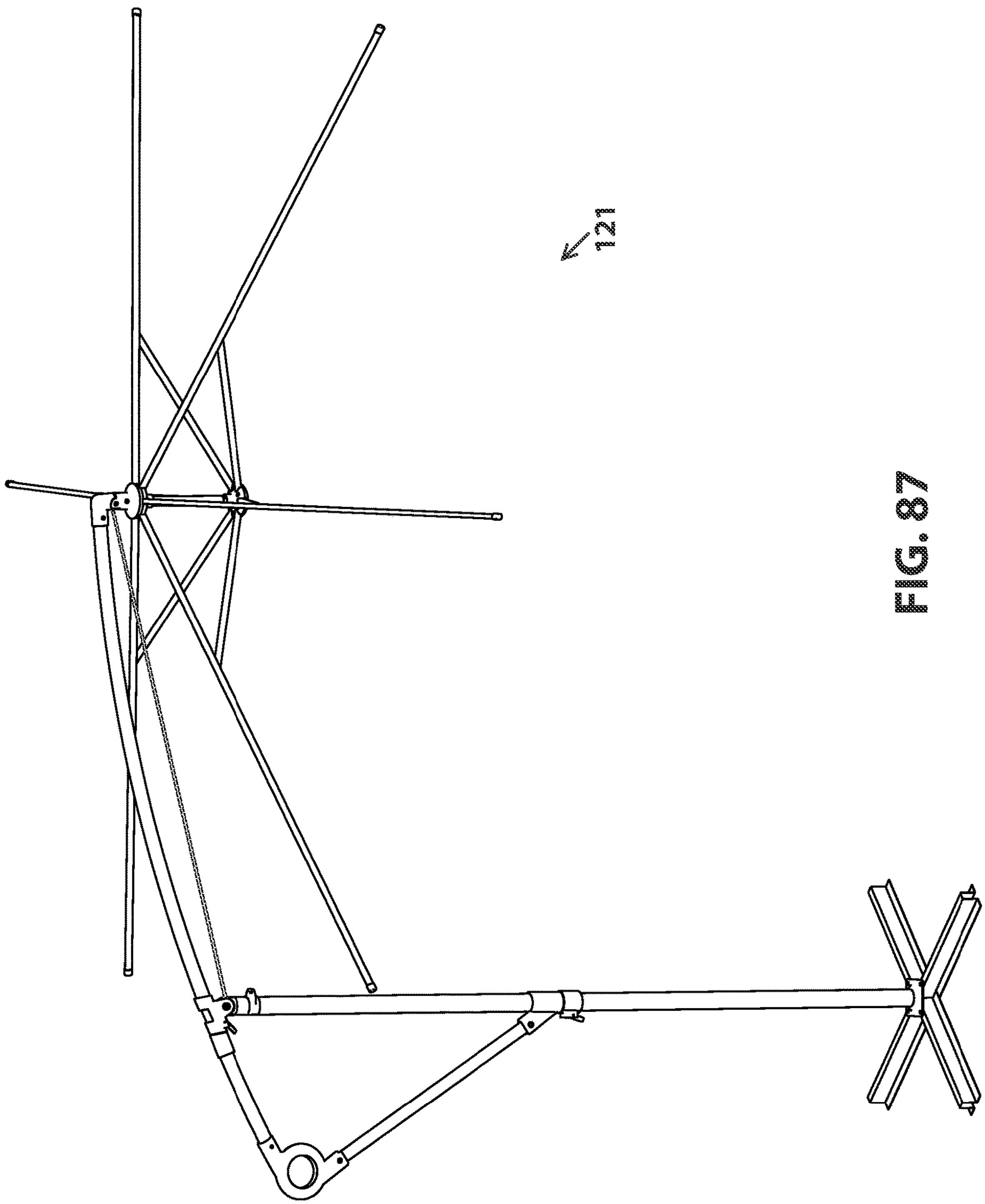
Figure 88:
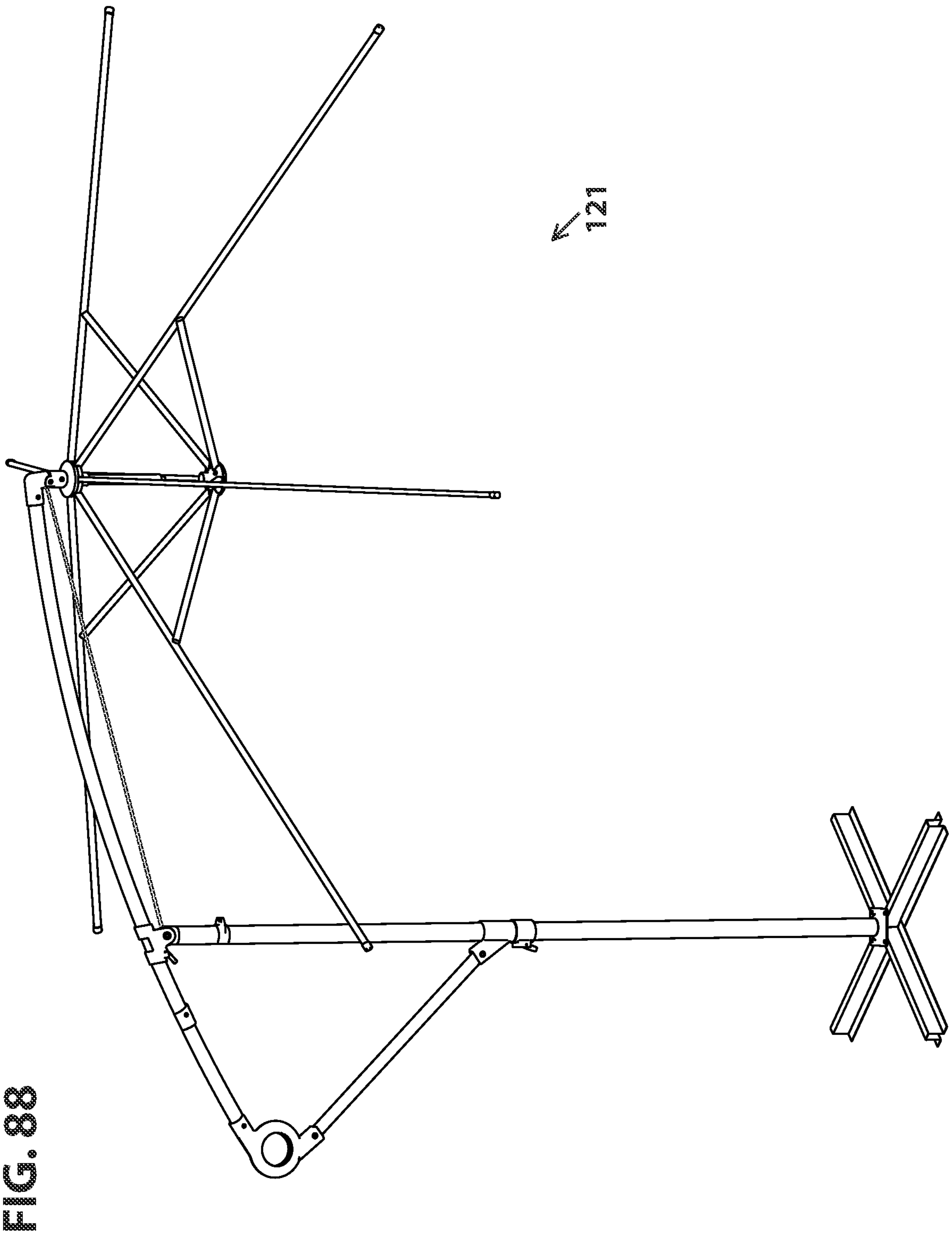
Figure 89:
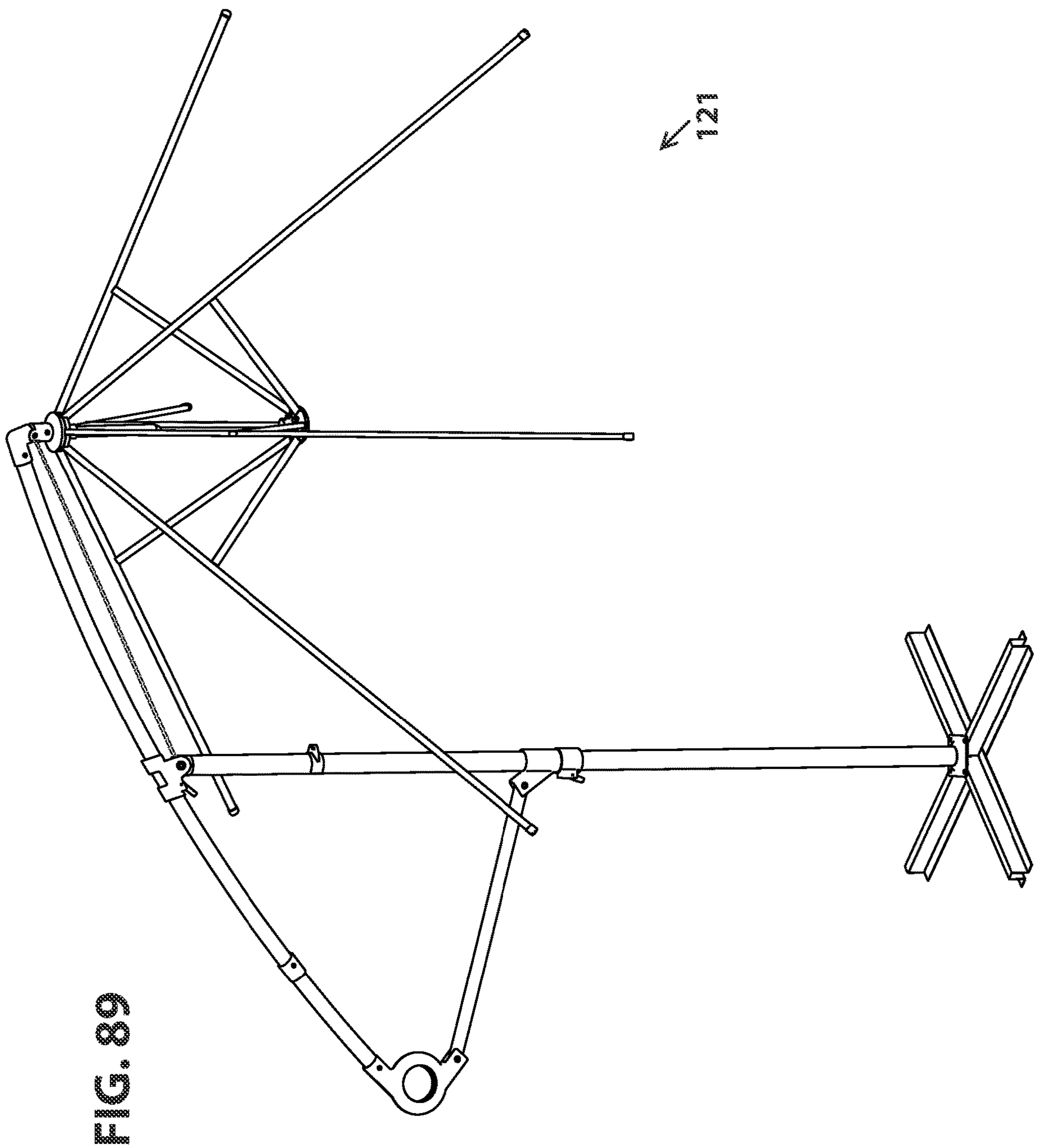
Figure 90:
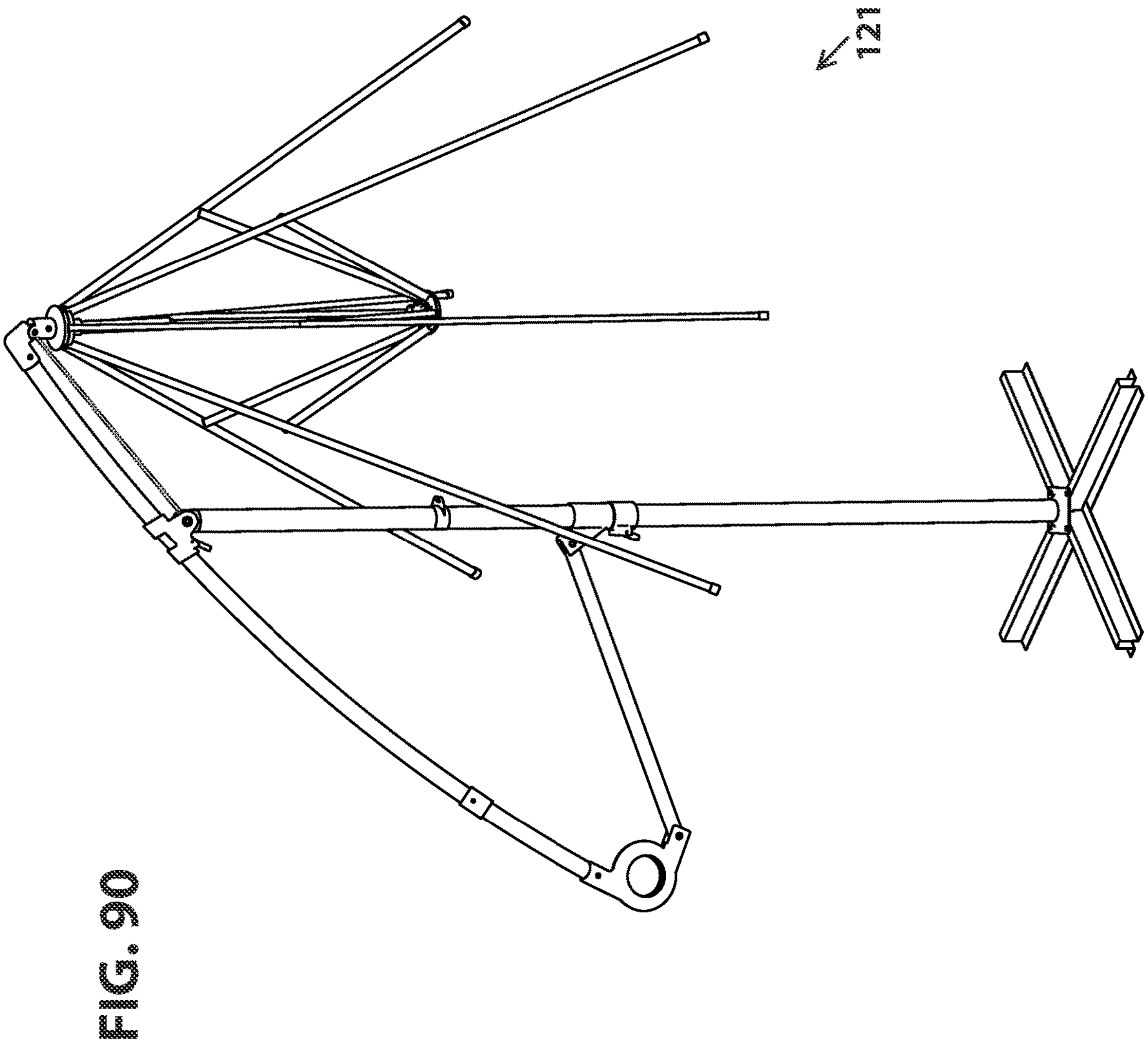
Figure 91:
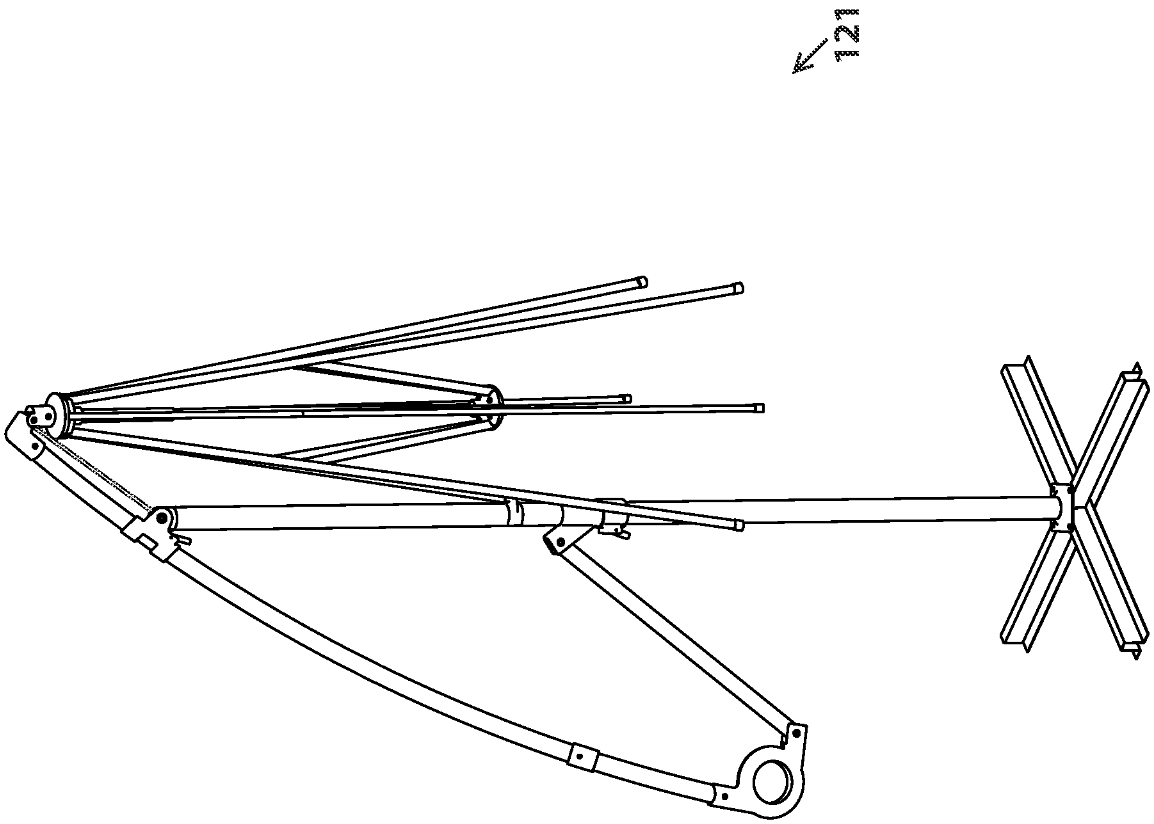
Figure 92:
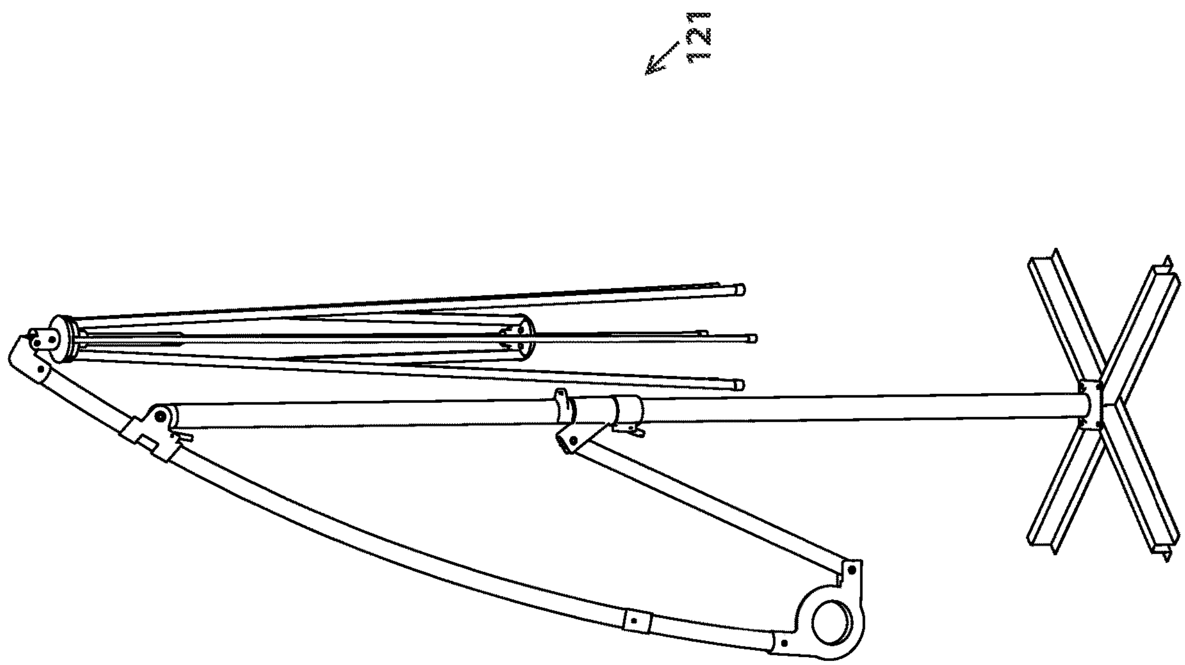
Figure 93:
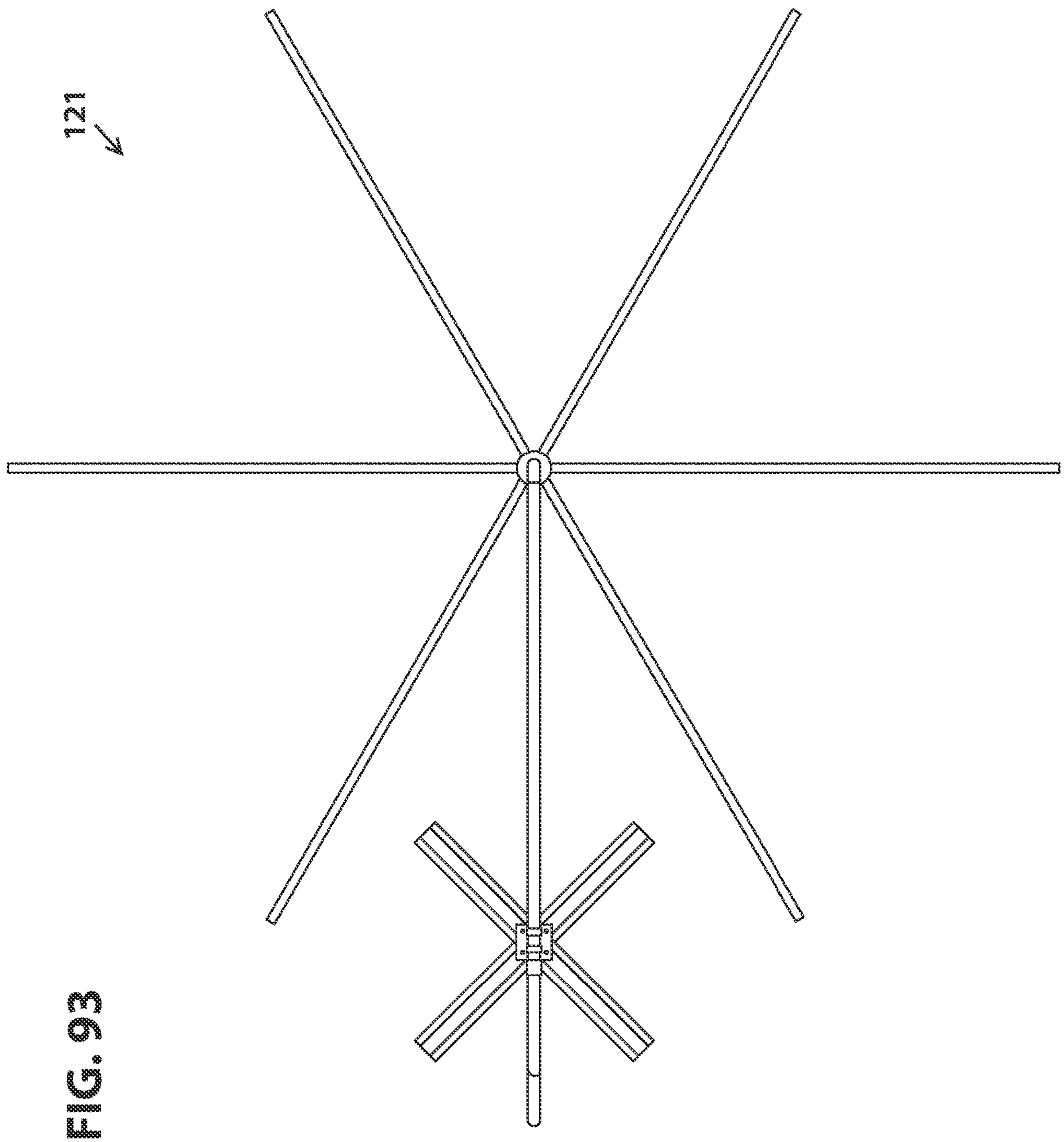
FIG. 93, FIG. 94, FIG. 95, FIG. 96, FIG. 97, and FIG. 98 illustrate partial top views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.
Figure 94:
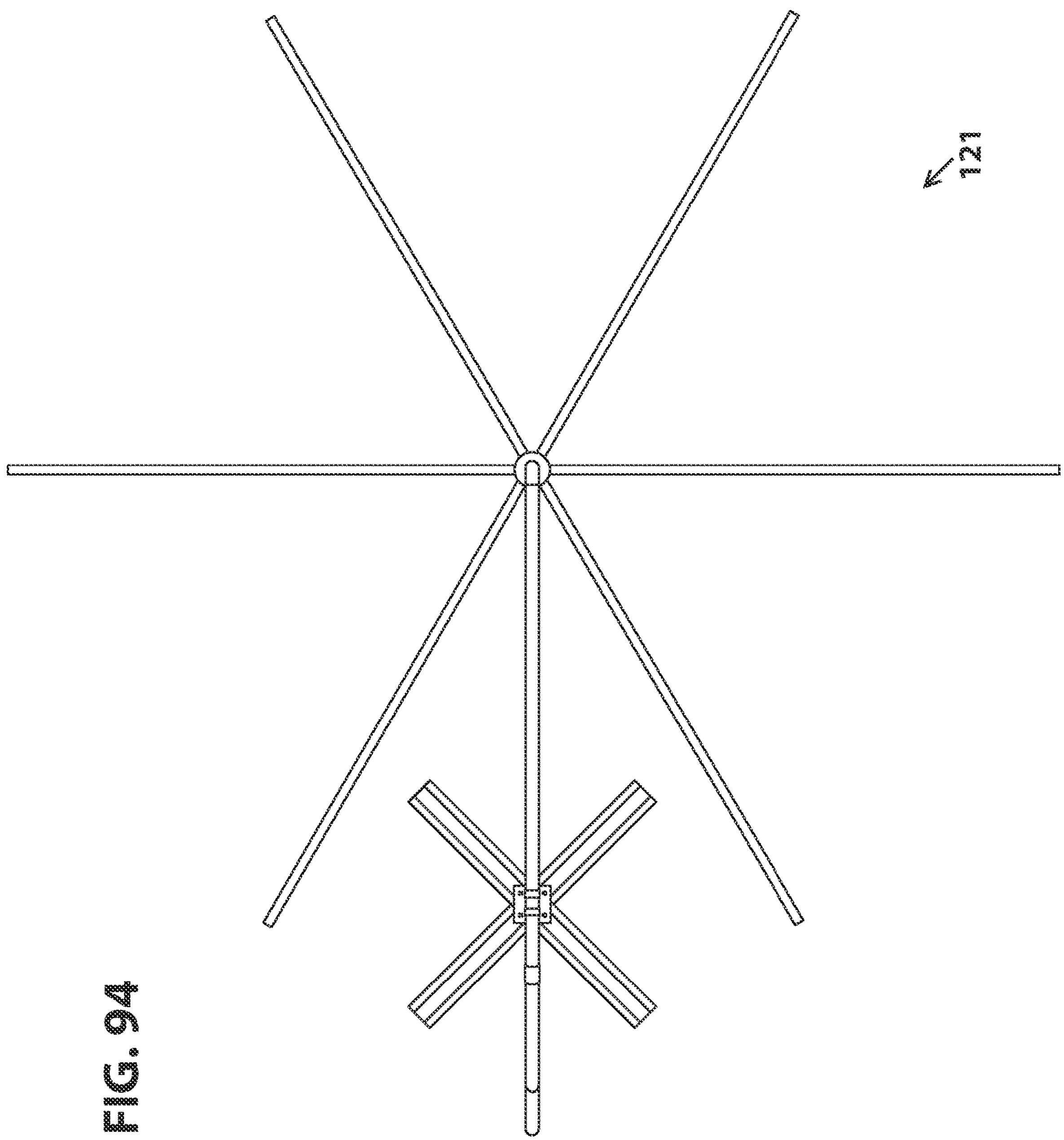
Figure 95:
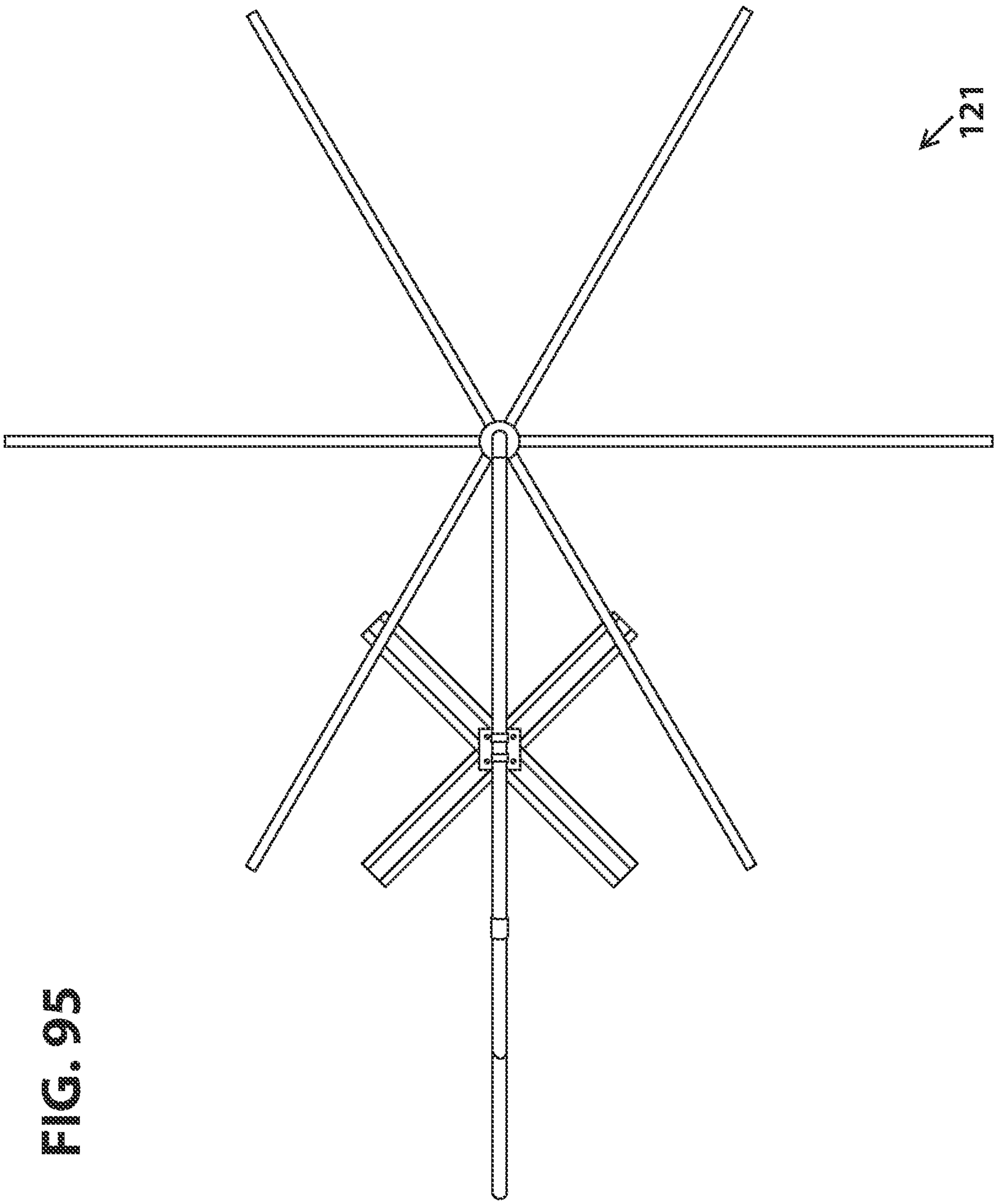
Figure 96:
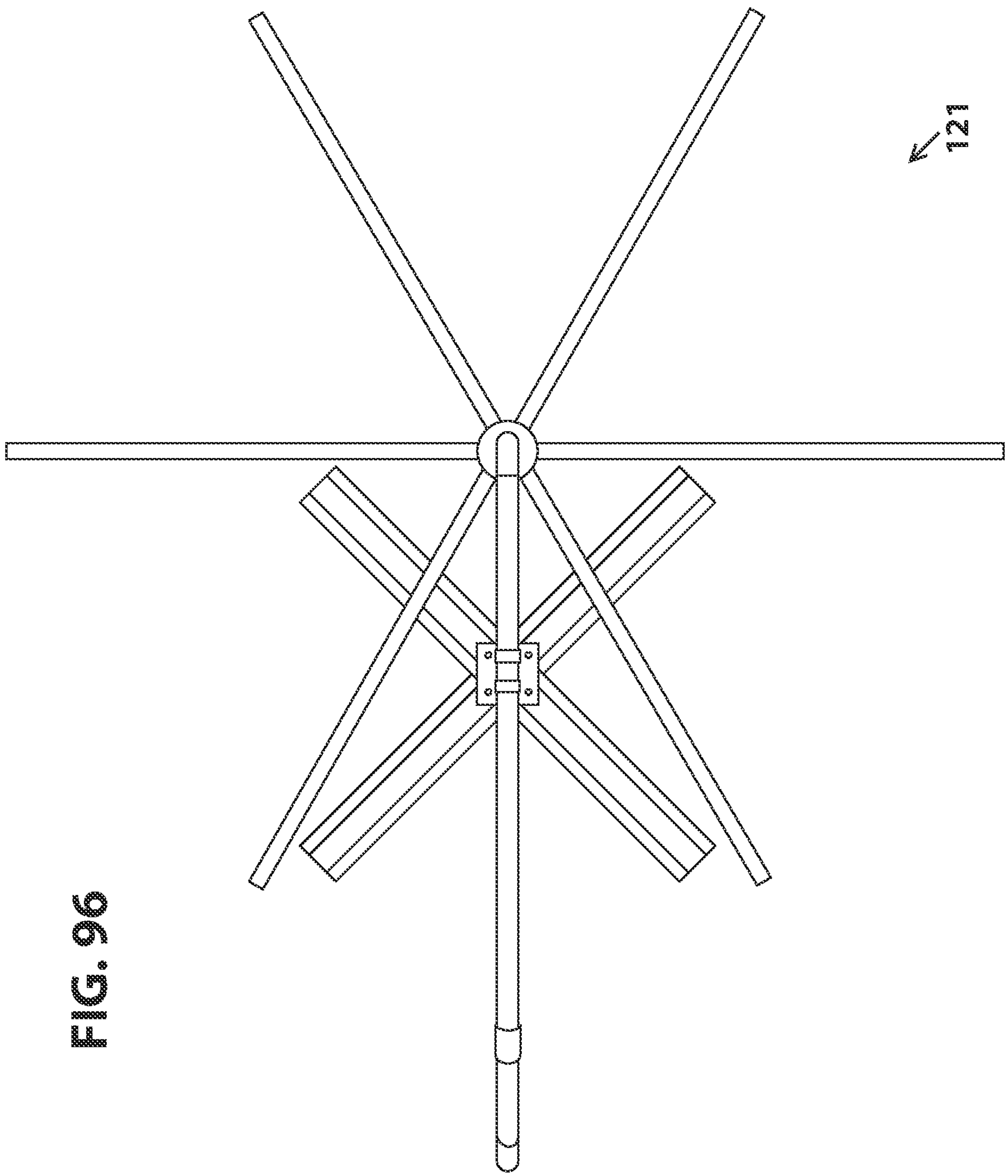
Figure 97:
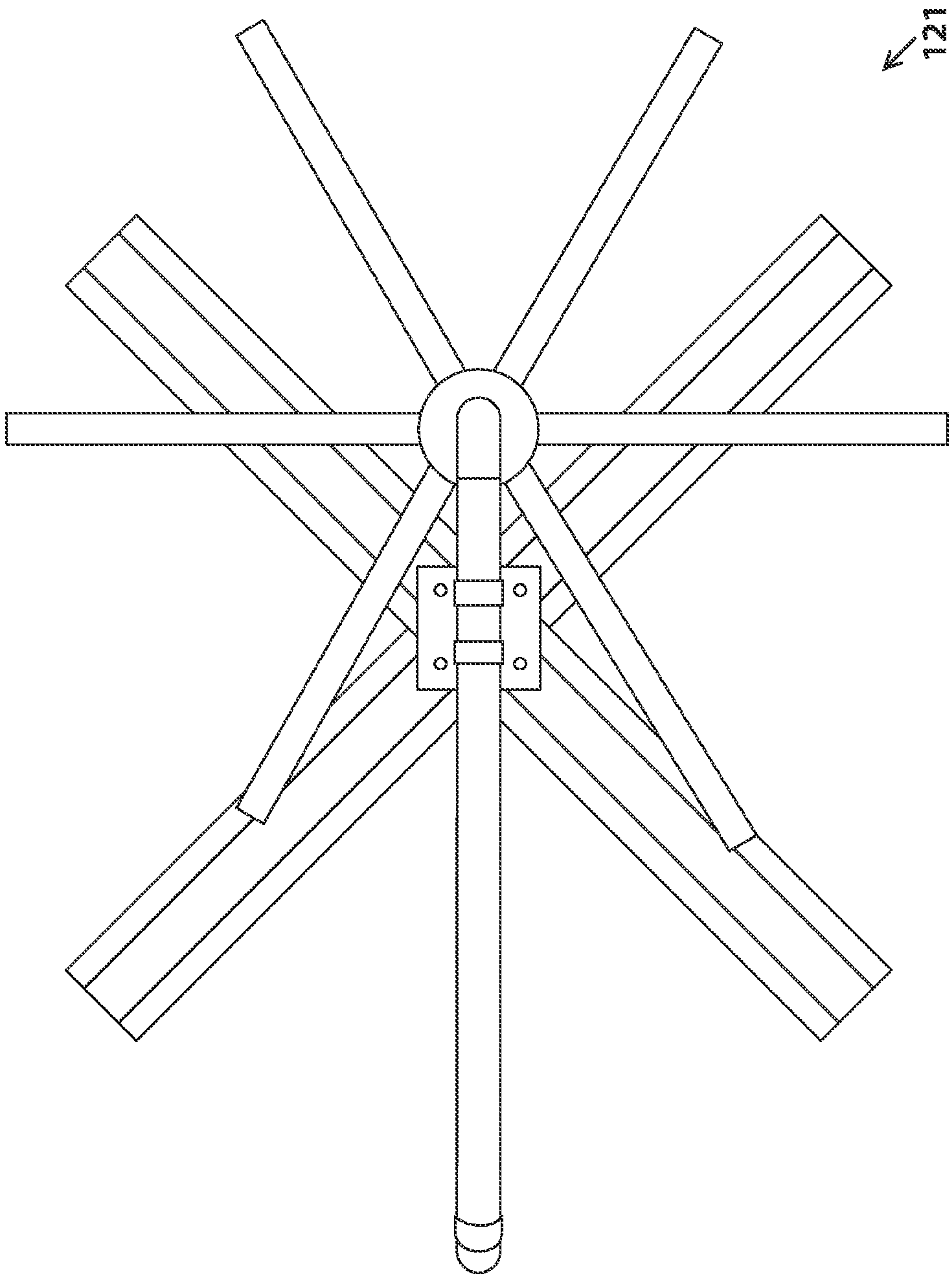
Figure 98:
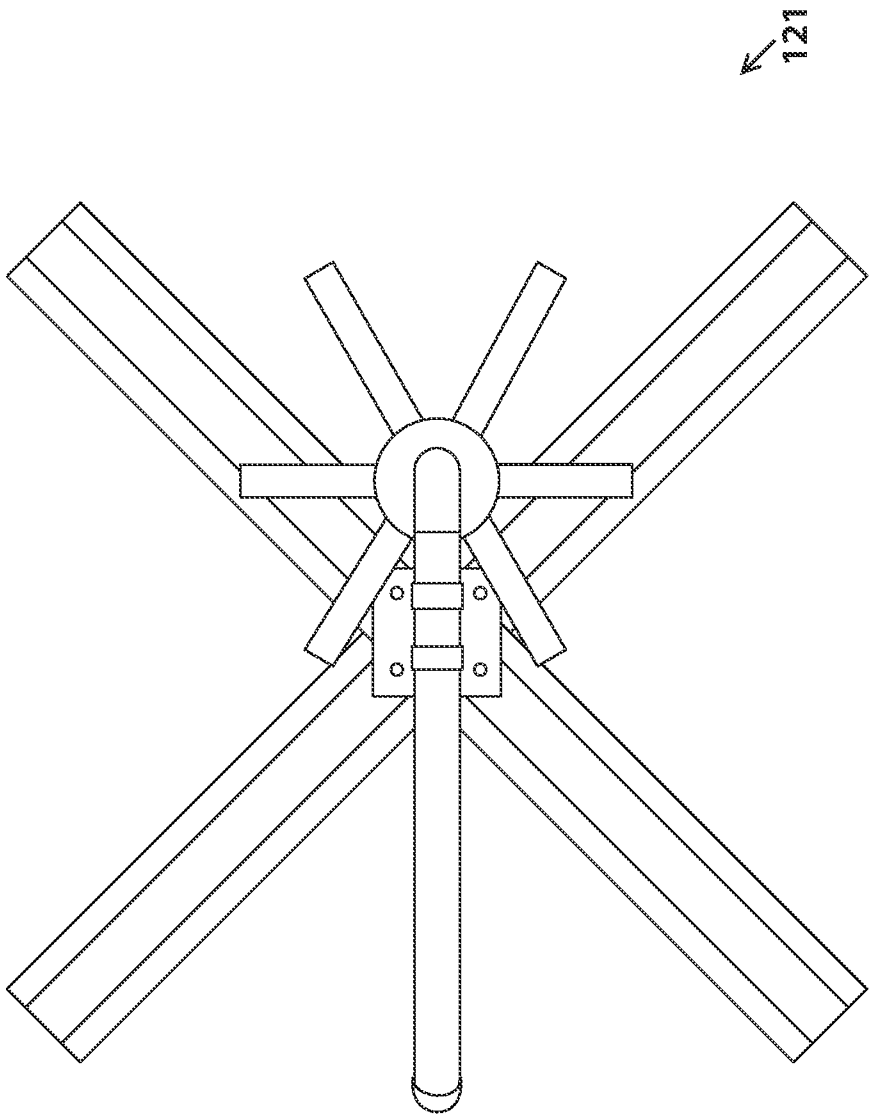
Figure 99:
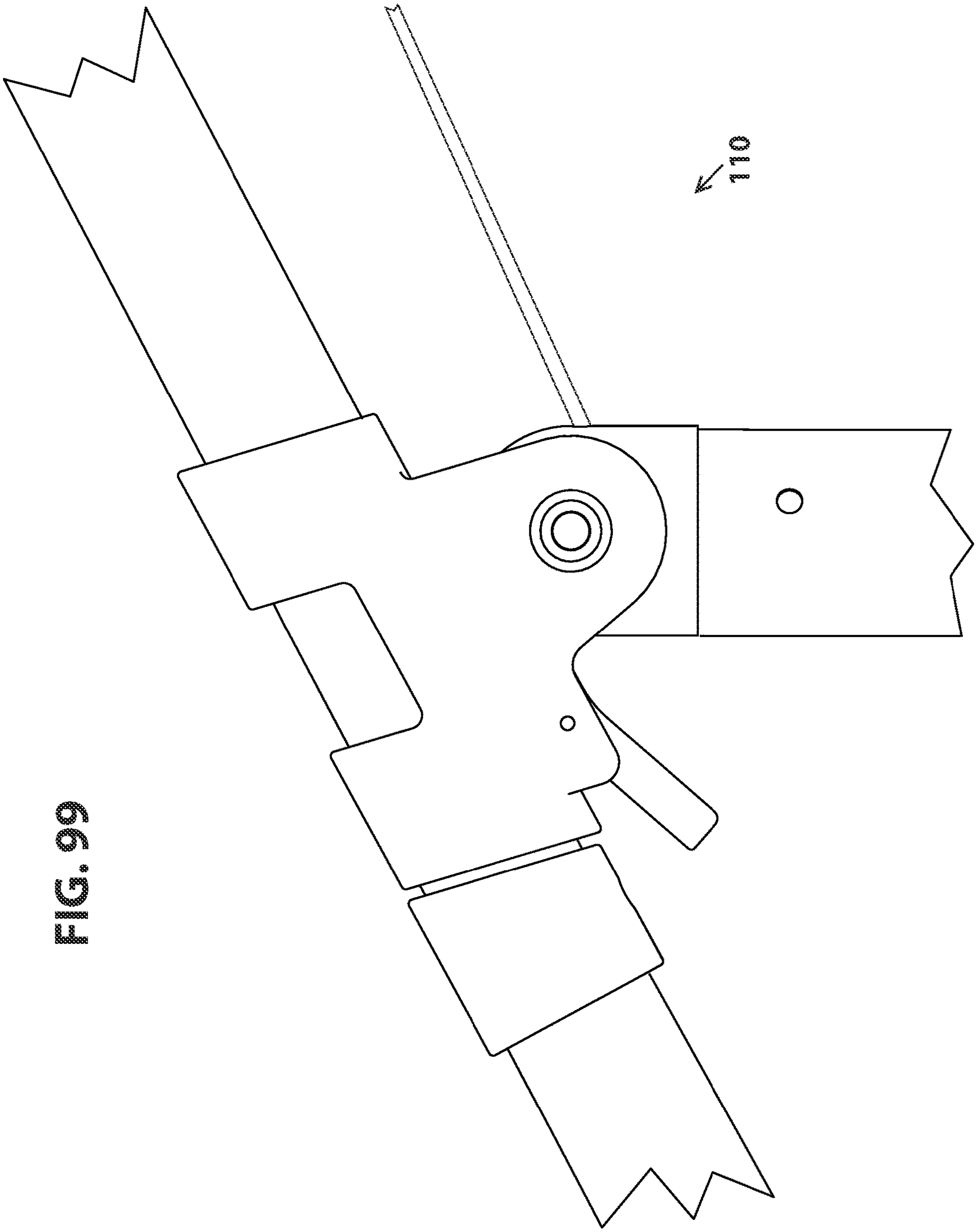
FIG. 99, FIG. 100, and FIG. 101 illustrate enlarged-partial side views of a variation of the physically-impaired-assisting arthritic-assisting single-hand-automatic-sail-deploying-and-retracting multi-direction-hoisting system 110.
Figure 100:
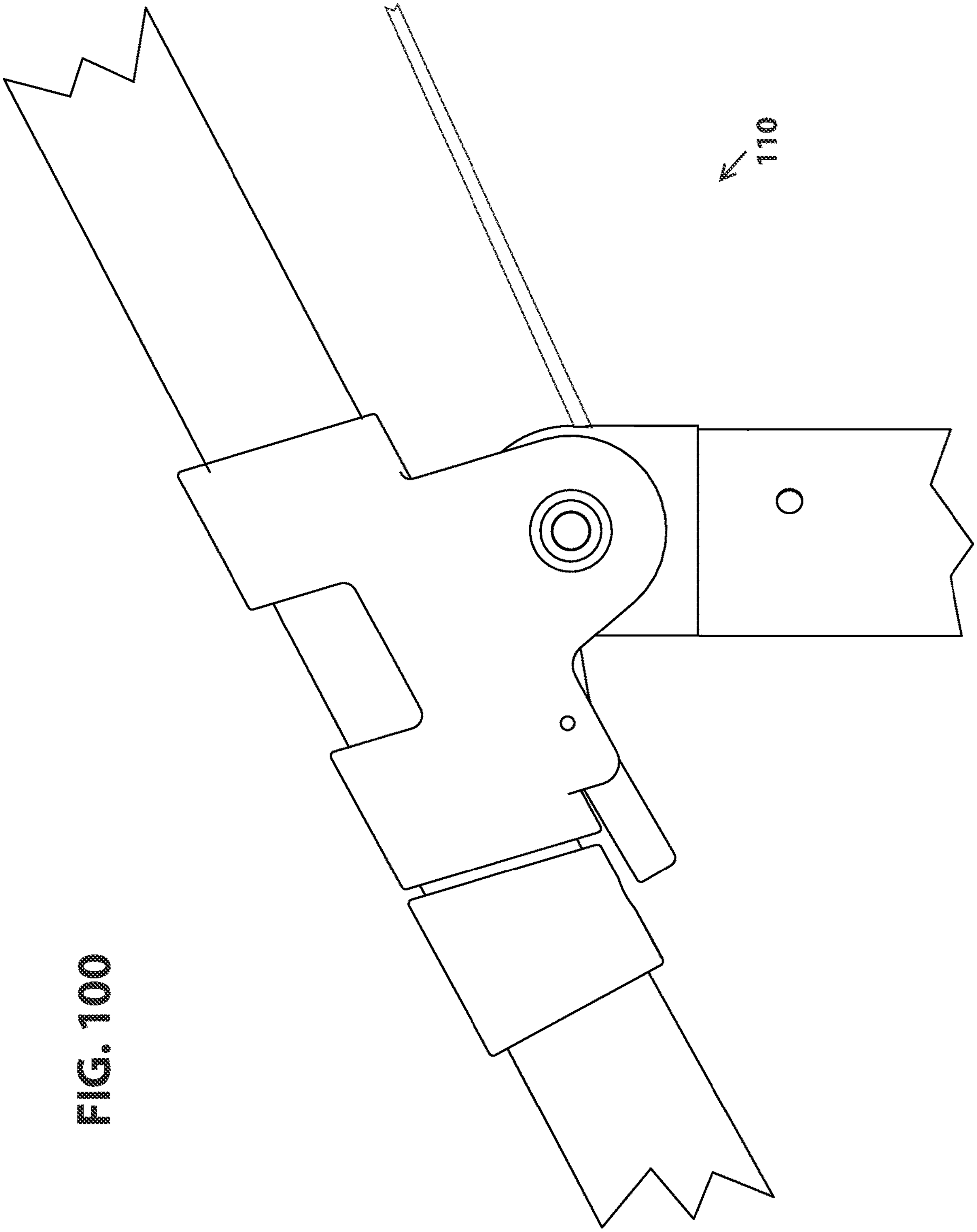
Figure 101:
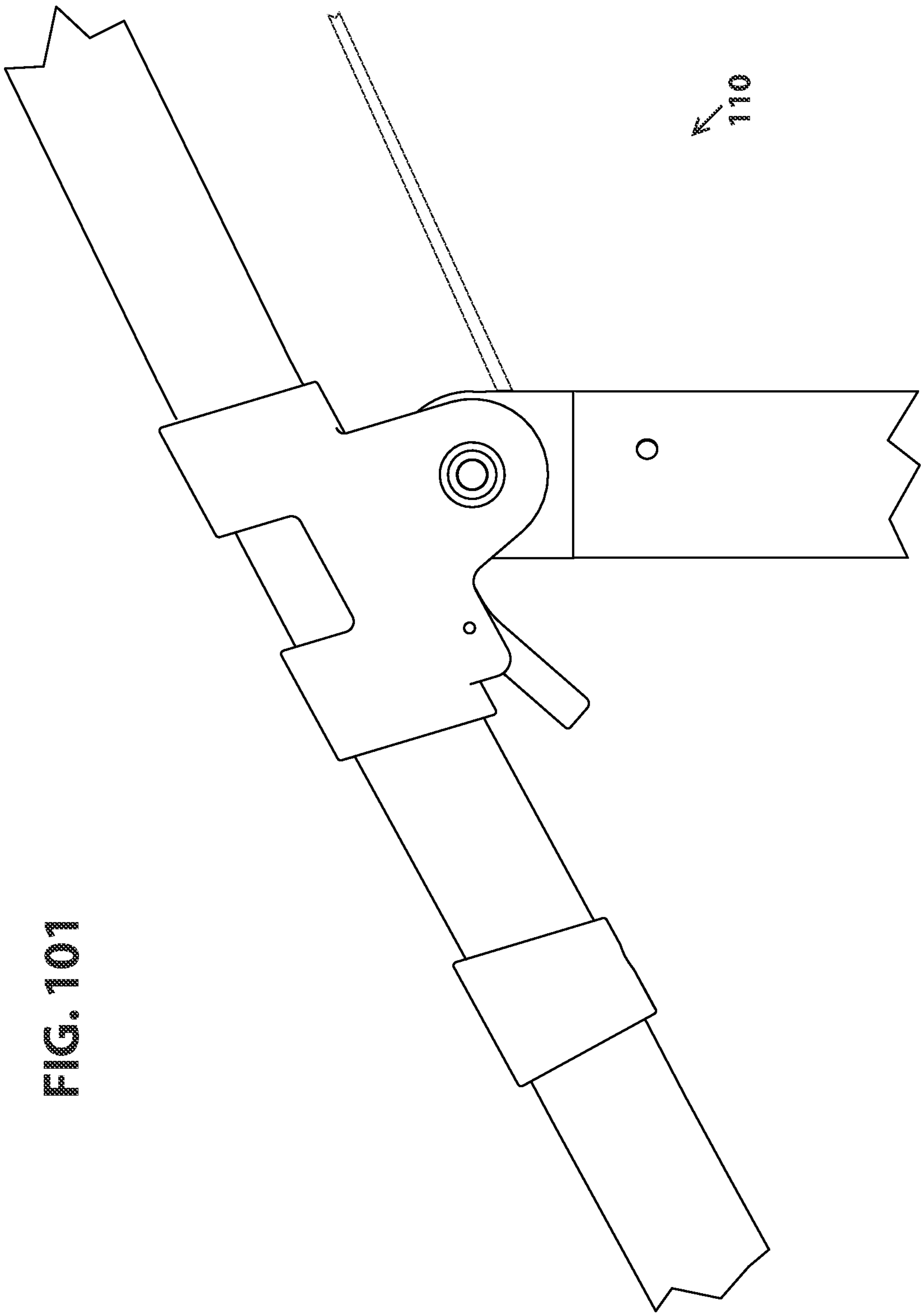
Figure 102:
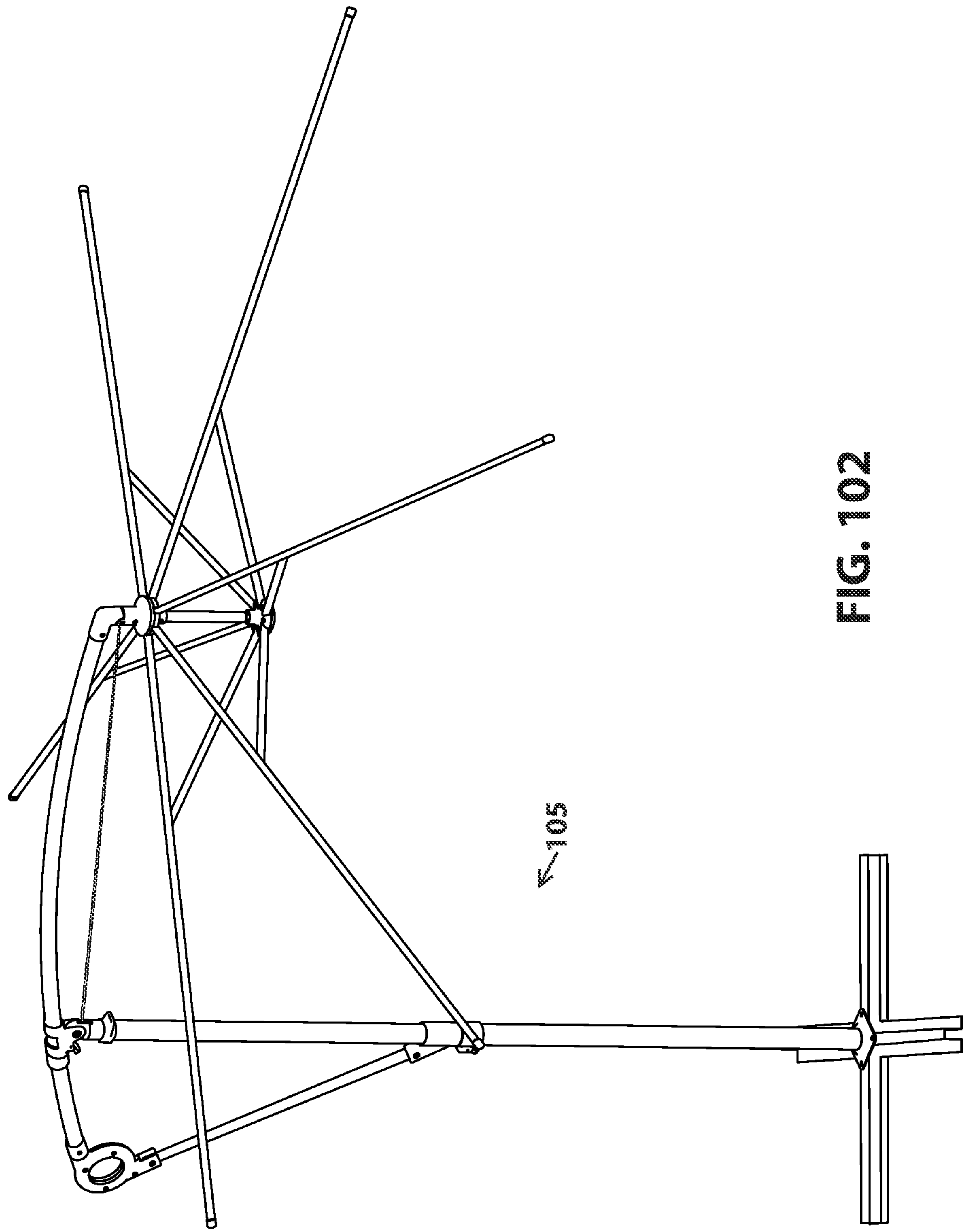
FIG. 102 and FIG. 103 illustrate perspective views of a variation of the horizontal-rotation-locking wind-catching-and-redirecting land-yacht-maneuvering system 105 providing means to rotate the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121.
Figure 103:
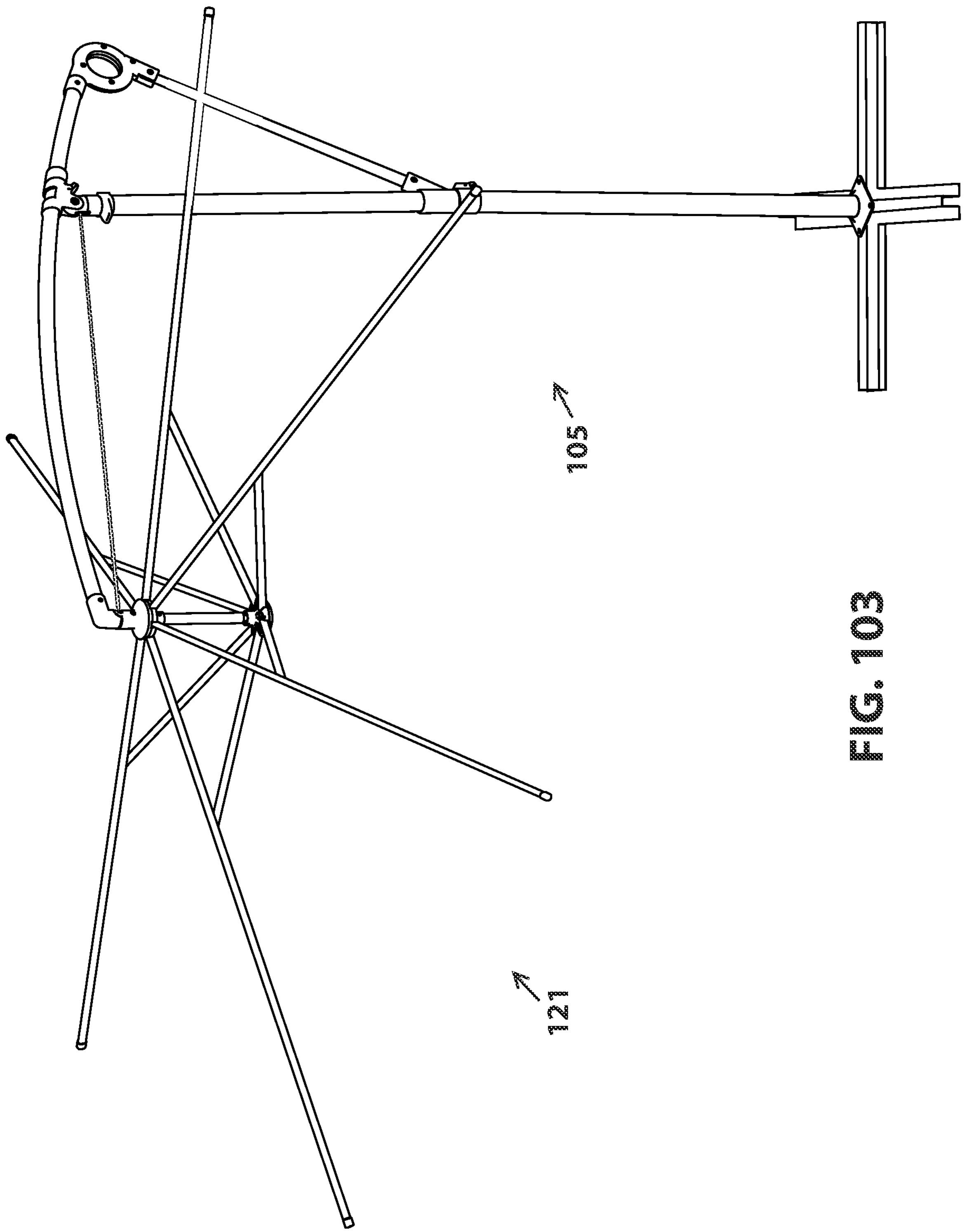

FIG. 68 illustrates an enlarged-partial view of a variation of the physically-impaired-assisting arthritic-assisting single-hand-automatic-sail-deploying-and-retracting multi-direction-hoisting system 110. FIG. 69, FIG. 70, FIG. 71, FIG. 72, FIG. 73, and FIG. 74 illustrate partial side views of variations of a sequence demonstrating the opening of the wind-catching-and-redirecting rainwater-amassing-and-storing garden-irrigating fruit-harvesting panorama-media-screen-capable land-yacht-powering sail system 121. FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, and FIG. 92 illustrate side and partial perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment. FIG. 93, FIG. 94, FIG. 95, FIG. 96, FIG. 97, and FIG. 98 illustrate partial top views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment. FIG. 99, FIG. 100, and FIG. 101 illustrate enlarged-partial side views of a variation of the physically-impaired-assisting arthritic-assisting single-hand-automatic-sail-deploying-and-retracting multi-direction-hoisting system 110. FIG. 102 and FIG. 103 illustrate perspective views of a variation of the horizontal-rotation-locking wind-catching-and-redirecting land-yacht-maneuvering system 105 providing means to rotate the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121.

Figure 104:
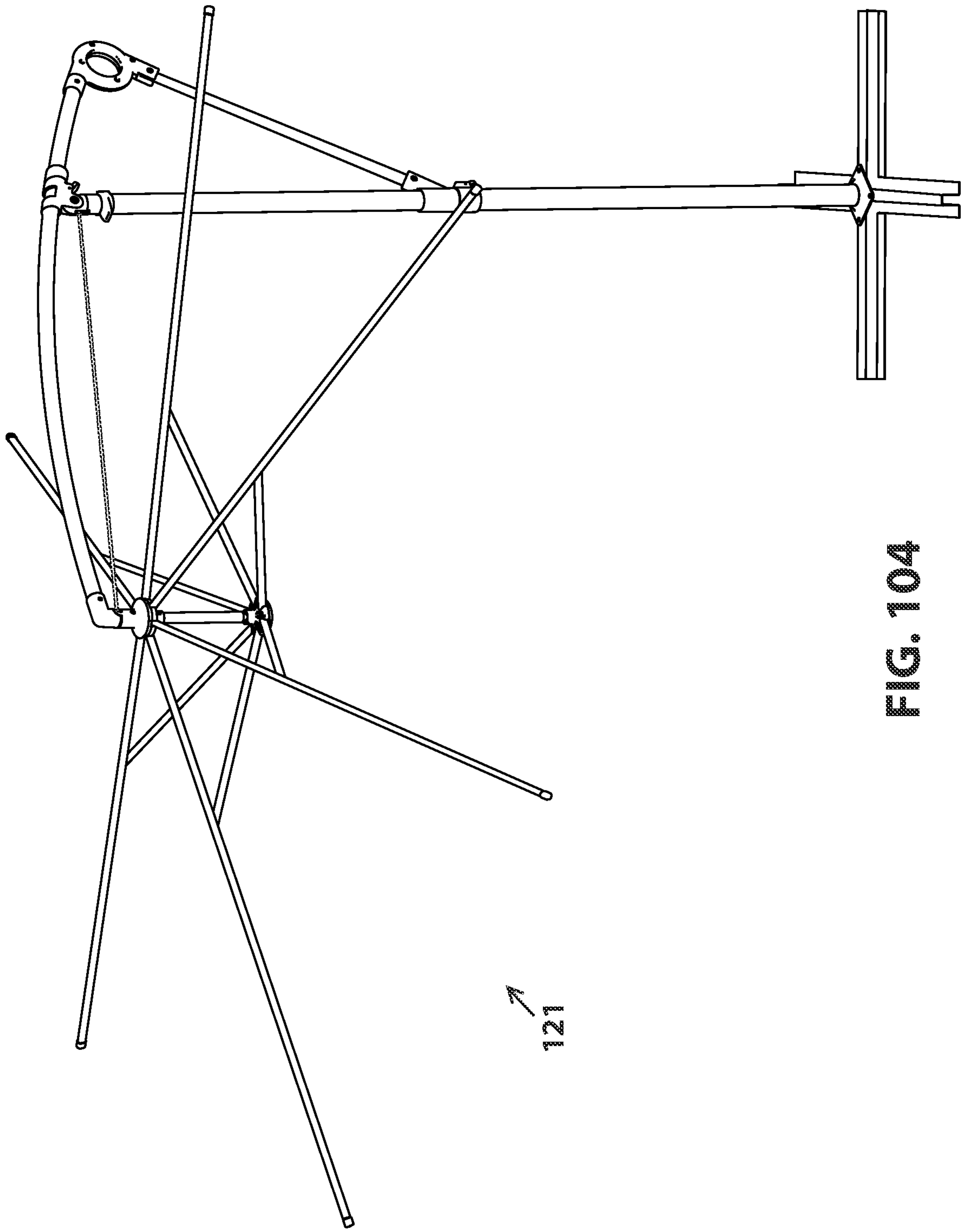
FIG. 104 illustrates a perspective view of a variation of the wind-catching-and-redirecting rainwater-amassing-and-storing garden-irrigating fruit-harvesting panorama-media-screen-capable land-yacht-powering sail system 121.
Figure 105:
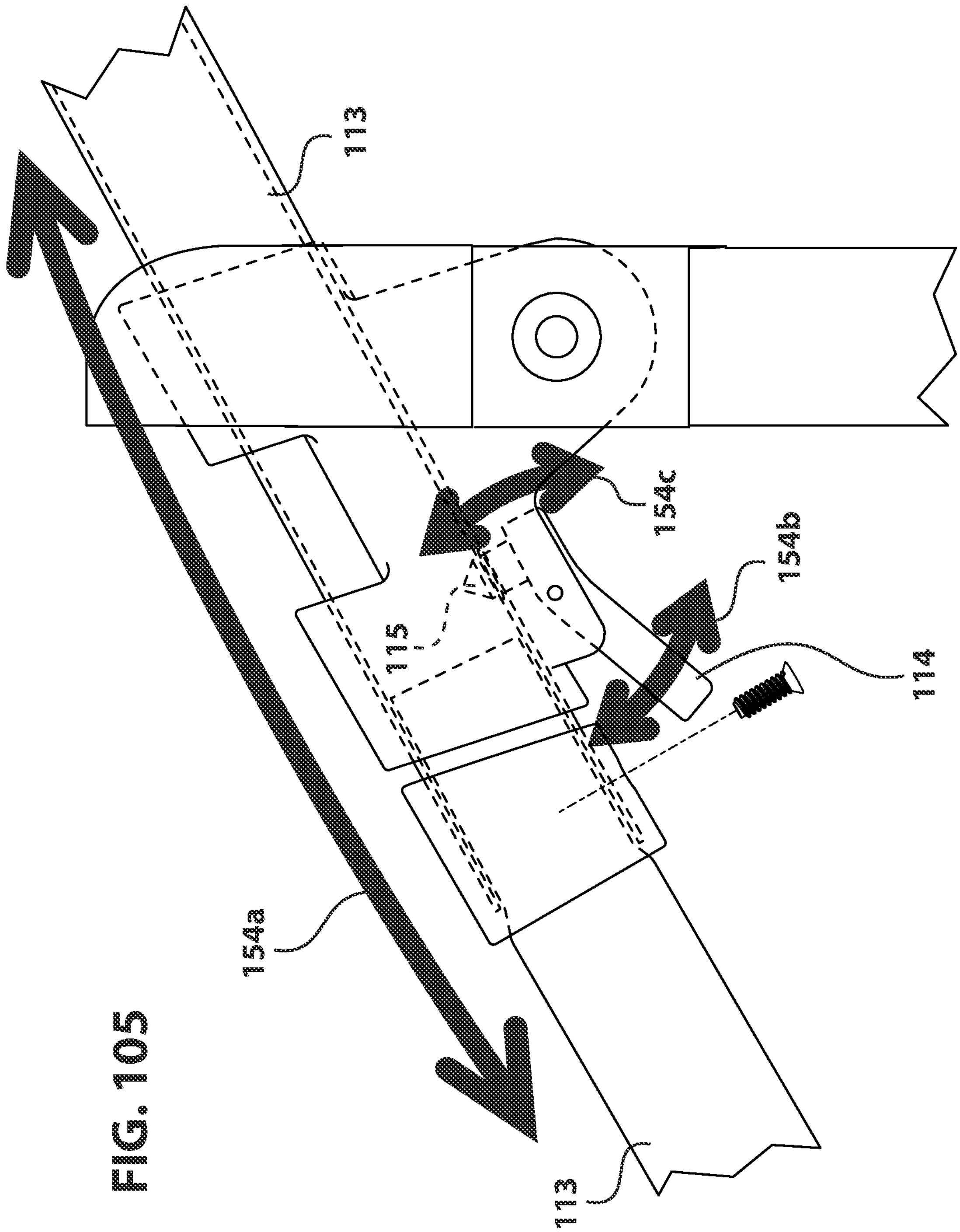
FIG. 105 illustrates a side view of a variation of the physically-impaired-assisting arthritic-assisting single-hand-automatic-sail-deploying-and-retracting multi-direction-hoisting system 110.
Figure 106:
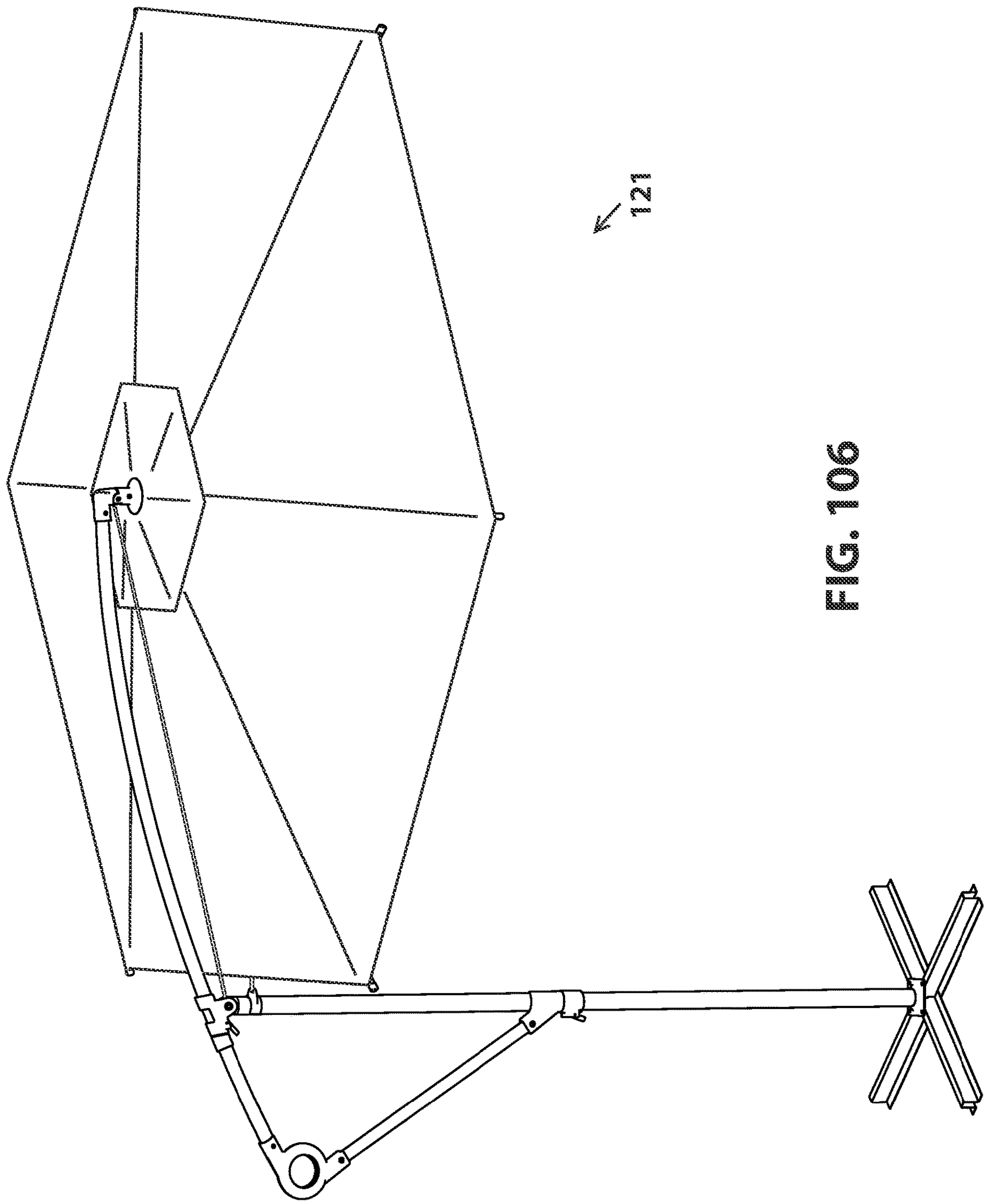
FIG. 106, FIG. 107, FIG. 108, FIG. 109, and FIG. 110 illustrate perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, including wind-catching-and-redirecting rainwater-amassing-and-storing garden-irrigating fruit-harvesting panorama-media-screen-capable land-yacht-powering sail 123, demonstrating varying degrees of deployment.
Figure 107:
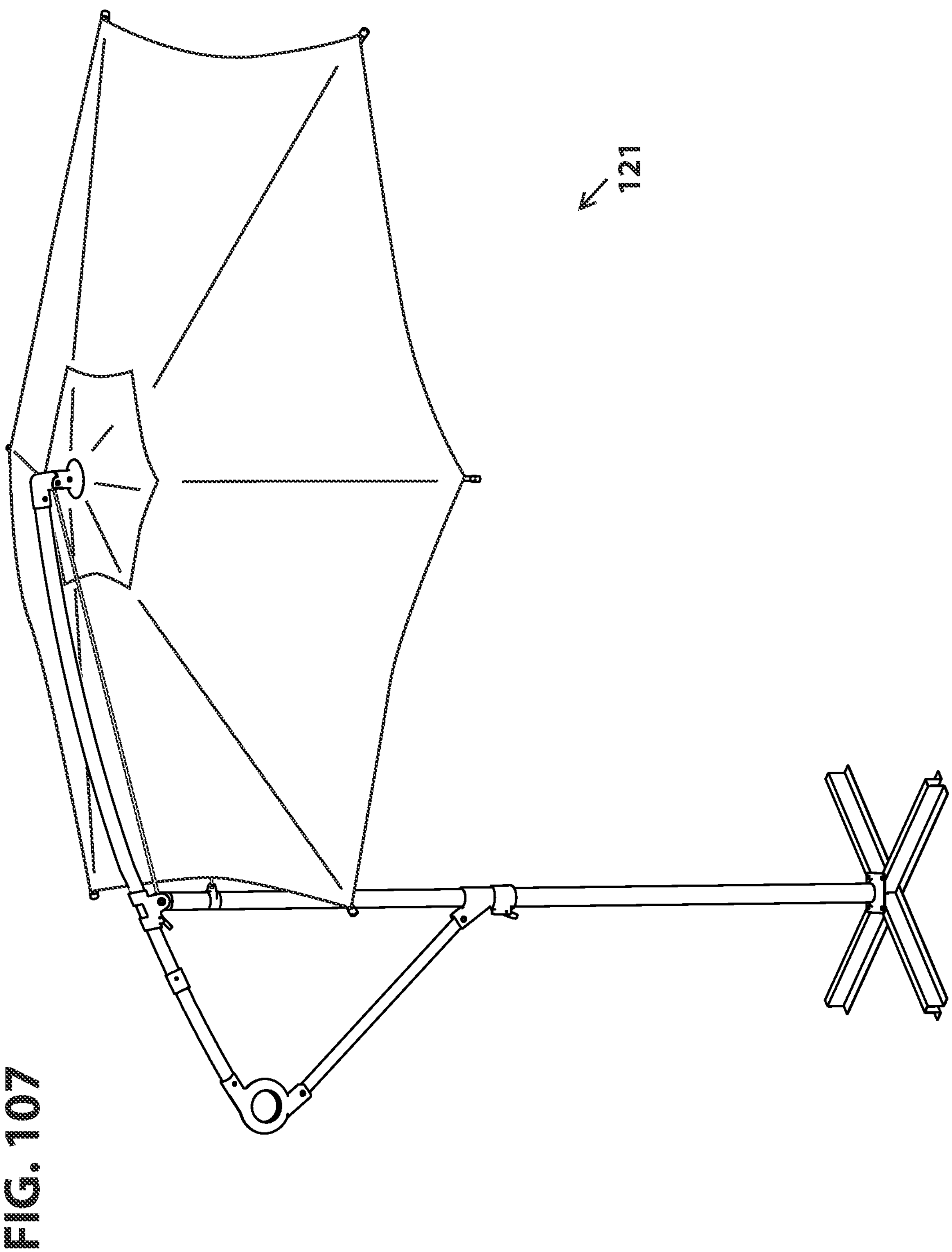
Figure 108:
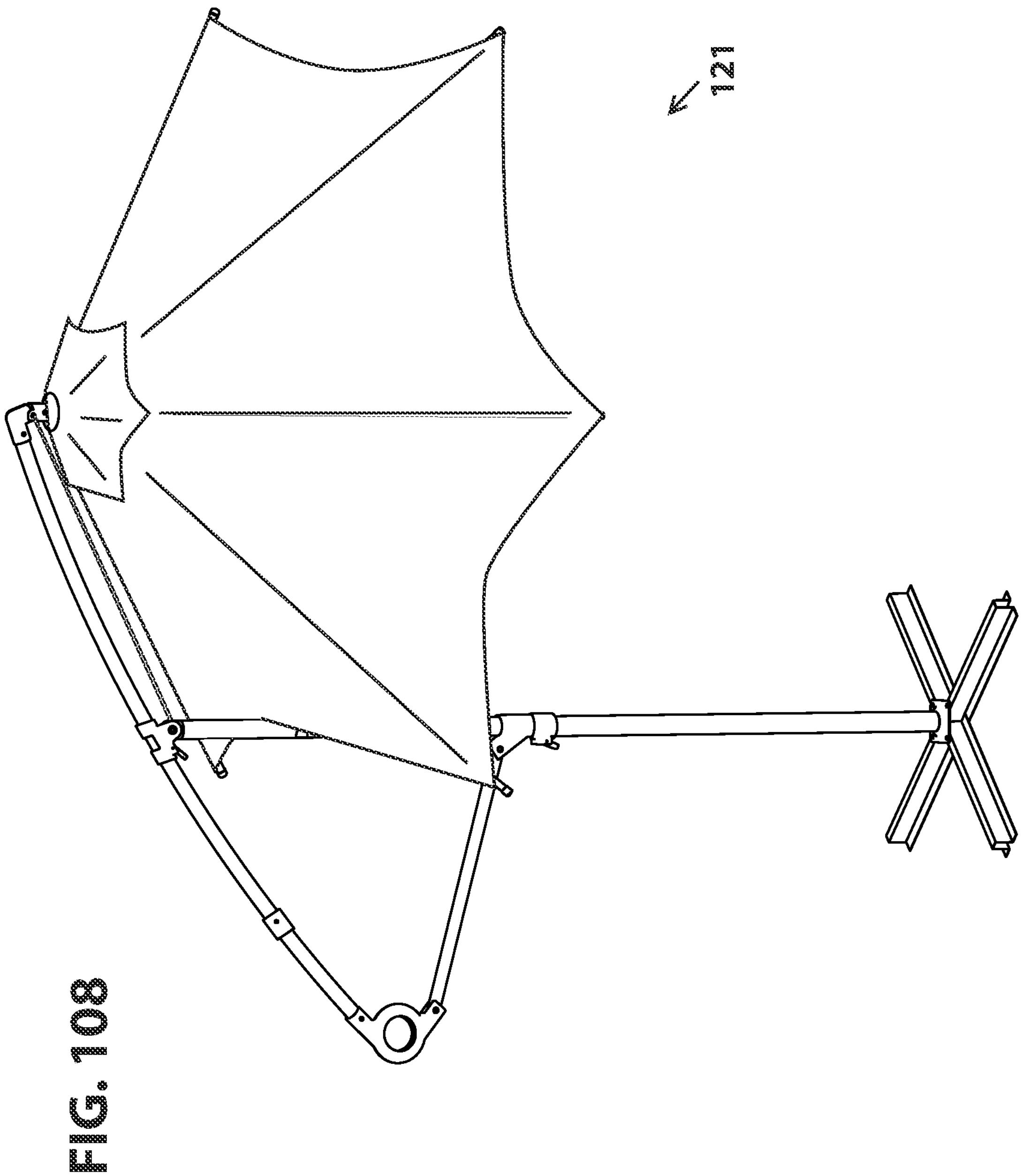
Figure 109:
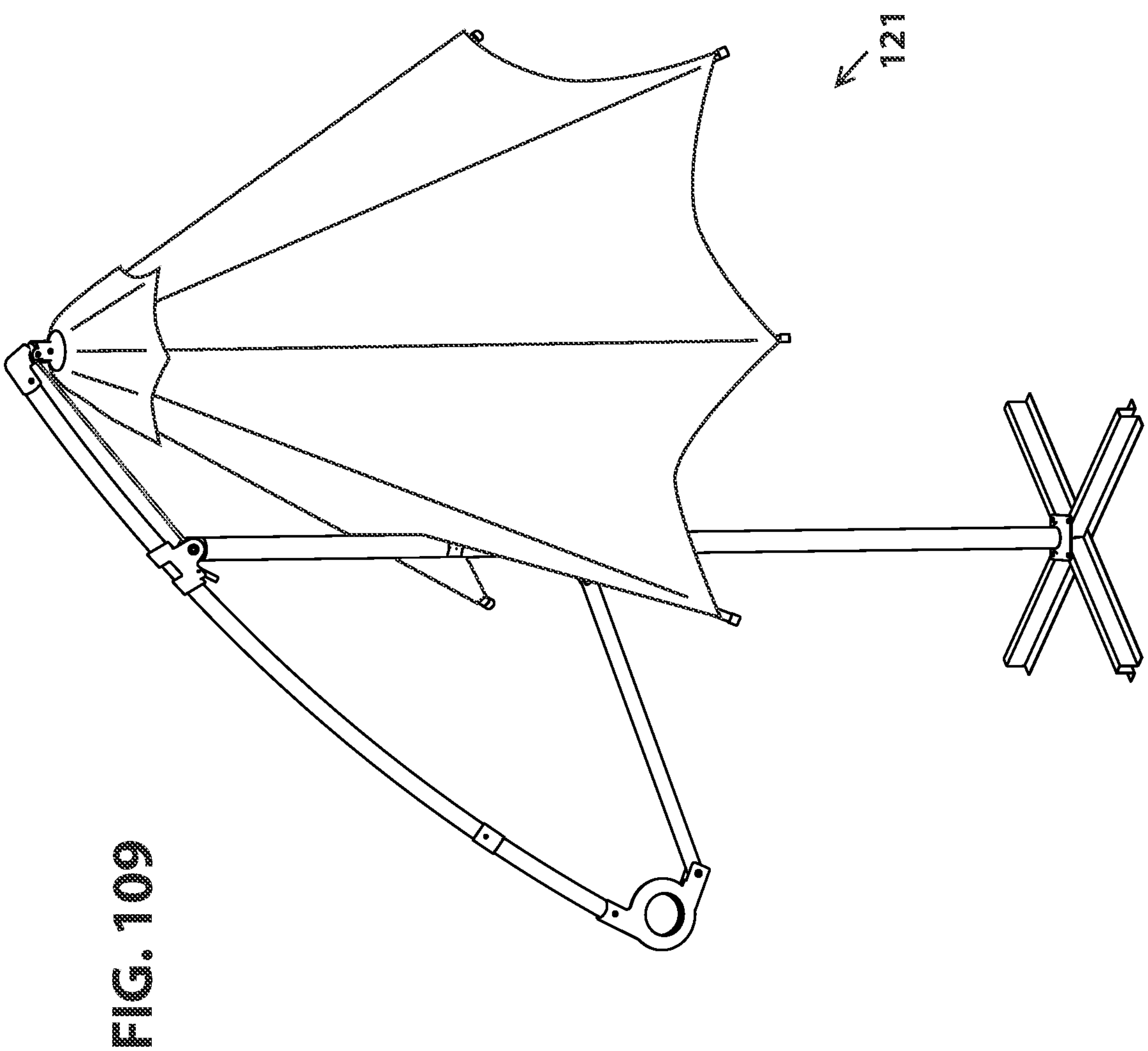
Figure 110:
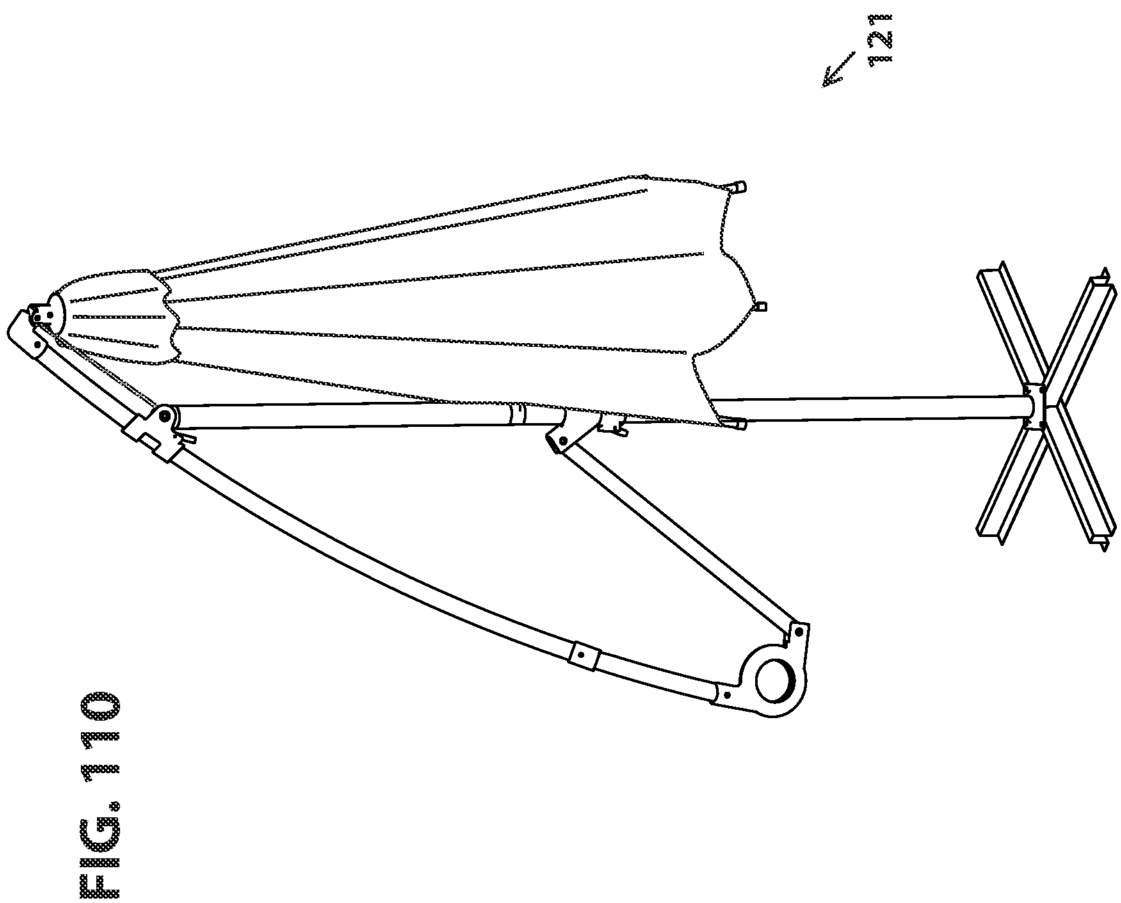

FIG. 104 illustrates a perspective view of a variation of the wind-catching-and-redirecting rainwater-amassing-and-storing garden-irrigating fruit-harvesting panorama-media-screen-capable land-yacht-powering sail system 121. FIG. 105 illustrates a side view of a variation of the physicallyimpaired-assisting arthritic-assisting single-hand-automatic-sail-deploying-and-retracting multi-direction-hoisting system 110. FIG. 106, FIG. 107, FIG. 108, FIG. 109, and FIG. 110 illustrate perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, including wind-catching-and-redirecting rainwater-amassing-and-storing garden-irrigating fruit-harvesting panorama-media-screen-capable land-yacht-powering sail 123, demonstrating varying degrees of deployment.

Figure 111:
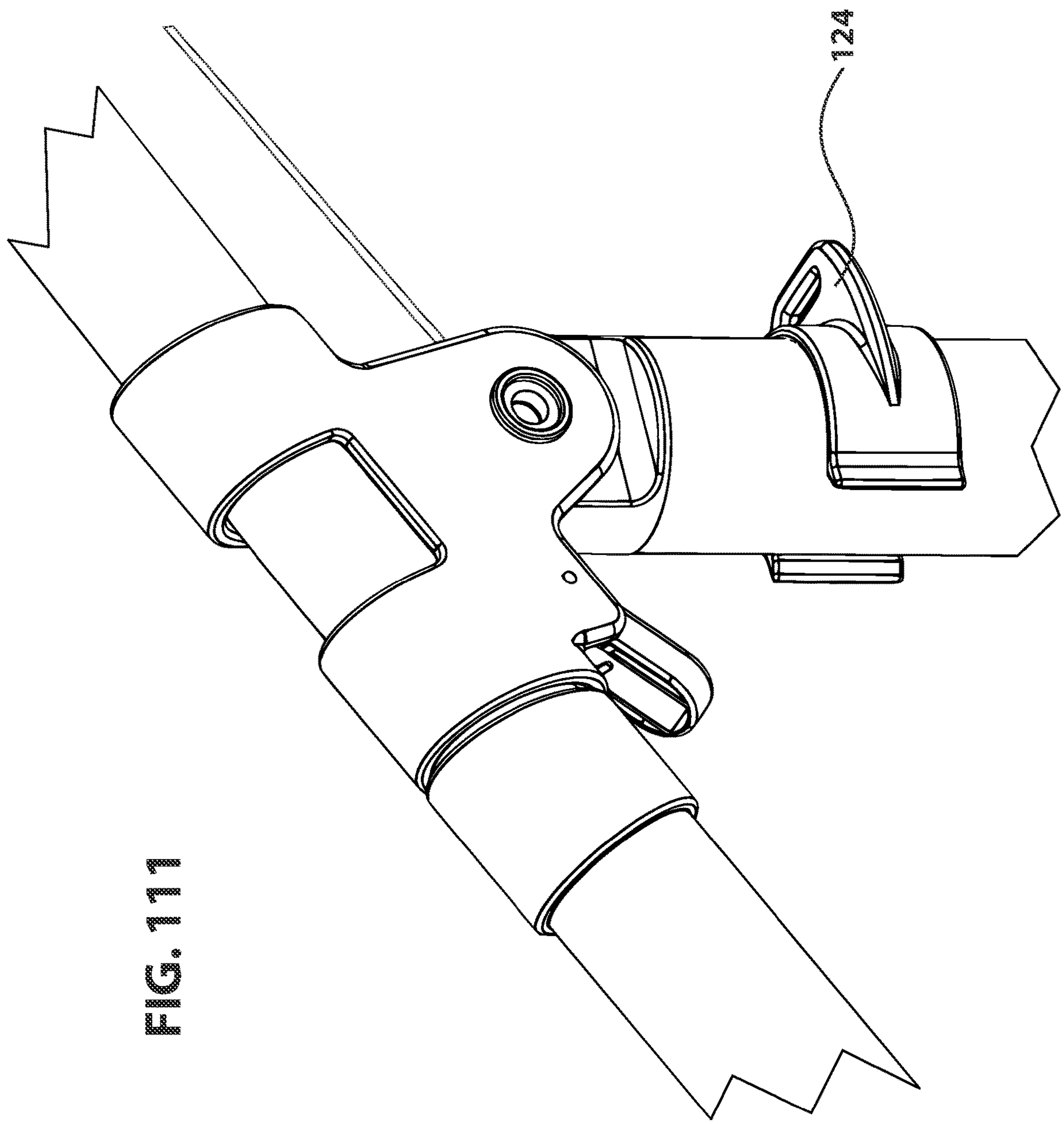
FIG. 111 and FIG. 112 illustrate enlarged perspective and side views of a variation of the sail-location-securing adjustable removable clip 124.
Figure 112:
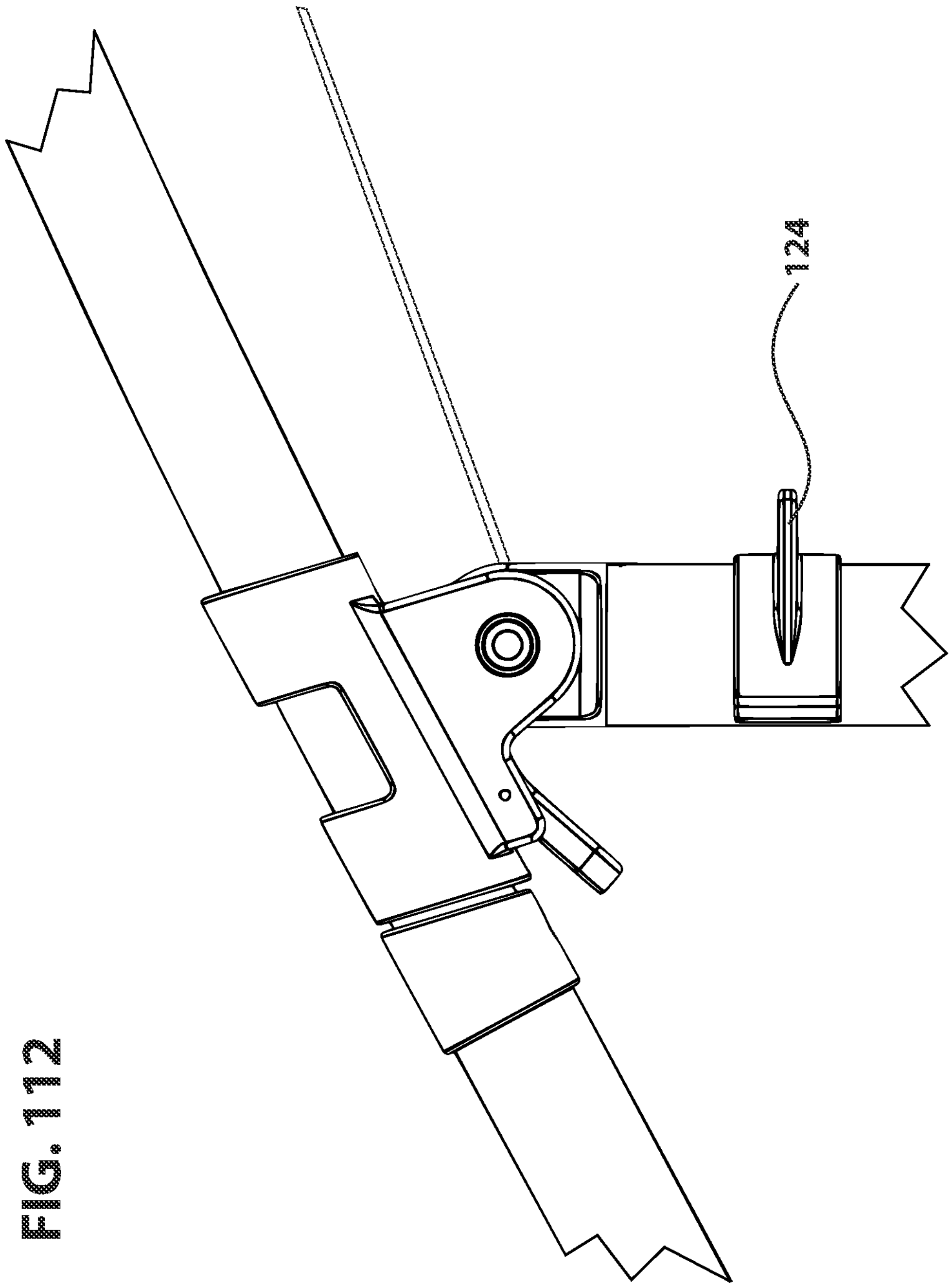
Figure 113:
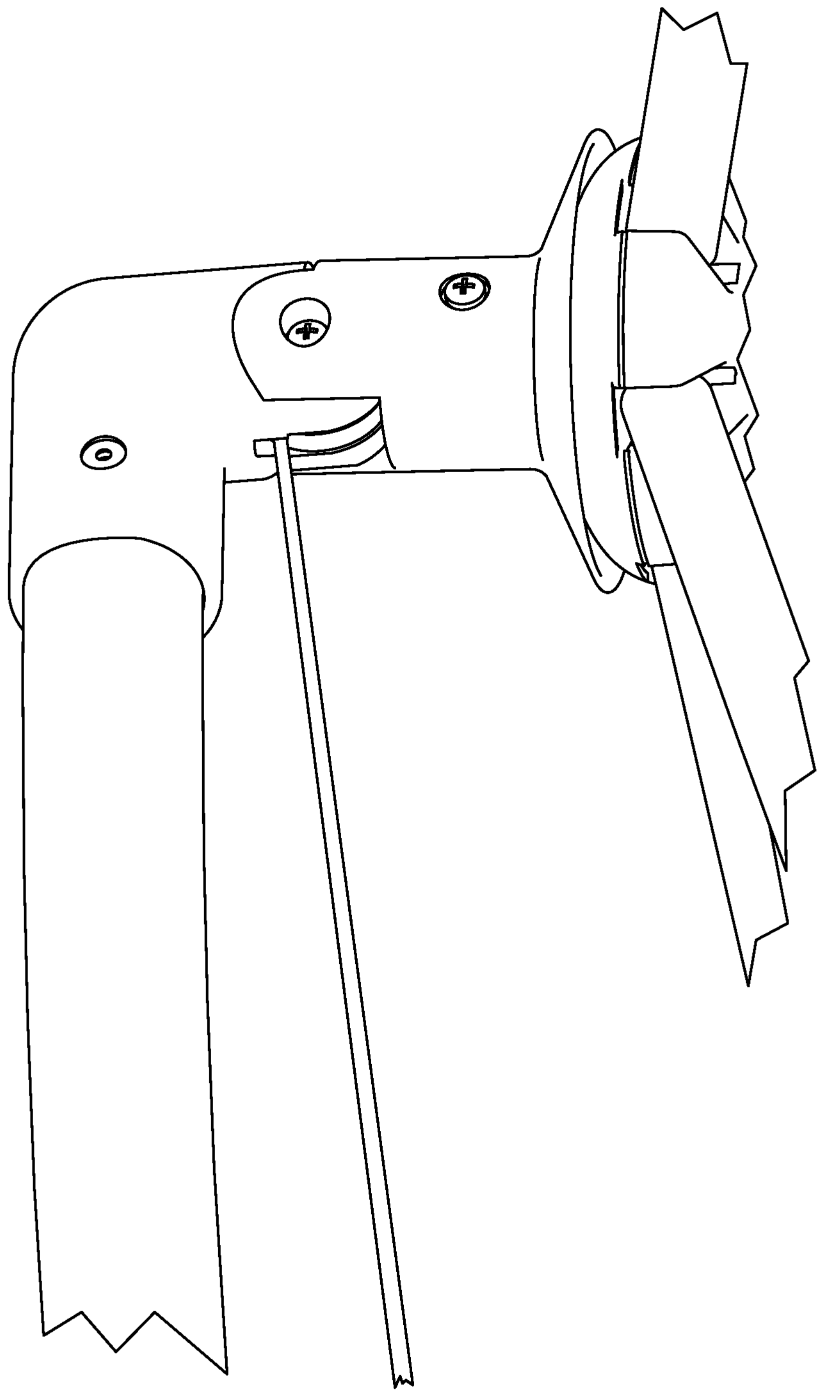
FIG. 113 and FIG. 114 illustrate enlarged perspective and side views of variations of the physically-impaired-assisting arthritic-assisting single-hand-automatic-sail-deploying-and-retracting multi-direction-hoisting system 110.
Figure 114:
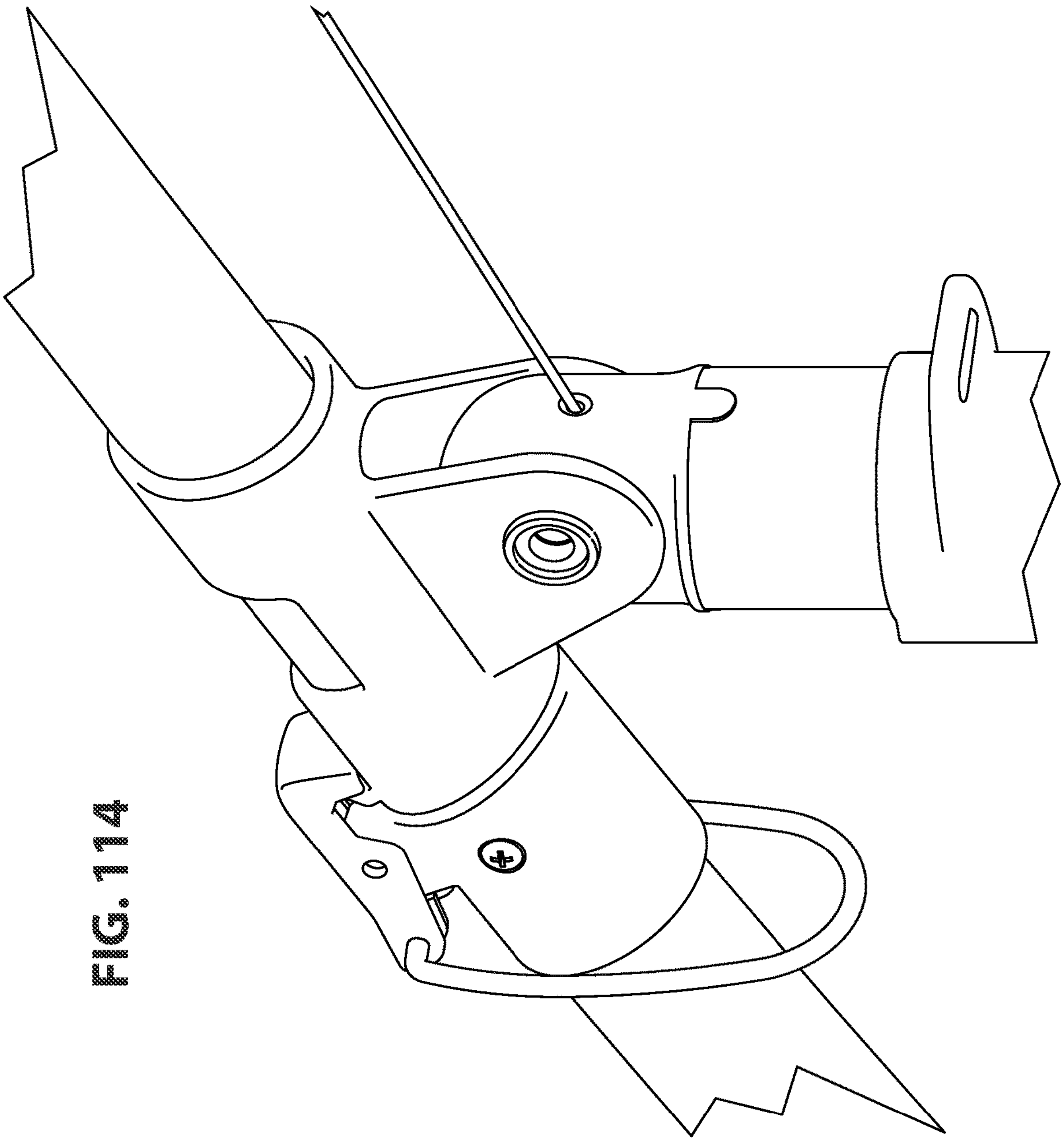
Figure 115:
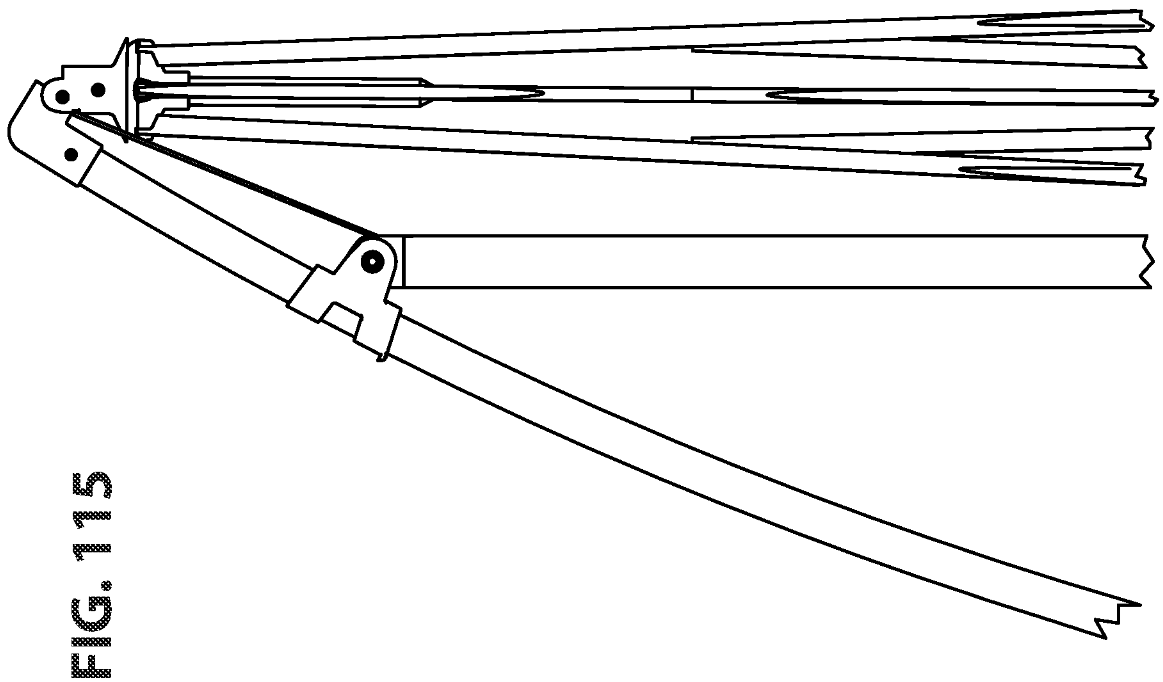
FIG. 115, FIG. 116, FIG. 117, FIG. 118, FIG. 119, and FIG. 120 illustrate side views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.
Figure 116:
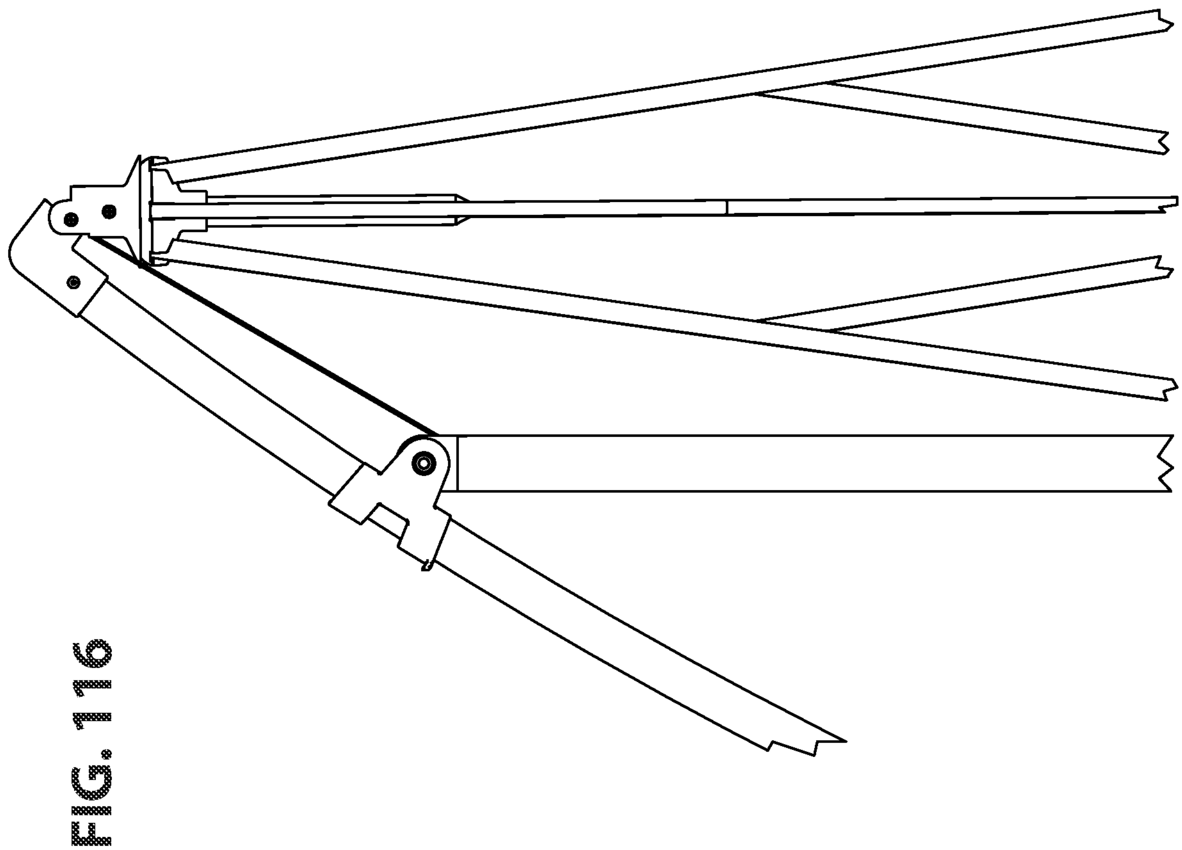
Figure 117:
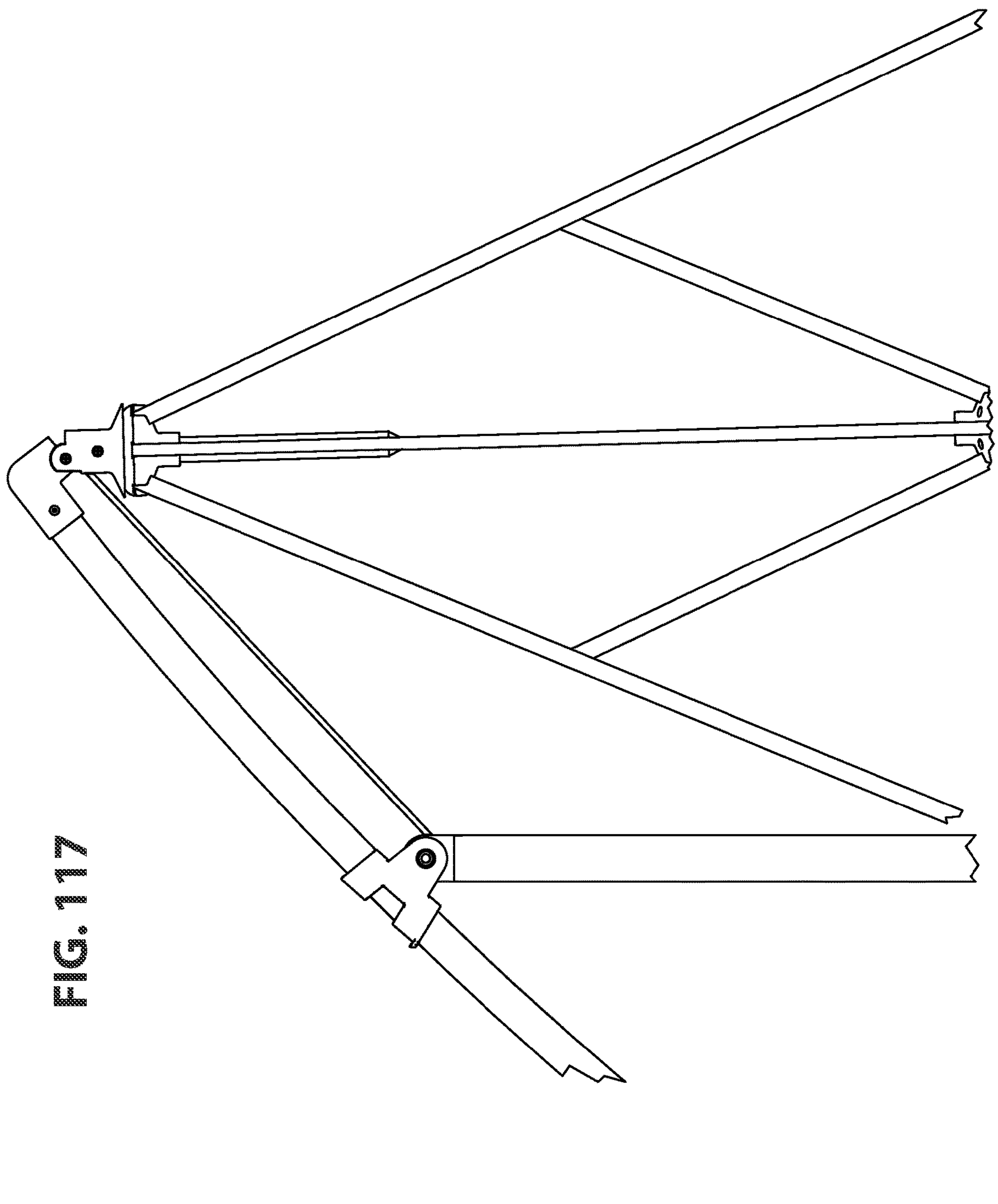
Figure 118:
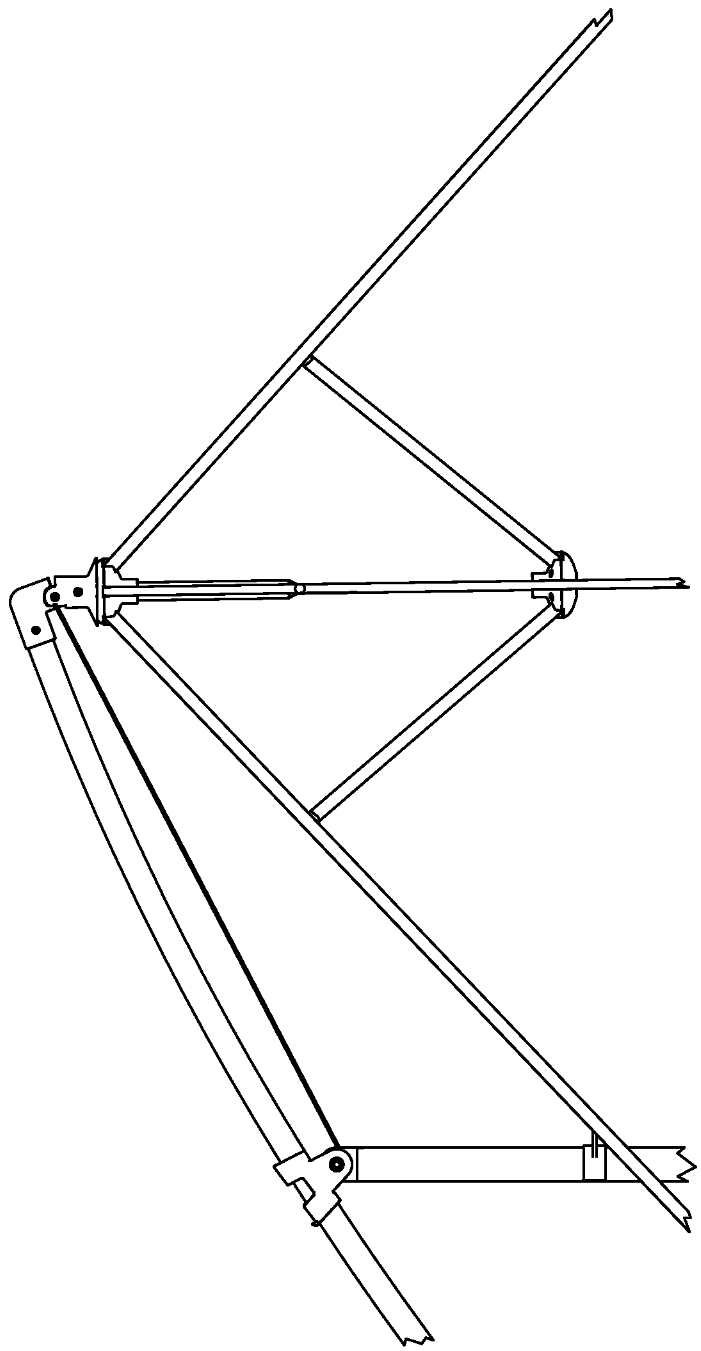
Figure 119:
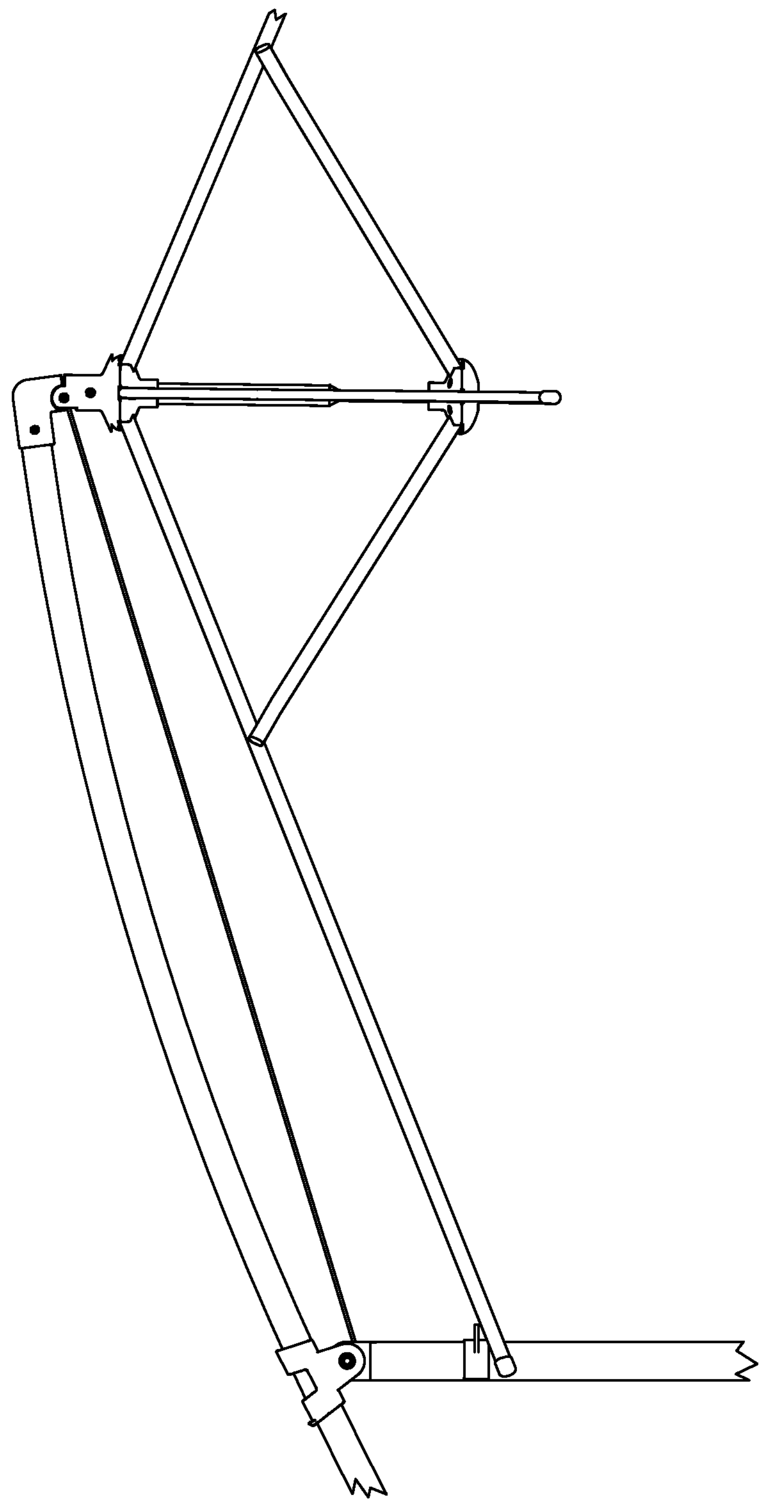
Figure 120:
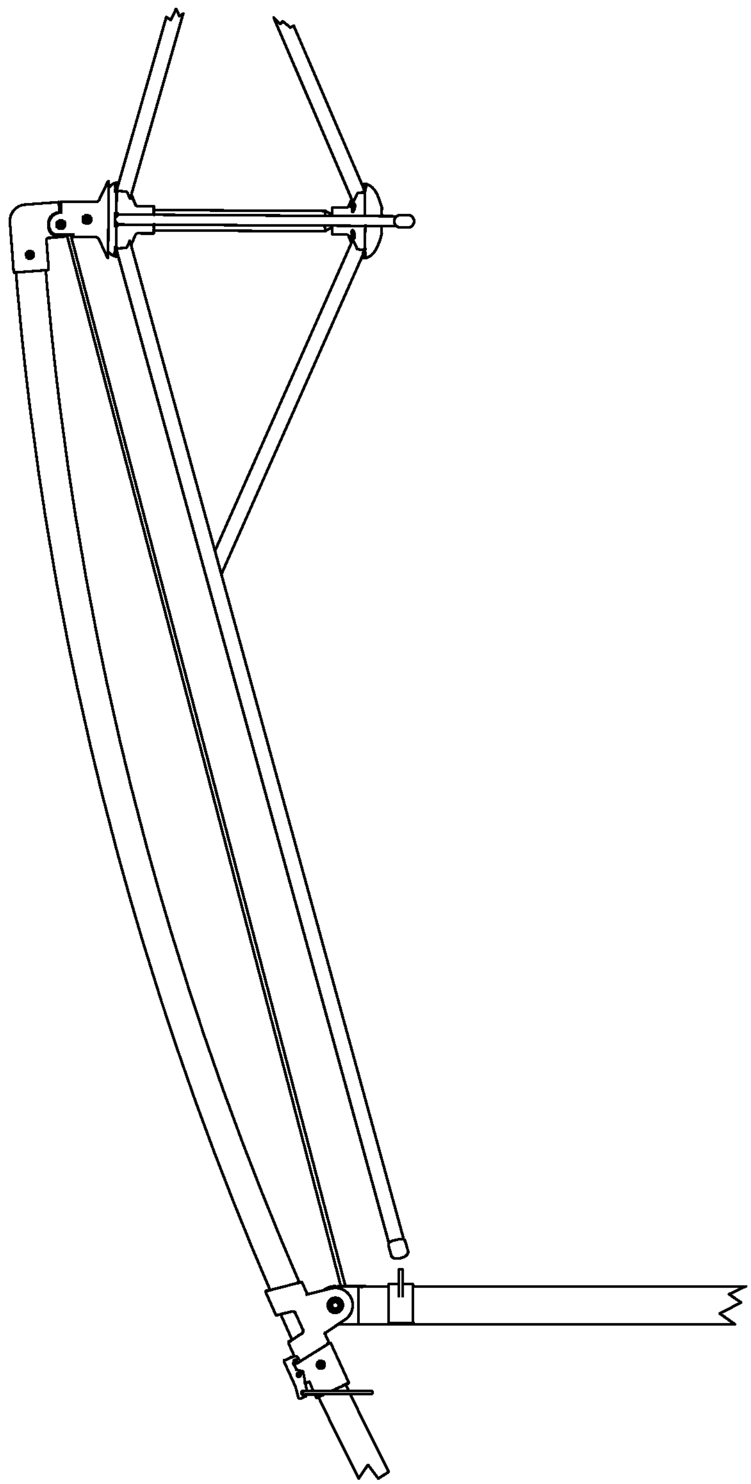

FIG. 111 and FIG. 112 illustrate enlarged perspective and side views of a variation of the sail-location-securing adjustable removable clip 124. FIG. 113 and FIG. 114 illustrate enlarged perspective and side views of variations of the physically-impaired-assisting arthritic-assisting single-hand-automatic-sail-deploying-and-retracting multi-direction-hoisting system 110.

Figure 121:
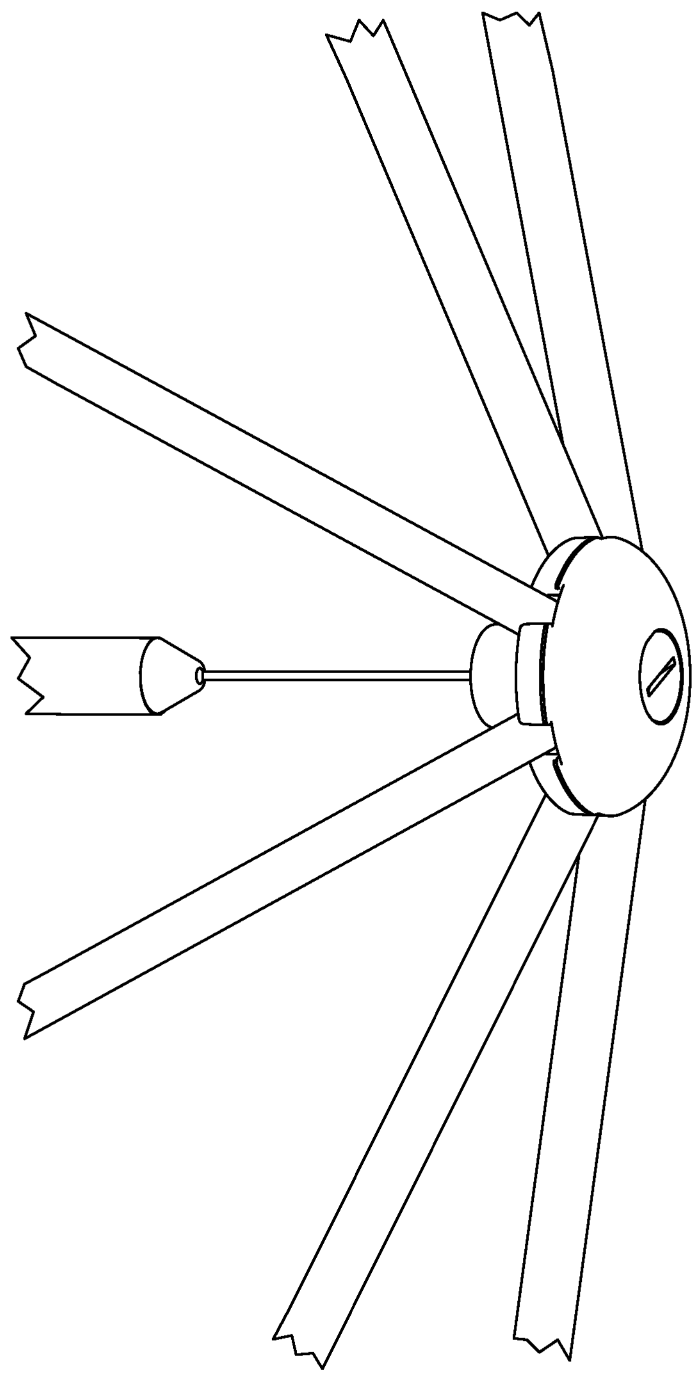
FIG. 121 illustrates a partial perspective view of a variation of components of the wind-catching-and-redirecting rainwater-amassing-and-storing garden-irrigating fruit-harvesting panorama-media-screen-capable land-yacht-powering sail system 121.
Figure 122:
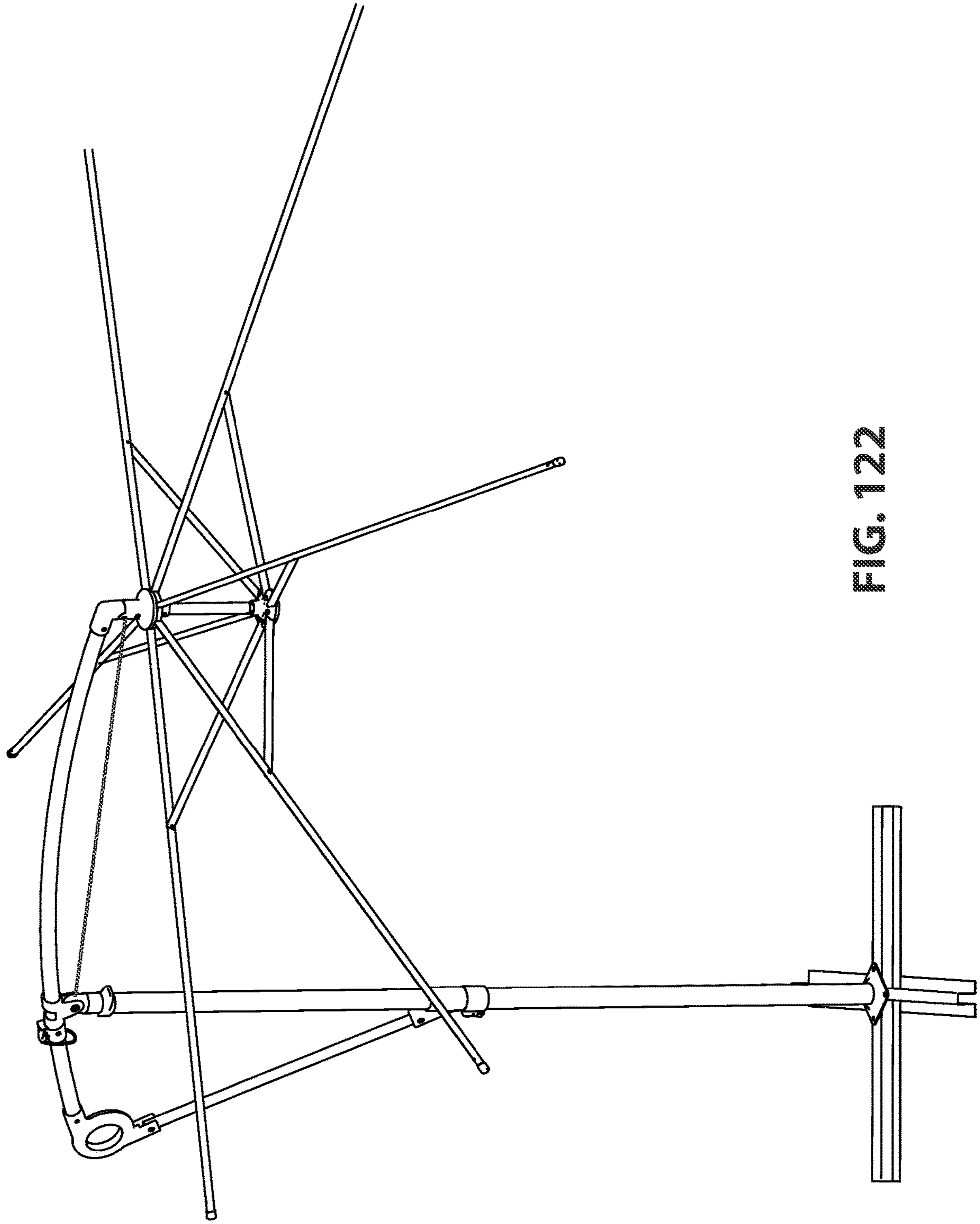
FIG. 122, FIG. 123, FIG. 124, and FIG. 125 illustrate partial perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.
Figure 123:
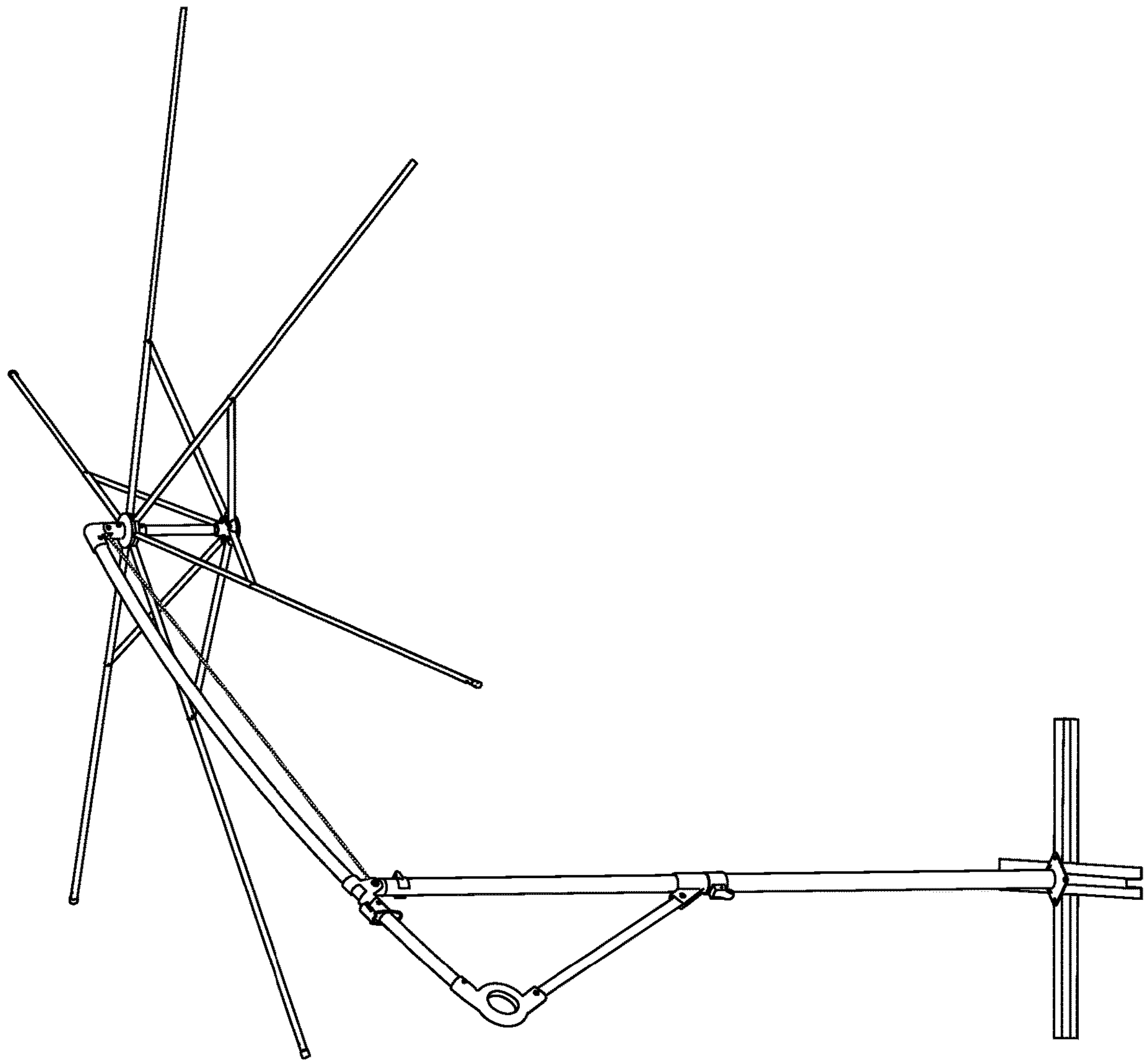
Figure 124:
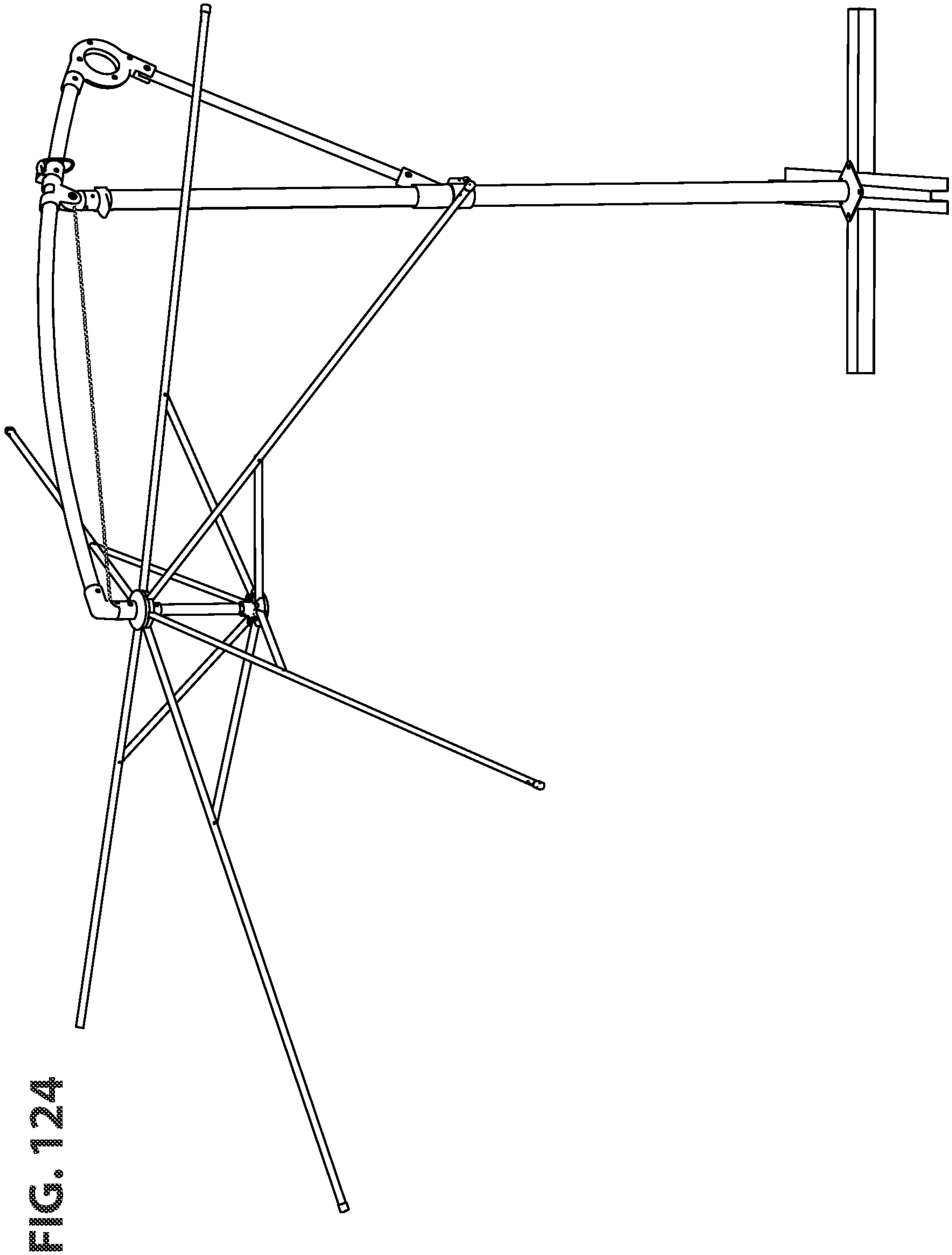
Figure 125:
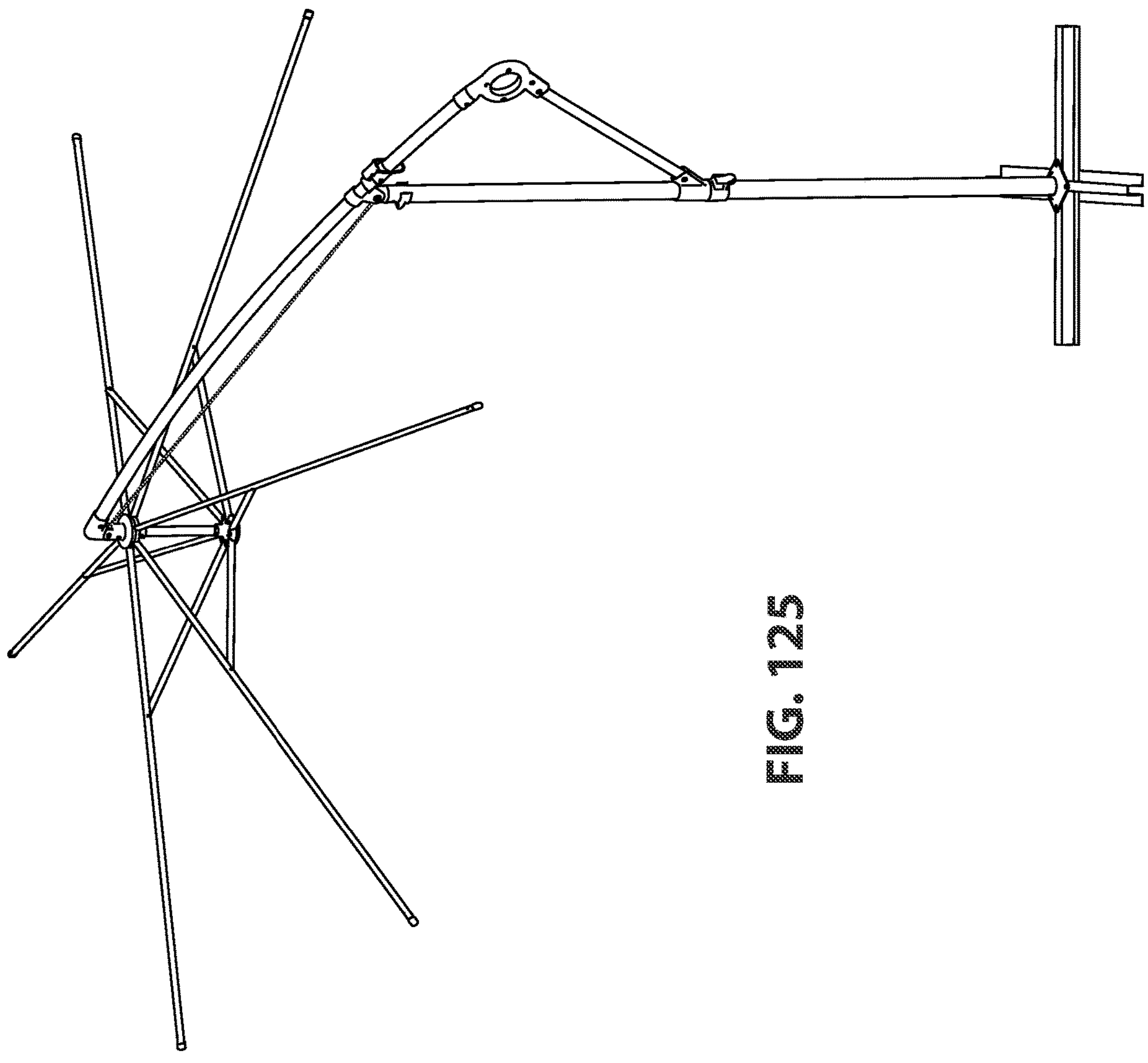
Figure 126:
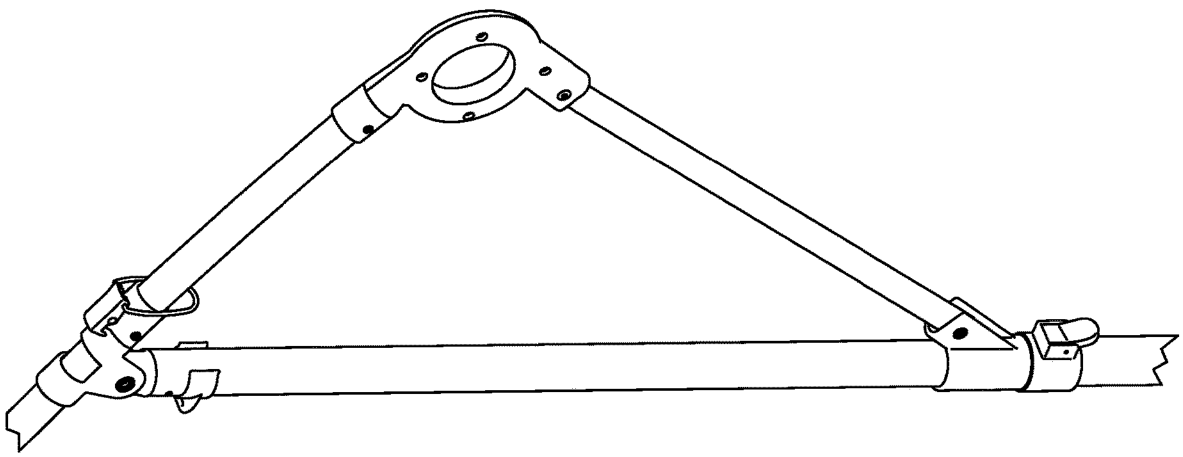
FIG. 126 illustrates an enlarged perspective view of a variation of the physically-impaired-assisting arthritic-assisting single-hand-automatic-sail-deploying-and-retracting multi-direction-hoisting system 110.
Figure 127:
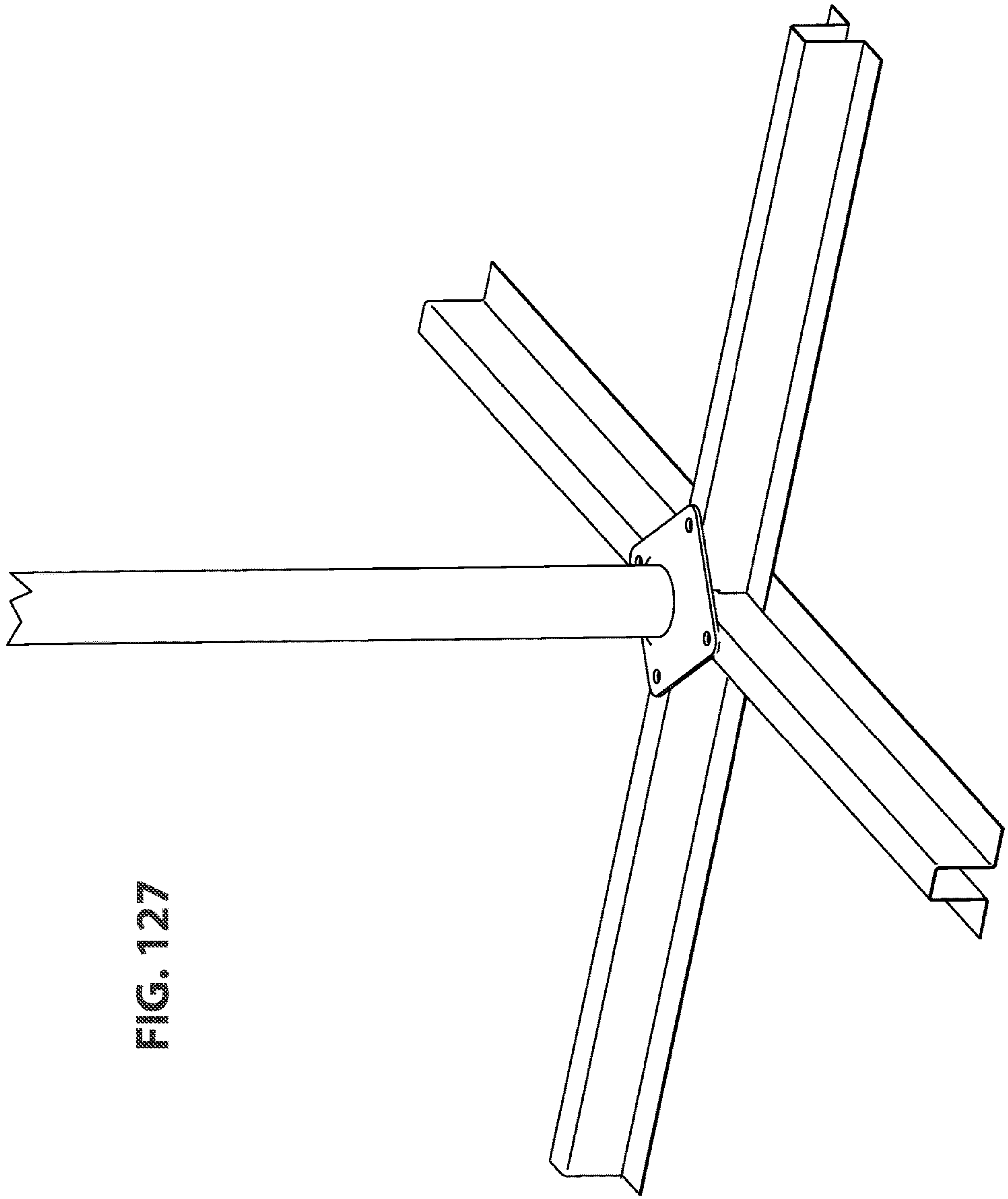
FIG. 127 illustrates a partial perspective view of a variation of components of the sail and stanchion plinth system 101.

FIG. 115, FIG. 116, FIG. 117, FIG. 118, FIG. 119, and FIG. 120 illustrate side views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment. FIG. 121 illustrates a partial perspective view of a variation of components of the wind-catching-and-redirecting rainwater-amassing-and-storing garden-irrigating fruit-harvesting panorama-media-screen-capable land-yacht-powering sail system 121. FIG. 122, FIG. 123, FIG. 124, and FIG. 125 illustrate partial perspective views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment. FIG. 126 illustrates an enlarged perspective view of a variation of the physically-impaired-assisting arthritic-assisting single-hand-automatic-sail-deploying-and-retracting multi-direction-hoisting system 110. FIG. 127 illustrates a partial perspective view of a variation of components of the sail and stanchion plinth system 101.

Figure 128:
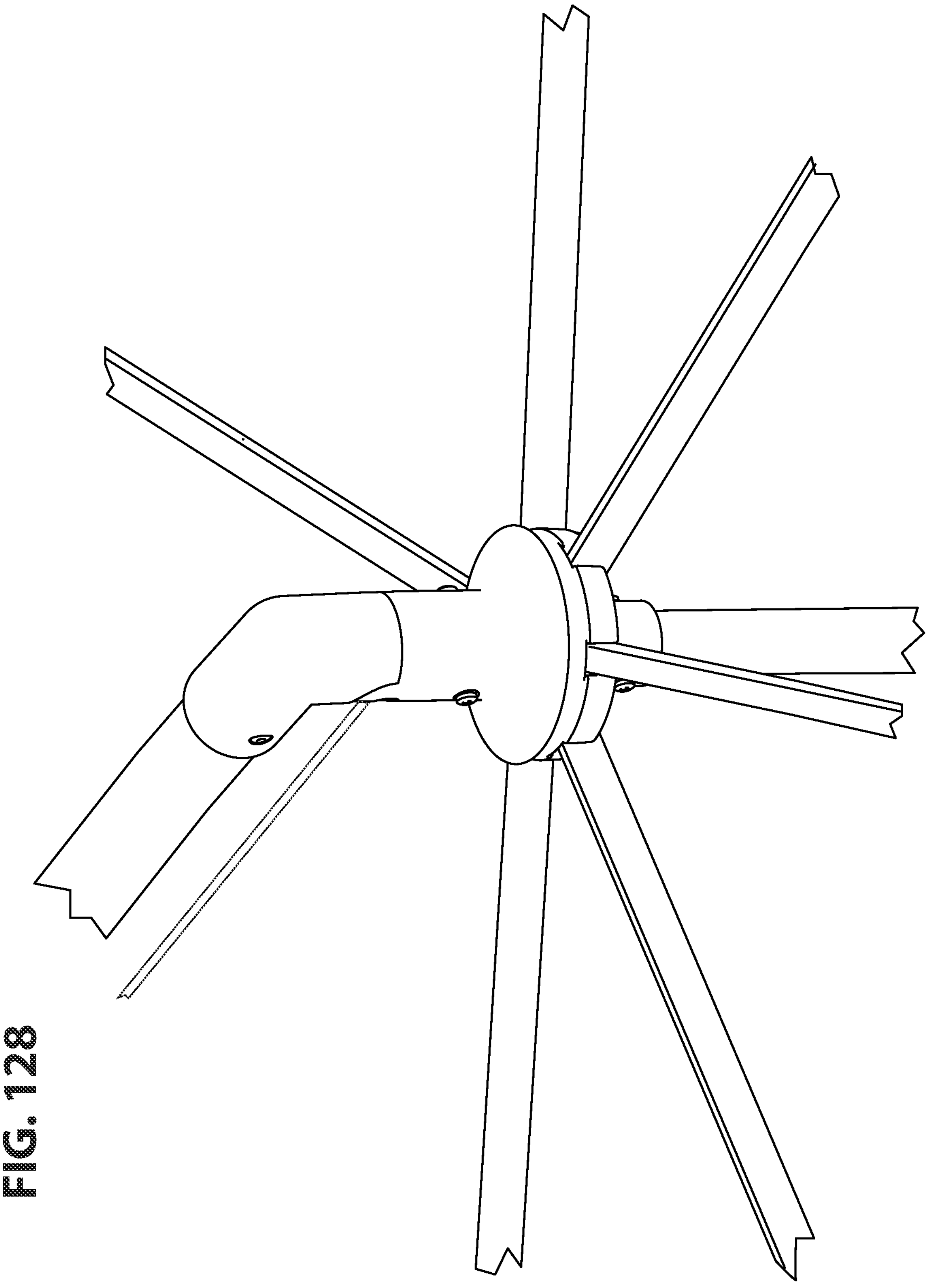
FIG. 128 illustrates a partial perspective view of a variation of components of the wind-catching-and-redirecting rainwater-amassing-and-storing garden-irrigating fruit-harvesting panorama-media-screen-capable land-yacht-powering sail system 121.
Figure 129:
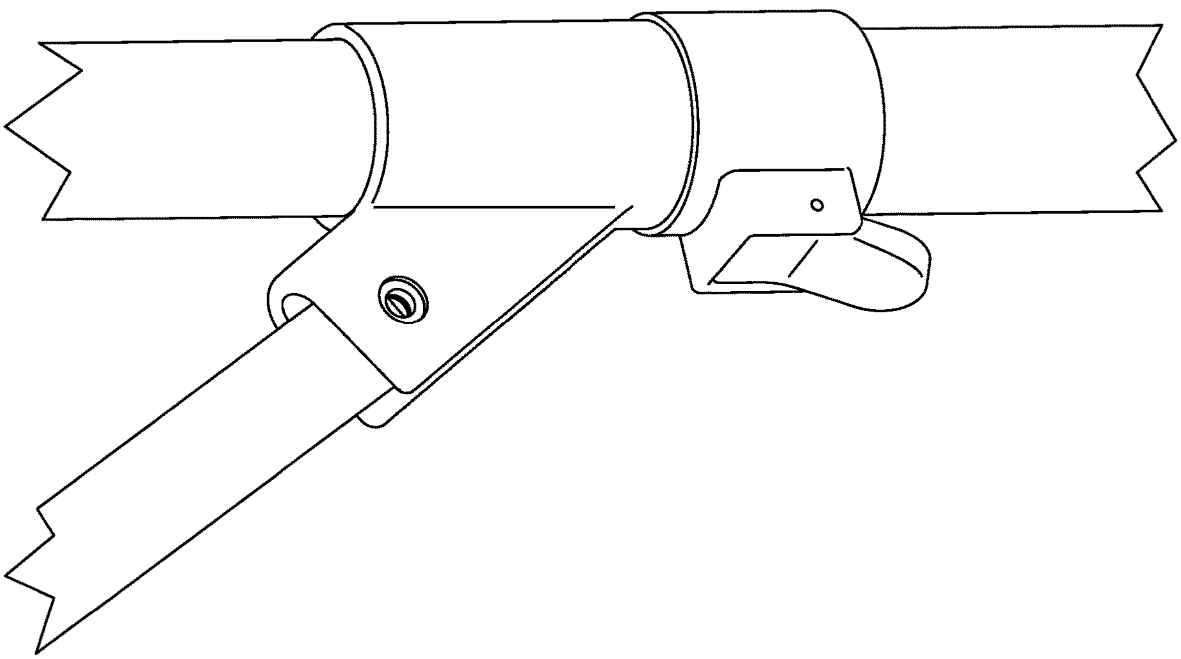
FIG. 129 illustrates a partial perspective view of a variation of components of the horizontal-rotation-locking wind-catching-and-redirecting land-yacht-maneuvering system 105.
Figure 130:
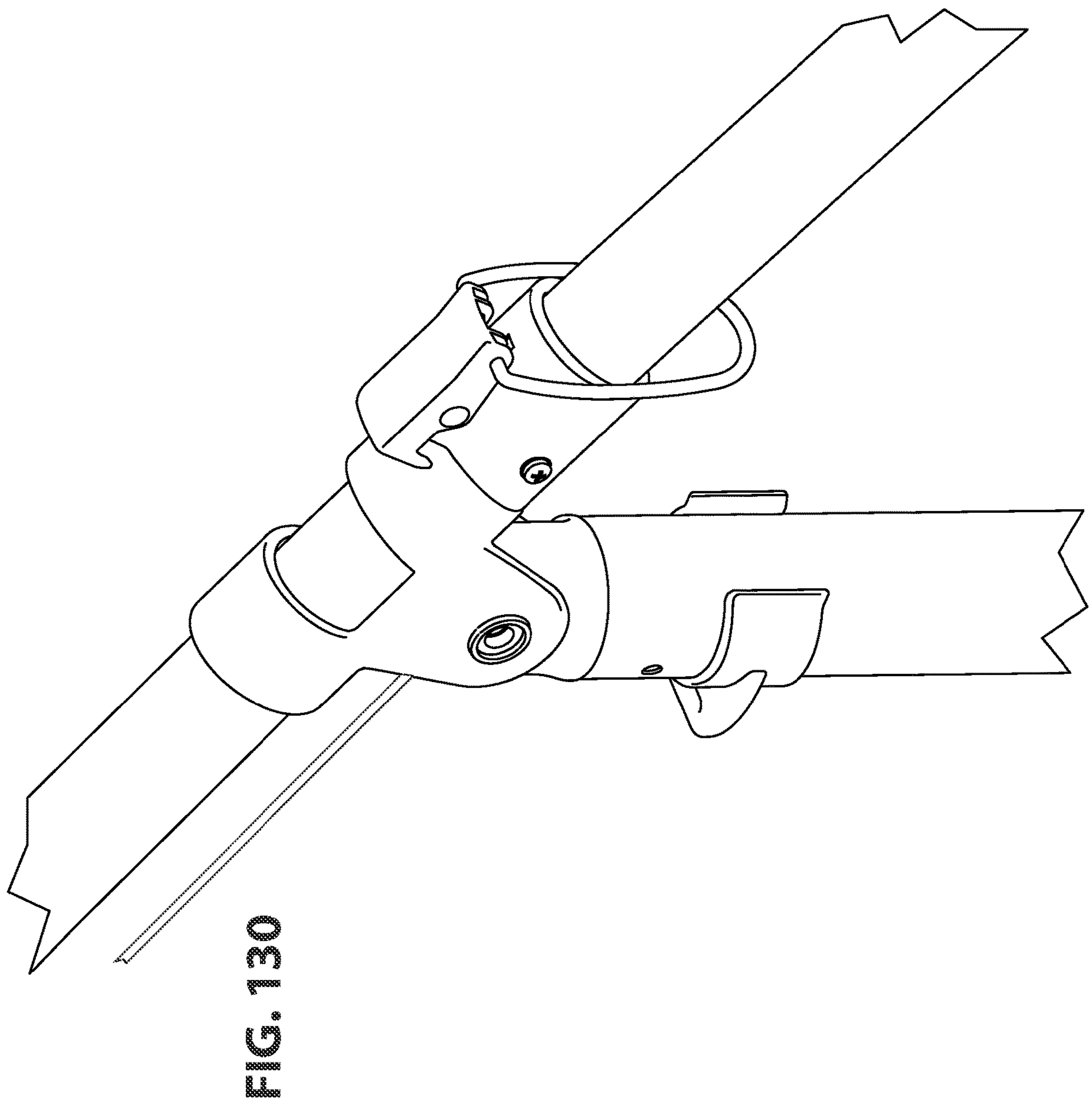
FIG. 130 illustrates an enlarged perspective view of a variation of the physically-impaired-assisting arthritic-assisting single-hand-automatic-sail-deploying-and-retracting multi-direction-hoisting system 110.
Figure 131:
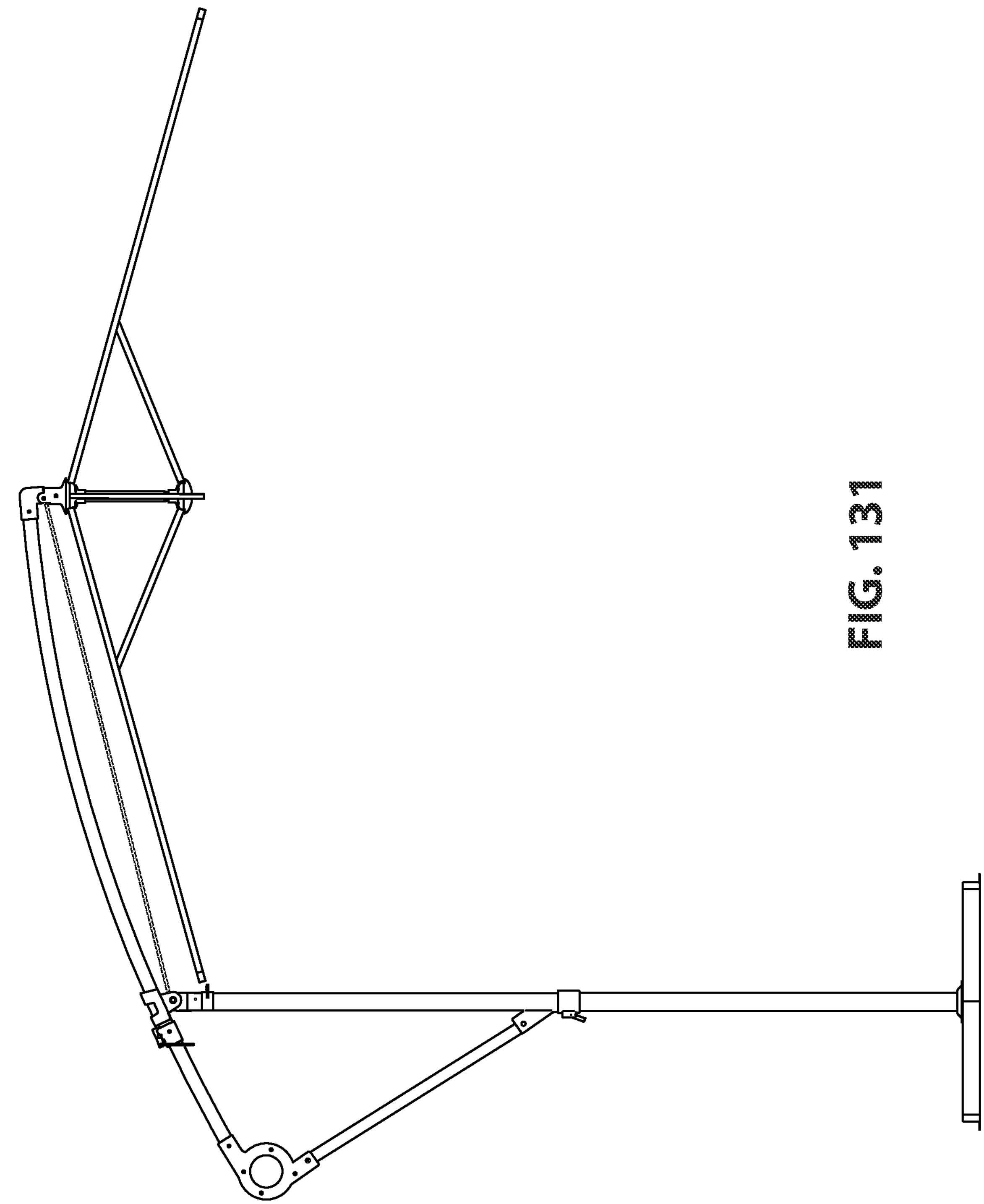
FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, and FIG. 148 illustrate partial side, perspective, and top views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.
Figure 132:
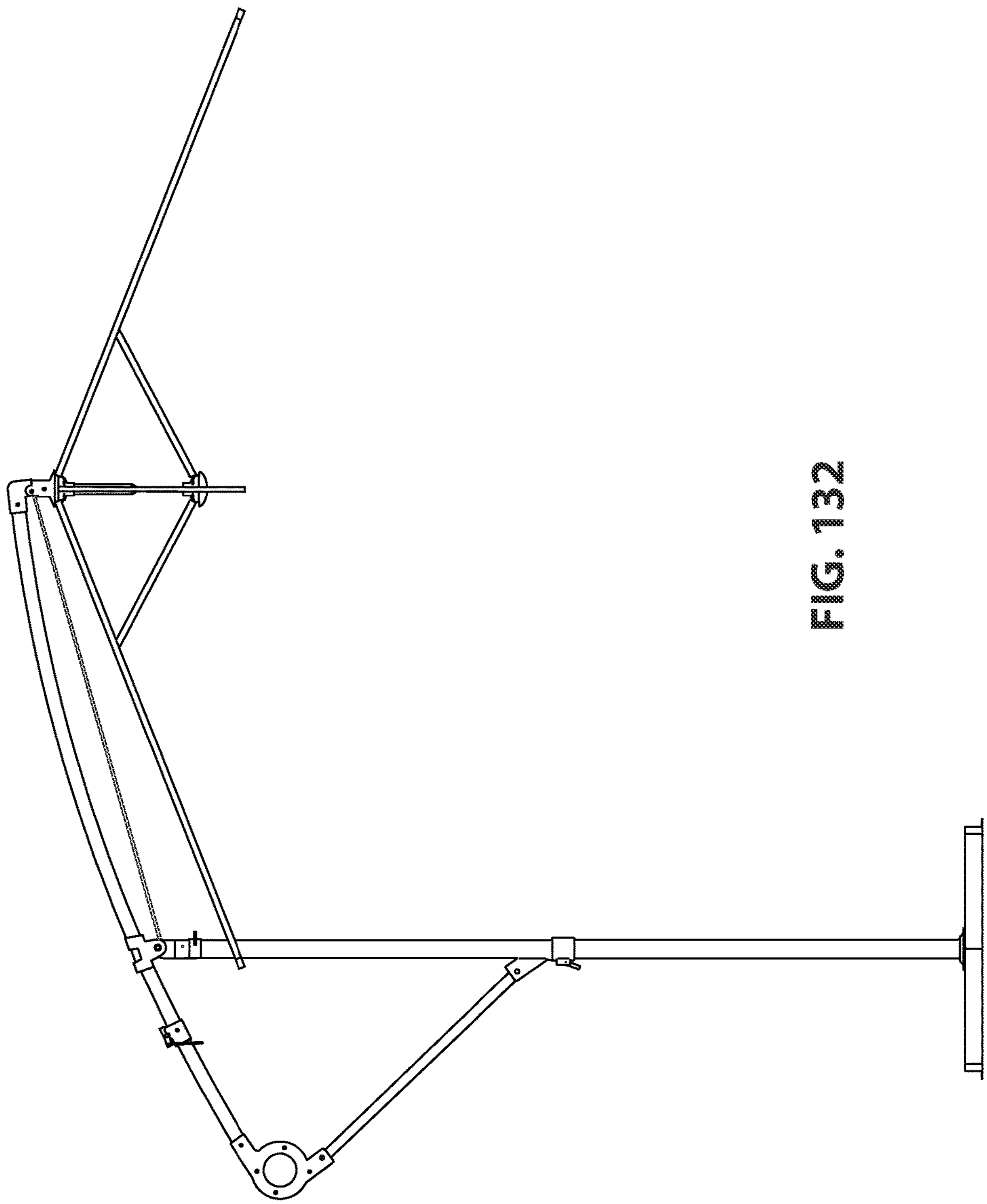
Figure 133:
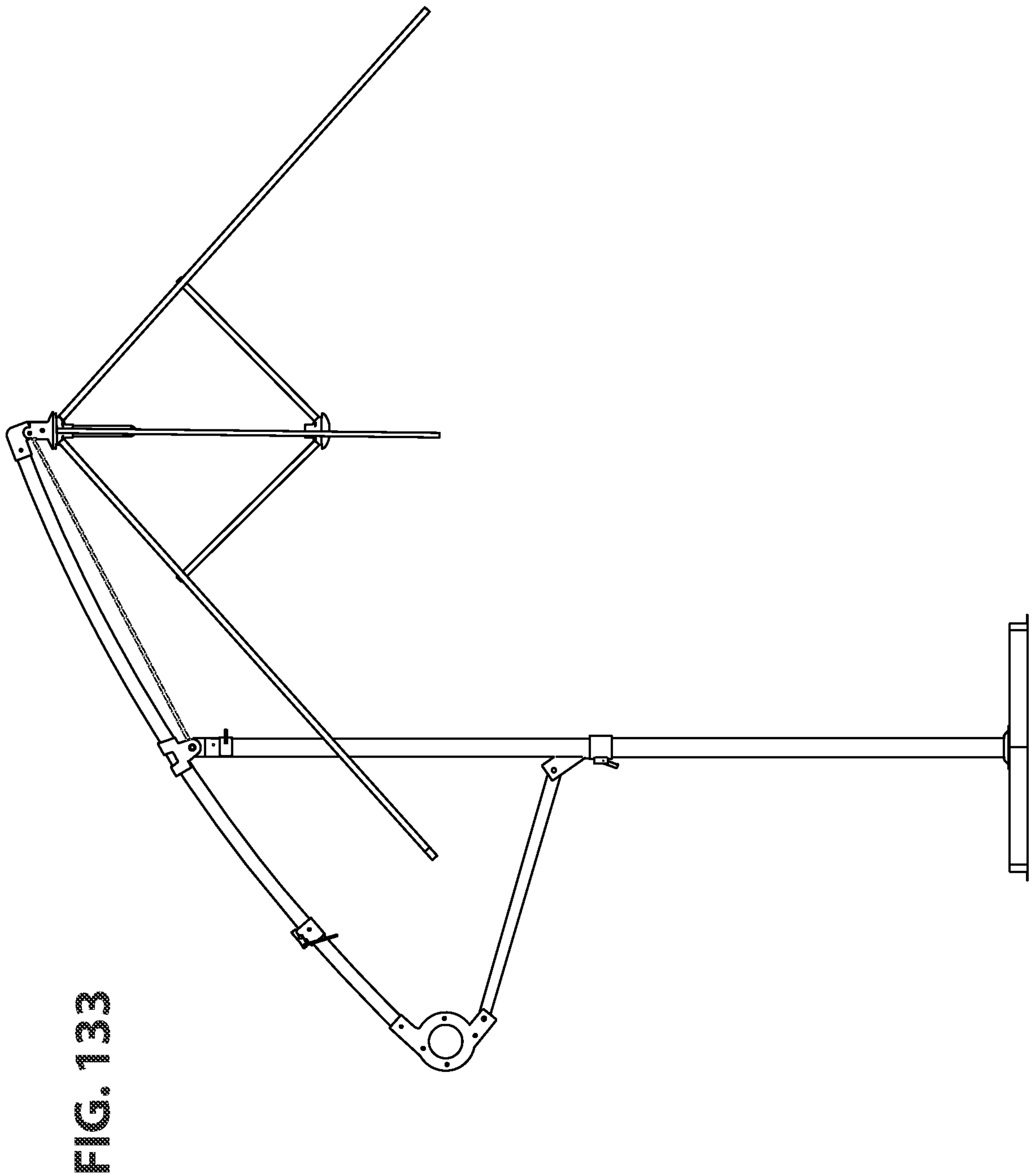
Figure 134:
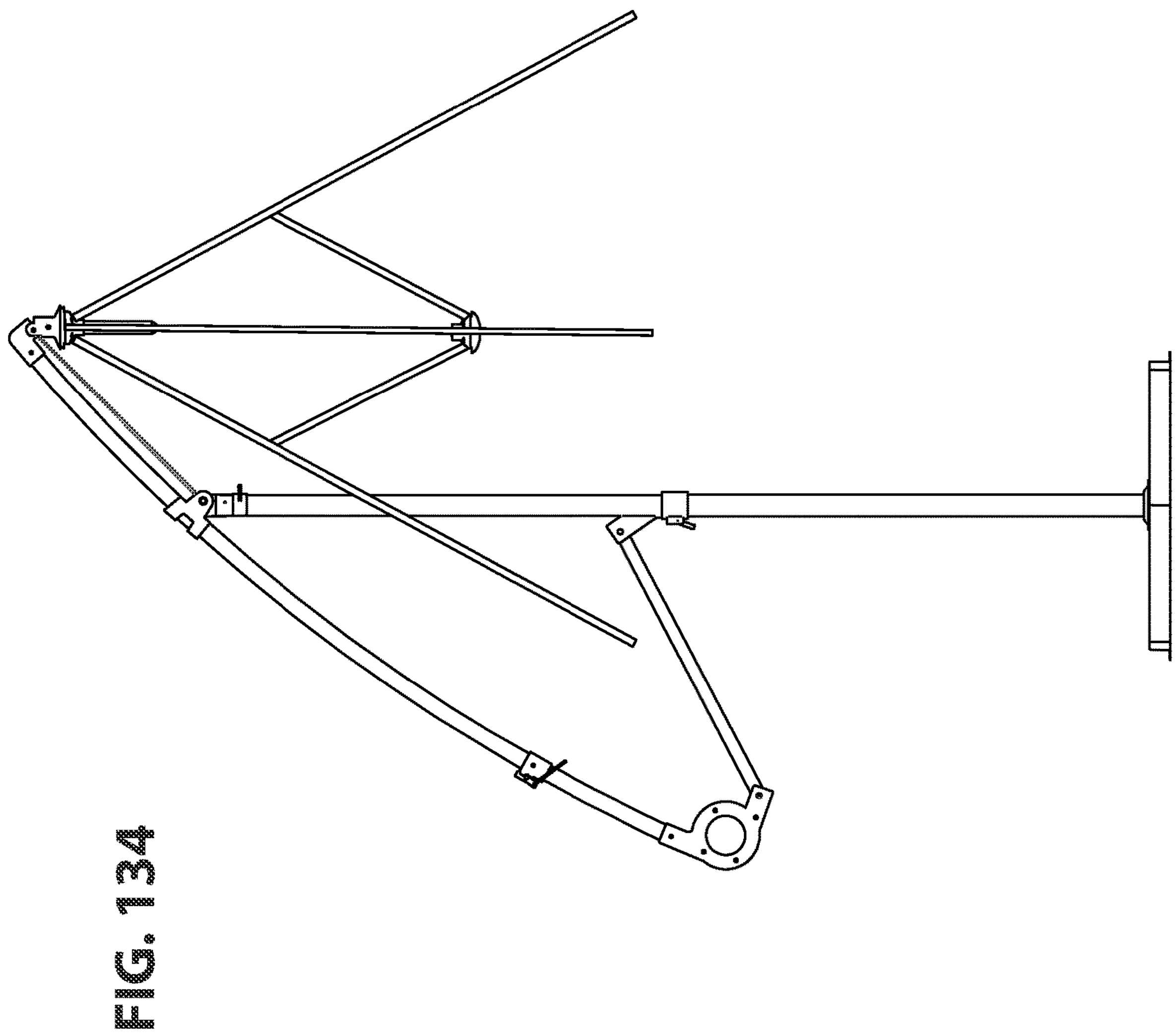
Figure 135:
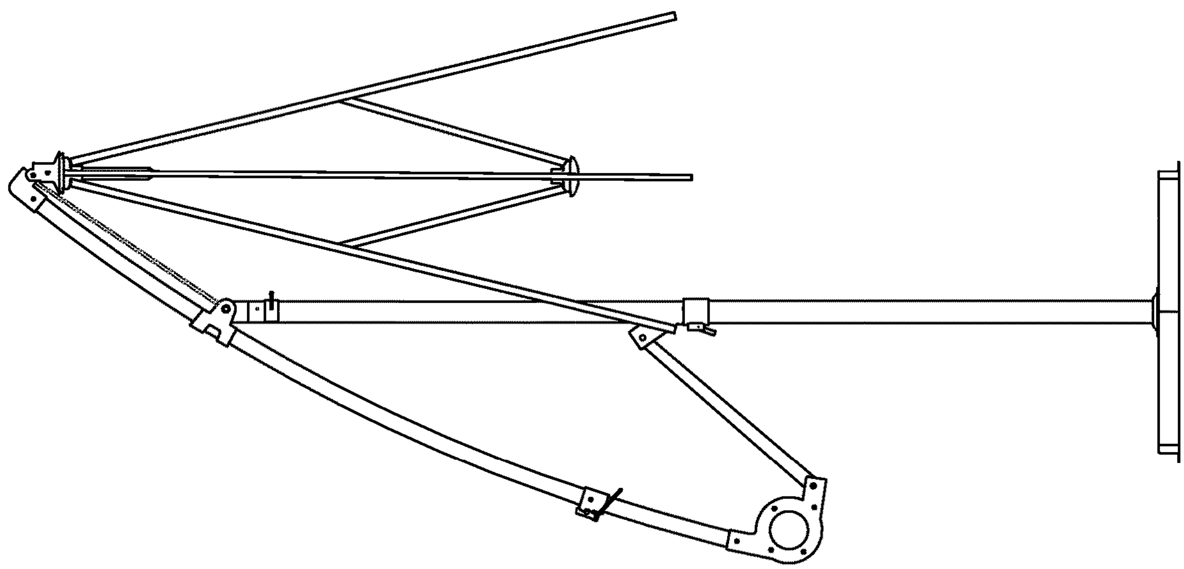
Figure 136:
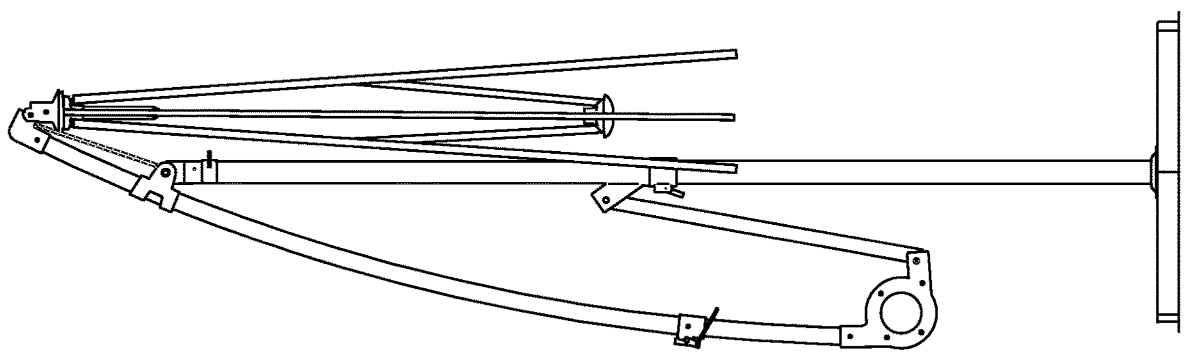
Figure 137:
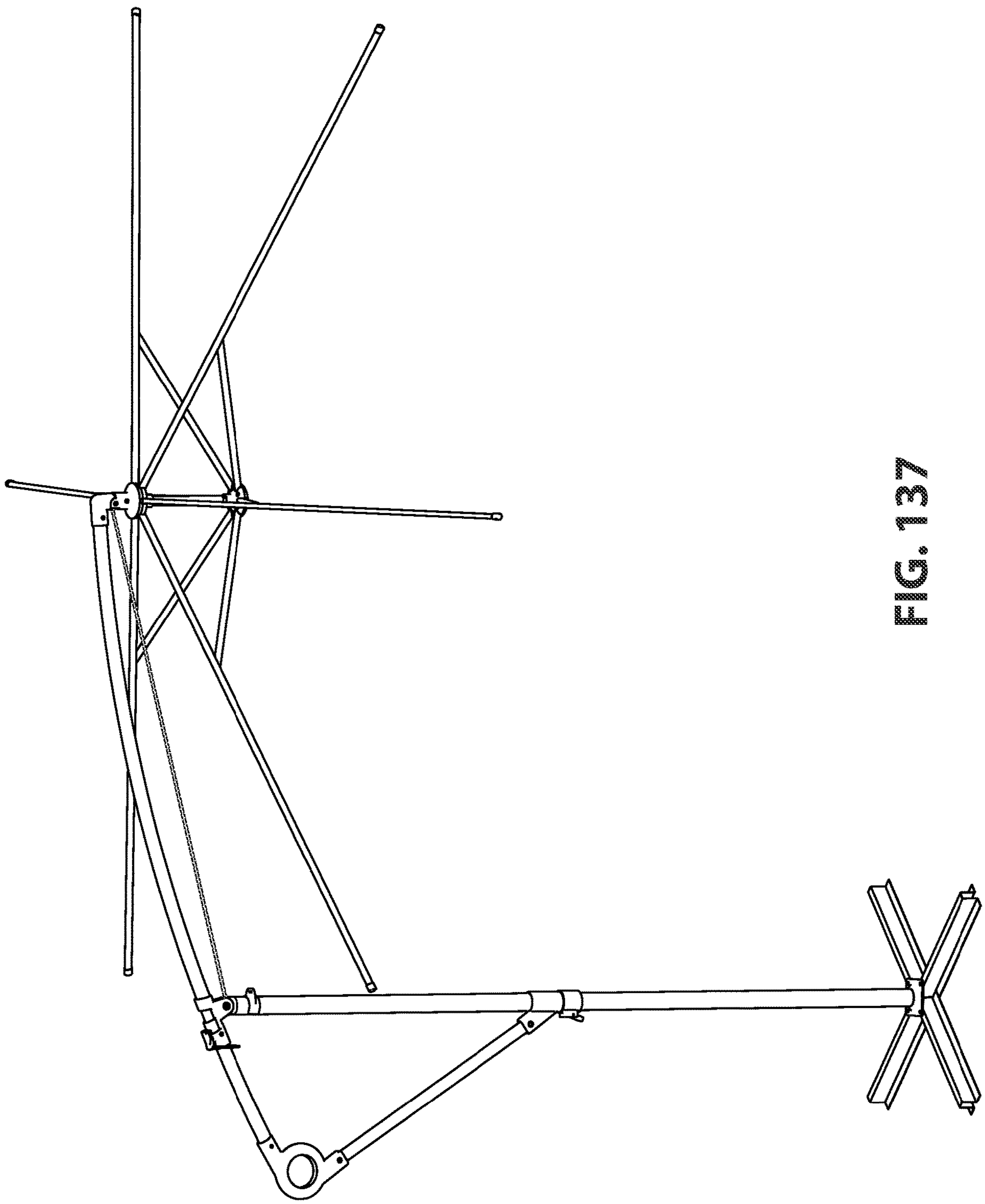
Figure 138:
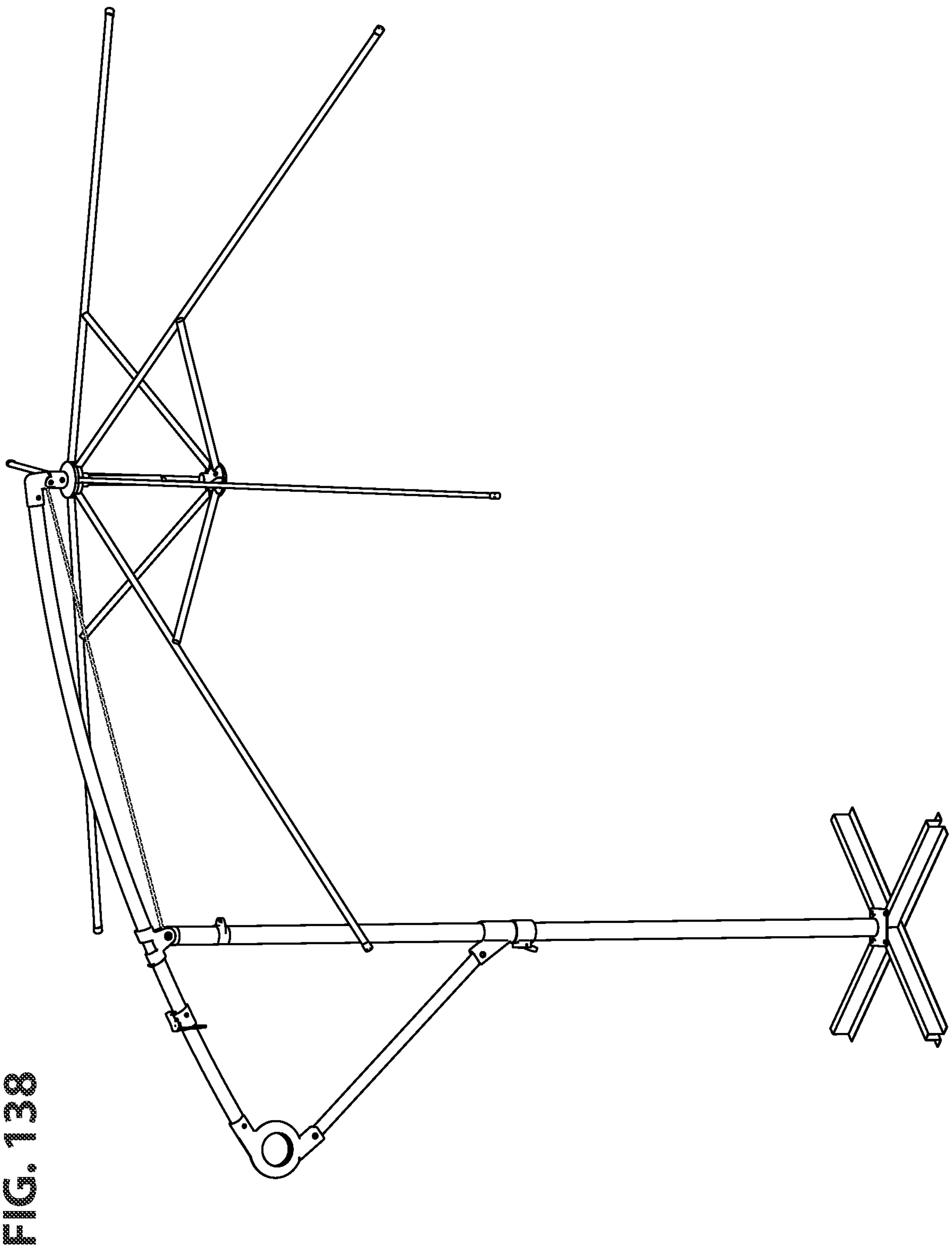
Figure 139:
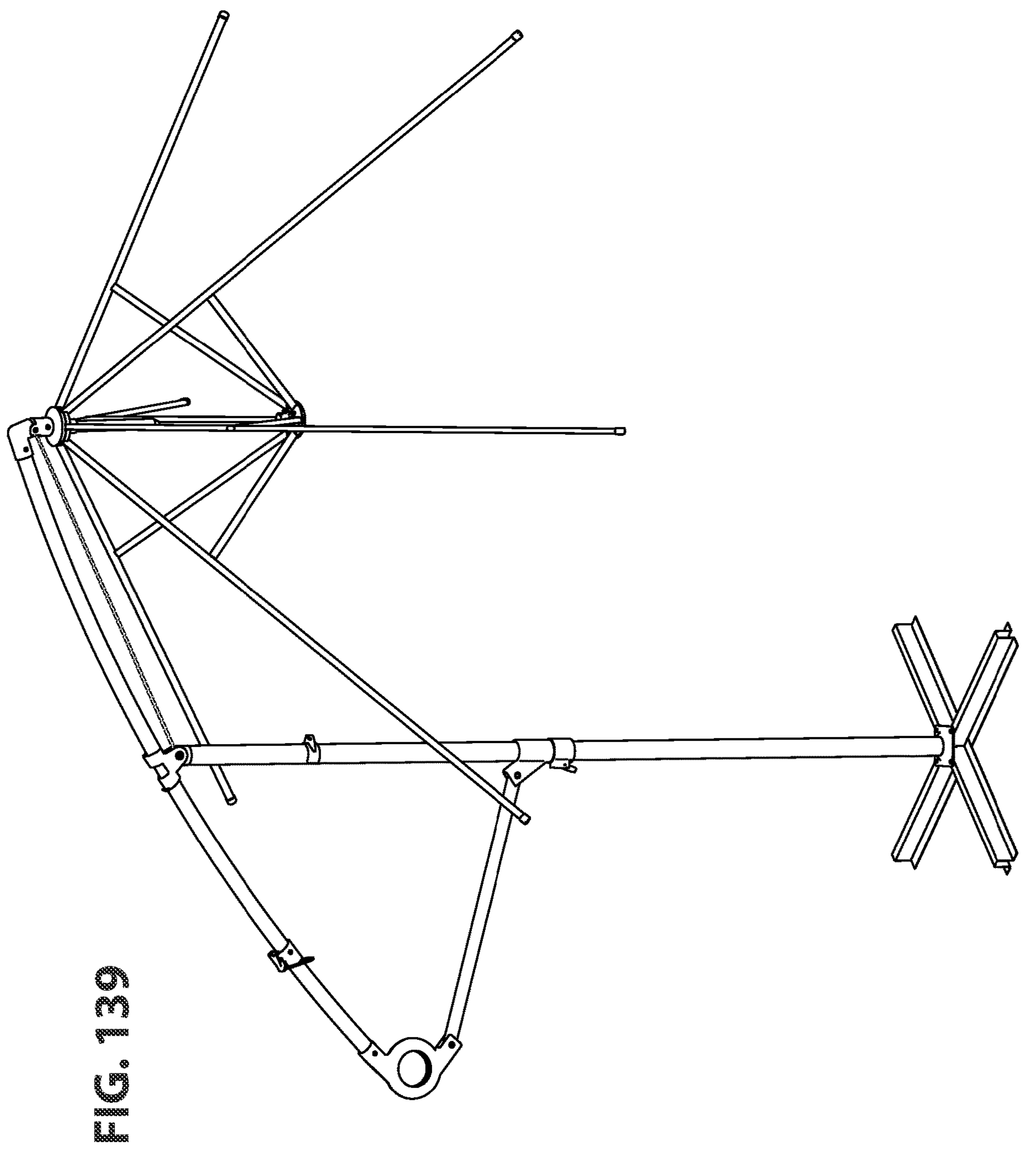
Figure 140:
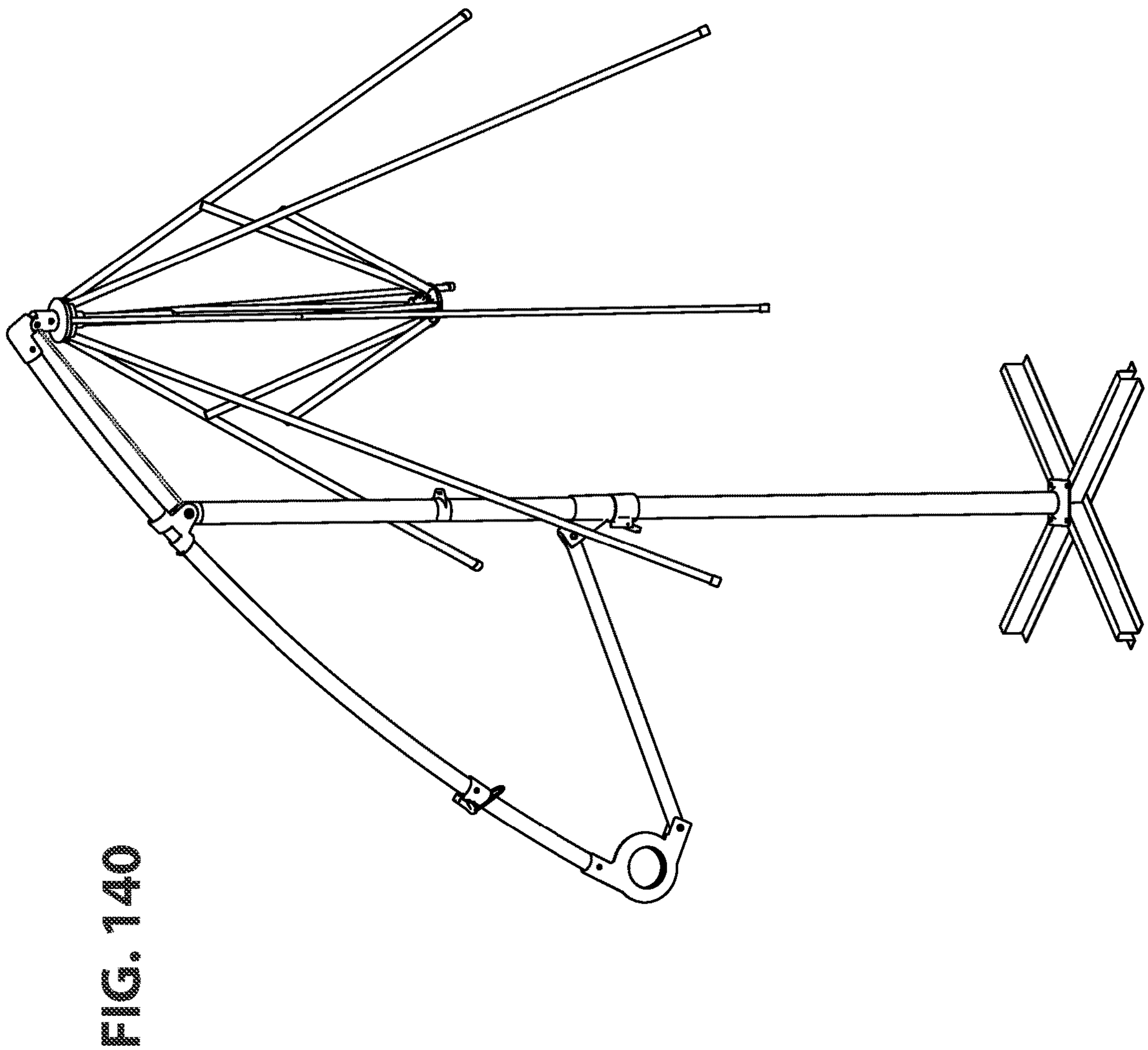
Figure 141:
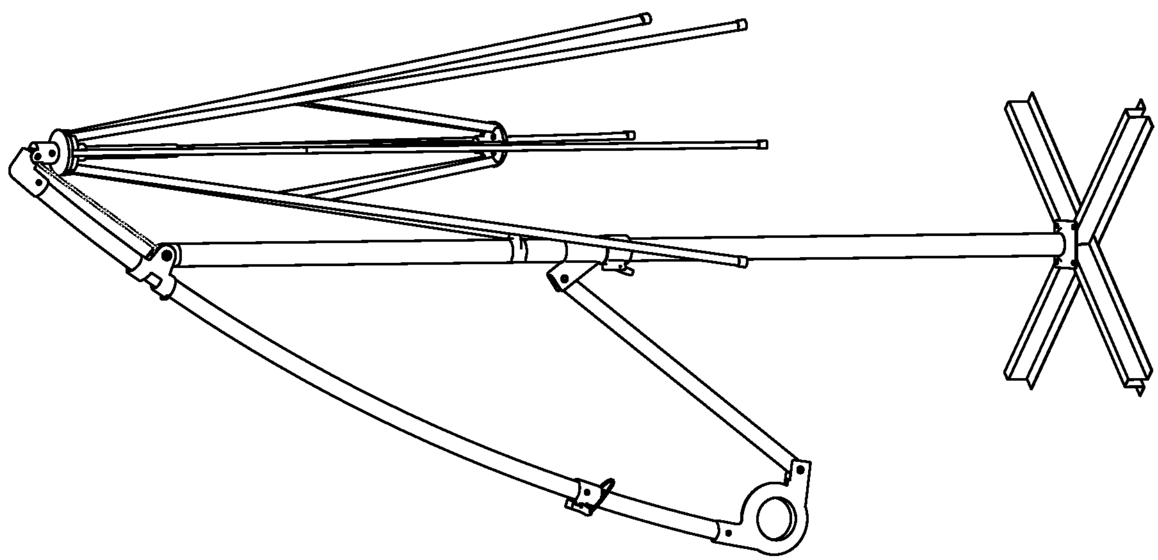
Figure 142:
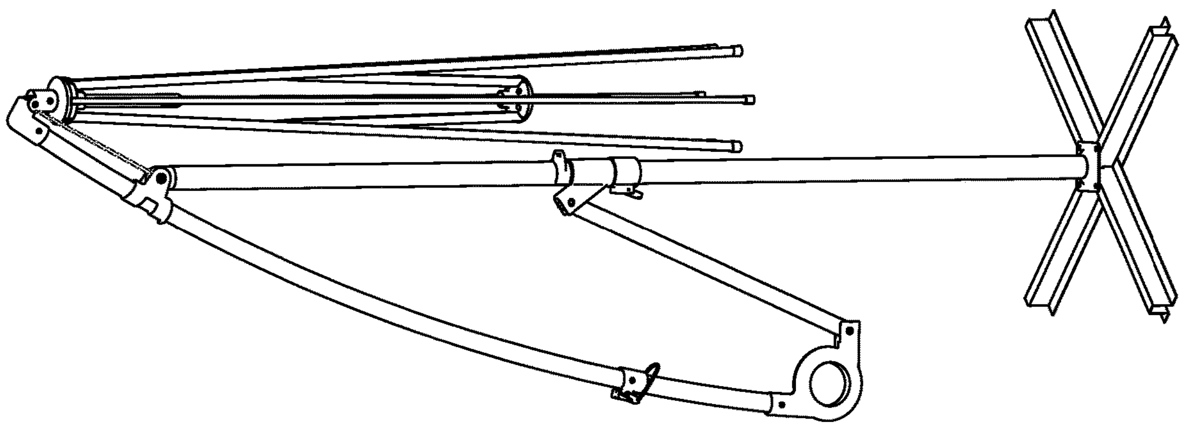
Figure 143:
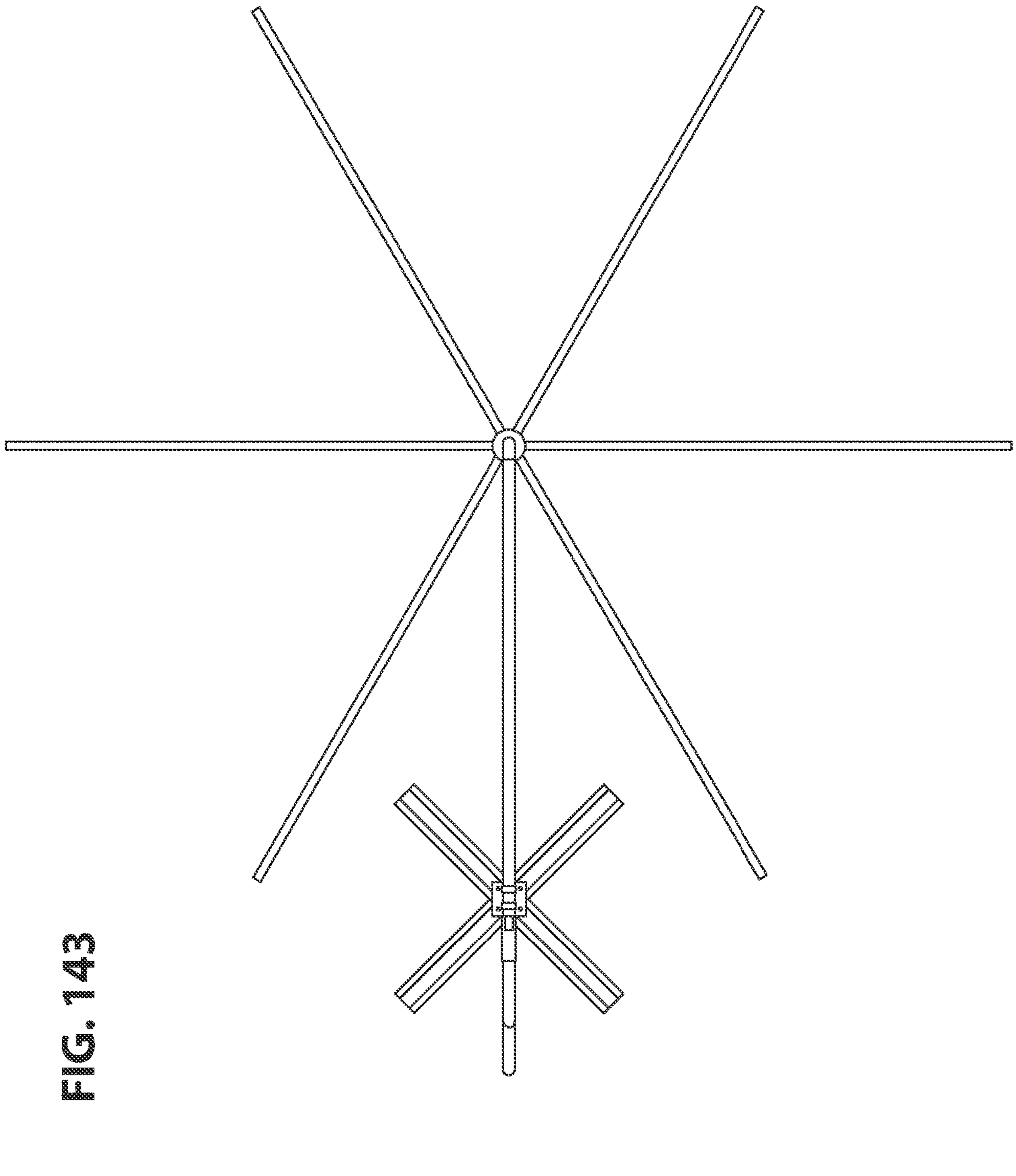
Figure 144:
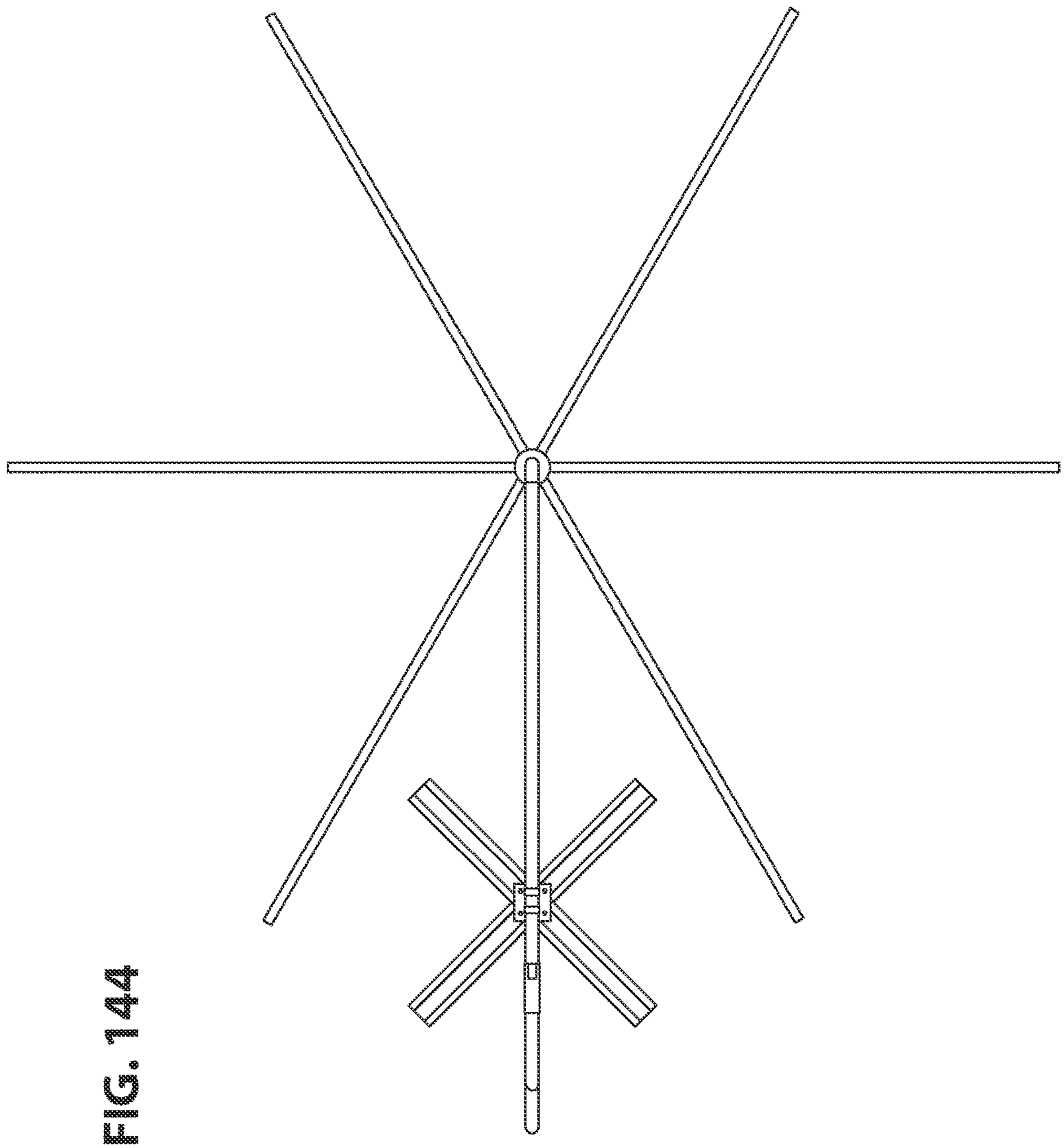
Figure 145:
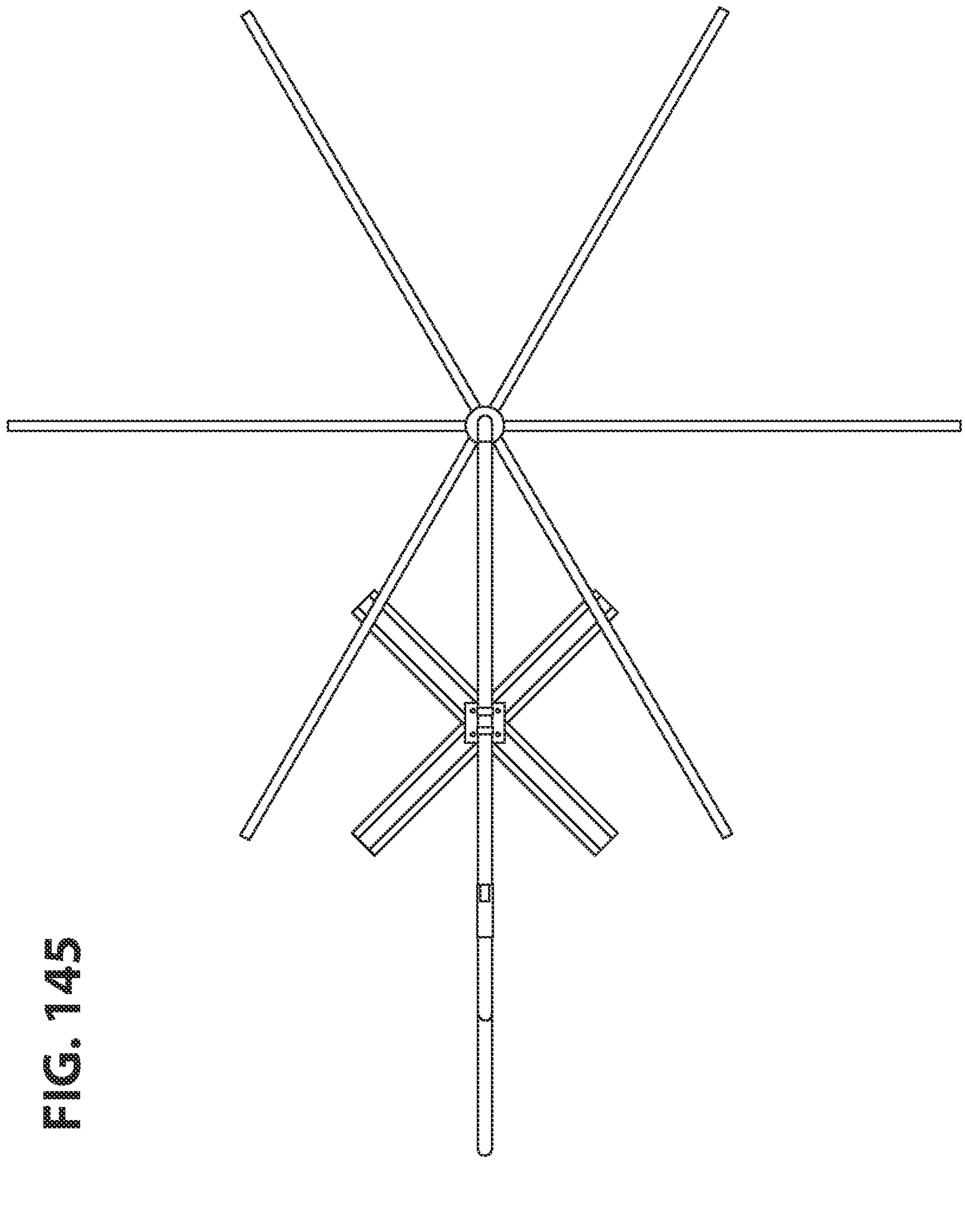
Figure 146:
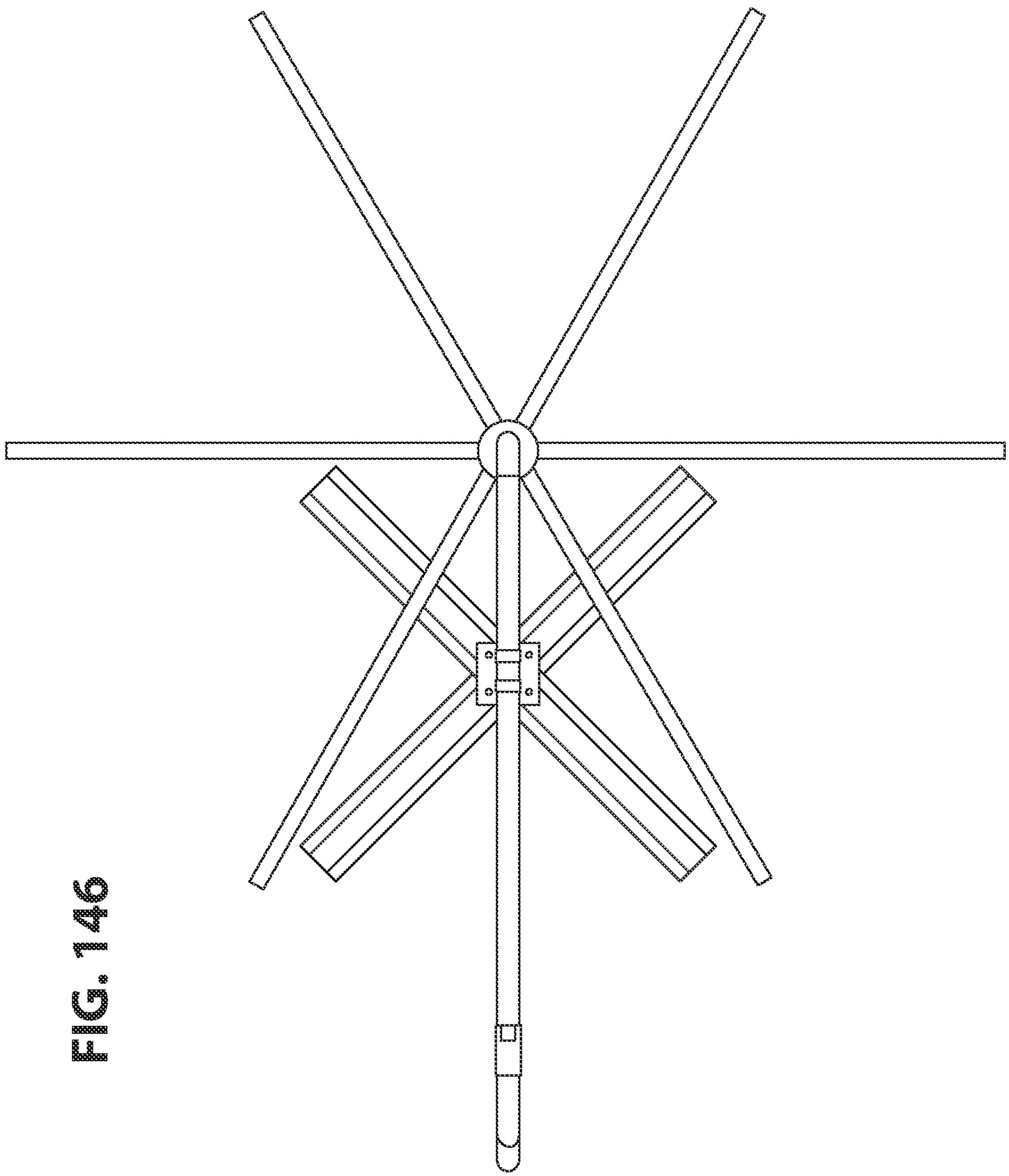
Figure 147:
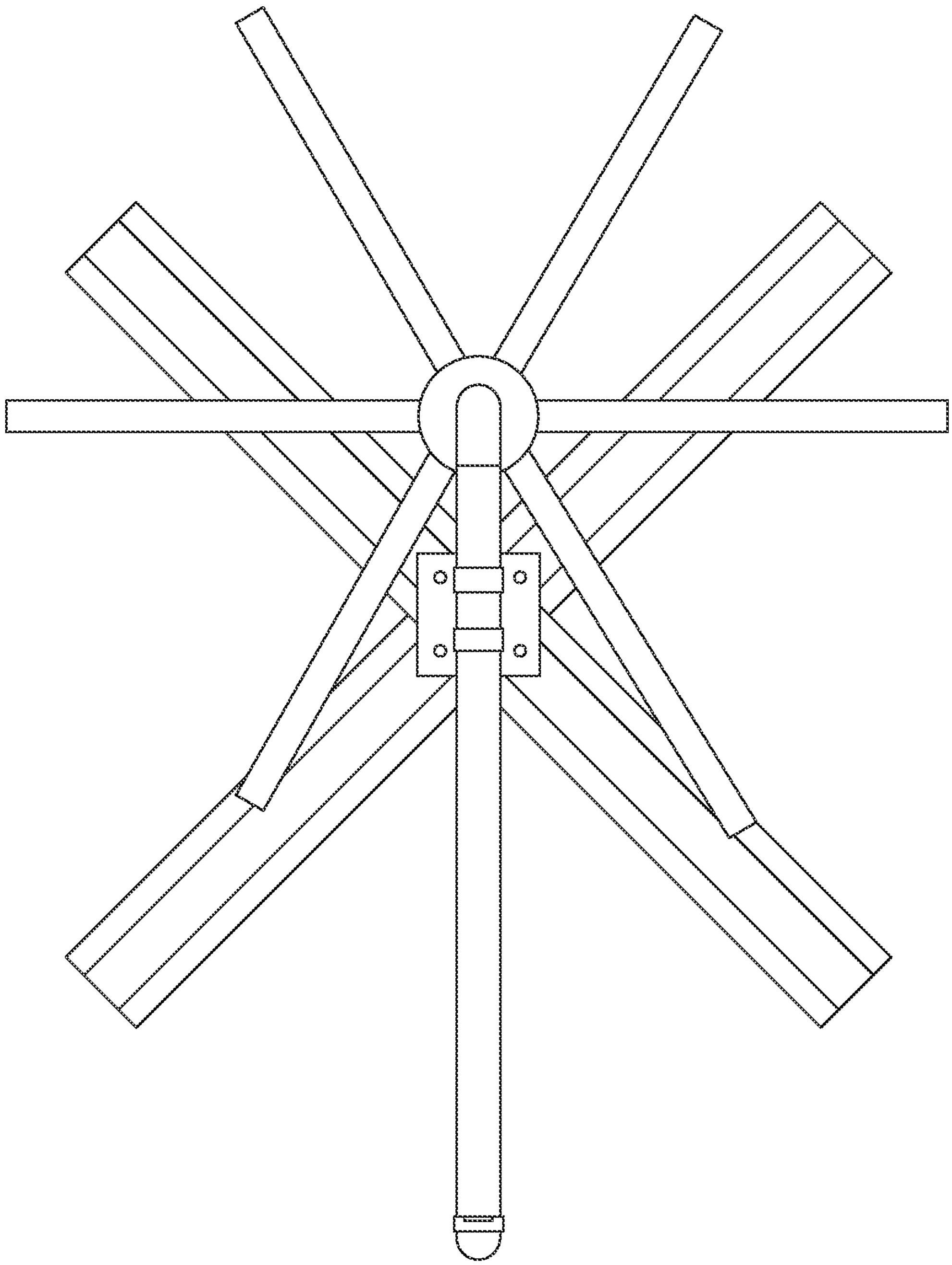
Figure 148:
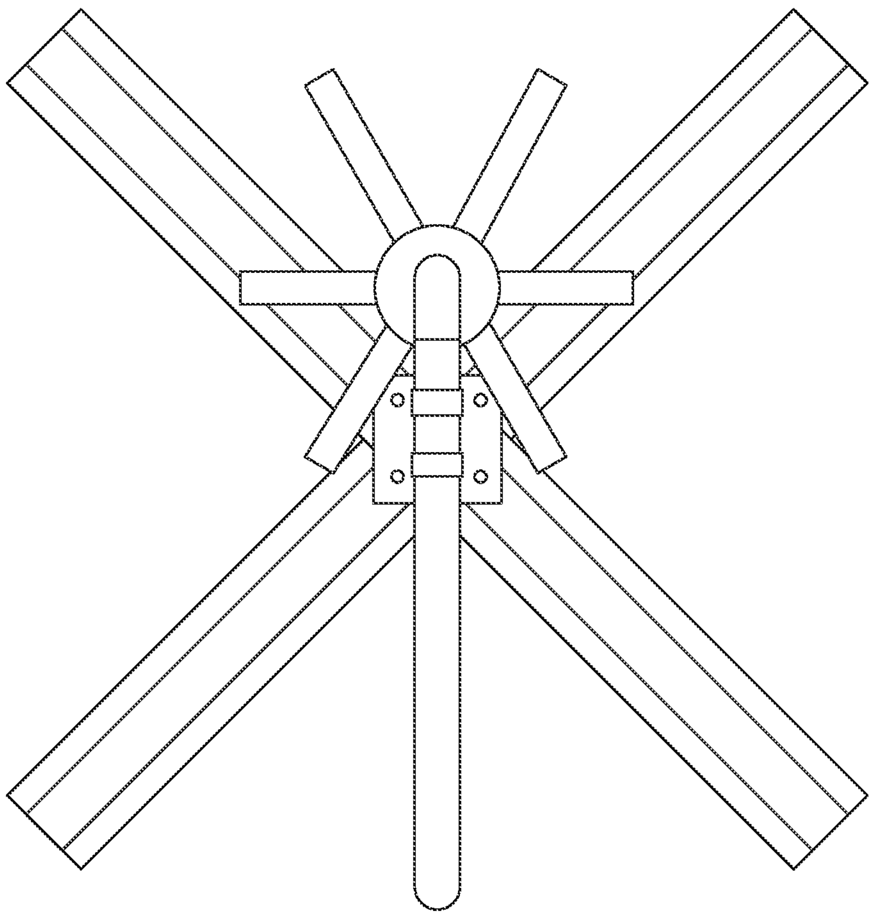
Figure 149:
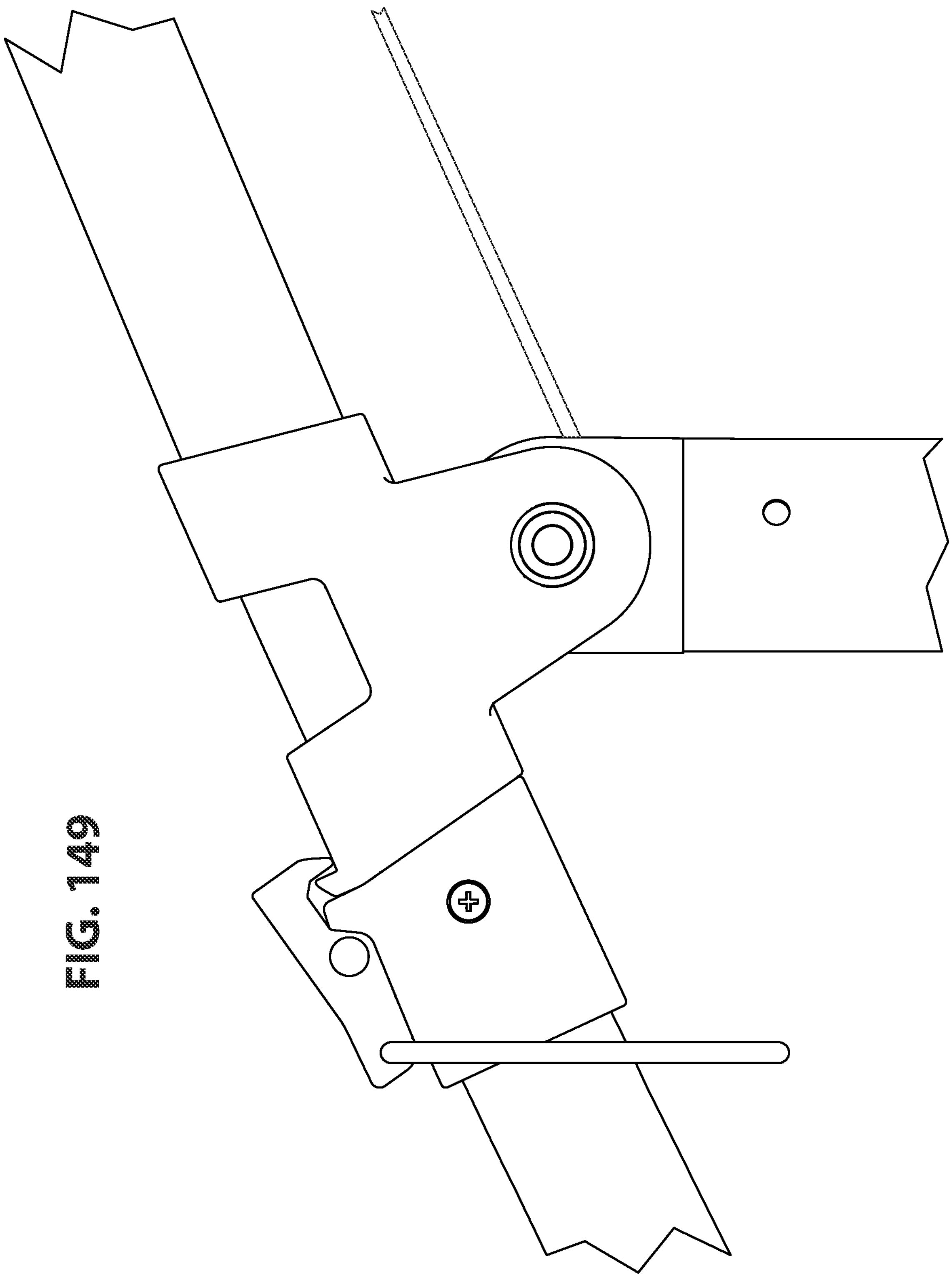
FIG. 149, FIG. 150, FIG. 151, and FIG. 152 illustrate enlarged partial side views of a variation of the teeter-totter-locking spring-loaded automatic hook-lock 114.
Figure 150:
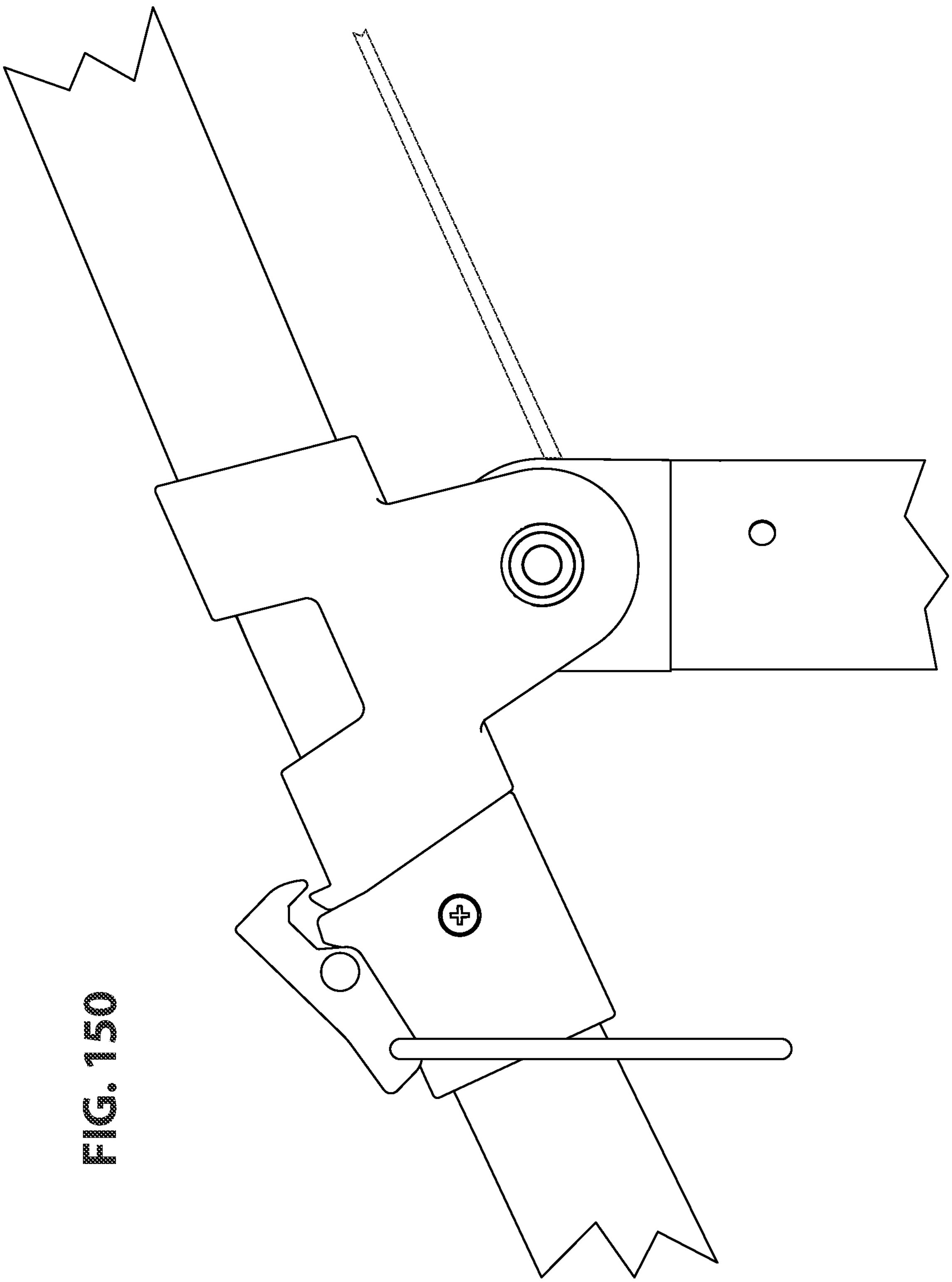
Figure 151:
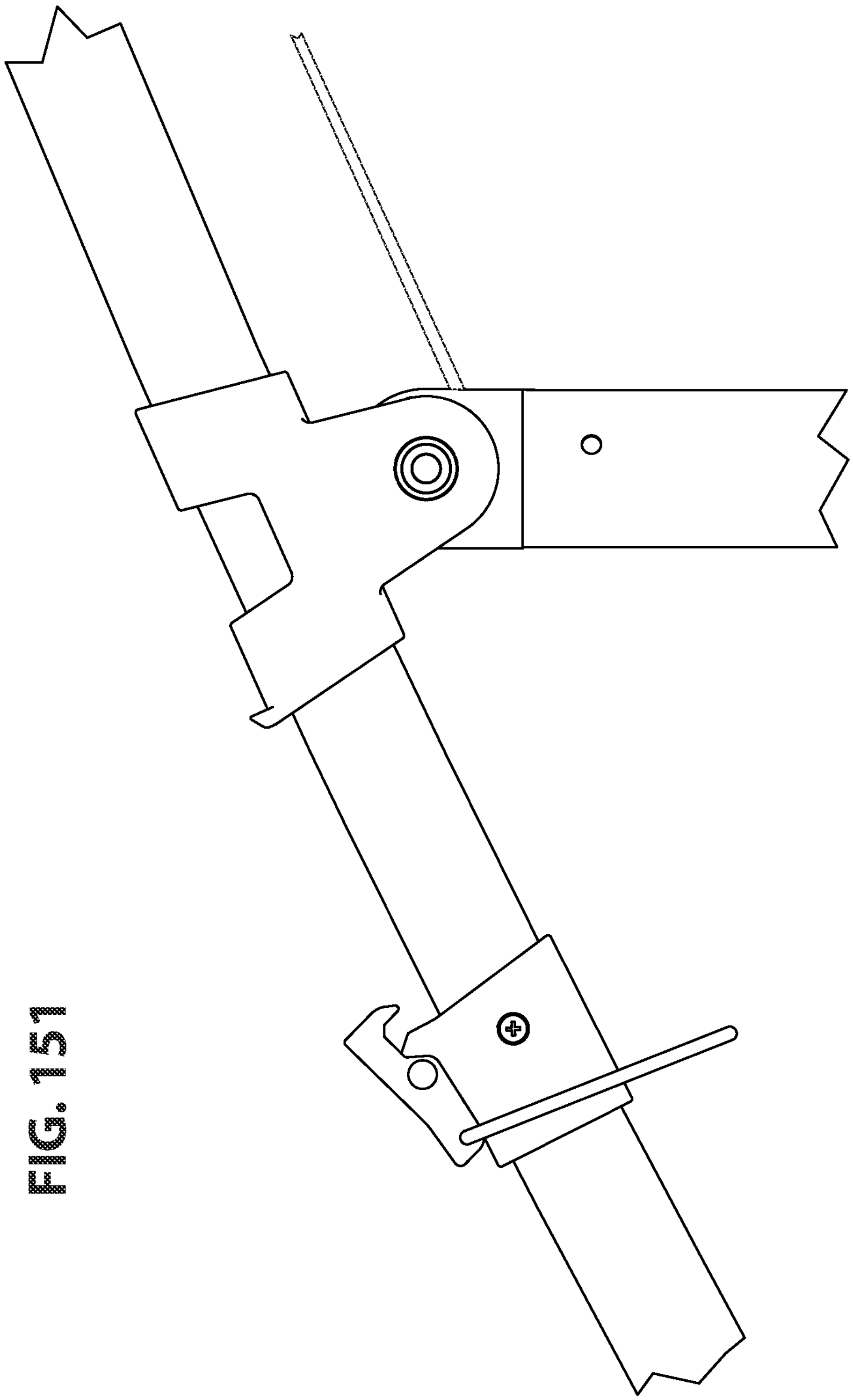
Figure 152:
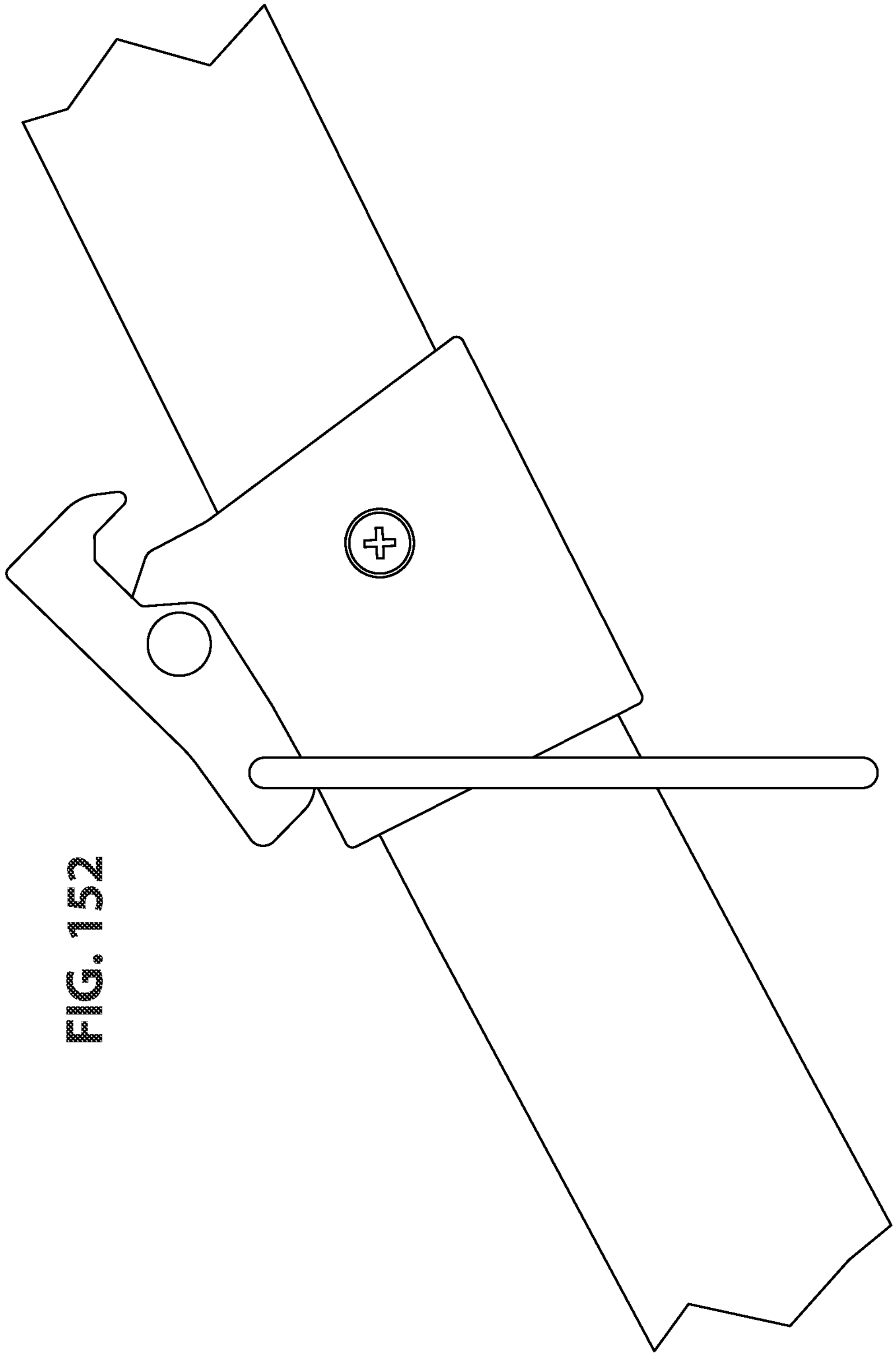
Figure 153:
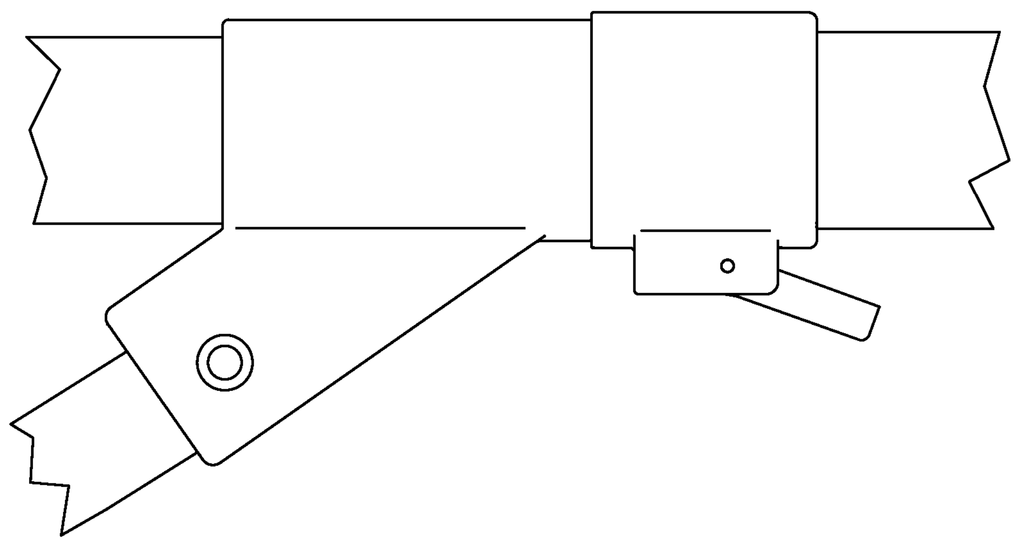
FIG. 153, FIG. 154, FIG. 155, and FIG. 156 illustrate enlarged partial side and perspective views of a variation of the horizontal-rotation-locking wind-catching-and-redirecting land-yacht-maneuvering system 105.
Figure 154:
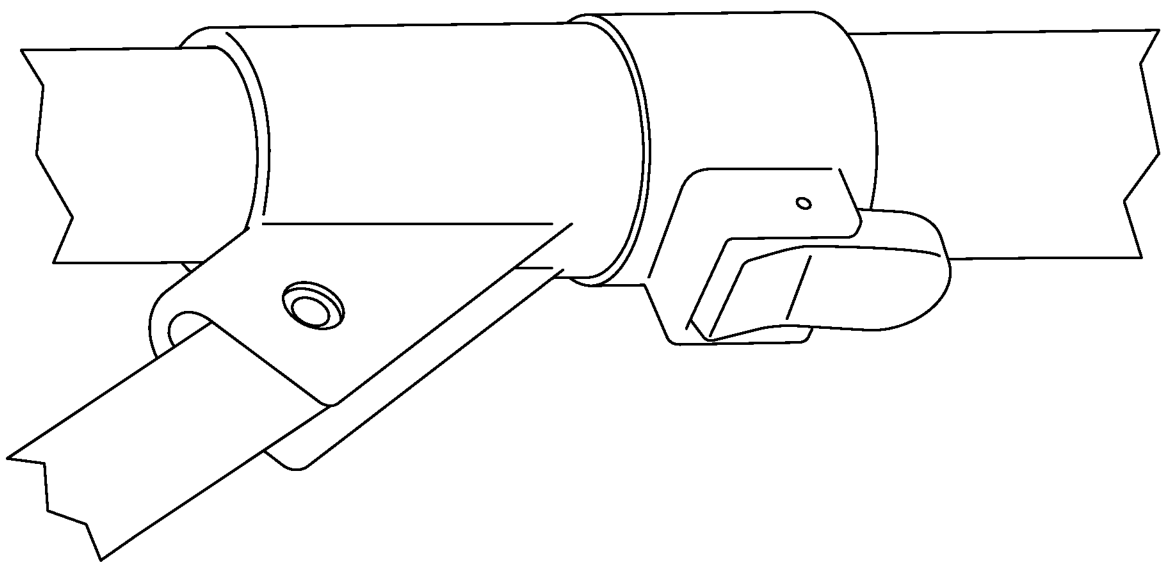
Figure 155:
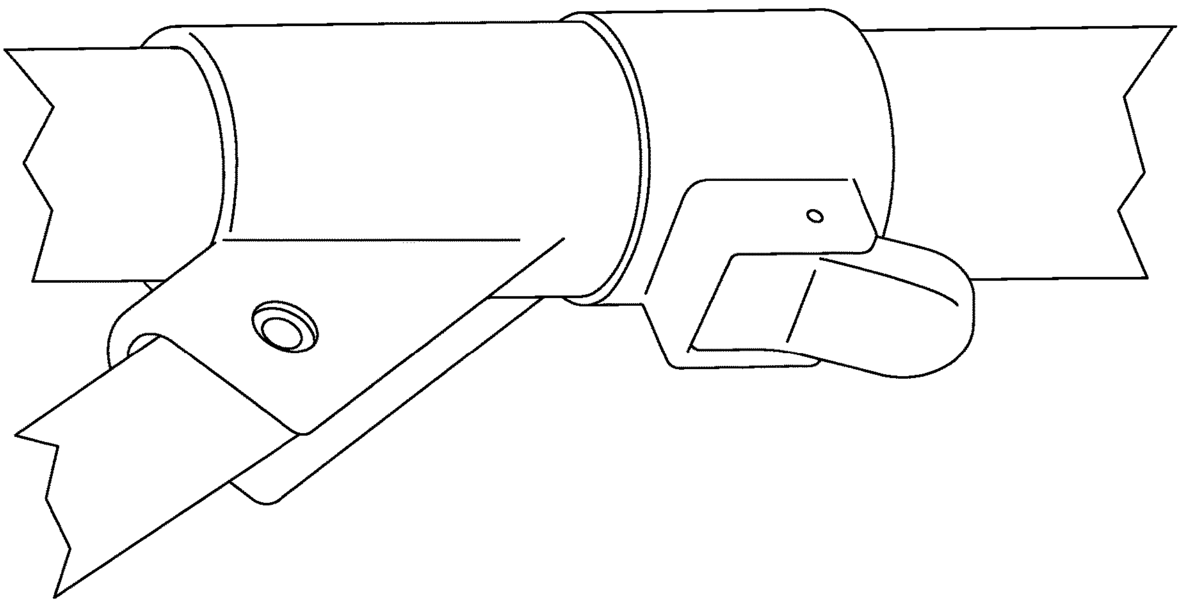
Figure 156:
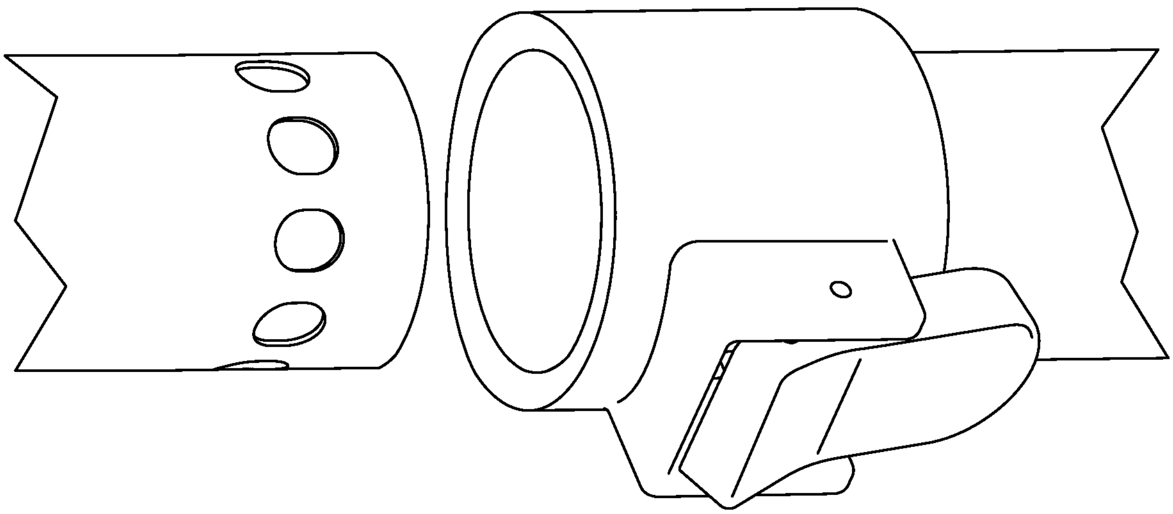

FIG. 128 illustrates a partial perspective view of a variation of components of the wind-catching-and-redirecting rainwater-amassing-and-storing garden-irrigating fruit-harvesting panorama-media-screen-capable land-yacht-powering sail system 121. FIG. 129 illustrates a partial perspective view of a variation of components of the horizontal-rotation-locking wind-catching-and-redirecting land-yacht-maneuvering system 105. FIG. 130 illustrates an enlarged perspective view of a variation of the physically-impaired-assisting arthritic-assisting single-hand-automatic-sail-deploying-and-retracting multi-direction-hoisting system 110. FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, and FIG. 148 illustrate partial side, perspective, and top views of a variation of the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, demonstrating varying degrees of deployment.

FIG. 149, FIG. 150, FIG. 151, and FIG. 152 illustrate enlarged partial side views of a variation of the teeter-totter-locking spring-loaded automatic hook-lock 114. FIG. 153, FIG. 154, FIG. 155, and FIG. 156 illustrate enlarged partial side and perspective views of a variation of the horizontal-rotation-locking wind-catching-and-redirecting land-yacht-maneuvering system 105.

Figure 157:
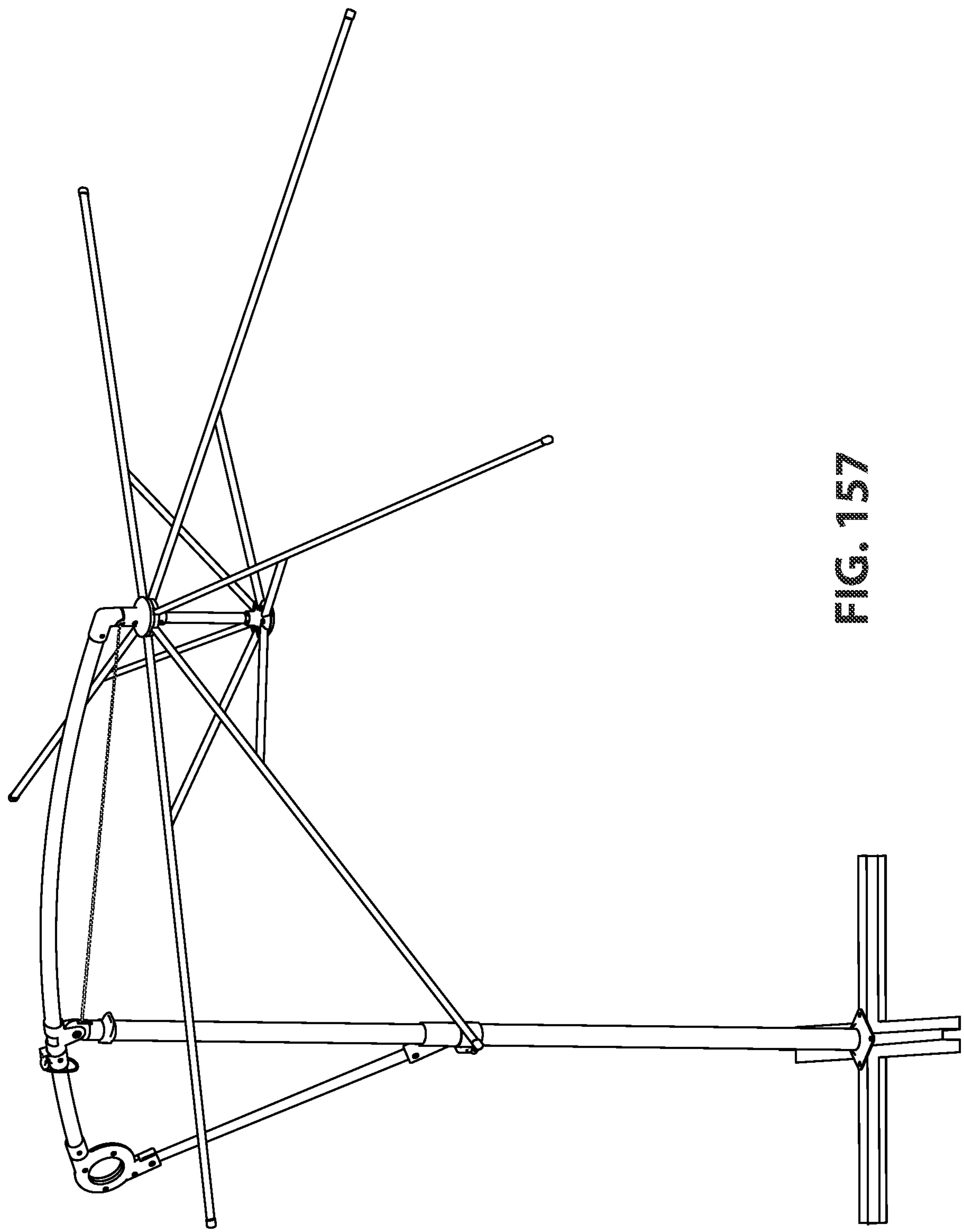
FIG. 157 and FIG. 158 illustrate perspective views of a variation of the horizontal-rotation-locking wind-catching-and-redirecting land-yacht-maneuvering system 105 providing means to rotate the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121.
Figure 158:
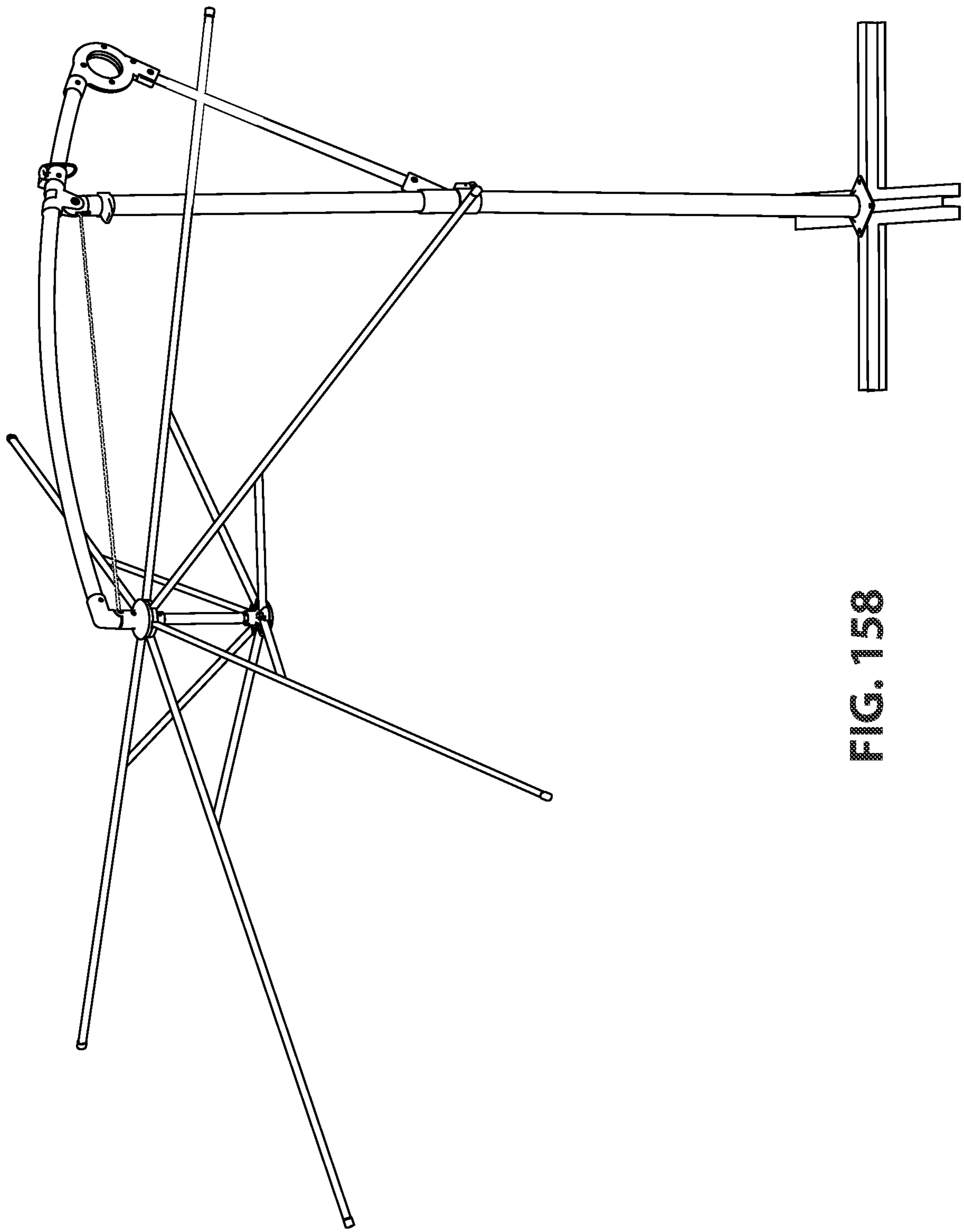
Figure 159:
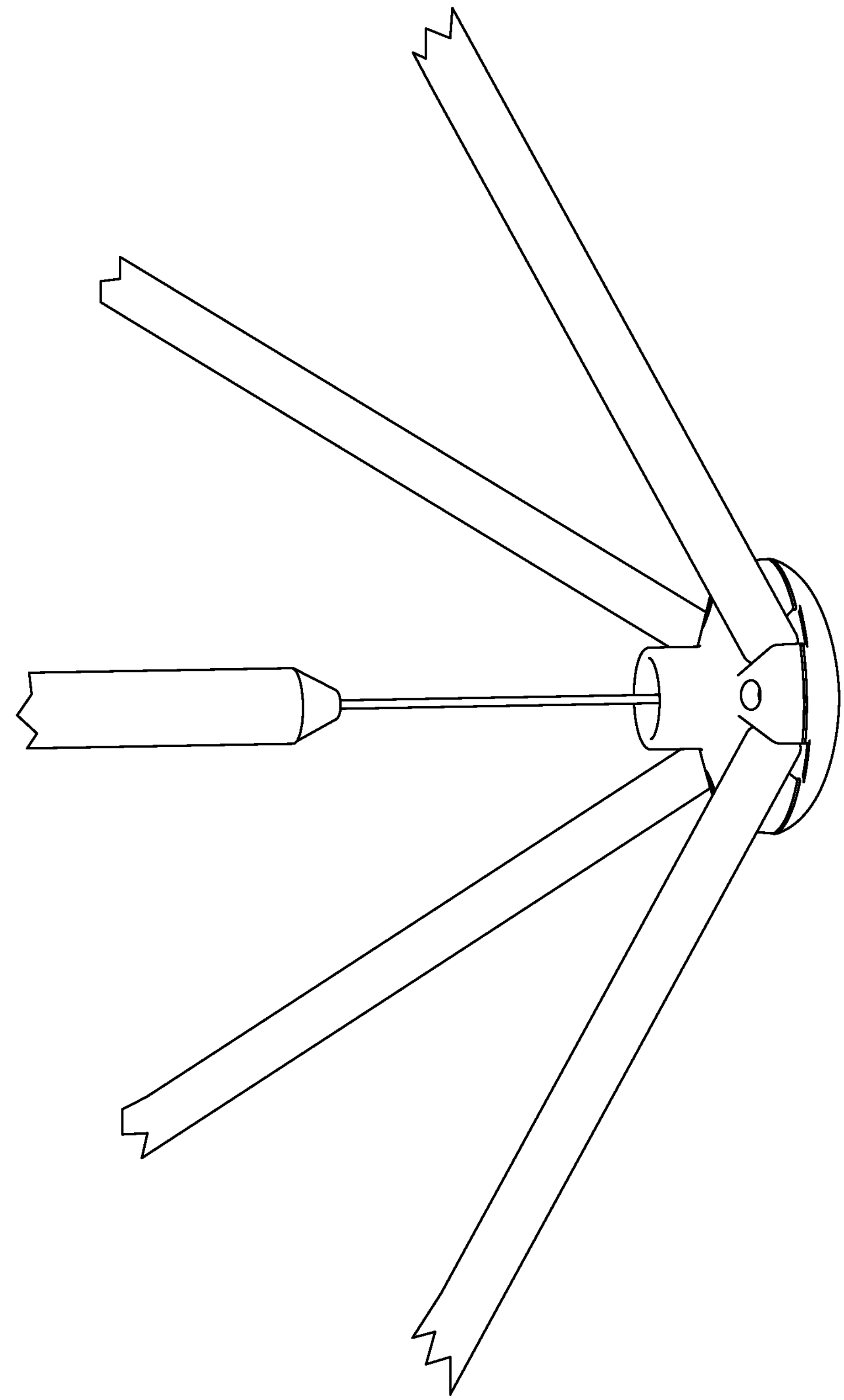
FIG. 159, and FIG. 160 illustrate partial perspective views of a variation of components of the wind-catching-and-redirecting rainwater-amassing-and-storing garden-irrigating fruit-harvesting panorama-media-screen-capable land-yacht-powering sail system 121.
Figure 160:
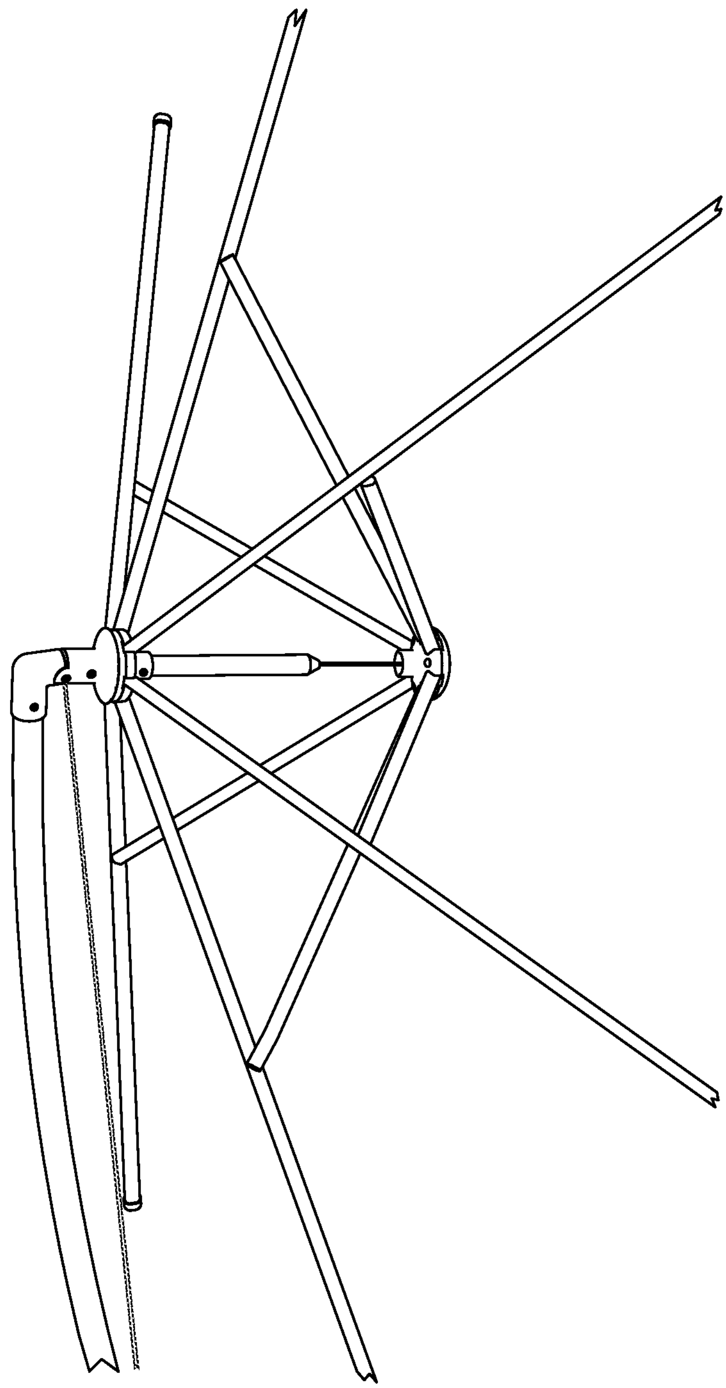
Figure 161:
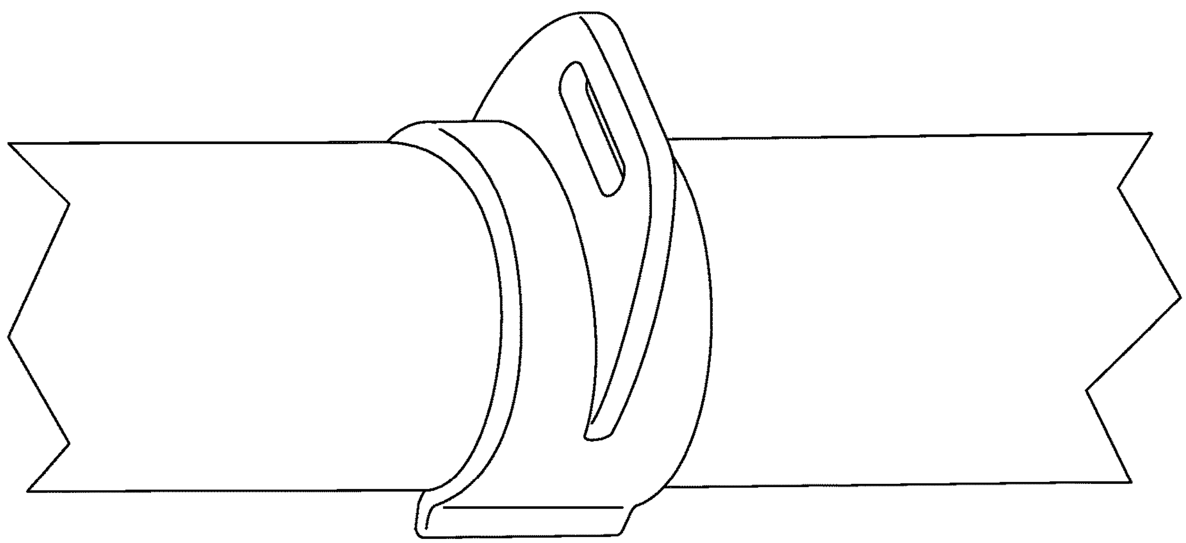
FIG. 161, FIG. 162, and FIG. 163 illustrate enlarged perspective views of a variation of the sail-location-securing adjustable removable clip 124.
Figure 162:
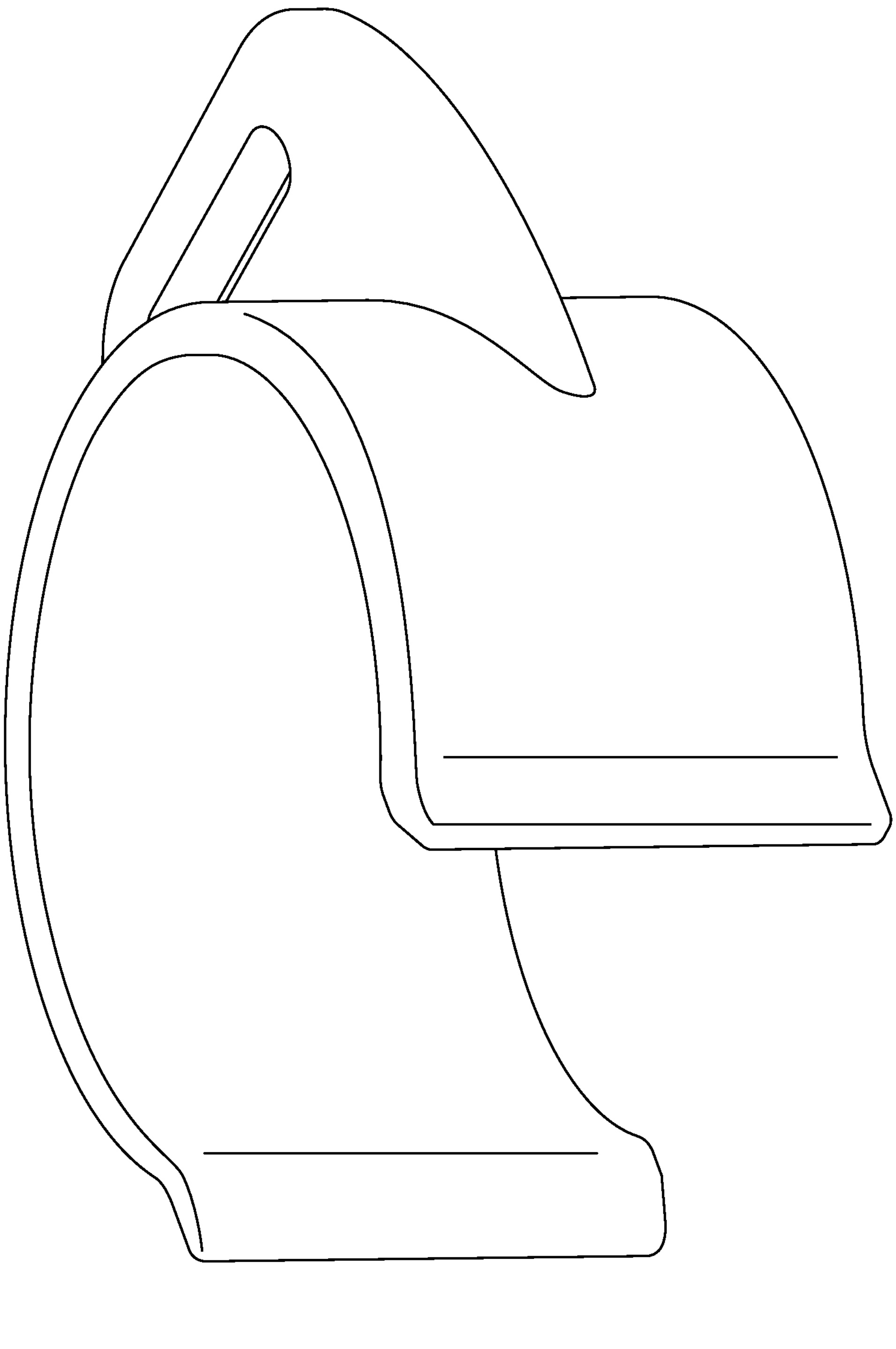
Figure 163:
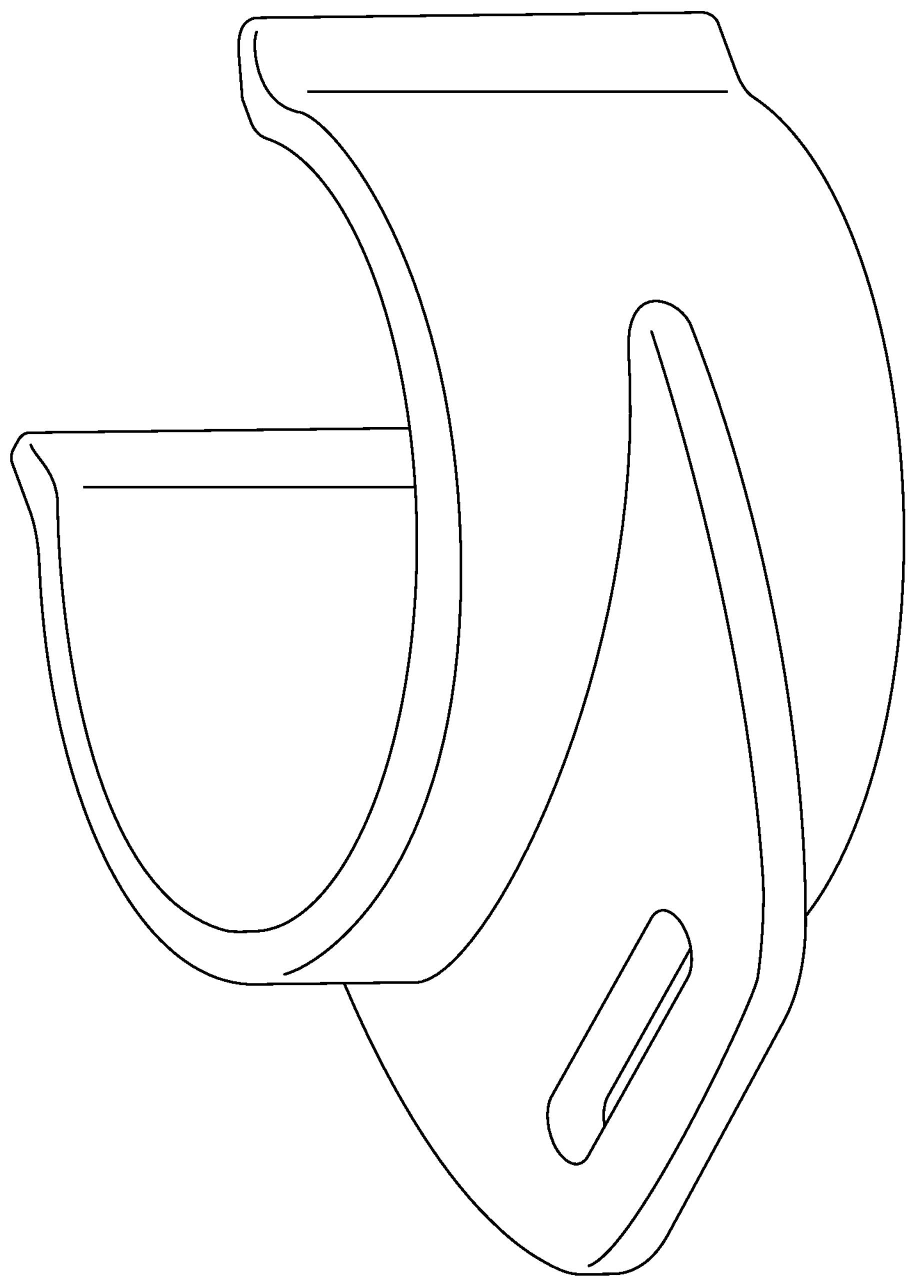

FIG. 157 and FIG. 158 illustrate perspective views of a variation of the horizontal-rotation-locking wind-catching-and-redirecting land-yacht-maneuvering system 105 providing means to rotate the physically-impaired-assisting arthritic-assisting single-hand-automatic-sail-deploying-and-retracting multi-direction-hoisting system 110 and the wind-catching-and-redirecting rainwater-amassing-and-storing garden-irrigating fruit-harvesting panorama-media-screen-capable land-yacht-powering sail system 121. FIG. 159 and FIG. 160 illustrate partial perspective views of a variation of components of the wind-catching-and-redirecting rainwater-amassing-and-storing garden-irrigating fruit-harvesting panorama-media-screen-capable land-yacht-powering sail system 121. FIG. 161, FIG. 162, and FIG. 163 illustrate enlarged perspective views of a variation of the sail-location-securing adjustable removable clip 124.

Figure 164:
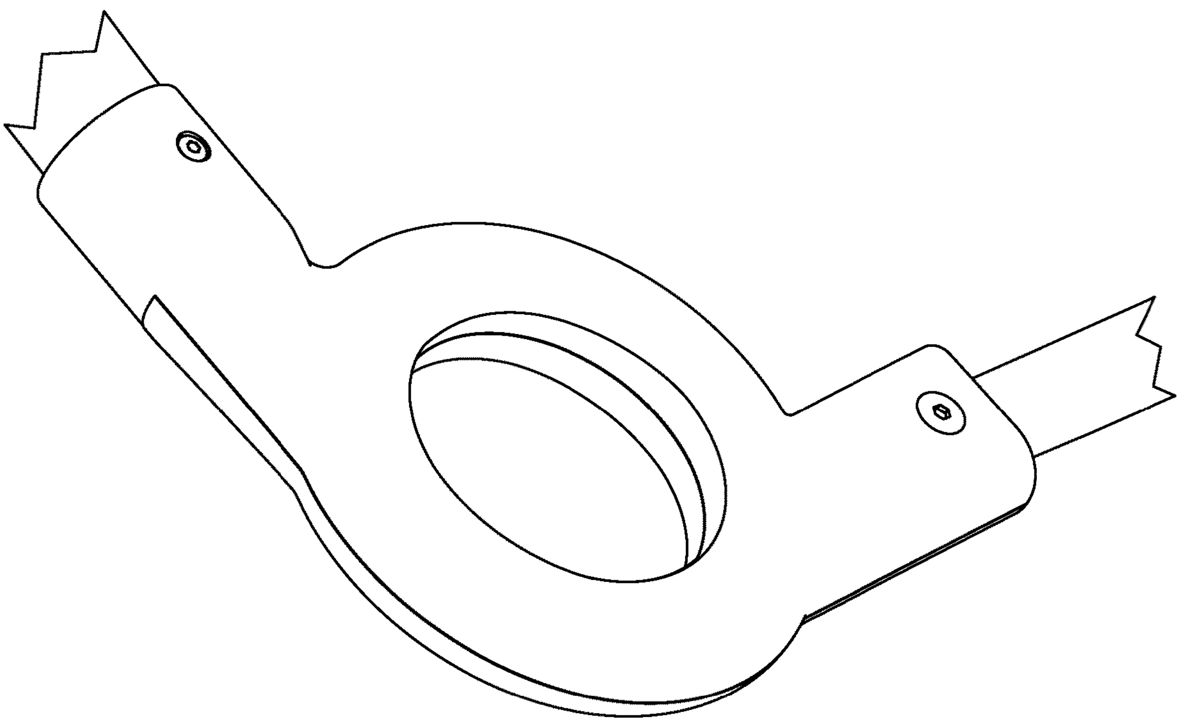
FIG. 164 and FIG. 165 illustrate enlarged partial side and perspective views of a variation of the physically-impaired-assisting arthritic-assisting single-hand-sail-deploying-and-retracting land-yacht-maneuvering multi-direction-hoisting ergonomic navigator 112.
Figure 165:
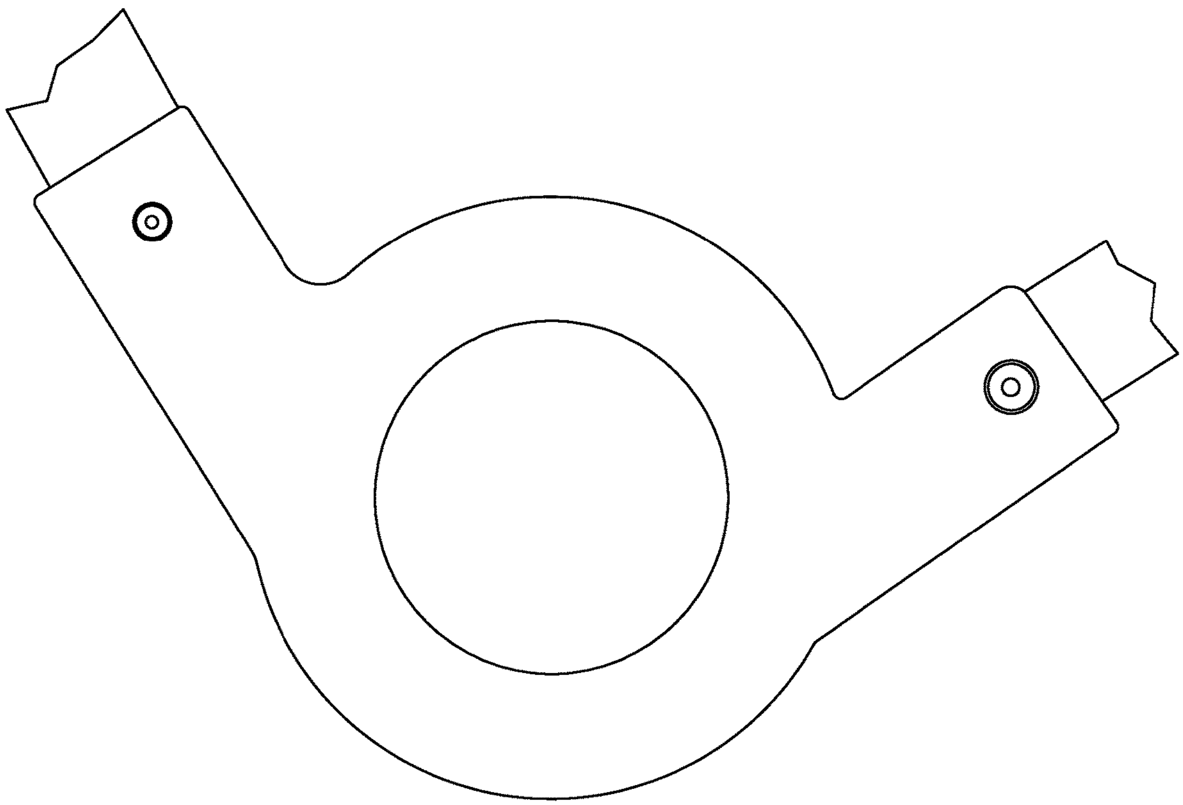
Figure 166:
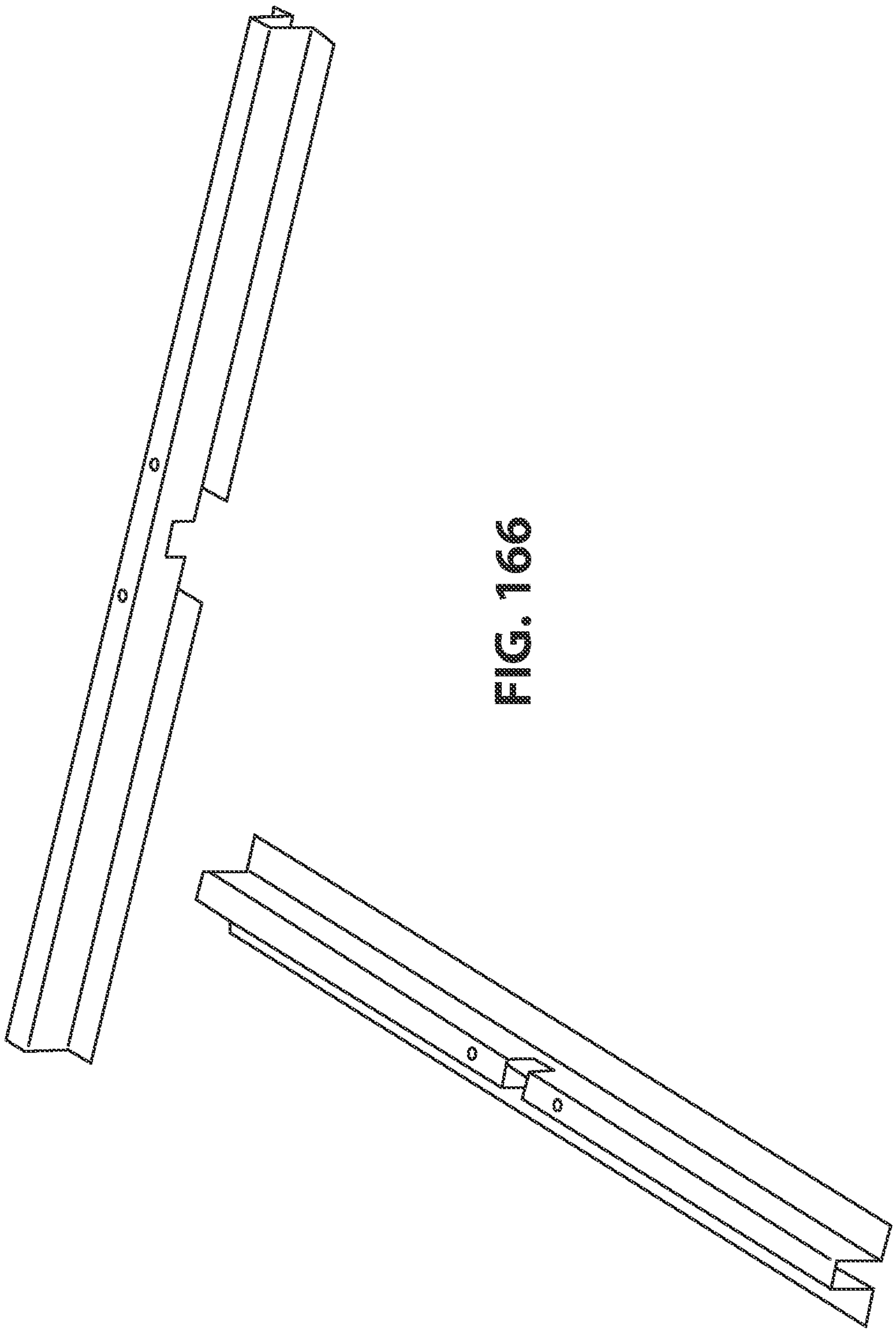
FIG. 166, FIG. 167, and FIG. 168 illustrate an exploded and perspective views of a variation of the sail and stanchion plinth system 101.
Figure 167:
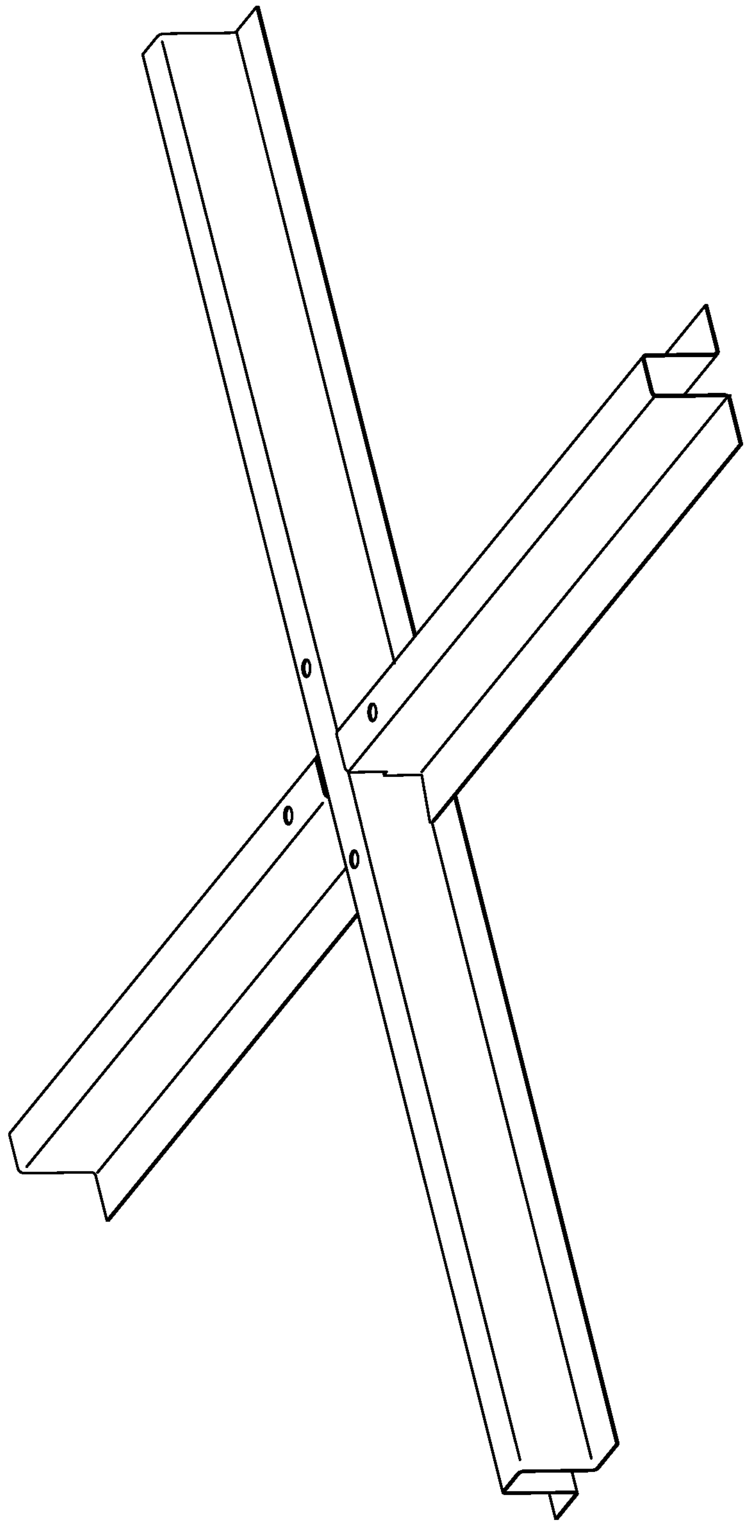
Figure 168:
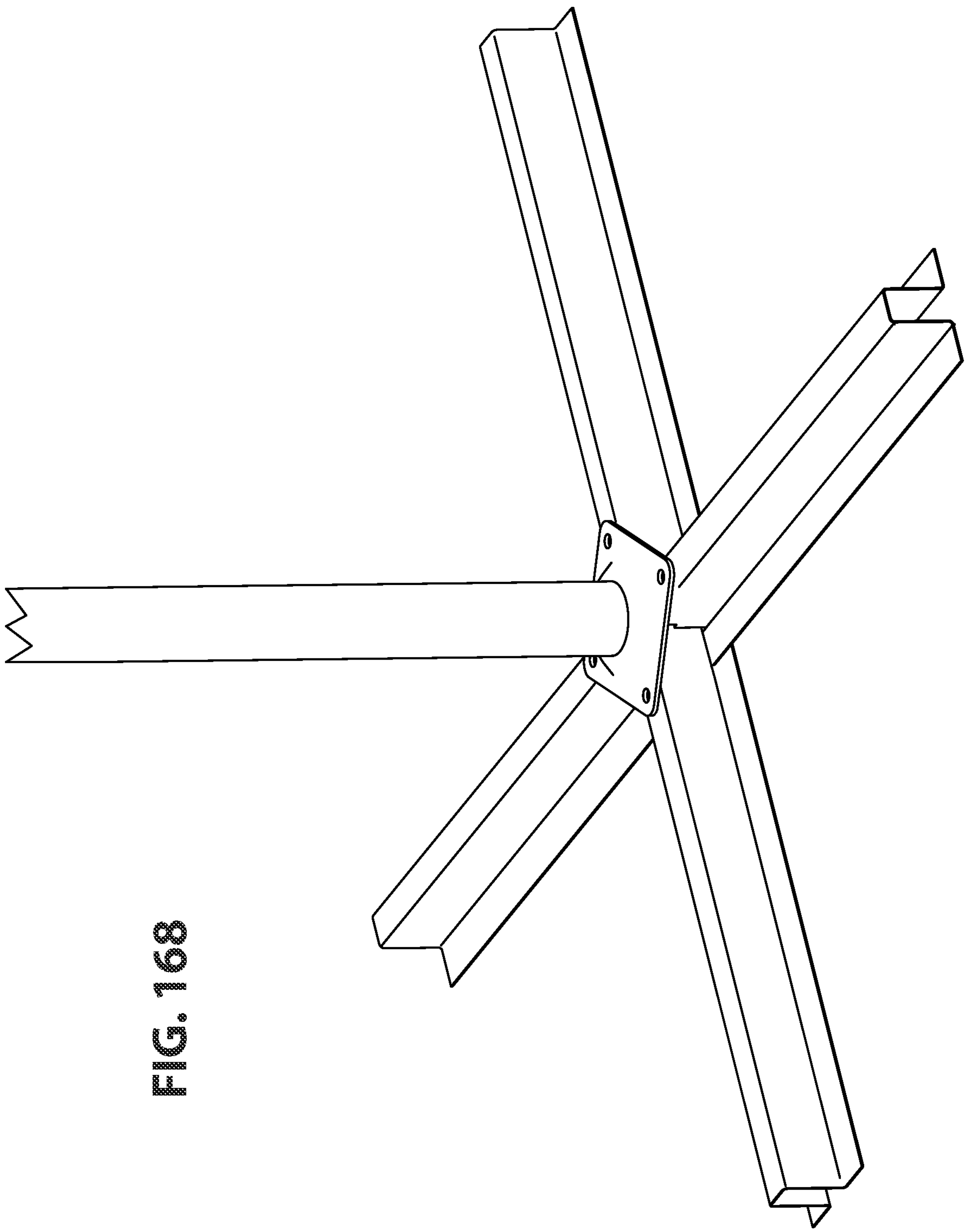
Figure 169:
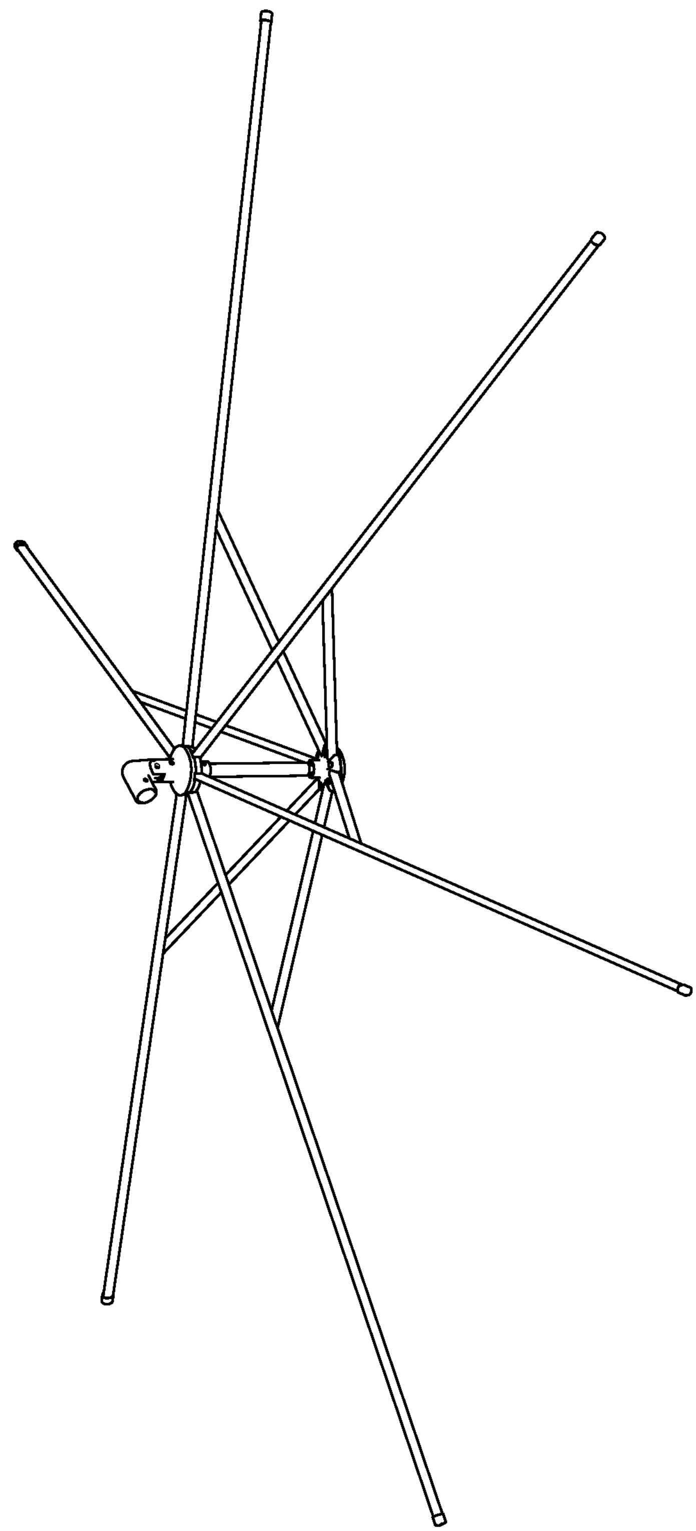
FIG. 169, FIG. 170, and FIG. 171 illustrate partial perspective views of a variation of the wind-catching-and-redirecting rainwater-amassing-and-storing garden-irrigating fruit-harvesting panorama-media-screen-capable land-yacht-powering sail system 121.
Figure 170:
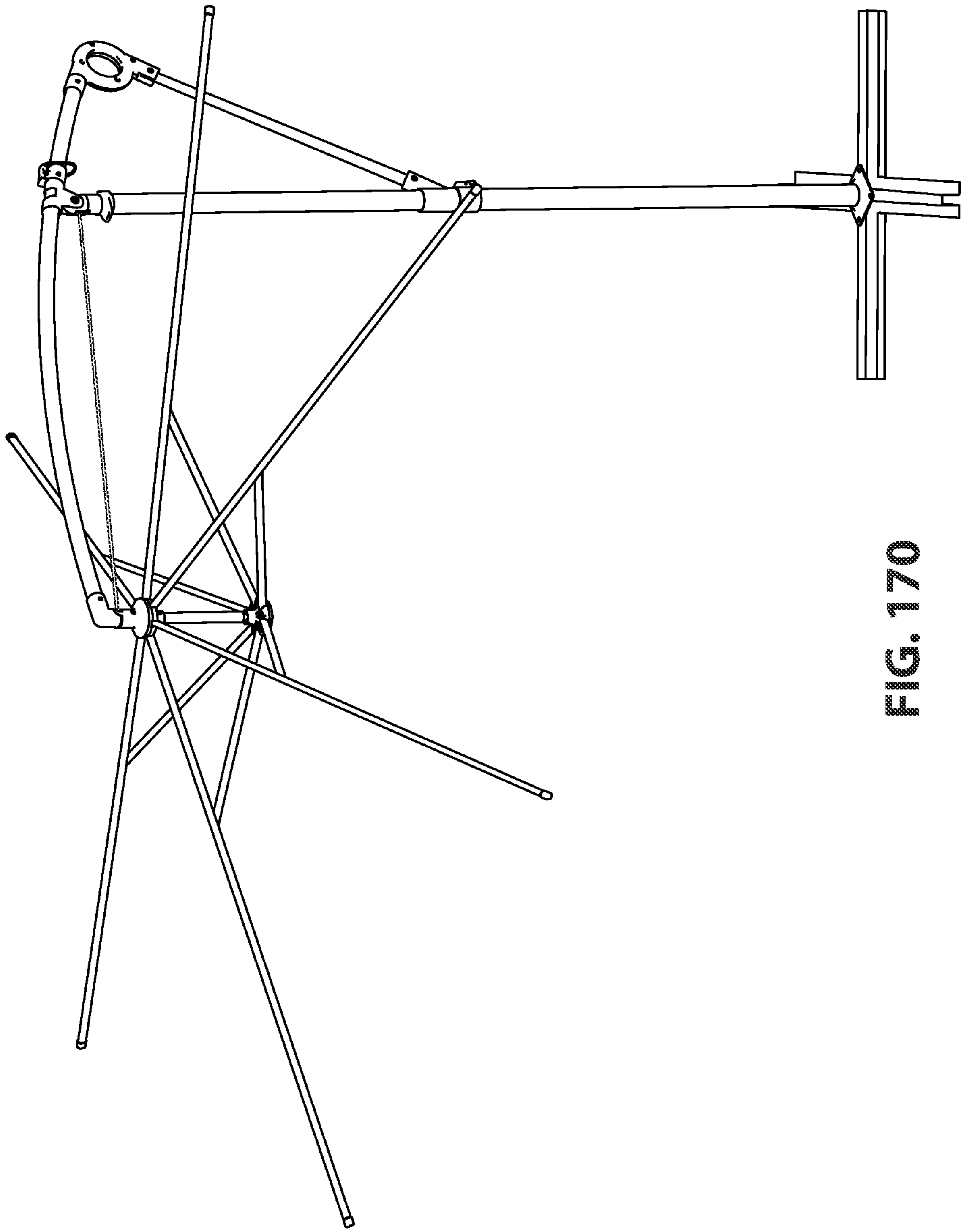
Figure 171:
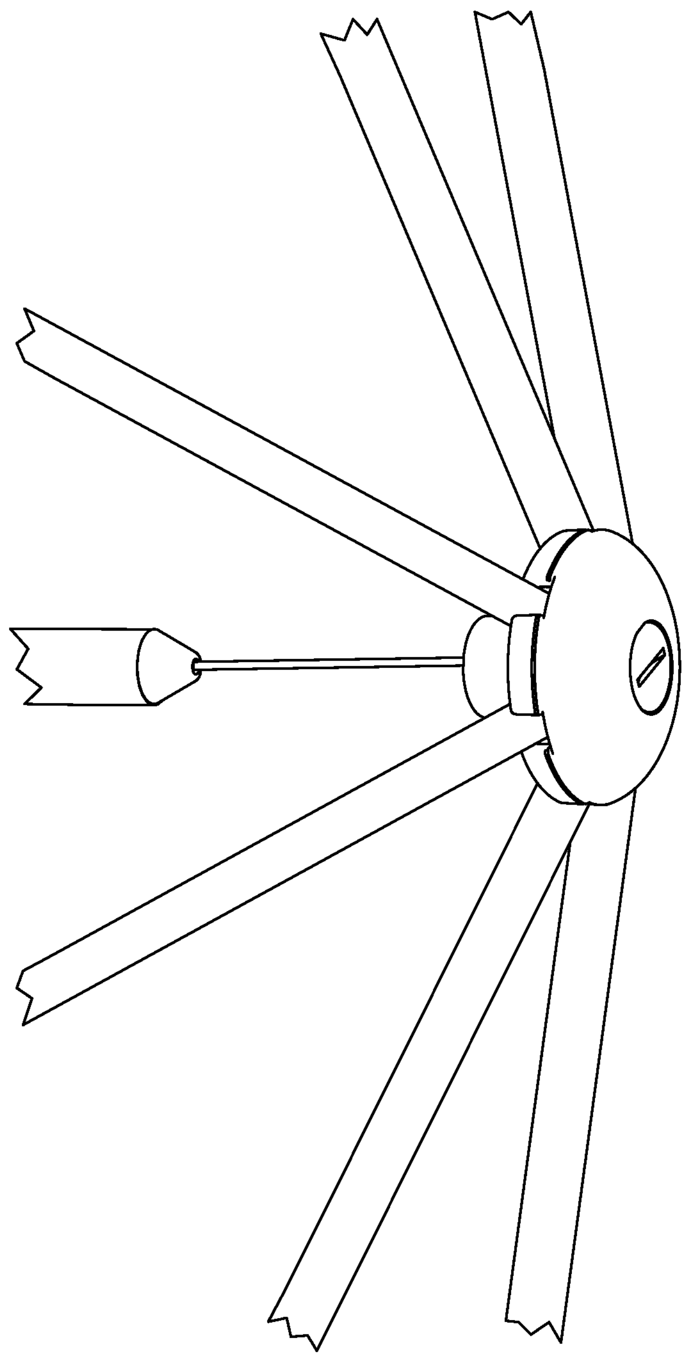
Figure 172:
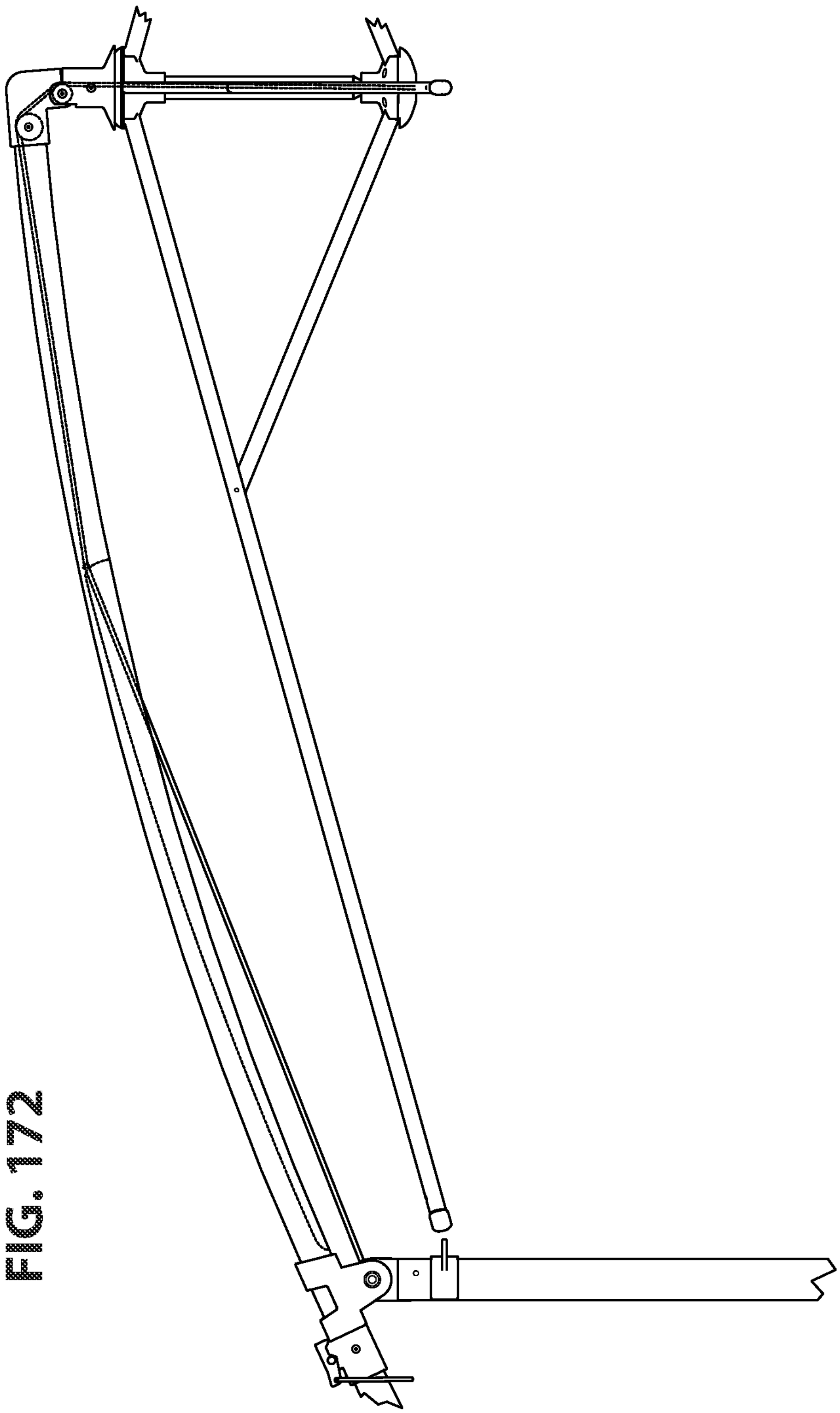
FIG. 172, FIG. 173, FIG. 174, FIG. 175, FIG. 176, FIG. 177, and FIG. 178 illustrate partial side and perspective views of a variation of the physically-impaired-assisting arthritic-assisting single-hand-automatic-sail-deploying-and-retracting multi-direction-hoisting system 110 demonstrating varying degrees of deployment of the wind-catching-and-redirecting rainwater-amassing-and-storing garden-irrigating fruit-harvesting panorama-media-screen-capable land-yacht-powering sail system 121.
Figure 173:
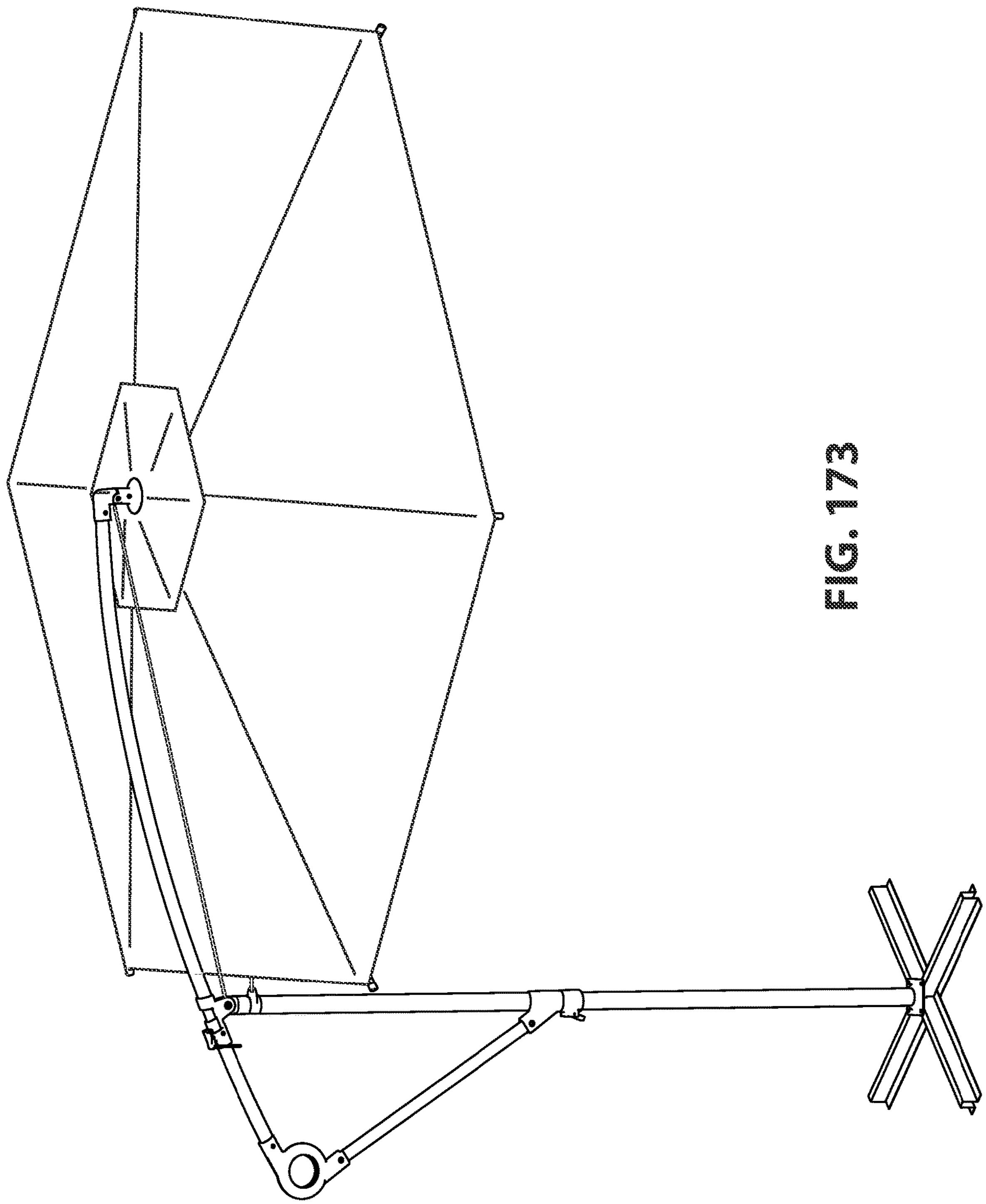
Figure 174:
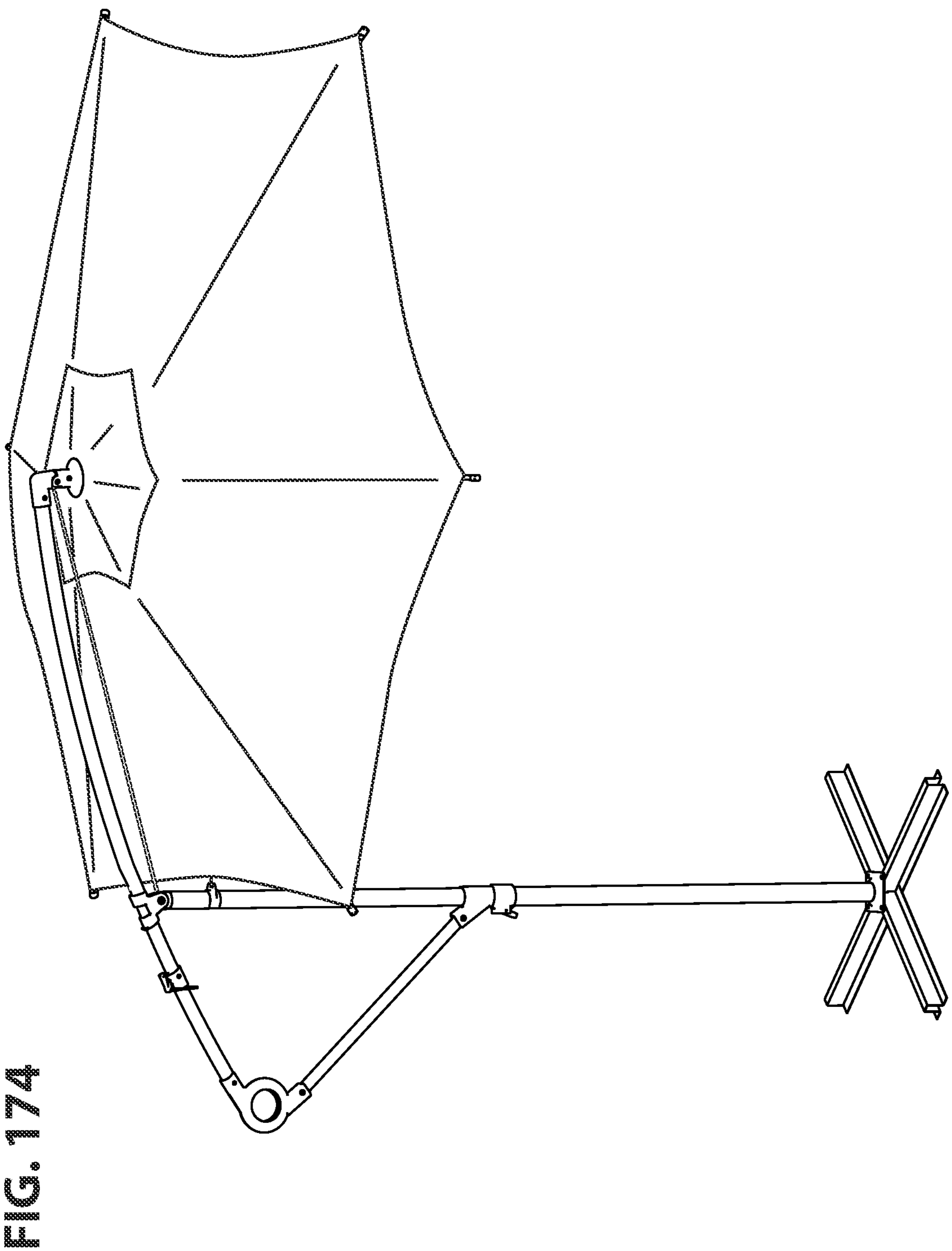
Figure 175:
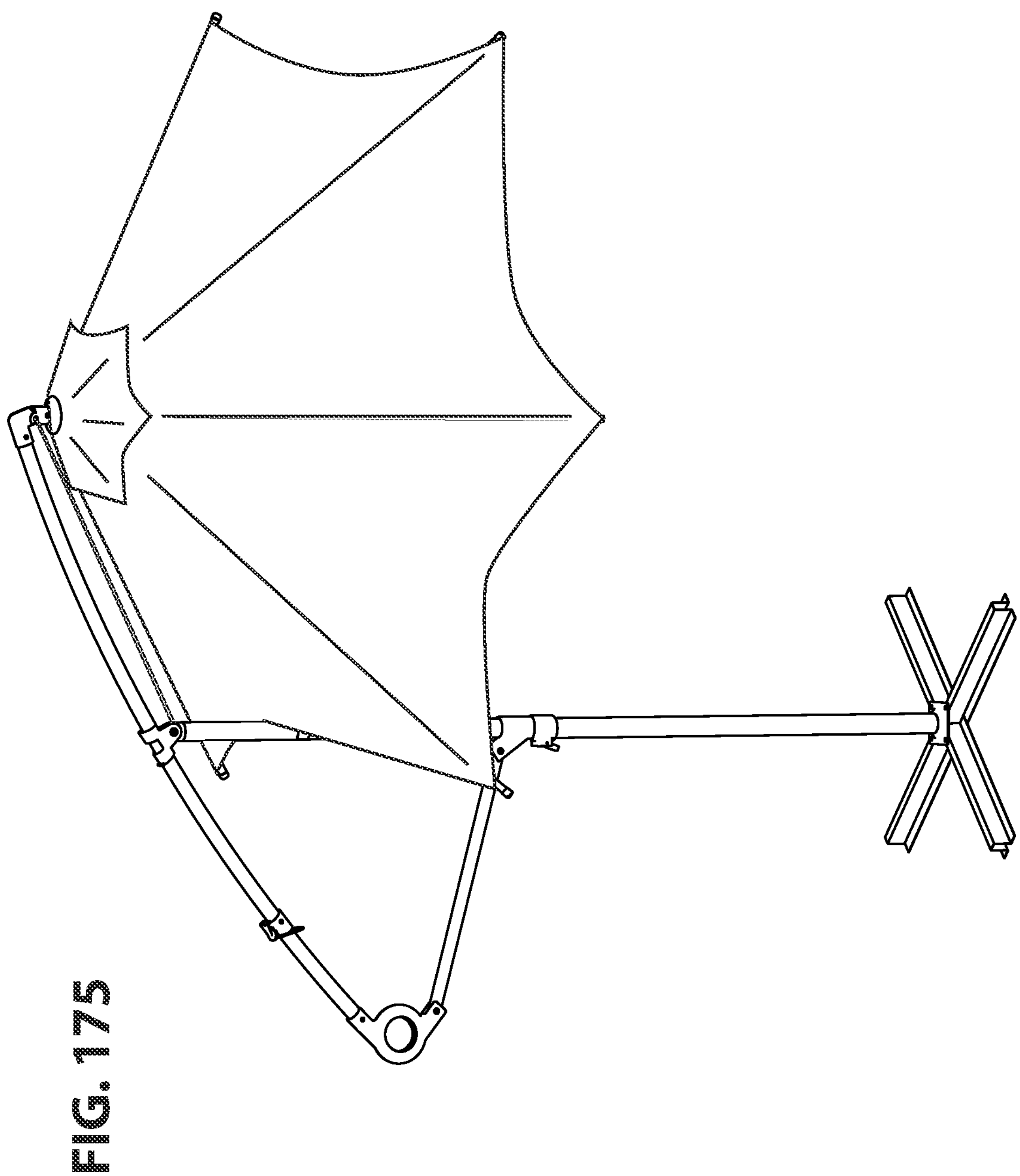
Figure 176:
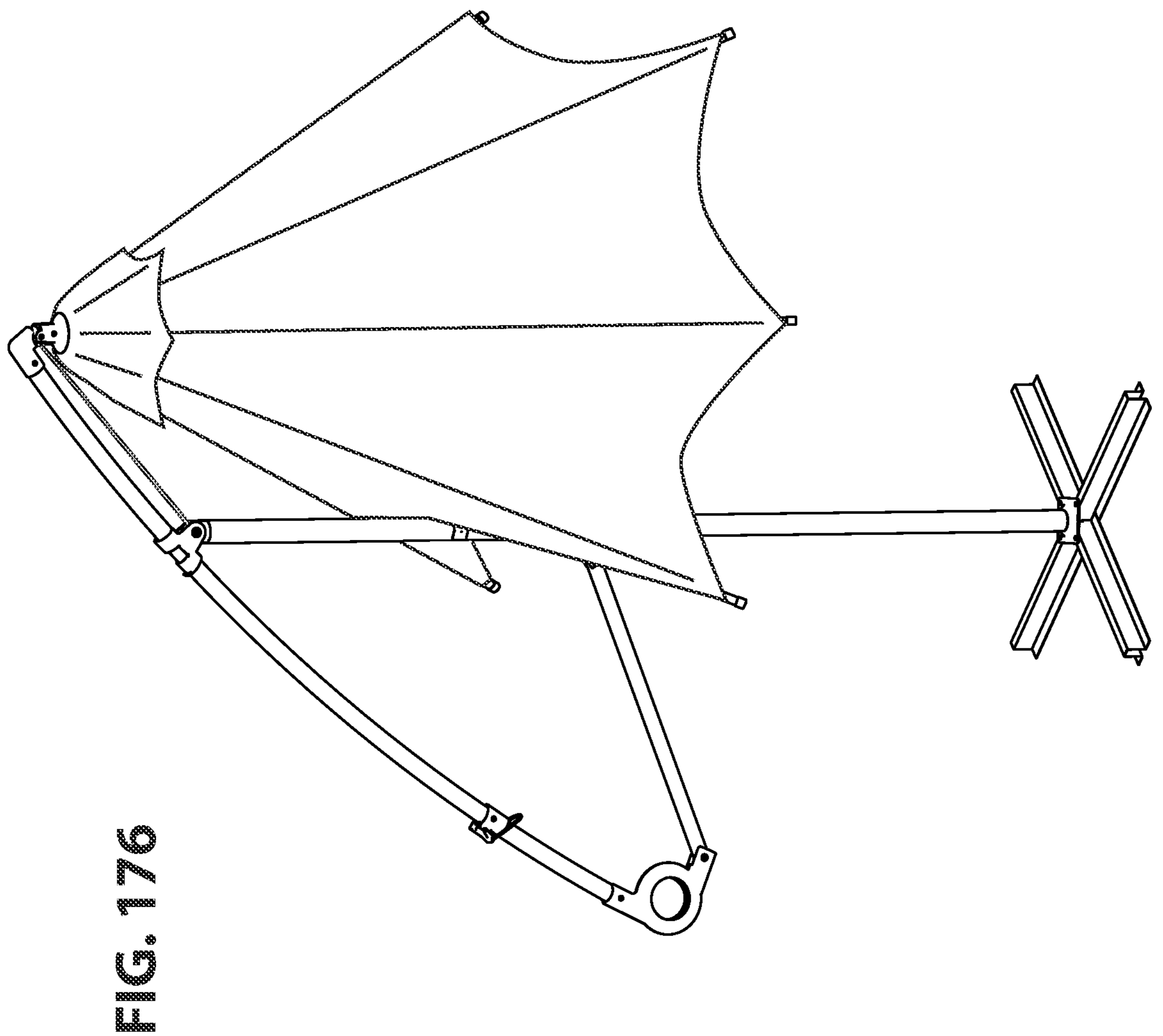
Figure 177:
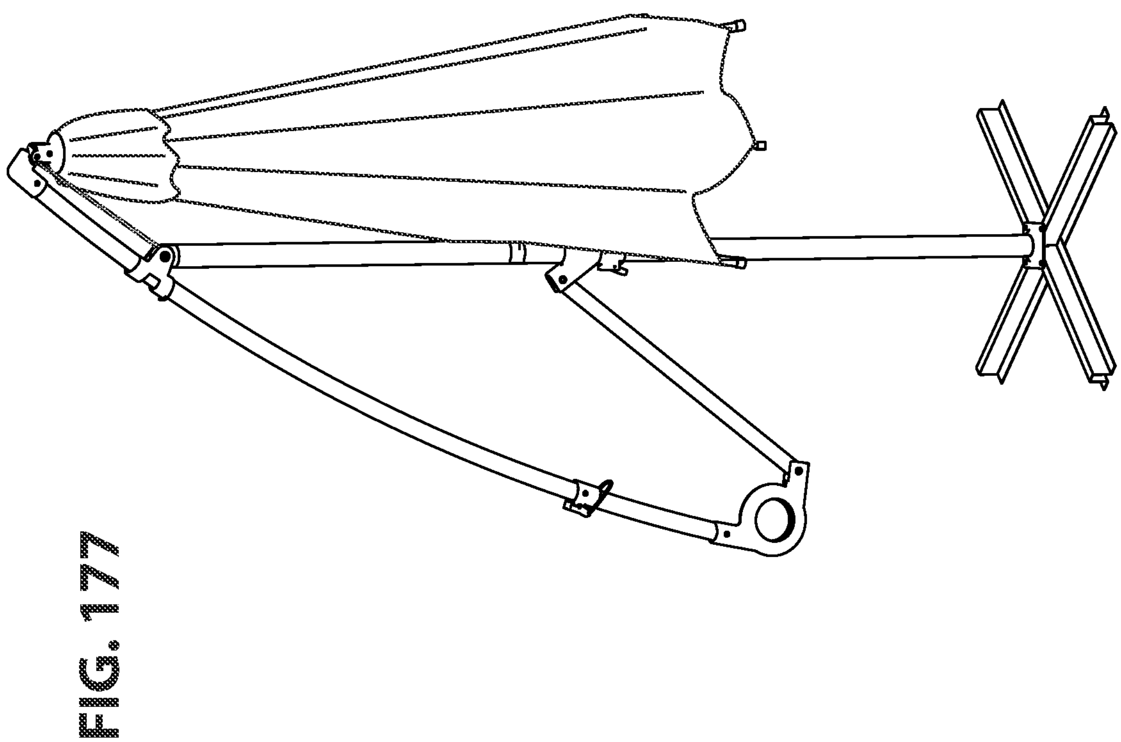
Figure 178:
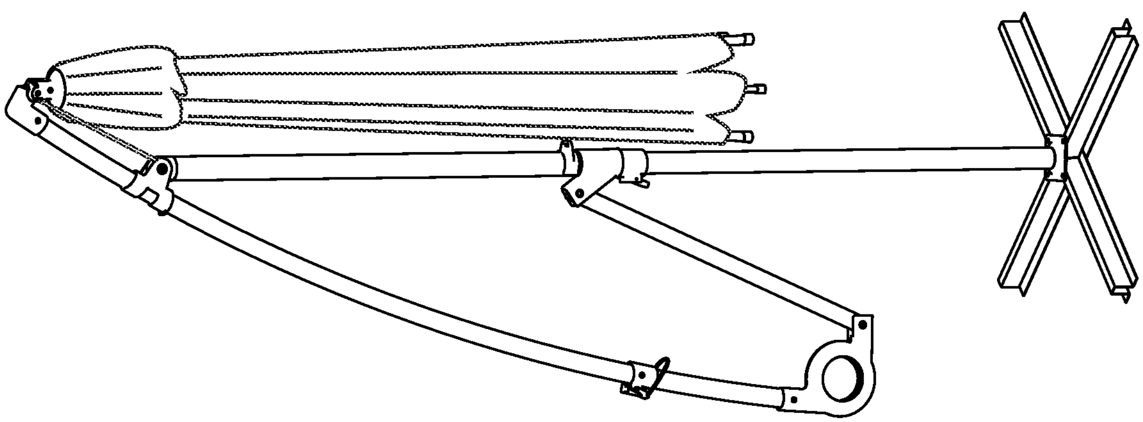
Figure 179:
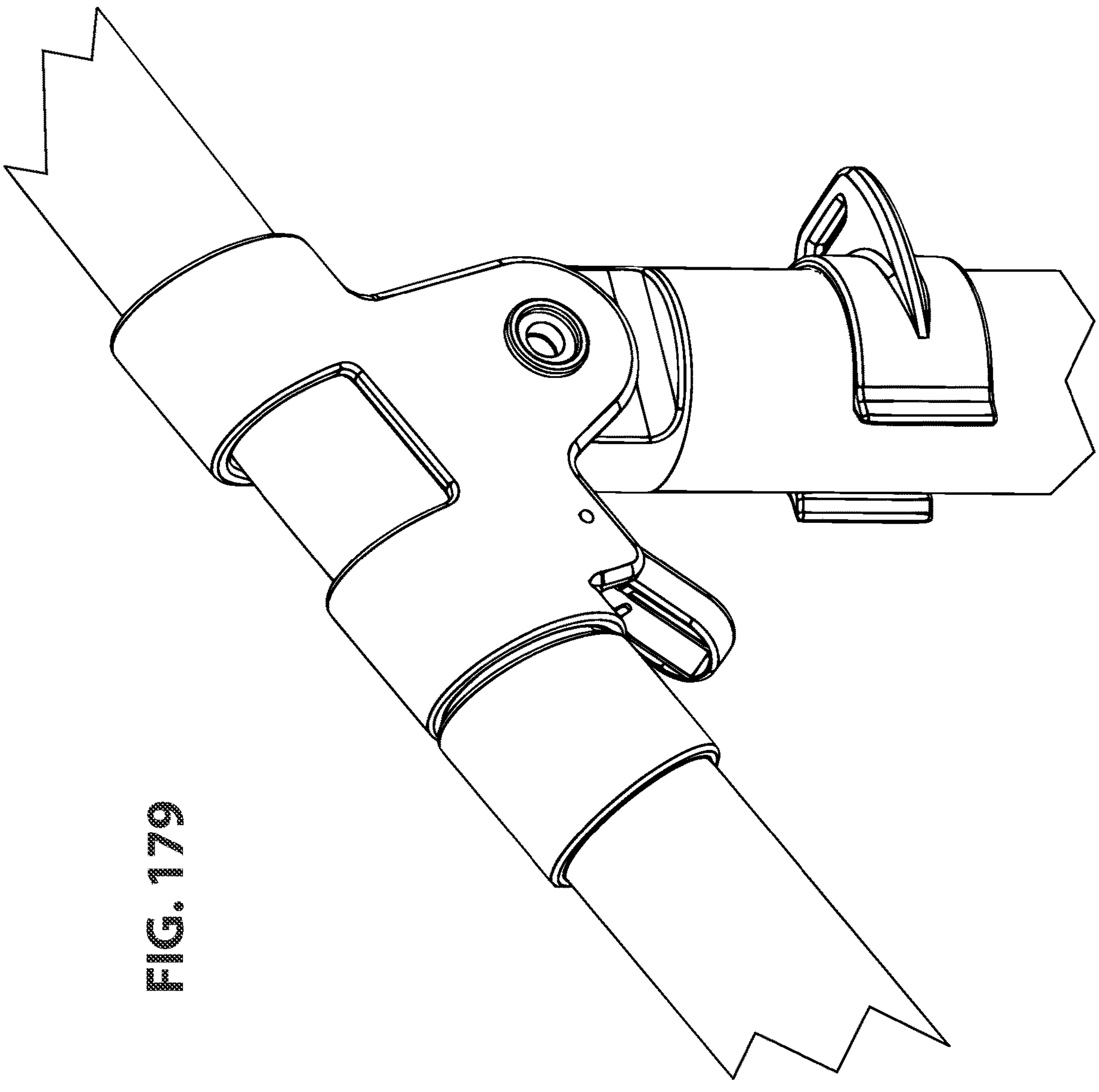
FIG. 179 illustrates an enlarged perspective view of a variation of the sail-location-securing adjustable removable clip 124.
Figure 180:
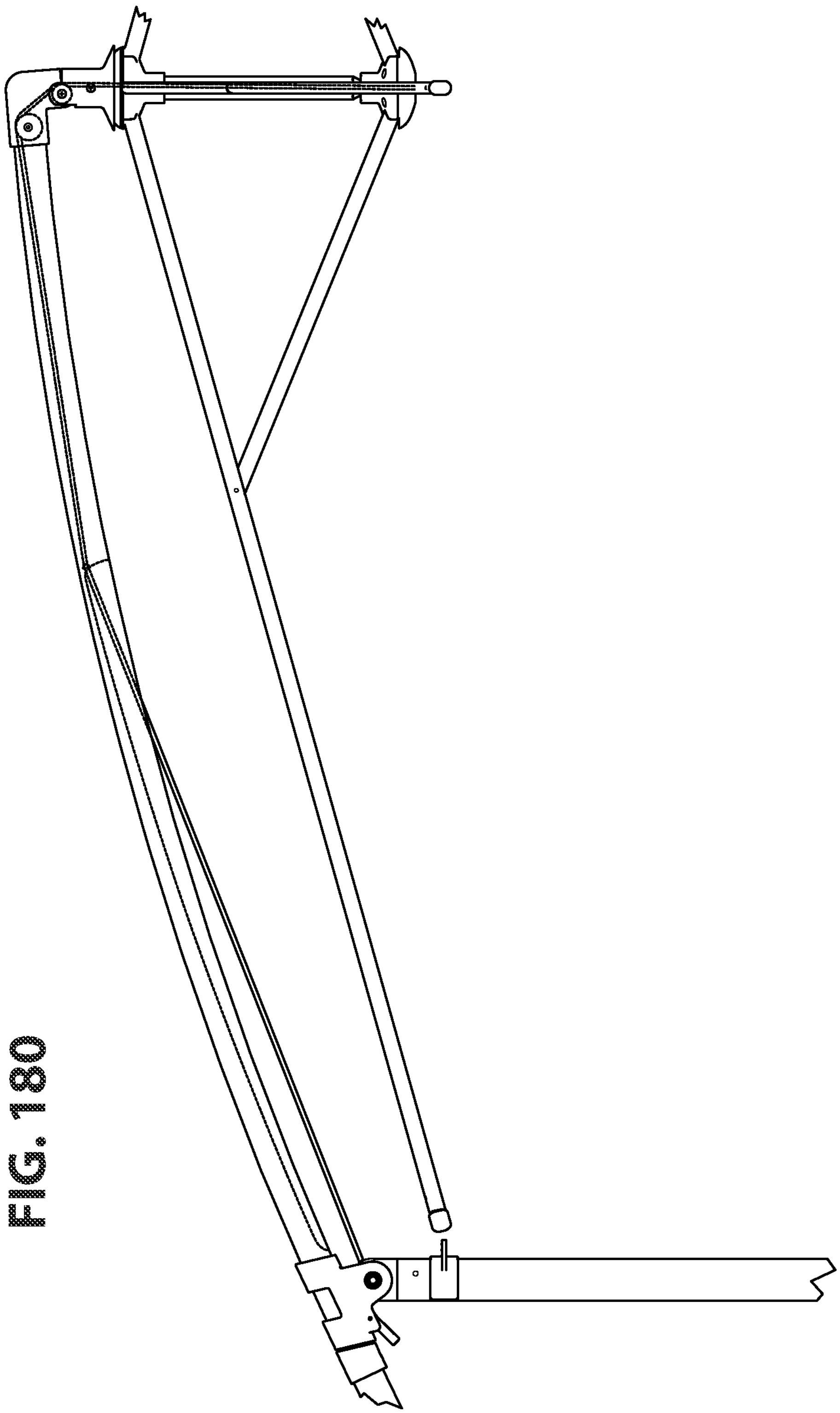
FIG. 180 illustrates a partial side view of a variation of the canal-hidden automatic-sail-deploying-and-retracting cable 118 and the cable-hiding cable-guiding canal 119.
Figure 182:
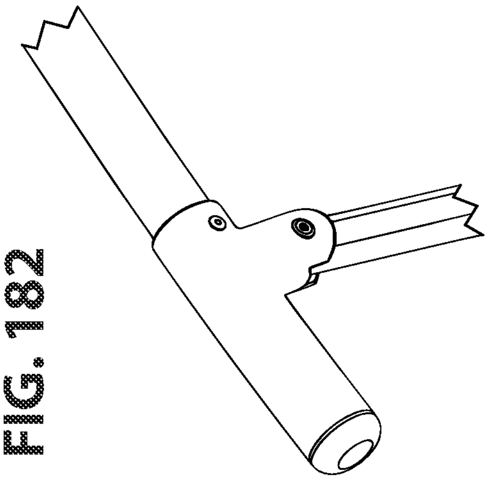
FIG. 181, FIG. 182, FIG. 183, and FIG. 184 illustrate partial side and perspective views of a variation of the physically-impaired-assisting arthritic-assisting single-hand-automatic-sail-deploying-and-retracting multi-direction-hoisting system 110.
Figure 184:
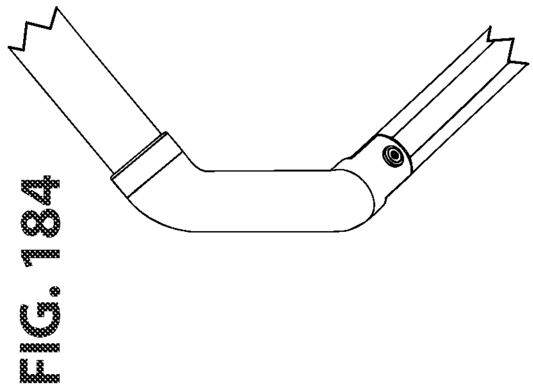
Figure 181:
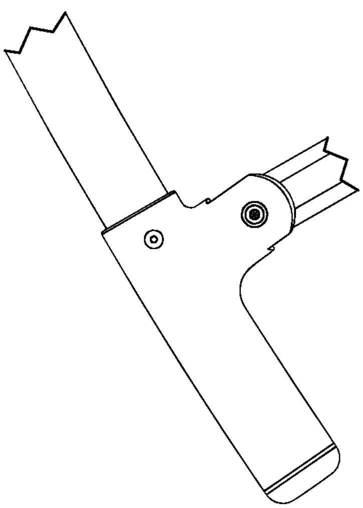
Figure 183:
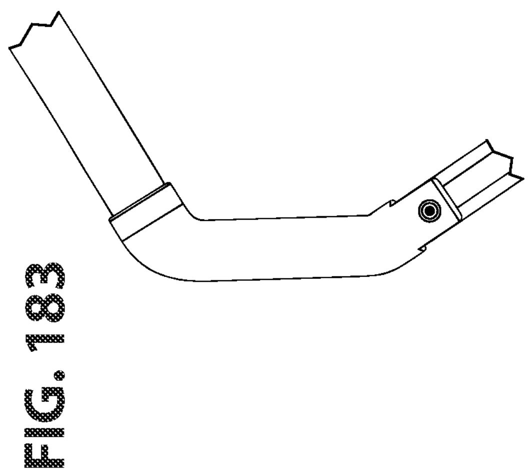
Figure 186:
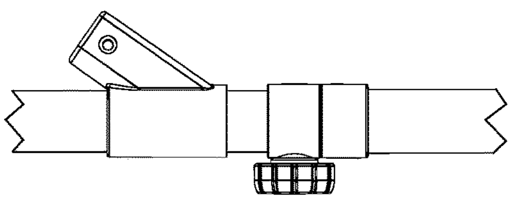
FIG. 185, FIG. 186, FIG. 187, FIG. 188, FIG. 189, FIG. 190, FIG.
Figure 188:
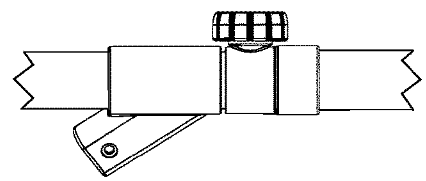
Figure 185:
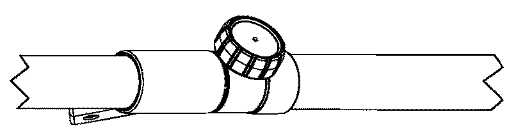
Figure 187:
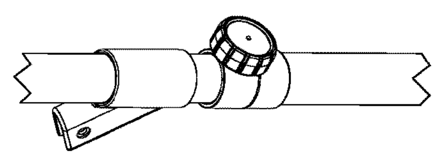

FIG. 164 and FIG. 165 illustrate enlarged partial side and perspective views of a variation of the physically-impaired-assisting arthritic-assisting single-hand-sail-deploying-and-retracting land-yacht-maneuvering multi-direction-hoisting ergonomic navigator 112. FIG. 166, FIG. 167, and FIG. 168 illustrate an exploded and perspective views of a variation of the sail and stanchion plinth system 101. FIG. 169, FIG. 170, and FIG. 171 illustrate partial perspective views of a variation of the wind-catching-and-redirecting rainwater-amassing-and-storing garden-irrigating fruit-harvesting panorama-media-screen-capable land-yacht-powering sail system 121. FIG. 172, FIG. 173, FIG. 174, FIG. 175, FIG. 176, FIG. 177, and FIG. 178 illustrate partial side and perspective views of a variation of the physically-impaired-assisting arthritic-assisting single-hand-automatic-sail-deploying-and-retracting multi-direction-hoisting system 110 demonstrating varying degrees of deployment of the wind-catching-and-redirecting rainwater-amassing-and-storing garden-irrigating fruit-harvesting panorama-media-screen-capable land-yacht-powering sail system 121. FIG. 179 illustrates an enlarged perspective view of a variation of the sail-location-securing adjustable removable clip 124. FIG. 180 illustrates a partial side view of a variation of the canal-hidden automatic-sail-deploying-and-retracting cable 118 and the cable-hiding cable-guiding canal 119. FIG. 181, FIG. 182, FIG. 183, and FIG. 184 illustrate partial side and perspective views of a variation of the physically-impaired-assisting arthritic-assisting single-hand-automatic-sail-deploying-and-retracting multi-direction-hoisting system 110.

Figure 189:
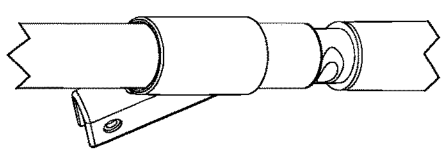
Figure 190:
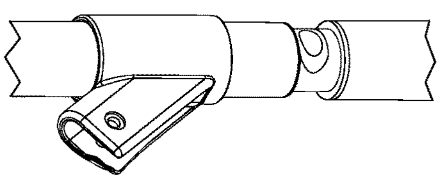
Figure 191:
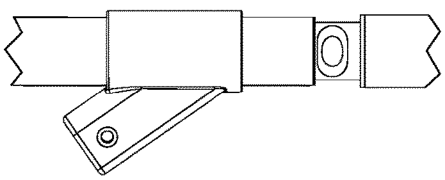
FIG. 191, FIG. 192, FIG. 193, FIG. 194, FIG. 195, FIG. 196, and FIG. 197 illustrate enlarged partial side and perspective views of variations of the horizontal-rotation-locking wind-catching-and-redirecting land-yacht-maneuvering system 105.
Figure 192:
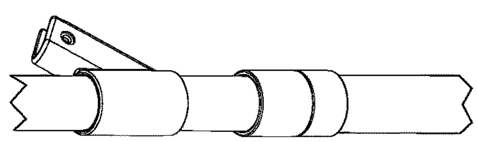
Figure 193:
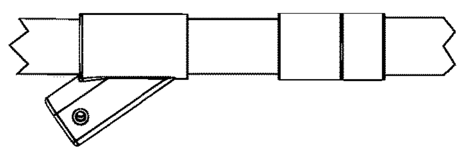
Figure 194:
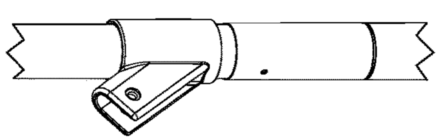
Figure 195:
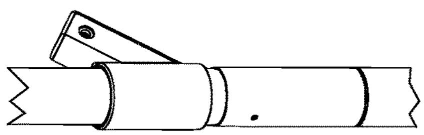
Figure 196:
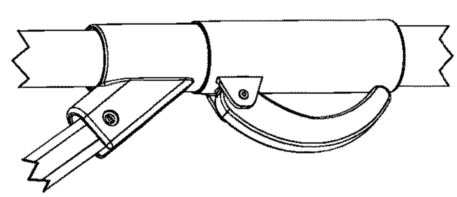
Figure 197:
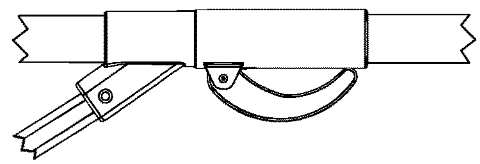

FIG. 185, FIG. 186, FIG. 187, and FIG. 188 illustrate enlarged partial side and perspective views of variations of the horizontal-rotation-locking wind-catching-and-redirecting land-yacht-maneuvering system 105 having a twist knob release. FIG. 189, FIG. 190, and FIG. 191 illustrate enlarged partial side and perspective views of variations of the horizontal-rotation-locking wind-catching-and-redirecting land-yacht-maneuvering system 105 having a push-button release. FIG. 192, FIG. 193, FIG. 194, and FIG. 195 illustrate enlarged partial side and perspective views of variations of the horizontal-rotation-locking wind-catching-and-redirecting land-yacht-maneuvering system 105 having a straight-pole coupling. FIG. 196, and FIG. 197 illustrate enlarged partial side and perspective views of variations of the horizontal-rotation-locking wind-catching-and-redirecting land-yacht-maneuvering system 105 having a grab-handle release.

MAJOR ADVANTAGES OF THE INVENTION

The present invention substantially departs from the conventional concepts and designs of the prior art. In doing so, the present invention provides a physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail (having: a) Sail and stanchion plinth system, b) Horizontal-rotation-locking wind-catching-and-redirecting land-yacht-maneuvering system, c) Physically-impaired-assisting arthritic-assisting single-hand-automatic-sail-deploying-and-retracting multi-direction-hoisting system, and d) Wind-catching-and-redirecting rainwater-amassing-and-storing garden-irrigating fruit-harvesting panorama-media-screen-capable land-yacht-powering sail system), having many new and significant features, functions, and advantages, which overcome all the disadvantages of the prior art, as follows:

1) It is an object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having horizontal-rotation-locking spring-loaded nipple-lock 106.
   Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:
   a) Capable of engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
      in the directions of arrows 135, and 136
      (see FIG. 19, and FIG. 49; and
   b) Capable of engaging and disengaging horizontal-rotation-locking pin 107 from horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
      in the directions of arrows 137, 138*a*, 138*b*, 139*a*, 139*b*, 140, 141*a*, 141*b*, 142*a*, and 142*b*
      (see FIG. 6, FIG. 7A, FIG. 7B, FIG. 30, FIG. 41, FIG. 42, FIG. 43, and FIG. 67).

2) It is an object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having horizontal-rotation-locking openings 108.
   Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:
   a) Capable of lockingly allowing horizontal-rotation-locking pin 107 to engage and disengage to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to maneuver a land yacht
      in the directions of arrows 135, and 136
      (see FIG. 19, and FIG. 49; and
   b) Capable of lockingly allowing horizontal-rotation-locking pin 107 to engage and disengage horizontal-rotation-locking openings 108 to horizontally rotate physically-impaired-assisting arthritic-assisting single-hand-automatic-sail-deploying-and-retracting multi-direction-hoisting system(s) 110 and wind-catching-and-redirecting rainwater-amassing-and-storing garden-irrigating fruit-harvesting panorama-media-screen-capable land-yacht-powering sail system(s) 121 to quickly and easily rotate and lock with 360 degrees of lateral movement to a desired location and configuration
      in the directions of arrows 137, 138*a*, 138*b*, 139*a*, 139*b*, 140, 141*a*, 141*b*, 142*a*, and 142*b*
      (see FIG. 6, FIG. 7A, FIG. 7B, FIG. 30, FIG. 41, FIG. 42, FIG. 43, and FIG. 67).

3) It is another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having physically-impaired-assisting arthritic-assisting single-hand-sail-deploying-and-retracting land-yacht-maneuvering multi-direction-hoisting ergonomic navigator 112.
   Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of allowing a physically-impaired or arthritic to easily deploy and retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail without the need to bend the fingers
   in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
   (see FIG. 2, FIG. 3, FIG. 4, FIG. 5, FIG. 37, FIG. 38, FIG. 39, and FIG. 40);

b) Capable of automatically deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
   in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
   (see FIG. 2, FIG. 3, FIG. 4, FIG. 5, FIG. 37, FIG. 38, FIG. 39, and FIG. 40); and c) Capable of automatically engaging physically-impaired-assisting arthritic-assisting single-hand-automatic-sail-deploying-and-retracting land-yacht-maneuvering multi-direction-hoisting slidable-rockable cantilever teeter totter 113, teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
   in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
   (see FIG. 2, FIG. 3, FIG. 4, FIG. 5, FIG. 37, FIG. 38, FIG. 39, and FIG. 40).

4) It is another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having physically-impaired-assisting arthritic-assisting single-hand-automatic-sail-deploying-and-retracting land-yacht-maneuvering multi-direction-hoisting slidable-rockable cantilever teeter totter 113.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of automatically engaging teeter-totter rocking tubular clamp 116, canal-hidden automatic-sail-deploying-and-retracting cable 118, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
   in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*
   (see FIG. 2, FIG. 3, FIG. 4, FIG. 5, FIG. 37, FIG. 38, FIG. 39, and FIG. 40); and b) Capable of providing cantilevered weight-balance for the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from falling over
   in the directions of arrows 150*a*, 150*b*, 151*a*, 151*b*, 152*a*, 152*b*, 152*c*, 152*d*, and 152*e*
   (see FIG. 39 and FIG. 40).

5) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomicnavigator-to-produce-multi-function sail, having teeter-totter-locking spring-loaded automatic hook-lock 114.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of automatically locking physically-impaired-assisting arthritic-assisting single-hand-automatic-sail-deploying-and-retracting land-yacht-maneuvering multi-direction-hoisting slidable-rockable cantilever teeter totter 113 to fully deploy the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to prevent from collapsing and causing injury in the directions of arrows 143, 144, 145*a*, 145*b*, 146*a*, 146*b*, 147*a*, 147*b*, 147*c*, 147*d*, 147*e*, 148, 149, 149*b*, 150*a*, 150*b*, 151*a*, 151*b*, 152*a*, 152*b*, 152*c*, 152*d*, and 152*e*

(see FIG. 2, FIG. 3, FIG. 4, FIG. 5, FIG. 37, FIG. 38, FIG. 39, and FIG. 40);

b) Capable of unlocking physically-impaired-assisting arthritic-assisting single-hand-automatic-sail-deploying-and-retracting land-yacht-maneuvering multi-direction-hoisting slidable-rockable cantilever teeter totter 113 to safely retract the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail to allow for compact storage and moving in the directions of arrows 153*a*, 153*b*, 153*c*, 154*a*, 154*b*, and 154*c*

(see FIG. 28, and FIG. 64); and c) Capable of automatically locking physically-impaired-assisting arthritic-assisting single-hand-automatic-sail-deploying-and-retracting land-yacht-maneuvering multi-direction-hoisting slidable-rockable cantilever teeter totter 113 to assist the physically-impaired or arthritic in the directions of arrows 153*a*, 153*b*, 153*c*, 154*a*, 154*b*, and 154*c*

(see FIG. 28, and FIG. 64).

6) It is yet still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having teeter-totter rocking tubular clamp 116.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of slidably navigating physically-impaired-assisting arthritic-assisting single-hand-automatic-sail-deploying-and-retracting land-yacht-maneuvering multi-direction-hoisting slidable-rockable cantilever teeter totter 113 for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155*a*, 155*b*, 156*a*, and 156*b*

(see FIG. 29A, FIG. 29B, FIG. 65A, and FIG. 65B);

b) Capable of preventing physically-impaired-assisting arthritic-assisting single-hand-automatic-sail-deploying-and-retracting land-yacht-maneuvering multi-direction-hoisting slidable-rockable cantilever teeter totter 113 from disengaging from upper stanchion 109 in the directions of arrows 155*a*, 155*b*, 156*a*, and 156*b*

(see FIG. 29A, FIG. 29B, FIG. 65A, and FIG. 65B); and c) Capable of pivotably rocking to allow physically-impaired-assisting arthritic-assisting single-hand-automatic-sail-deploying-and-retracting land-yacht-maneuvering multi-direction-hoisting slidable-rockable cantilever teeter totter 113 a defined range of motion for deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail in the directions of arrows 155*a*, 155*b*, 156*a*, and 156*b*

(see FIG. 29A, FIG. 29B, FIG. 65A, and FIG. 65B).

7) It is yet still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having cable-securing tubular clamp-securing camber 117.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of securely and discretely locking canal-hidden automatic-sail-deploying-and-retracting cable 118
in the directions of arrow 157*a* and 157*b*
(see FIG. 58, FIG. 59A, FIG. 59B, FIG. 60, and FIG. 61); and b) Capable of guiding physically-impaired-assisting arthritic-assisting single-hand-automatic-sail-deploying-and-retracting land-yacht-maneuvering multi-direction-hoisting slidable-rockable cantilever teeter totter 113 to assist and control deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 155*a*, 155*b*, 156*a*, and 156*b*
(see FIG. 29A, FIG. 29B, FIG. 65A, and FIG. 65B).

8) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having
canal-hidden automatic-sail-deploying-and-retracting cable 118.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

Capable of automatically engaging teeter-totter rocking tubular clamp 116, cable-hiding cable-guiding canal 119, pivoting pulley housing 120, pivoting pulley hub 122, wind-catching-and-redirecting rainwater-amassing-and-storing garden-irrigating fruit-harvesting panorama-media-screen-capable land-yacht-powering sail 123, sail-location-securing adjustable removable clip 124, automatic-sail-deploying-and-retracting-cable pulleys 125, cable-guiding central tube 126, sail-buttresses 127, sail-buttress-supporting arms 128, arm-hinging shuttling hub 129, and automatic-sail-deploying-and-retracting-cable anti-tangling weight 130 in a single upward-arching motion to save time and effort in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*
(see FIG. 60, FIG. 61, FIG. 63, and FIG. 64).

9) It is still another object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having
cable-hiding cable-guiding canal 119.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of discretely hiding canal-hidden automatic-sail-deploying-and-retracting cable 118 within to be more aesthetically pleasing
in the directions of arrows 164*a* and 165*a*
(see FIG. 58, FIG. 59A, FIG. 59B, FIG. 60, and FIG. 61);

b) Capable of discretely hiding canal-hidden automatic-sail-deploying-and-retracting cable 118 within to prevent injury
in the directions of arrows 164*a* and 165*a*
(see FIG. 58, FIG. 59A, FIG. 59B, FIG. 60, and FIG. 61); and c) Capable of guiding canal-hidden automatic-sail-deploying-and-retracting cable 118 to assist in deploying and retracting the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail
in the directions of arrows 164*a*, 164*b*, 164*c*, 164*d*, 164*e*, 165*a*, 165*b*, 165*a*, 165*a*, 165*a*, 165*a*, 165*a*, 165*a*, 165*a*, 165*a*, 165*a*, 165*a*, 165*a*, 165*a*, and 169*d*
(see FIG. 60, FIG. 61, FIG. 63, and FIG. 64).

10) It is a further object of the new invention to provide (a or an) physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail, having
wind-catching-and-redirecting rainwater-amassing-and-storing garden-irrigating fruit-harvesting panorama-media-screen-capable land-yacht-powering sail 123.

Therefore, the physically-impaired-assisting arthritic-assisting five-device-in-one wind-catching-and-redirecting land-yacht-maneuvering-and powering rainwater-amassing-and-storing garden-irrigating fruit-harvesting panorama-media-screen-capable single-hand-automatic-sail-deploying-and-retracting single-movement-ergonomic-navigator-to-produce-multi-function sail:

a) Capable of harvesting fruit and nuts from trees;
b) Capable of collecting rainwater on a marine craft;
c) Capable of collecting rainwater for irrigation;
d) Capable of multi-adjustably catching and redirecting wind to maneuver a land-yacht; and e) Capable of providing shade in the directions of arrows 131*a*, 131*b*, 131*c*, 132*a*, 132*b*, 132*c*, 133*a*, 133*b*, 133*c*, 134*a*, 134*b*, 134*c*, 155*a*, 155*b*, 155*c*, 171*a*, 171*b*, 171*c*, 171*d*, 172*a*, 172*b*, 172*c*, 172*d*, 173*a*, 173*b*, 173*c*, 173*d*, 174*a*, 174*b*, 175*a*, 175*b*, 176*a*, 176*b*, 176*c*, 176*d*, 177*a*, 177*b*, 177*c*, 177*d*, 178*a*, 178*b*, 178*c*, and 178*d*

(see FIG. 9, FIG. 10, FIG. 11, FIG. 12, FIG. 16, FIG. 17, FIG. 18, FIG. 19, FIG. 20, FIG. 21, FIG. 45, FIG. 46, FIG. 47, FIG. 48, FIG. 52, FIG. 53, FIG. 54, FIG. 56, and FIG. 57).

What is claimed is:

1. A physically-impaired-assisting multi-function sail, comprising:

a lower-stanchion-supporting plinth;

a plurality of plinth-securing screws inserted into said lower-stanchion-supporting plinth; a lower stanchion welded to said lower-stanchion-supporting plinth;

a horizontal-rotation-locking spring-loaded nipple-lock secured to said lower stanchion;

a horizontal-rotation-locking pin formed to said horizontal-rotation-locking spring-loaded nipple-lock;

a plurality of horizontal-rotation-locking openings;

an upper stanchion, said horizontal-rotation-locking openings formed into said upper stanchion wherein said horizontal-rotation-locking spring-loaded nipple-lock is for allowing a physically-impaired or arthritic to engage and disengage said horizontal-rotation-locking pin from said horizontal-rotation-locking openings to horizontally rotate said upper stanchion to maneuver a land yacht without the need for said physically-impaired or arthritic to bend their fingers, and allowing a physically-impaired or arthritic to engage and disengage said horizontal-rotation-locking pin from said horizontal-rotation-locking openings to horizontally rotate said upper stanchion to rotate and lock with 360 degrees of lateral movement to a desired location and configuration without the need for said physically-impaired or arthritic to bend their fingers;

a multi-direction-hoisting shank pivotably secured to said upper stanchion;

an ergonomic navigator hingedly attached to said multi-direction-hoisting shank for allowing a physically-impaired or arthritic to push and pull said ergonomic navigator to deploy and retract said physically-impaired-assisting multi-function sail without the need for said physically-impaired or arthritic to bend the fingers, and automatically deploying and retracting said physically-impaired-assisting multi-function sail;

a physically-impaired-assisting teeter totter secured to said ergonomic navigator for providing cantilevered weight-balance for said physically-impaired-assisting multi-function sail to prevent from falling over;

a teeter-totter-locking automatic hook-lock for automatically locking said physically-impaired-assisting teeter totter when pushing said teeter totter to fully deploy said physically-impaired-assisting multi-function sail to prevent from collapsing and causing injury and unlocking said physically-impaired-assisting teeter totter when pulling said teeter totter to safely retract said physically-impaired-assisting multi-function sail to allow for compact storage and moving;

a teeter-totter-locking pin, said physically-impaired-assisting teeter totter having a recess, said teeter totter pushed to automatically snap said teeter-totter-locking pin into said recess for automatically locking said physically-impaired-assisting teeter totter in said recess when pushing said teeter totter to fully deploy said physically-impaired-assisting multi-function sail to prevent from collapsing and causing injury, said teeter totter pulled to automatically snap said teeter-totter-locking pin out of said recess for unlocking said physically-impaired-assisting teeter totter from said recess when pulling said teeter totter to safely retract said physically-impaired-assisting multi-function sail to allow for compact storage and moving;

a teeter-totter rocking tubular clamp slidably fit around said physically-impaired-assisting teeter totter, said teeter-totter-locking automatic hook-lock springingly secured to said teeter-totter rocking tubular clamp, said teeter-totter-locking pin formed to said teeter-totter rocking tubular clamp for slidably navigating said physically-impaired-assisting teeter totter for deploying and retracting said physically-impaired-assisting multi-function sail, preventing said physically-impaired-assisting teeter totter from disengaging from said upper stanchion, and pivotably rocking to allow said physically-impaired-assisting teeter totter a defined range of motion for deploying and retracting said physically-impaired-assisting multi-function sail;

a cable-securing tubular clamp-securing camber secured to said upper stanchion and around said teeter-totter rocking tubular clamp for guiding said physically-impaired-assisting teeter totter to automatically assist and control deploying and retracting said physically-impaired-assisting multi-function sail;

a sail-deploying-and-retracting cable secured to said cable-securing tubular clamp-securing camber;

a cable-hiding cable-guiding canal formed into said physically-impaired-assisting teeter totter for discretely hiding said sail-deploying-and-retracting cable within to prevent injury, and guiding said sail-deploying-and-retracting cable to assist in deploying and retracting said physically-impaired-assisting multi-function sail;

a pivoting pulley housing secured to said physically-impaired-assisting teeter totter;

a pivoting pulley hub swingingly attached to said pivoting pulley housing;

a multi-function sail canopy for harvesting fruit and nuts from trees, collecting rainwater on a marine craft, collecting rainwater for irrigation, multi-adjustably catching and redirecting wind to maneuver a land-yacht, and providing shade;

a plurality of automatic-sail-deploying-and-retracting-cable pulleys rotatably secured at multiple locations within said pivoting pulley housing and said pivoting pulley hub for guiding said sail-deploying-and-retracting cable when deploying and retracting said physically-impaired-assisting multi-function sail, and providing rotation when deploying and retracting said physically-impaired-assisting multi-function sail;

a cable-guiding central tube attached to said pivoting pulley hub, said sail-deploying-and-retracting cable secured to said cable-securing tubular clamp-securing camber and situated within said cable-hiding cable-guiding canal and threaded around said automatic-sail-deploying-and-retracting-cable pulleys and inserted through said cable-guiding central tube;

a plurality of sail-buttresses hingedly attached to said pivoting pulley hub, said multi-function sail canopy secured to said sail-buttresses;

a plurality of sail-buttress-supporting arms hingedly attached to said sail-buttresses;

an arm-hinging shuttling hub attached to said sail-buttress-supporting arms wherein said sail-deploying-and-retracting cable is for automatically engaging said teeter-totter rocking tubular clamp, said cable-hiding cable-guiding canal, said pivoting pulley housing, said pivoting pulley hub, said multi-function sail canopy, said automatic-sail-deploying-and-retracting-cable pulleys, said cable-guiding central tube, said sail-buttresses, said sail-buttress-supporting arms, and said arm-hinging shuttling hub in a single upward-arching motion to save time and effort in deploying and retracting said physically-impaired-assisting multi-function sail.

2. The physically-impaired-assisting multi-function sail, of claim 1, further comprising:

a sail-location-securing adjustable removable clip attached to said multi-function sail canopy and removably and slidably clipped to said upper stanchion for securing said multi-function sail canopy to prevent from spinning, and slidably vertically guiding said multi-function sail canopy when deploying and retracting said physically-impaired-assisting multi-function sail.

3. The physically-impaired-assisting multi-function sail, of claim 1, further comprising: a sail-deploying-and-retracting-cable anti-tangling weight secured to said sail-deploying-and-retracting cable to secure said multi-function sail canopy in an upside-down or right-side-up position for weightingly preventing said sail-deploying-and-retracting cable from tangling, and assisting in deploying and retracting said multi-function sail canopy in an upside-down or right-side-up positions.

4. The physically-impaired-assisting multi-function sail, of claim 1, wherein:

said ergonomic navigator is formed into the shape of a circle.

5. The physically-impaired-assisting multi-function sail, of claim 1, wherein:

said ergonomic navigator is made of the material of plastic, metal, or rubber.

6. The physically-impaired-assisting multi-function sail, of claim 1, wherein:

said multi-function sail canopy is formed into the shape of hexagon.

7. The physically-impaired-assisting multi-function sail, of claim 1, wherein:

said multi-function sail canopy is made of the material of vinyl, nylon or other fabric.

8. The physically-impaired-assisting multi-function sail, of claim 1, wherein:

said sail-deploying-and-retracting cable is made of the material of metal.

9. The physically-impaired-assisting multi-function sail, of claim 1, wherein:

said physically-impaired-assisting teeter totter is made of the material of metal.

10. An arthritic-assisting multi-function sail, comprising:

a lower-stanchion-supporting plinth;

a plurality of plinth-securing screws inserted into said lower-stanchion-supporting plinth;

a lower stanchion welded to said lower-stanchion-supporting plinth;

a spring-loaded nipple-lock secured to said lower stanchion;

a rotation-locking pin formed to said spring-loaded nipple-lock;

a plurality of rotation-locking openings;

an upper stanchion, said rotation-locking openings formed to said upper stanchion wherein said spring-loaded nipple-lock is for allowing a physically-impaired or arthritic to engage and disengage said rotation-locking pin from said rotation-locking openings to horizontally rotate said upper stanchion to maneuver a land yacht without the need for said physically-impaired or arthritic to bend their fingers, and allowing a physically-impaired or arthritic to engage and disengage said rotation-locking pin from said rotation-locking openings to horizontally rotate said upper stanchion to quickly rotate and lock with 360 degrees of lateral movement to a desired location and configuration without the need for said physically-impaired or arthritic to bend their fingers;

a hoisting shank pivotably secured to said upper stanchion;

an ergonomic navigator hingedly attached to said hoisting shank for allowing a physically-impaired or arthritic to push and pull said ergonomic navigator to deploy and retract said multi-function sail without the need for said physically-impaired or arthritic to bend the fingers, and automatically deploying and retracting said arthritic-assisting multi-function sail;

a physically-impaired-assisting teeter totter secured to said ergonomic navigator for providing cantilevered weight-balance for said arthritic-assisting multi-function sail to prevent from falling over;

a teeter-totter-locking hook-lock for automatically locking said physically-impaired-assisting teeter totter when pushing said teeter totter to fully deploy said arthritic-assisting-multi-function sail to prevent from collapsing and causing injury and unlocking said physically-impaired-assisting teeter totter when pulling said teeter totter to safely retract said arthritic-assisting multi-function sail to allow for compact storage and moving;

a teeter-totter-locking pin; said physically-impaired-assisting teeter totter having a recess, said teeter totter pushed to automatically snap said teeter-totter-locking pin into said recess for automatically locking said physically-impaired-assisting teeter totter in said recess when pushing said teeter totter to fully deploy said arthritic-assisting multi-function sail to prevent from collapsing and causing injury, said teeter totter pulled to automatically snap said teeter-totter-locking pin out of said recess for unlocking said physically-impaired-assisting teeter totter from said recess when pulling said teeter totter to safely retract said arthritic-assisting multi-function sail to allow for compact storage and moving; a teeter-totter rocking tubular clamp slidably fit around said physically-impaired-assisting teeter totter, said teeter-totter-locking hook-lock springingly secured to said teeter-totter rocking tubular clamp, said teeter-totter-locking pin for slidably navigating said physically-impaired-assisting teeter totter for deploying and retracting said arthritic-assisting multi-function sail, preventing said physically-impaired-assisting teeter totter from disengaging from said upper stanchion, and pivotably rocking to allow said physically-impaired-assisting teeter totter a defined range of motion for deploying and retracting said arthritic-assisting multi-function sail;

a cable-securing clamp-securing camber secured to said upper stanchion and around said teeter-totter rocking tubular clamp for guiding said physically-impaired-assisting teeter totter to automatically assist and control deploying and retracting said arthritic-assisting multi-function sail;

an automatic-sail-deploying-and-retracting cable secured to said cable-securing clamp-securing camber;

a cable-hiding cable-guiding canal formed into said physically-impaired-assisting teeter totter for discretely hiding said automatic-sail-deploying-and-retracting cable within to prevent injury, and guiding said automatic-sail-deploying-and-retracting cable to assist in deploying and retracting said multi-function sail; a pivoting pulley housing secured to said physically-impaired-assisting teeter totter;

a pivoting pulley hub swingingly attached to said pivoting pulley housing; a multi-function sail canopy for harvesting fruit and nuts from trees, collecting rainwater on a marine craft, collecting rainwater for irrigation, multi-adjustably catching and redirecting wind to maneuver a land-yacht, and providing shade;

a plurality of automatic-sail-deploying-and-retracting-cable pulleys rotatably secured at multiple locations within said pivoting pulley housing and said pivoting pulley hub for guiding said automatic-sail-deploying-and-retracting cable when deploying and retracting said arthritic-assisting multi-function sail, and providing rotation when deploying and retracting said arthritic-assisting multi-function sail; a cable-guiding central tube attached to said pivoting pulley hub, said automatic-sail-deploying-and-retracting cable secured to said cable-securing clamp-securing camber and situated within said cable-hiding cable-guiding canal and threaded around said automatic-sail-deploying-and-retracting-cable pulleys and inserted through said cable-guiding central tube; a plurality of sail-buttresses hingedly attached to said pivoting pulley hub, said multi-function sail canopy secured to said sail-buttresses;

a plurality of sail-buttress-supporting arms hingedly attached to said sail-buttresses;

an arm-hinging shuttling hub attached to said sail-buttress-supporting arms wherein said automatic-sail-deploying-and-retracting cable is for automatically engaging said teeter-totter rocking tubular clamp, said cable-hiding cable-guiding canal, said pivoting pulley housing, said pivoting pulley hub, said multi-function sail canopy, said automatic-sail-deploying-and-retracting-cable pulleys, said cable-guiding central tube, said sail-buttresses, said sail-buttress-supporting arms, and said arm-hinging shuttling hub in a single upward-arching motion to save time and effort in deploying and retracting said arthritic-assisting multi-function sail.

11. The arthritic-assisting multi-function sail, of claim 10, further comprising:

a sail-location-securing adjustable removable clip
attached to said multi-function sail canopy and removably and slidably clipped to said upper stanchion
for
securing said multi-function sail canopy to prevent from spinning, and slidably vertically guiding said multi-function sail canopy when deploying and retracting said arthritic-assisting multi-function sail.

12. The arthritic-assisting multi-function sail, of claim 10, further comprising: a sail-deploying-and-retracting-cable anti-tangling weight secured to said automatic-sail-deploying-and-retracting cable to secure said multi-function sail canopy in an upside-down or right-side-up position for weightingly preventing said automatic-sail-deploying-and-retracting cable from tangling, and assisting in deploying and retracting said multi-function sail canopy.

13. The arthritic-assisting multi-function sail, of claim 10, wherein:

said ergonomic navigator
is formed into the shape of a circle.

14. The arthritic-assisting multi-function sail, of claim 10, wherein:

said ergonomic navigator
is made of the material of plastic, metal, or rubber.

15. The arthritic-assisting multi-function sail, of claim 10, wherein:

said multi-function sail canopy
is formed into the shape of hexagon.

16. The arthritic-assisting multi-function sail, of claim 10, wherein:

said multi-function sail canopy
is made of the material of vinyl, nylon or other fabric.

17. The arthritic-assisting multi-function sail, of claim 10, wherein:

said automatic-sail-deploying-and-retracting cable
is made of the material of metal.

18. The arthritic-assisting multi-function sail, of claim 10, wherein:

said physically-impaired-assisting teeter totter
is made of the material of metal.

19. A physically-impaired-assisting arthritic-assisting multi-function sail, comprises:

a plinth;
a plurality of plinth screws
inserted into said plinth;
a lower stanchion welded to said plinth;
a nipple-lock
secured to said lower stanchion;
a plurality of locking openings;
an upper stanchion,
said locking openings formed into said upper stanchion;
a hoisting shank
pivotably secured to said upper stanchion;
an ergonomic navigator
hingedly attached to said hoisting shank;
a cantilever teeter totter
secured to said ergonomic navigator;
a teeter-totter hook-lock;
a teeter-totter clamp
slidably fit around said cantilever teeter totter,
said teeter-totter hook-lock springingly secured to said teeter-totter clamp;
a camber
secured to said upper stanchion and around said teeter-totter clamp;
a cable
secured to said camber;
a cable canal
formed into said cantilever teeter totter;

a pivoting pulley housing
secured to said cantilever teeter totter;
a pivoting pulley hub
swingingly attached to said pivoting pulley housing;
a multi-function sail canopy;
a plurality of cable pulleys
rotatably secured at multiple locations within said pivoting pulley housing and said
pivoting pulley hub;
a central tube
attached to said pivoting pulley hub,
said cable secured to said camber and situated within said cable canal and threaded around said cable pulleys and inserted through said central tube;
a plurality of sail-buttresses
hingedly attached to said pivoting pulley hub,
said multi-function sail canopy secured to said sail-buttresses;
a plurality of sail-buttress-supporting arms
hingedly attached to said sail-buttresses;
a shuttling hub
attached to said sail-buttress-supporting arms.

20. The physically-impaired-assisting arthritic-assisting multi-function sail, of claim 19,
wherein:
said cantilever teeter totter
is made of the material of metal.

* * * * *